US012762056B1

(12) United States Patent
Albericio Latorre et al.

(10) Patent No.: US 12,762,056 B1
(45) Date of Patent: Oct. 13, 2026

(54) DATA STORAGE TECHNIQUES

(71) Applicant: NVIDIA Corporation, Santa Clara, CA (US)

(72) Inventors: Jorge Albericio Latorre, Brooklyn, NY (US); Dmitri Vainbrand, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 18/923,573

(22) Filed: Oct. 22, 2024

(51) Int. Cl.
*G06F 12/08* (2016.01)
*G06F 17/16* (2006.01)

(52) U.S. Cl.
CPC .............. *G06F 12/08* (2013.01); *G06F 17/16* (2013.01)

(58) Field of Classification Search
CPC .... G06F 17/16; G06F 9/3016; G06F 9/30036; G06F 13/00; G06F 12/08
USPC .......................................... 711/117; 710/105
See application file for complete search history.

(56) References Cited

U.S. PATENT DOCUMENTS 11,074,072 B2 * 7/2021 Nealis .................. G06F 9/3851
11,507,797 B2 * 11/2022 Motoya ................ G06N 3/0464
2009/0198977 A1 * 8/2009 Gschwind ............. G06F 9/3885 712/226
2013/0283018 A1 * 10/2013 Ould-Ahmed-Vall ...................... G06F 9/30038 712/225
2025/0068423 A1 * 2/2025 Parra Osorio ........ G06F 9/3851

OTHER PUBLICATIONS

Society of Automotive Engineers on-Road Automated Vehicle Standards Committee "Taxonomy and Definitions for Terms Related to Driving Automation Systems for on-Road Motor Vehicles", Standard No. J3016-201806, dated Jun. 15, 2018, 35 pages.

Society of Automotive Engineers on-Road Automated Vehicle Standards Committee, "Taxonomy and Definitions for Terms Related to Driving Automation Systems for on-Road Motor Vehicles," Standard No. J3016-201609, issued Jan. 2014, revised Sep. 2016, 30 pages.

* cited by examiner

*Primary Examiner* — Jared I Rutz
*Assistant Examiner* — Edward Waddy, Jr.
(74) *Attorney, Agent, or Firm* — Davis Wright Tremaine LLP

(57) ABSTRACT

Apparatuses, systems, and techniques to format memory to store values of mixed precision. In at least one embodiment, processor(s) perform operations to format memory to store values of mixed precision in a block of contiguous memory by, in part, using an indication of a number of higher-precision values to be stored in memory.

21 Claims, 38 Drawing Sheets

DATA STORAGE TECHNIQUES

TECHNICAL FIELD

At least one embodiment pertains to processing resources used to store values. At least one embodiment pertains to processors or computing systems used to store values based, at least in part, on a precision of those values.

BACKGROUND

Storing values of mixed precision may increase computing time. Techniques for storing values can be improved.

DETAILED DESCRIPTION

Figure 1:
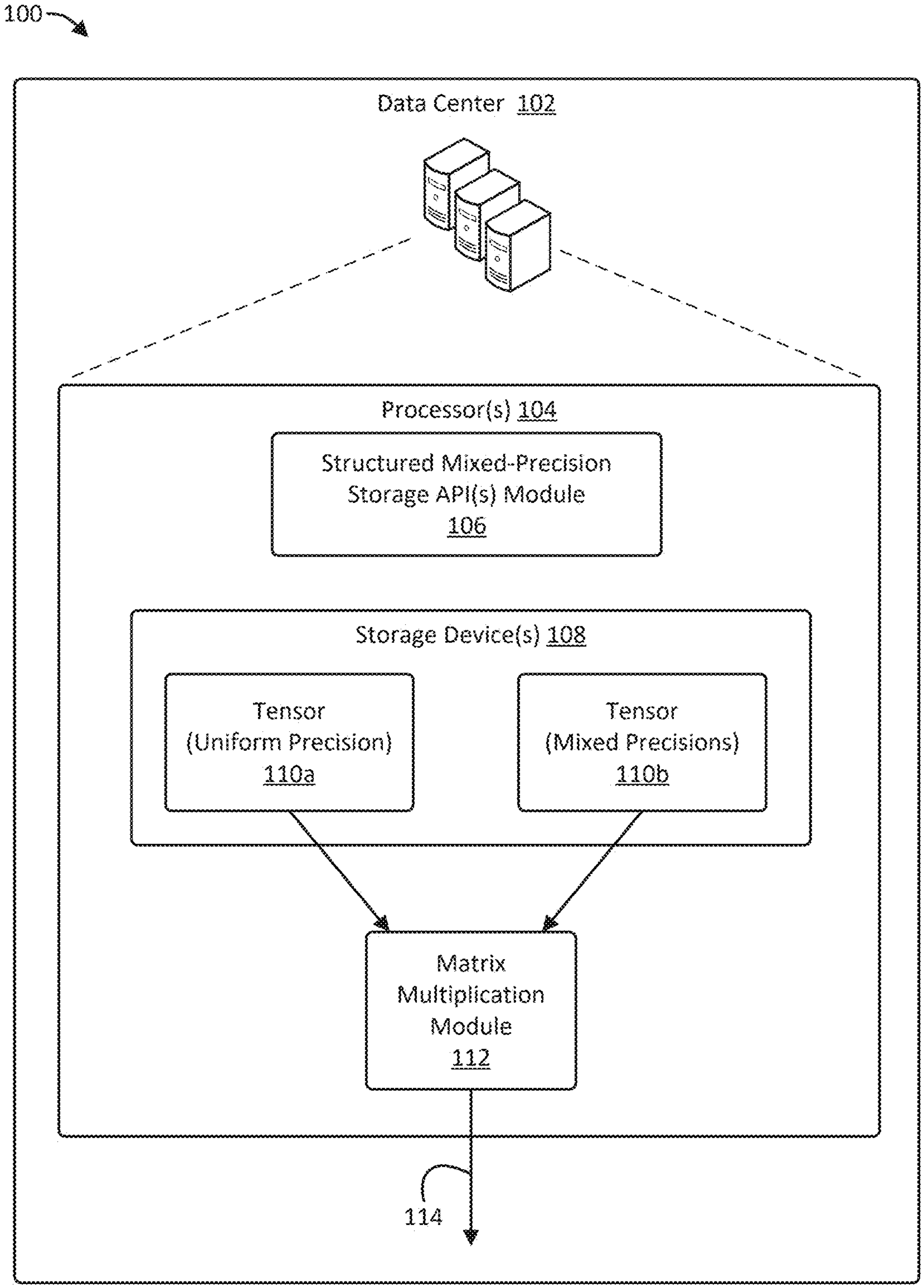
FIG. 1 illustrates a system used to format memory to store values of mixed precision, in accordance with at least one embodiment.

In the following description, numerous specific details are set forth to provide a more thorough understanding of at least one embodiment. However, it will be apparent to one skilled in the art that the inventive concepts may be practiced without one or more of these specific details, and that any two or more aspects of any one or more embodiments described herein may be combined.

In at least one embodiment, quantization refers to reducing a size a set of values with respect to an amount of data required to represent those values. In at least one embodiment, quantization refers to reducing a number of bits required to represent and store a value in memory. In at least one embodiment, quantization is used in fields such as artificial intelligence, machine learning, statistics, data compression, data analysis, data science, digital image processing, signal processing, or some combination thereof.

In at least one embodiment, a precision refers, in part, to a data representation format using a specific number of bits. In at least one embodiment, a precision that uses fewer bits than another precision is referred to as a lower precision. In at least one embodiment, a precision that use more bits than another precision are referred to as a higher precision. In at least one embodiment, precisions are referred to as data representation formats, data types, data formats, or precision types. In at least one embodiment, bits used with a precision can be any number format (e.g., binary, ternary).

In at least one embodiment, a set of values is represented by two or more different precisions. In at least one embodiment, values represented by two or more different precisions are referred to as values of mixed precision. In at least one embodiment, neural network values (e.g., parameters, weights, activation values) are quantized to be represented by two or more different precisions to achieve a threshold level of neural network accuracy while reducing a size of neural network values to reduce computing overhead and speed up computing performance. In at least one embodiment, specific neural network values are selected to be represented in a higher precision to achieve a threshold level of neural network accuracy, while remaining neural network values are represented in a lower precision. In at least one embodiment, a computing system performs mathematical operations (e.g., matrix multiplication operations) more quickly if values are stored in memory locations that are sequential with respect to their addresses. A technical problem of not storing values in contiguous memory locations is slower access to values due to issues such as requiring additional instructions to access non-contiguous memory locations or not being able to concurrently access values in multiple contiguous memory locations using a single instruction. In at least one embodiment, contiguous memory locations are referred to as continuous, sequential, or adjacent memory locations. In at least one embodiment, contiguous memory locations are contiguous virtual memory locations. In at least one embodiment, contiguous memory locations are contiguous physical memory locations. In at least one embodiment, a memory location is indicated by a memory address.

In at least one embodiment, a processor configures a portion of memory to store values of mixed precision within a contiguous range of memory by generating metadata and/or an index, to indicate memory locations of values of a given precision. In at least one embodiment, as an example, if a portion of contiguous memory is 32 bits long and contains values stored as precisions that use 8 bits and other values stored as precisions that use 4 bits, an index indicates which ranges of memory locations within that 32-bit portion of contiguous memory contains a value represented with 8 bits, which also serves to indicate which ranges contain numbers represented with 4 bits as described further herein.

In at least one embodiment, a processor uses one or more indices comprising a plurality of bits, each indicating one or more operands stored contiguously based, at least in part, on a precision of one or more operands, or as otherwise described herein. In at least one embodiment, an operand is a value used in a mathematical operation. In at least one embodiment, one or more bits of an index indicates a storage location in a portion of storage of one or more operands of a higher precision than a precision used for other operands, or as otherwise described herein. In at least one embodiment, storage refers to any storage device, including any memory device described herein. In at least one embodiment, a processor identifies storage locations of operands of a lower precision based on storage locations of operands of a higher precision, or as otherwise described herein. In at least one embodiment, a processor uses an index to identify one or more storage locations of one or more operands of a first precision based, at least in part, on one or more storage locations of one or more operands of a second precision. In at least one embodiment, a processor generates an index based, at least in part, on metadata stored in a portion of storage storing one or more operands. In at least one embodiment, a processor generates an index based, at least in part, on metadata stored in a portion of storage different from that which stores one or more operands. In at least one embodiment, a processor assigns a plurality contiguous storage locations to store two or more operands of mixed precision, or as otherwise described herein. In at least one embodiment, a processor uses an index to store one or more operands of one or more tensors each comprising a plurality of different precisions, or as otherwise described herein.

A technical problem is storing values of different precisions in separate and/or non-contiguous memory, which increases a number of program instructions required to access those values. In at least one embodiment, a technical effect of techniques disclosed herein is storage of values of mixed precision within a contiguous portion of memory. In at least one embodiment, a technical effect of techniques disclosed herein is requiring fewer program instructions to perform operations to obtain values of mixed precision than if values were stored in corresponding but separate contiguous ranges of memory. In at least one embodiment, a technical effect of techniques disclosed herein is requiring only a single program instruction to obtain values of mixed precision stored in a block of contiguous memory as part of a parallel processing method, such as a Single Instruction Multiple Data (SIMD) method.

FIG. 1 illustrates an example of a system 100 that includes one or more processors comprising one or more circuits used, at least in part, to store values of mixed precision in contiguous memory, according to at least one embodiment. In at least one embodiment, one or more aspects of one or more embodiments described herein in conjunction with FIG. 1 are combined with one or more aspects of one or more embodiments described herein at least in conjunction with FIGS. 2-8. In at least one embodiment, system 100 includes at least a portion of, or is at least a portion of, structured mixed-precision system 200 of FIG. 2, structured mixed-precision system 300 of FIG. 3, structured mixed-precision system 400 of FIG. 4, structured mixed-precision system 500 of FIG. 5, or some combination thereof.

In at least one embodiment, one or more processors perform one or more operations of system 100. In at least one embodiment, processor(s) 104 that perform one or more operations of system 100 are any type of processor, portion of a processor, processor of a system, or combination of processors, described herein, including processor 908 of FIG. 9, processor complex 1010 of FIG. 10, parallel processor 1100 of FIG. 11A, graphics multiprocessor 1134 of FIG. 11B, processor 1200 of FIG. 12, processor 1300 of FIG. 13A, core 1312 of FIG. 13B, accelerator 1400 of FIG. 14, processor 1555 of FIG. 15, processor 1632 of FIG. 16, accelerated processing unit 1700 of FIG. 17, processor 1800 of FIG. 18, core 1900 of FIG. 19, TPUs 2000 of FIG. 20, vector processor 2100 of FIG. 21, many-core tiled processor 2200 of FIG. 22A, hardware 2308 of FIG. 23, CPU 2590 of FIG. 25, processor(s) 2610 of FIG. 26, a processor used in conjunction with logic 2715 illustrated in FIGS. 27A and 27B, a processor used in conjunction with training framework 2724 of FIG. 27C, or some combination thereof.

In at least one embodiment, two or more processor(s) 104 are installed on different computing machines (e.g., servers), different server racks, different data centers, or some combination thereof. In at least one embodiment, processor(s) 104 perform an operation used by system 100, such as an operation of structured mixed-precision storage API(s) module 106. In at least one embodiment, processor(s) 104 perform one or more operations described in conjunction with FIG. 2, such as an operation of structured mixed-precision storage system 200 to format storage. In at least one embodiment, processor(s) 104 perform one or more operations described in conjunction with FIG. 3, such as an operation of structured mixed-precision storage system 300 to format storage. In at least one embodiment, processor(s) 104 perform one or more operations described in conjunction with FIG. 4, such an operation of structured mixed-precision storage system 400 to store values used during matrix multiplication. In at least one embodiment, processor(s) 104 perform one or more operations described in conjunction with FIG. 5, such as an operation of structured mixed-precision storage system 500 to calculate values using arithmetic logic units. In at least one embodiment, processor(s) 104 perform one or more operations described in conjunction with FIG. 6, such as generating a structure of a block of contiguous memory. In at least one embodiment, processor(s) 104 perform one or more operations described in conjunction with FIG. 7, such as a call of structured mixed-precision storage API. In at least one embodiment, processor(s) 104 perform one or more operations described in conjunction with FIG. 8, such as an API function to generate structured mixed-precision storage.

In at least one embodiment, system 100 is any computing system or combination of computing systems, such as those that make up one or more data centers or other facilities that house computing and networking devices. In at least one embodiment, system 100 is at least a part of, or includes at least a part of, system 1600 of FIG. 16. In at least one embodiment, system 100 is used to perform high performance computing tasks, quantization of neural network values, neural network training, neural network inferencing, or some combination thereof. In at least one embodiment, a reference to machine learning, artificial intelligence, or deep learning refers to an aspect of any neural network described herein. In at least one embodiment, system 100 includes an edge computing system, an accelerated computing system, a cloud computing system, a hybrid cloud computing system, or some combination thereof. In at least one embodiment, system 100 is a computing system that includes multiple distributed components connected by a network, such as an internet network. In at least one embodiment, system 100 is used in fields such as generative artificial intelligence (AI), healthcare, genomics, engineering, aerospace, urban planning, graphics processing, finance, data storage and management, online commerce, meteorology, physics modeling, or some combination thereof. In at least one embodiment, system 100 is used to perform AI tasks such as image classification, image segmentation, autonomous driving, manufacturing defect identification, or some combination thereof. In at least one embodiment, neural networks are a component or a type of AI.

In at least one embodiment, system 100 includes data center 102. In at least one embodiment, data center 102 is one or more data centers. In at least one embodiment, data center 102 is at least a portion of data center 900 of FIG. 9. In at least one embodiment, a data center is any facility which houses computer and networking devices. In at least one embodiment, a data center includes processors, such as processor(s) 108*b*, that perform operations in parallel to process massive data sets of multiple dimensions. In at least one embodiment, a data center performs one or more neural network tasks. In at least one embodiment, at least a portion of computing resources of data center 102 is accessed remotely by a user via a network.

In at least one embodiment, data center 102 includes processor(s) 104. In at least one embodiment, processor(s) 104 perform operations of system 100 to group together and store values (e.g., elements of a tensor) of mixed precision together in a portion of storage, or as otherwise described herein. In at least one embodiment, processor(s) 104 perform operations of system 100 to configure a portion of storage with contiguous storage locations by assigning certain ranges of storage locations to store values of one precision and remaining ranges of storage locations to store values of another precision, or as otherwise described herein. In at least one embodiment, processor(s) 104 calculate storage locations for values of a certain precision, or as otherwise described herein. In at least one embodiment, processor(s) 104 generate indicators of storage locations for values of a specific precision as metadata. In at least one embodiment, processor(s) 104 stores metadata correlating a range of storage locations (e.g., memory addresses, memory index numbers) with a specific value of a certain precision, where such metadata may indicate that a range of storage locations is to store an n-th value in an array of values of a certain precision. In at least one embodiment, for example, metadata includes a 0 correlated with a specific range of storage locations used to store 8-bit values to store an 8-bit value that appears first, in position 0, of an array of 8-bit values.

In at least one embodiment, processor(s) 104 perform operations of system 100 to format portions of storage, such as blocks of contiguous virtual or physical memory each with a same fixed-length of bits. In at least one embodiment, blocks of contiguous memory are 32-bits long due to computing system specifications, such as a maximum number of threads that can be assigned to a block of contiguous memory to perform software instructions in parallel. In at least one embodiment, a thread refers to an instance of at least a portion of a software program performing operations on a particular set of values. In at least one embodiment, a number of blocks of contiguous memory is determined by calculating a number of blocks that can fit within a memory page, where a memory page is a larger fixed-length block of contiguous virtual or physical memory. In at least one embodiment, a number of 32-bit blocks of contiguous memory is 1024 blocks, 524,288 blocks, or 268,435,456 blocks depending on memory page sizes of 4 KB, 2 MB, or 1 GB respectively.

In at least one embodiment, processor(s) 104 calculate a number of values of that can be stored in a block of contiguous memory by using information about two or more precision types to be stored in each block. In at least one embodiment, information about precision types is input by an application or user. In at least one embodiment, two or more precision types are to be stored in each block of a set of blocks of contiguous memory. In at least one embodiment, two precision types are stored in one or more blocks of a set of blocks of contiguous memory, precision types such as INT8 and INT4, where INT8 is higher precision and INT4 is lower precision. In at least one embodiment, values of two precision types are not stored in each block of contiguous memory, but are stored in a portion of a set of blocks of contiguous memory. In at least one embodiment, values of two or more precision types are stored in a portion of a set of blocks of contiguous memory according to any suitable factor such as a total number of higher or lower precision values, a pattern that determines which blocks store values of two or more precisions, which blocks are faster to access than others with respect to higher or lower precision values, or some combination thereof.

In at least one embodiment, two different precisions to be stored in a block of contiguous memory are represented as A and B in documentation, code, pseudocode, an API command, or some combination thereof, where A represents a number of bits used to represent a value in a higher precision and B represents a number of bits used to represent a value in lower precision. In at least one embodiment, processor(s) 104 use A and B to calculate a number of values of lower precision that can be stored in a block of contiguous memory, or as otherwise described herein at least in conjunction with FIG. 2.

In at least one embodiment, a number of higher-precision values to be stored in a block of contiguous memory is represented as N in documentation, code, pseudocode, an API command, or some combination thereof. In at least one embodiment, a number of sub-blocks of a block of contiguous memory is represented as M in documentation, code, pseudocode, an API command, or some combination thereof. In at least one embodiment, a sub-block of a block of contiguous memory is a range of memory locations within that block. In at least one embodiment, a processor such as processor(s) 104 format a block into multiple sub-blocks of fixed length, as depicted and described further herein at least in conjunction with FIGS. 2-3. In at least one embodiment, processor(s) 104 use N and M to calculate a number of values of lower precision that can be stored in a block of contiguous memory, or as otherwise described herein at least in conjunction with FIG. 2. In at least one embodiment, a proportion or ratio of N:M is referred to as a structure of a block of contiguous memory. In at least one embodiment, a format for one or more blocks of contiguous memory is represented as N:M, A:B in documentation, code, pseudocode, an API command, or some combination thereof.

In at least one embodiment, processor(s) perform one or more APIs of structured mixed-precision storage API(s) module 106 to perform one or more operations to format blocks of contiguous memory to store values of mixed precision as described herein at least in conjunction with FIGS. 1-8. In at least one embodiment, an API refers to an function, method, procedure, or a combination of functions, methods, and/or procedures, such as those further described herein at least in conjunction with FIGS. 7-8. In at least one embodiment, structured mixed-precision storage API(s) module 106 includes one or more API(s) described further herein at least in conjunction with FIGS. 7-8.

Figure 6:
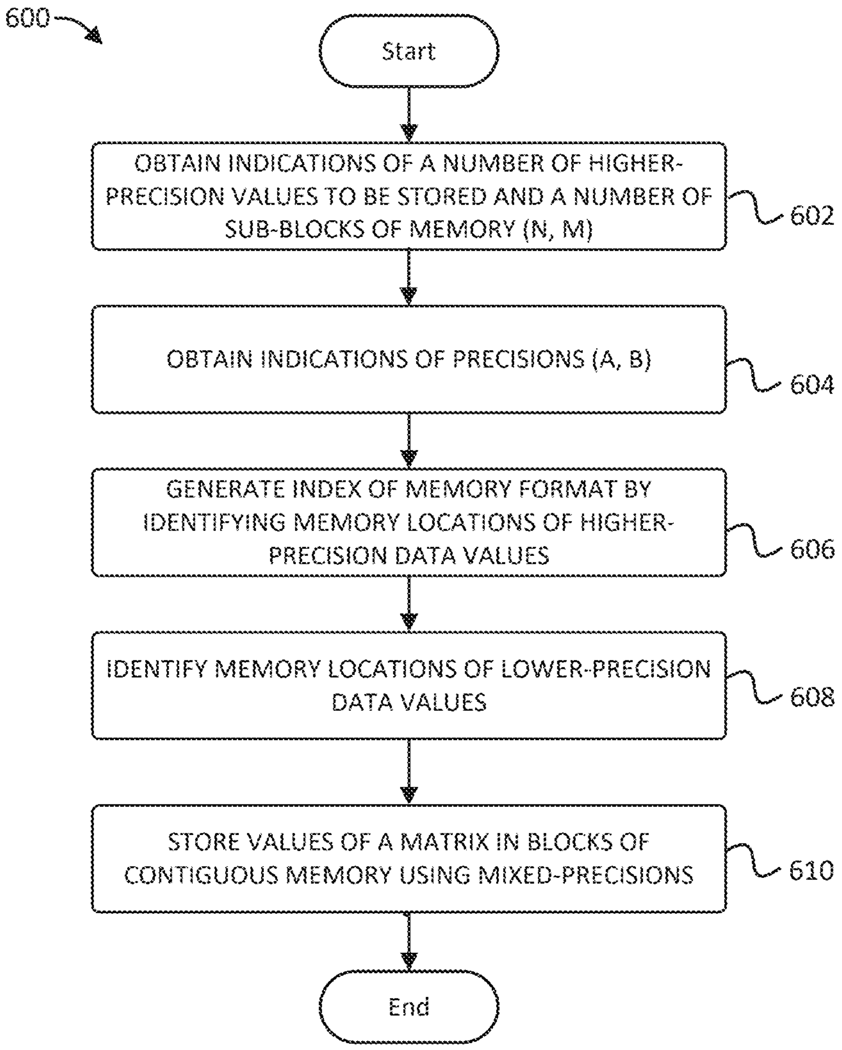
FIG. 6 illustrates a process used to format memory to store values of mixed precision, in accordance with at least one embodiment.

In at least one embodiment, processor(s) 104 perform one or more APIs of structured mixed-precision storage API(s) module 106 to obtain precisions to be used when storing values in a block of contiguous memory, or as otherwise described herein at least in conjunction with FIG. 6. In at least one embodiment, processor(s) 104 perform one or more APIs of structured mixed-precision storage API(s) module 106 to generate a structure of a block of contiguous memory used to store values of mixed precision, or as otherwise described herein at least in conjunction with FIG. 6. In at least one embodiment, processor(s) 104 perform one or more APIs of structured mixed-precision storage API(s) module 106 to generate an index of a structure of a block of contiguous memory by identifying memory locations used to store values of higher precision, or as otherwise described herein at least in conjunction with FIG. 6. In at least one embodiment, processor(s) 104 perform one or more APIs of structured mixed-precision storage API(s) module 106 to generate an index indicating memory locations of a block of contiguous memory that stores lower precision values, or as otherwise described herein at least in conjunction with FIG. 6. In at least one embodiment, processor(s) 104 perform one or more APIs of structured mixed-precision storage API(s) module 106 to store values of mixed precision in a block of contiguous memory, or as otherwise described herein at least in conjunction with FIG. 6.

In at least one embodiment, as used in any implementation described herein, unless otherwise clear from context or stated explicitly to contrary, terms such as "system," "device," "components," "framework," and "module," and nominalized verbs (e.g., compiler, scheduler, manager, and/or other terms) each refers to any combination of software logic, firmware logic, hardware logic, and/or circuitry configured to provide functionality described herein. In at least one embodiment, any combination of software logic, firmware logic, hardware logic, and/or circuitry configured to provide functionality described herein is referred to as a component. In at least one embodiment, any component described herein are combined and/or communicatively connected with at least one other component, regardless of how such components are described to be combined and/or communicatively connected in other embodiments. In at least one embodiment, software may be embodied as a software package, code, and/or instruction set or instructions. In at least one embodiment, hardware includes, singly or in any combination, hardwired circuitry, programmable circuitry, state machine circuitry, fixed function circuitry, execution unit circuitry, and/or firmware that stores instructions executed by programmable circuitry. In at least one embodiment, modules may, collectively or individually, be embodied as circuitry that forms part of a larger system, for example, an integrated circuit (IC), system on-chip (SoC), and so forth. In at least one embodiment, any one or more architectures of any circuits of one or more modules are represented as a register-transfer level (RTL) representation and/or another fabless representation that may be licensed and/or used in tape-out, a final phase in IC design before being used in manufacturing an IC. In at least one embodiment, any reference to a module performing one or more operations refers to one or more processors performing one or more operations of that module.

In at least one embodiment, system 100 includes storage device(s) 108. In at least one embodiment, two or more storage devices of storage device(s) 108 are implemented on different devices, such as different processors or different nodes of a data center. In at least one embodiment, storage device(s) 108 are implemented on a device other than processor(s) 104 as depicted in FIG. 1. In at least one embodiment, storage device(s) 108 include one or more memory devices, portions of memory devices, or groups of memory devices, such as memory 910 of FIG. 9. L2 cache 1028(1), L2 cache 1042, L3 cache 1030, or unified system memory 1090 of FIG. 10, or some combination thereof. Memory can be parallel processor memory 1122 of FIG. 11A. Memory can be shared memory 1170, cache memory 1172 of FIG. 11C, memory 1210 of FIG. 12, memory subsystem 1342 of FIG. 13B, device memory (HBM) 1426 of FIG. 14, memory 1560 of FIG. 15, memory 1640 of FIG.

Figure 17:
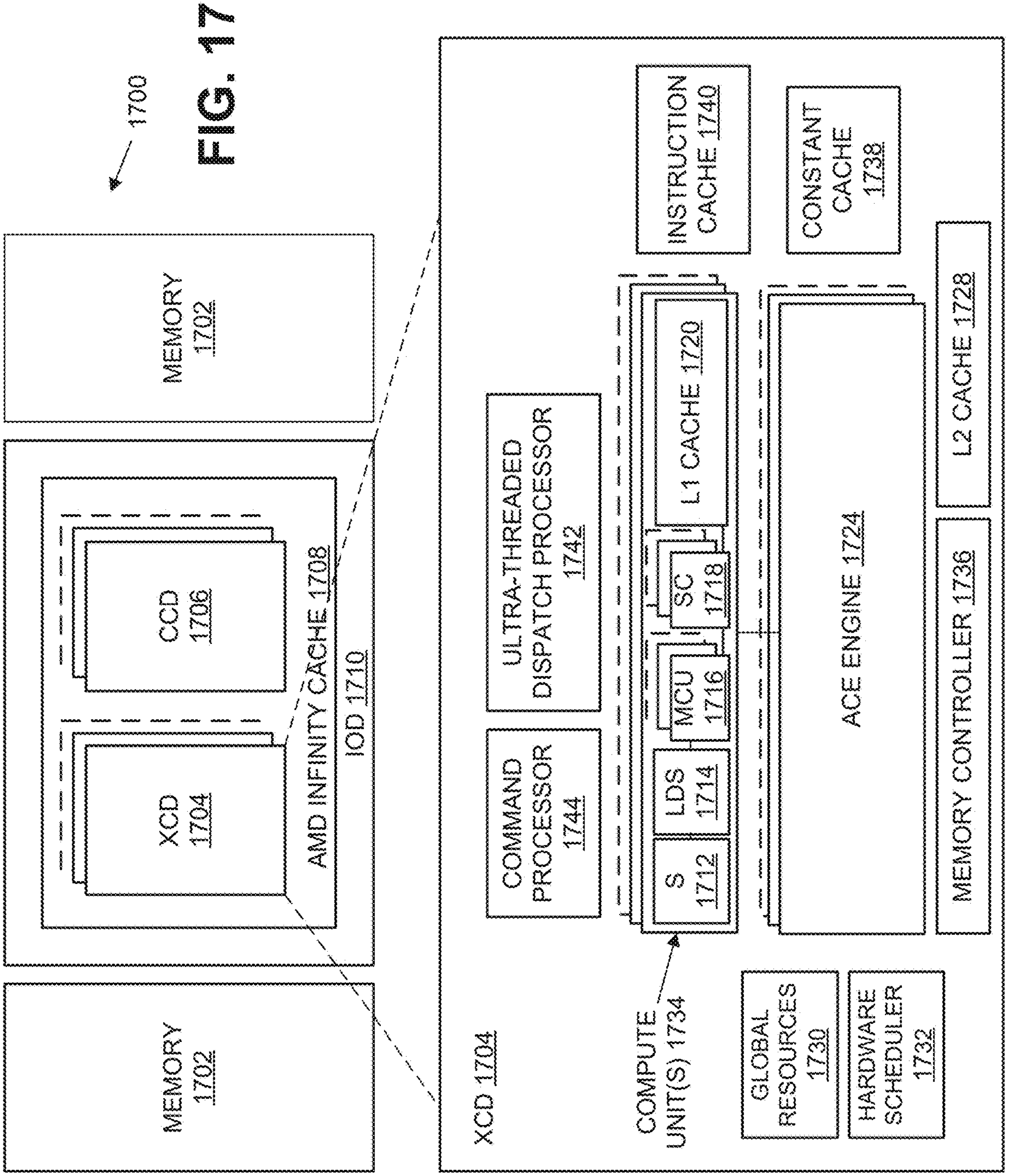
FIG. 17 illustrates another accelerator processor, in accordance with at least one embodiment.
Figure 18:
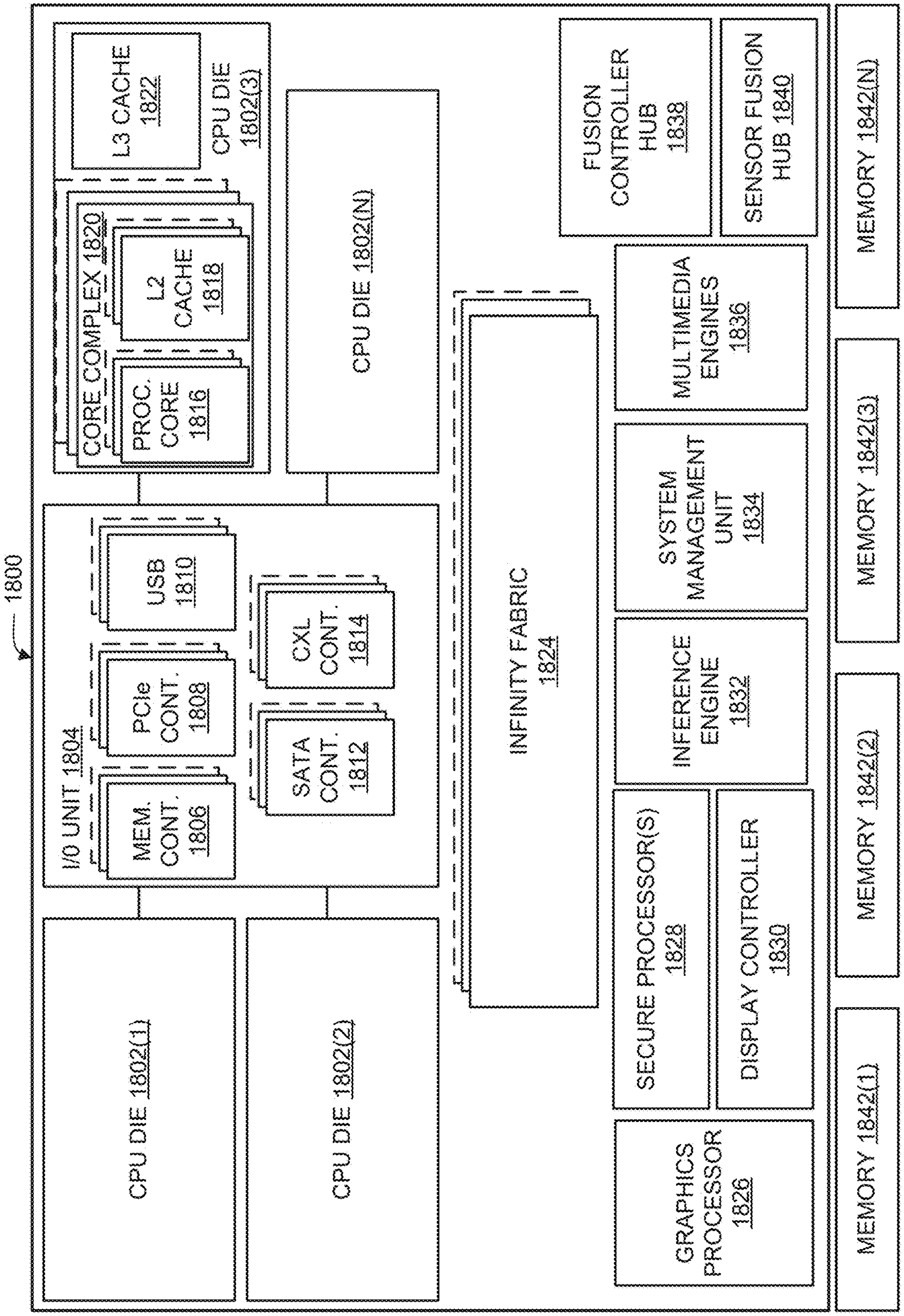
FIG. 18 illustrates another processor, in accordance with at least one embodiment.
Figure 19:
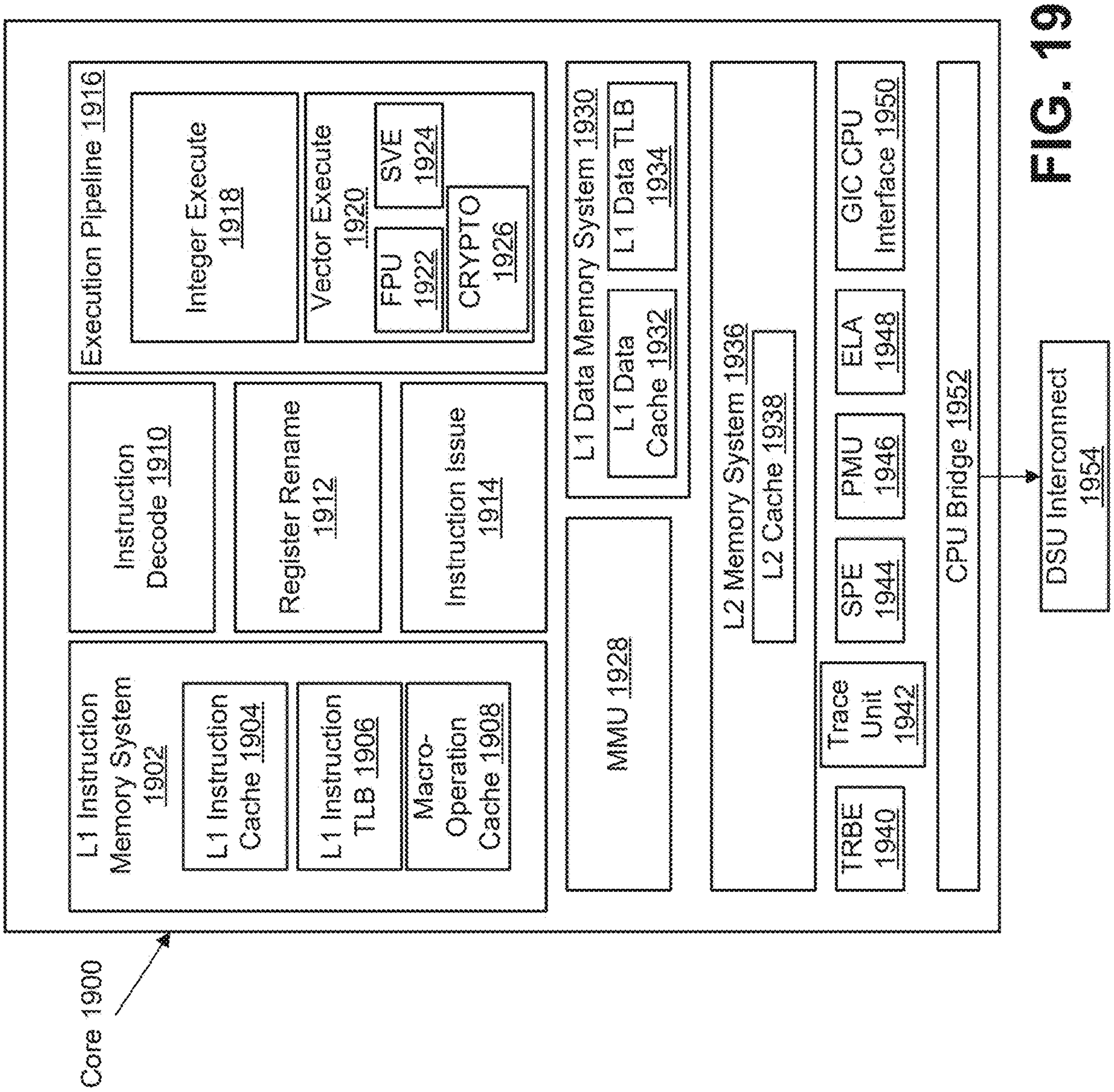
FIG. 19 illustrates another accelerator processor, in accordance with at least one embodiment.
Figure 20:
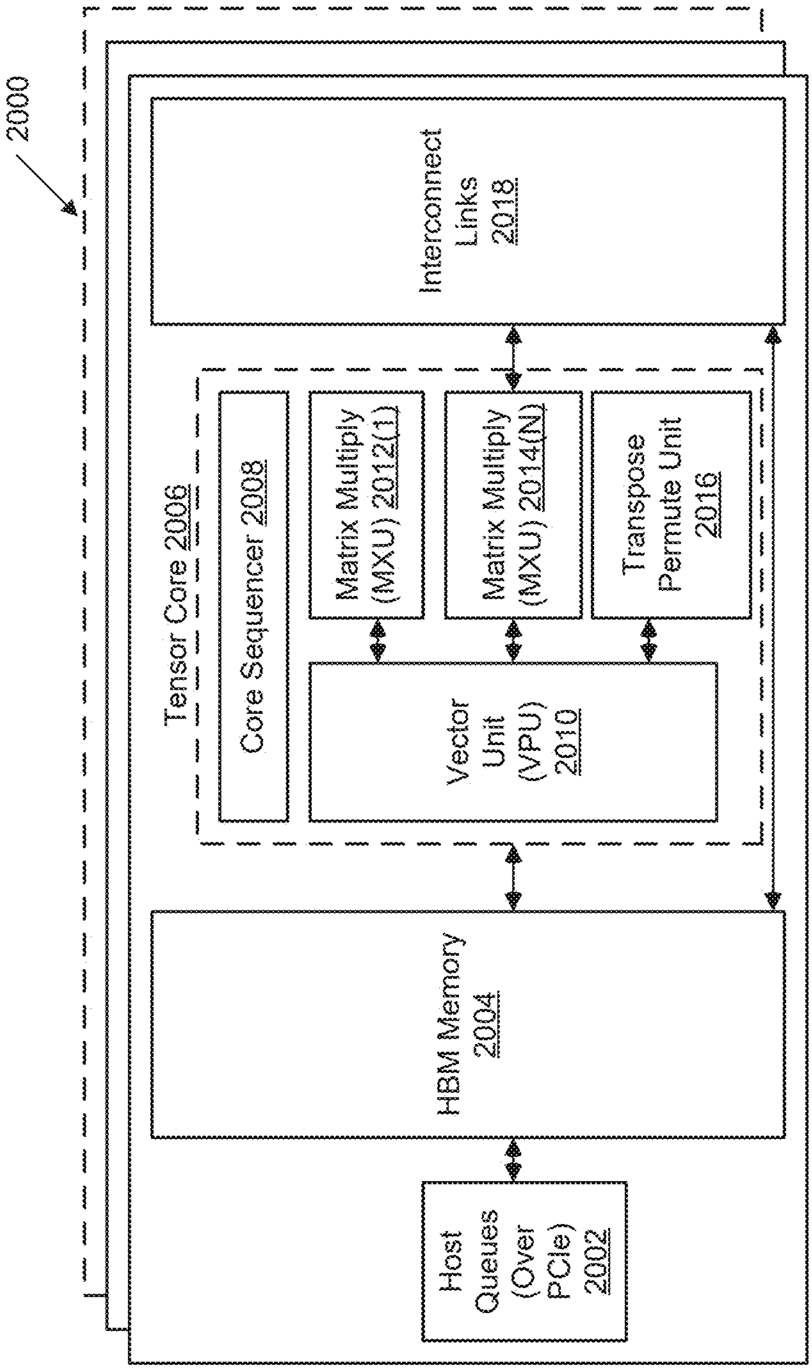
FIG. 20 illustrates a tensor processing unit, in accordance with at least one embodiment.
Figure 21:
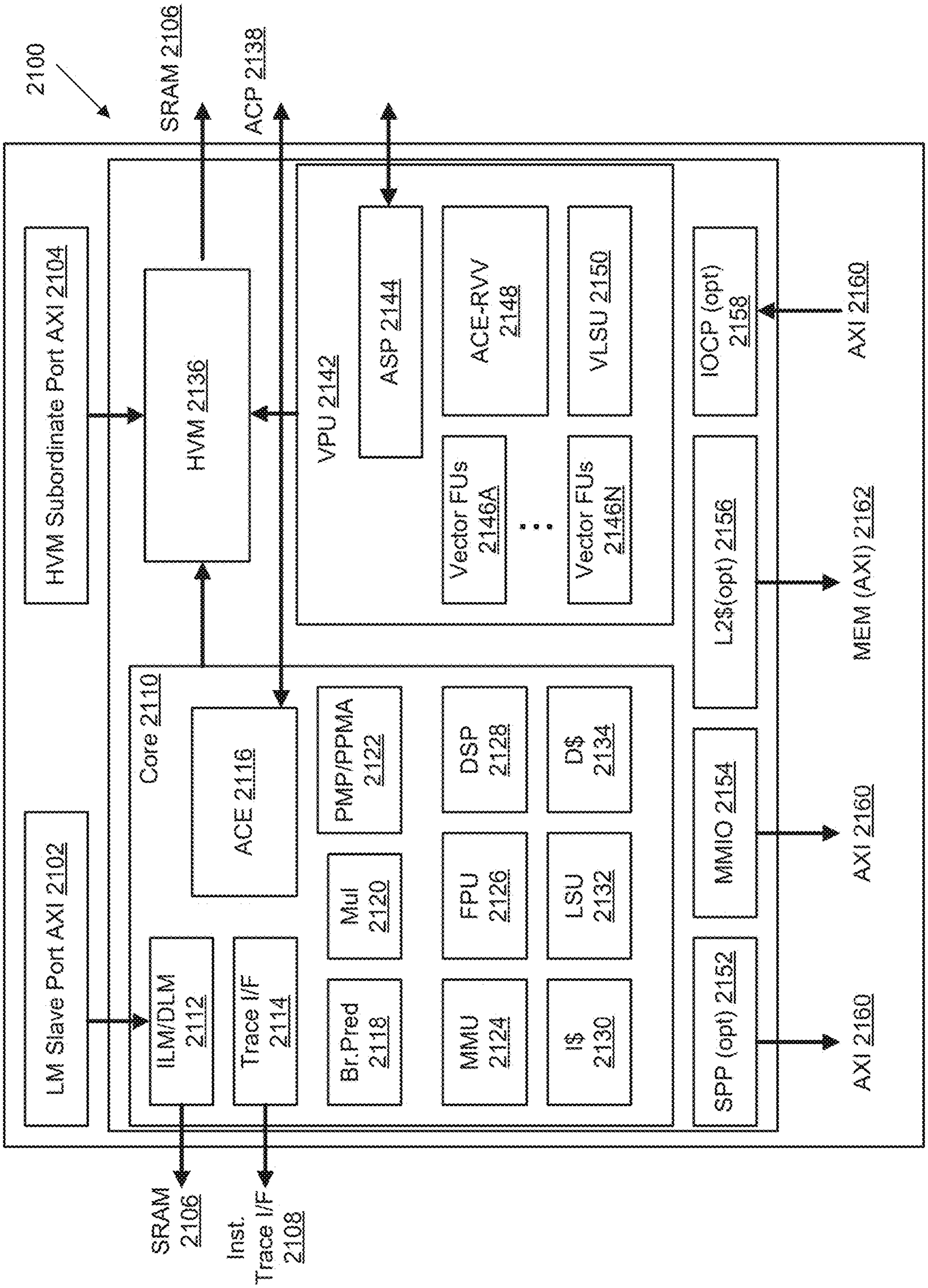
FIG. 21 illustrates a RISC-V-compatible processor, in accordance with at least one embodiment.
Figure 22A:
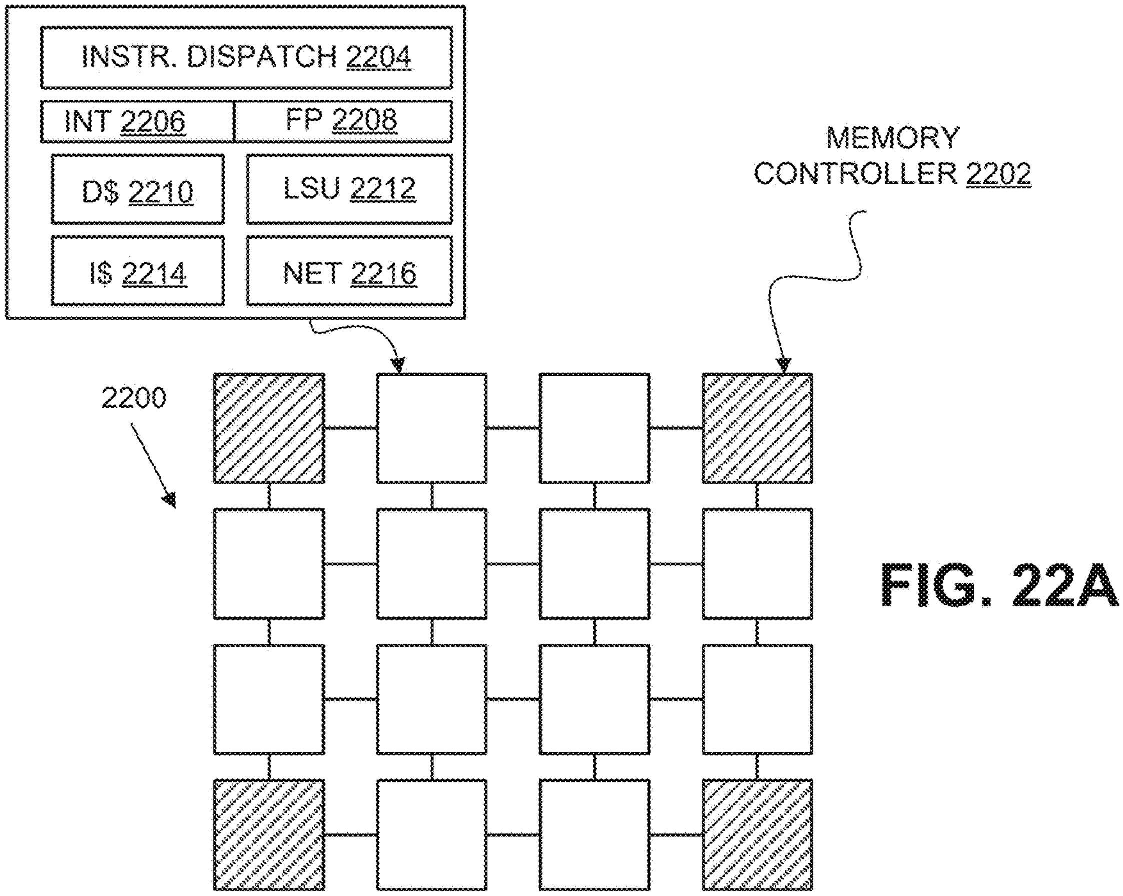
FIGS. 22A and 22B illustrate a language processing unit, in accordance with at least one embodiment.
Figure 22B:
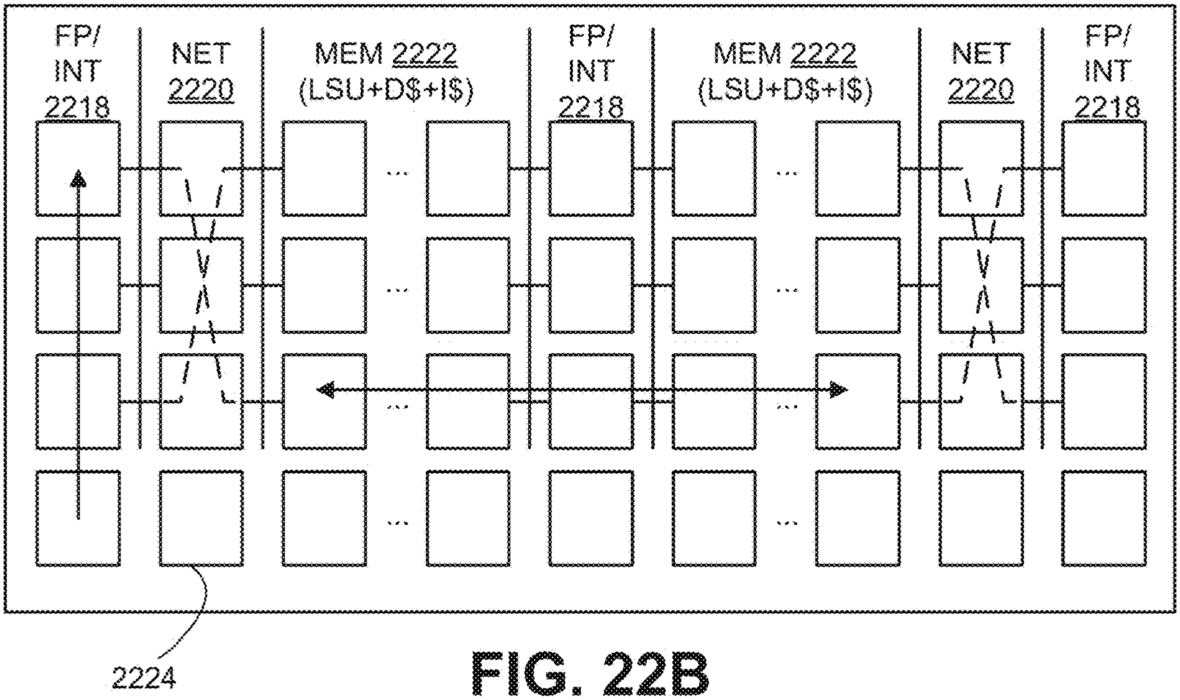
Figure 26:
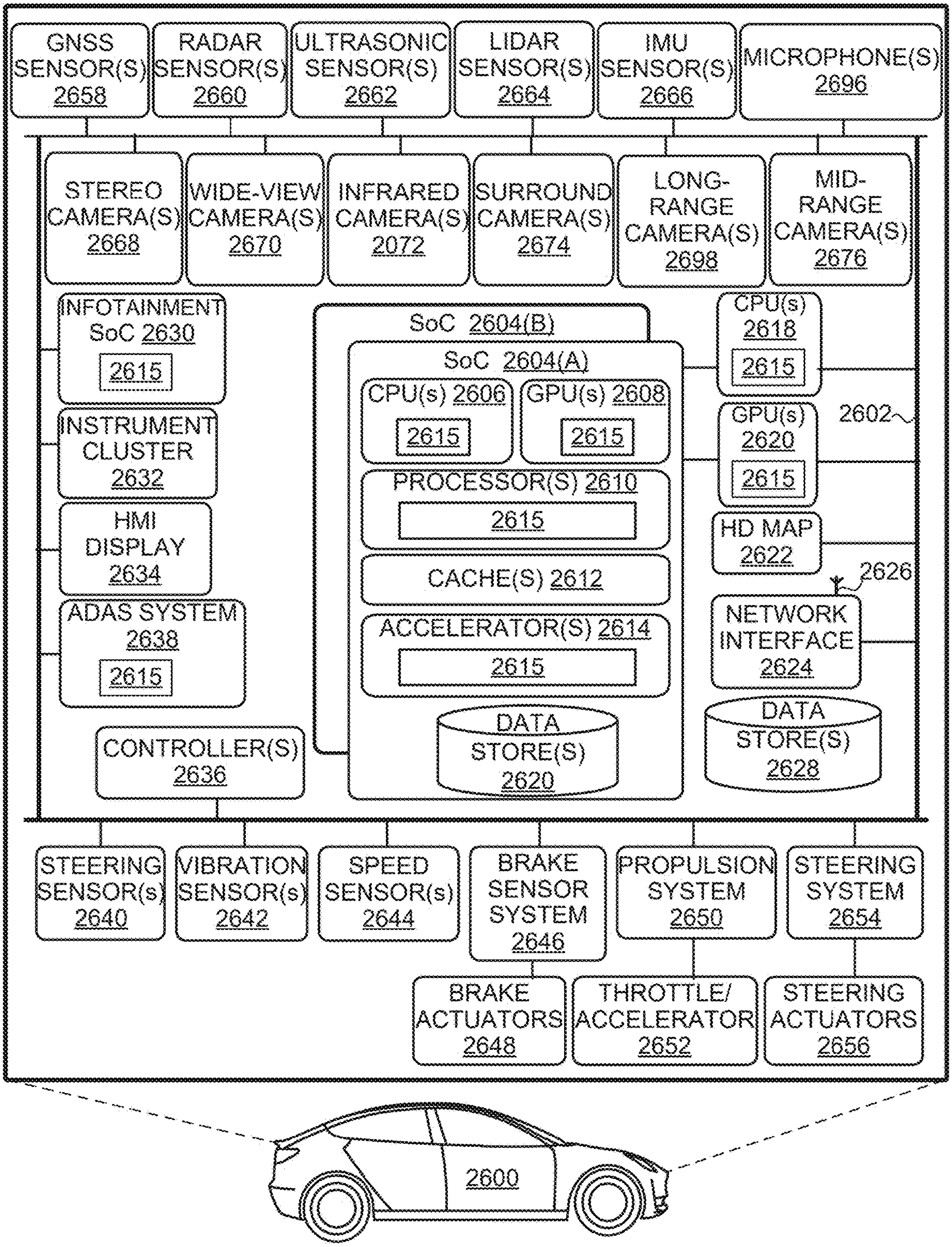
FIG. 26 illustrates an example of an autonomous vehicle and its system architecture, in accordance with at least one embodiment.
Figure 27A:
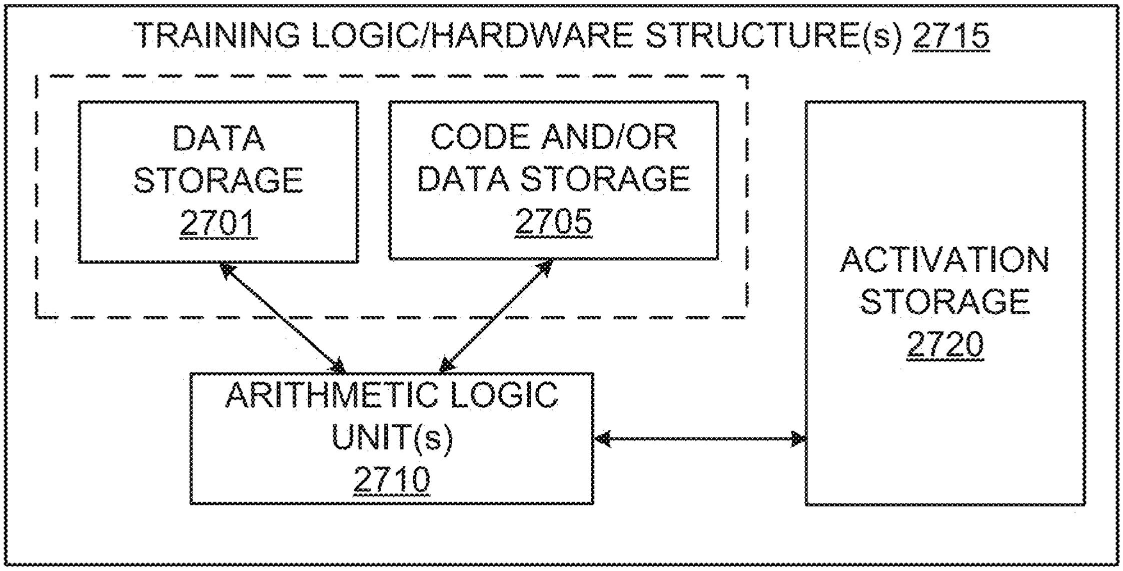
FIG. 27A illustrates inference and/or training logic, in accordance with at least one embodiment.
Figure 27B:
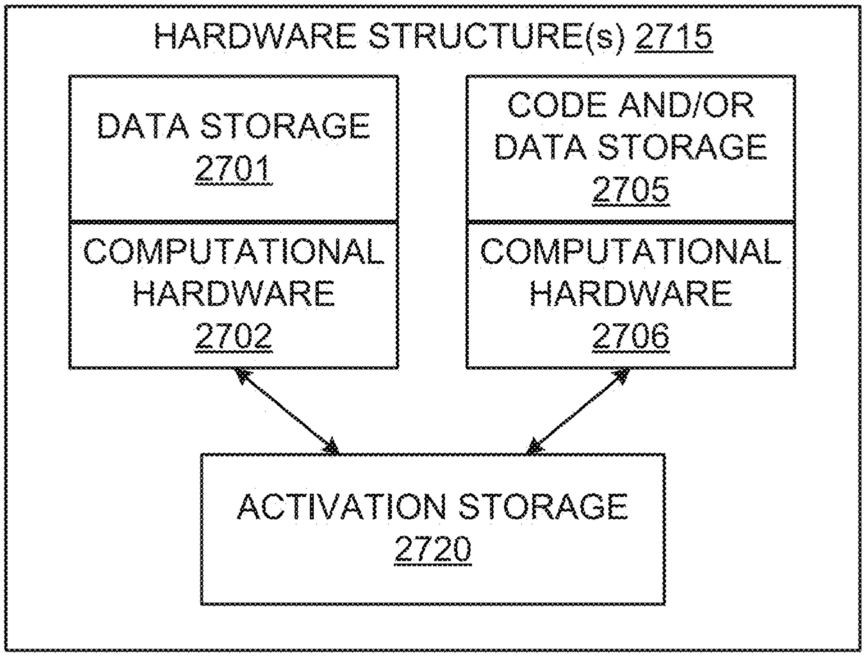
FIG. 27B illustrates inference and/or training logic, in accordance with at least one embodiment.

16, memory 1700 of FIG. 17, memory 1842(1) of FIG. 18, L2 memory system 1936 of FIG. 19, HBM memory 2004 of FIG. 20, SRAM 2106 of FIG. 21, memory 2222 of FIG. 22B, cache(s) 2612 of FIG. 26, data storage 2701 of FIGS. 27A and 27B, or some combination thereof.

In at least one embodiment, storage device(s) 108 have been formatted by processor(s) 104 to store values of mixed precision in one or more blocks of contiguous memory as described further herein. In at least one embodiment, storage device(s) 108 store at least a portion of values of tensor 110*a* and tensor 110*b*. In at least one embodiment, tensor 110*a* includes values stored in one type of precision and is referred to as a tensor of uniform precision. Tensor 110*b* includes values stored in two or more precisions and is referred to as a tensor of mixed precisions. In at least one embodiment, tensor 110*a* and tensor 110*b* include values to be operated upon by using matrix multiplication operations such as multiply and accumulate. In at least one embodiment, tensor 110*a* and tensor 110*b* include neural network values such as input values, weights, activation values, or some combination thereof. In at least one embodiment, values of tensor 110*b* include values that have been quantized.

In at least one embodiment, processor(s) 104 send at least a portion of values of tensor 110*a* and tensor 110*b* to matrix multiplication module 112. In at least one embodiment, processor(s) 104 perform matrix multiplication module 112 to perform mathematical operations on values of tensor 110*a* and tensor 110*b*. In at least one embodiment, matrix multiplication module 112 performs matrix multiplication operations such as multiplication operations and accumulation operations. In at least one embodiment, matrix multiplication module 112 includes one or more hardware components, such as arithmetic logic units (ALUs), to perform mathematical operations on tensor values. In at least one embodiment, matrix multiplication module 112 performs operations used to perform convolutions as part of a convolutional neural network. In at least one embodiment, matrix multiplication module 112 is any combination of hardware, firmware, and software used to perform any mathematical operations on values of tensor 110*a* and tensor 110*b*.

In at least one embodiment, matrix multiplication module 112 outputs products of matrix multiplication operations 114. In at least one embodiment, products of matrix multiplication operations 114 are stored in a storage device for use as inputs to additional mathematical operations, such as operations used to calculate neural network activation values, gradients, biases, or some combination thereof.

Figure 2:
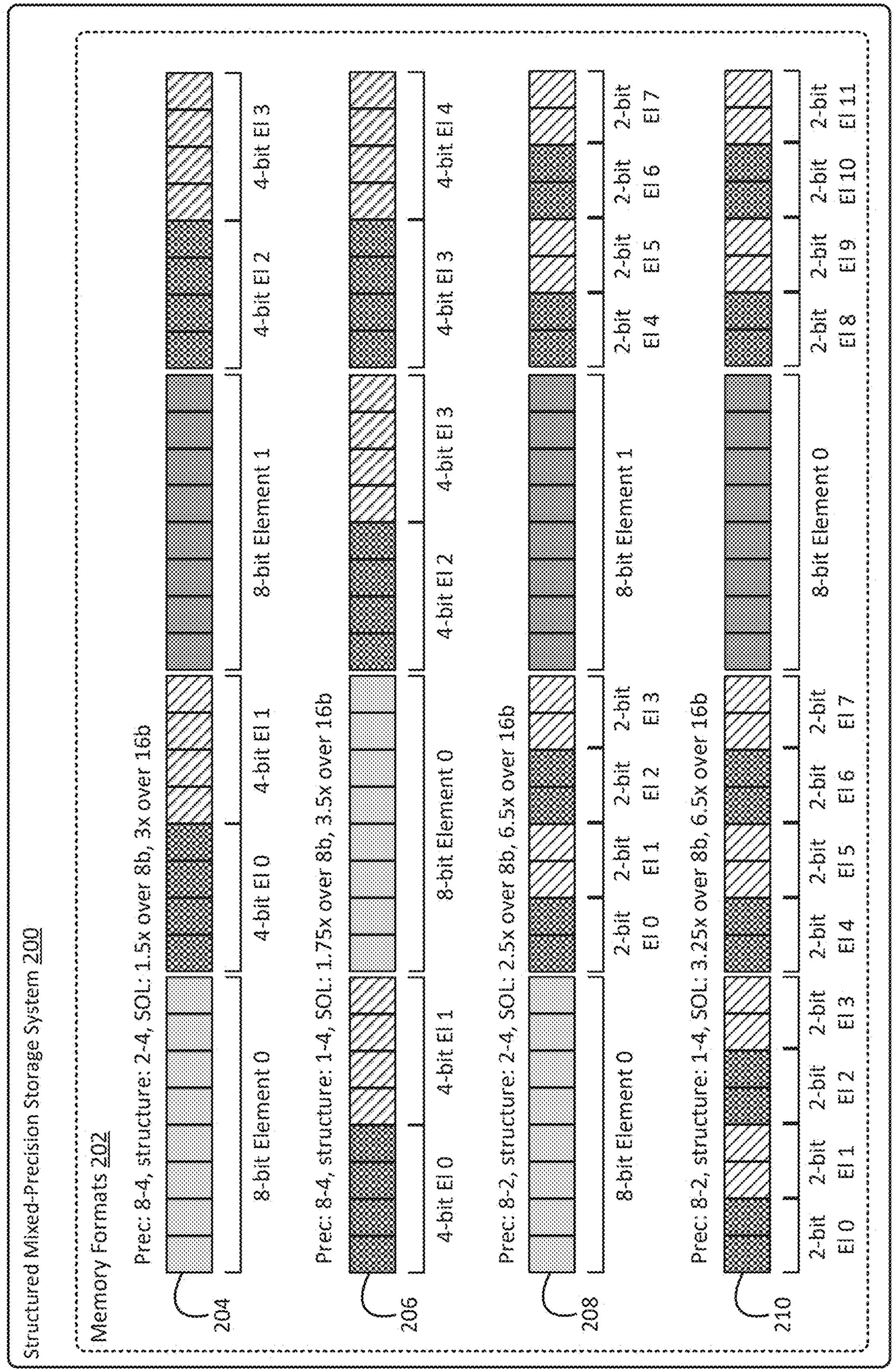
FIG. 2 illustrates a system used to format memory to store values of mixed precision according to various structures, in accordance with at least one embodiment.

FIG. 2 illustrates an example of a system 200 that includes one or more processors comprising one or more circuits used, at least in part, to store values of mixed precision in contiguous memory, according to at least one embodiment. In at least one embodiment, one or more aspects of one or more embodiments described herein in conjunction with FIG. 2 are combined with one or more aspects of one or more embodiments described herein at least in conjunction with FIGS. 1 and 3-8. In at least one embodiment, structured mixed-precision system 200 includes at least a portion of, or is at least a portion of, system 100 of FIG. 1, structured mixed-precision system 300 of FIG. 3, structured mixed-precision system 400 of FIG. 4, structured mixed-precision system 500 of FIG. 5, or some combination thereof.

In at least one embodiment, one or more processors perform one or more operations of structured mixed-precision system 200. In at least one embodiment, processor(s) that perform one or more operations of structured mixed-precision system 200 are any type of processor, portion of a processor, processor of a system, or combination of processors, described herein, including processor(s) 108 of FIG. 1, processor 908 of FIG. 9, processor complex 1010 of FIG. 10, parallel processor 1100 of FIG. 11A, graphics multiprocessor 1134 of FIG. 11B, processor 1200 of FIG. 12, processor 1300 of FIG. 13A, core 1312 of FIG. 13B, accelerator 1400 of FIG. 14, processor 1555 of FIG. 15, processor 1632 of FIG. 16, accelerated processing unit 1700 of FIG. 17, processor 1800 of FIG. 18, core 1900 of FIG. 19, TPUs 2000 of FIG. 20, vector processor 2100 of FIG. 21, many-core tiled processor 2200 of FIG. 22A, hardware 2308 of FIG. 23, CPU 2590 of FIG. 25, processor(s) 2610 of FIG. 26, a processor used in conjunction with logic 2715 illustrated in FIGS. 27A and 27B, a processor used in conjunction with training framework 2724 of FIG. 27C, or some combination thereof.

In at least one embodiment, one or more processors that perform an operation of structured mixed-precision system 200 perform one or more operations of system 100, such as an operation of structured mixed-precision storage API(s) module 106. In at least one embodiment, one or more processors that perform an operation of structured mixed-precision system 200 perform one or more operations described in conjunction with FIG. 2, such as an operation of structured mixed-precision storage system 200 to format storage. In at least one embodiment, one or more processors that perform an operation of structured mixed-precision system 200 perform one or more operations described in conjunction with FIG. 3, such as an operation of structured mixed-precision storage system 300 to format storage. In at least one embodiment, one or more processors that perform an operation of structured mixed-precision system 200 perform one or more operations described in conjunction with FIG. 4, such an operation of structured mixed-precision storage system 400 to store values used during matrix multiplication. In at least one embodiment, one or more processors that perform an operation of structured mixed-precision system 200 perform one or more operations of described in conjunction with FIG. 5, such as an operation of structured mixed-precision storage system 500 to calculate values using arithmetic logic units. In at least one embodiment, one or more processors that perform an operation of structured mixed-precision system 200 perform one or more operations described in conjunction with FIG. 6, such as generating a structure of a block of contiguous memory. In at least one embodiment, one or more processors that perform an operation of structured mixed-precision system 200 perform one or more operations described in conjunction with FIG. 7, such as a call of structured mixed-precision storage API. In at least one embodiment, one or more processors that perform an operation of structured mixed-precision system 200 perform one or more operations described in conjunction with FIG. 8, such as an API function to generate structured mixed-precision storage.

In at least one embodiment, one or more processors of structured mixed-precision storage system 200 formats one or more blocks of contiguous memory depicted as memory formats 202. In at least one embodiment, memory formats 202 depict a 32-bit block of contiguous memory with different formats used to store values of mixed precision. In at least one embodiment, one or more processors of structured mixed-precision storage system 200 formats a 32-bit block of contiguous memory by using, at least in part, information about a number of sub-blocks in a block, M; a number of higher-precision values to be stored in a block, N; a number of bits required to store a higher-precision value in a block, A; or a number of bits required to store a lower-precision value in a block, B; or some combination thereof. In at least one embodiment, one or more processors of structured mixed-precision storage system 200 formats a 32-bit block of contiguous memory by using, at least in part, one or more memory controller such as memory controllers 1080 of FIG. 10.

In at least one embodiment, block 204 is formatted to store two 8-bit values and four 4-bit values. In at least one embodiment, one or more processors of structured mixed-precision storage system 200 receive or obtains from an application one or more indications of precisions to be used to store values in a block of contiguous memory. In at least one embodiment, one or more processors of structured mixed-precision storage system 200 receive or obtains from an application an indication of one of two precisions, such as a value N, to be used to store values in a block of contiguous memory. In at least one embodiment, an application that inputs one or more precisions to be used to store values in a block of contiguous memory is a quantization application, neural network training application, or some combination thereof. In at least one embodiment, a block of contiguous memory is divided into sub-blocks of contiguous memory.

In at least one embodiment, one or more processors of structured mixed-precision system 200 formats a block of contiguous memory to store values of mixed precision suitable for one or more program instructions to obtain values stored in that block. In at least one embodiment, a processor performs a single program instruction to obtain values of mixed precision (e.g., a cache request) stored in two or more memory locations of a block of contiguous memory. In at least one embodiment, a processor performs a single program instruction to obtain values of mixed precision stored in a block of contiguous memory as part of a Single Instruction Multiple Data (SIMD) parallel processing method. In at least one embodiment, a processor performs a single program instruction to obtain values of mixed precision stored in a block of contiguous memory formatted using a memory coalescing method. In at least one embodiment, a memory coalescing method merges adjacent memory locations or memory addresses into a single group and/or single memory address. In at least one embodiment, a processor performs two or more program instructions to concurrently obtain values of mixed precision stored in a block of contiguous memory. In at least one embodiment, a processor performs two or more program instructions to obtain from a block of contiguous memory a set of values of mixed precision to be used as operands by one or more programs (e.g., threads). In at least one embodiment, two or more values stored in a block of contiguous memory are accessed by consecutive threads according to their thread indicators (e.g., thread IDs). In at least one embodiment, a plurality of contiguous memory locations each of a same fixed length (e.g., 1 bit, 2 bits, 4 bits, 8 bits, 32 bits) are each assigned by a processor to a thread as part of a parallel computing process, where each of those contiguous memory locations of fixed length are a block of contiguous memory or a sub-block. In at least one embodiment, a block or sub-block of contiguous memory to be assigned to thread is referred to as a word. In at least one embodiment, a block or sub-block of contiguous memory to be assigned to a thread is referred to as burst section.

Figure 3:
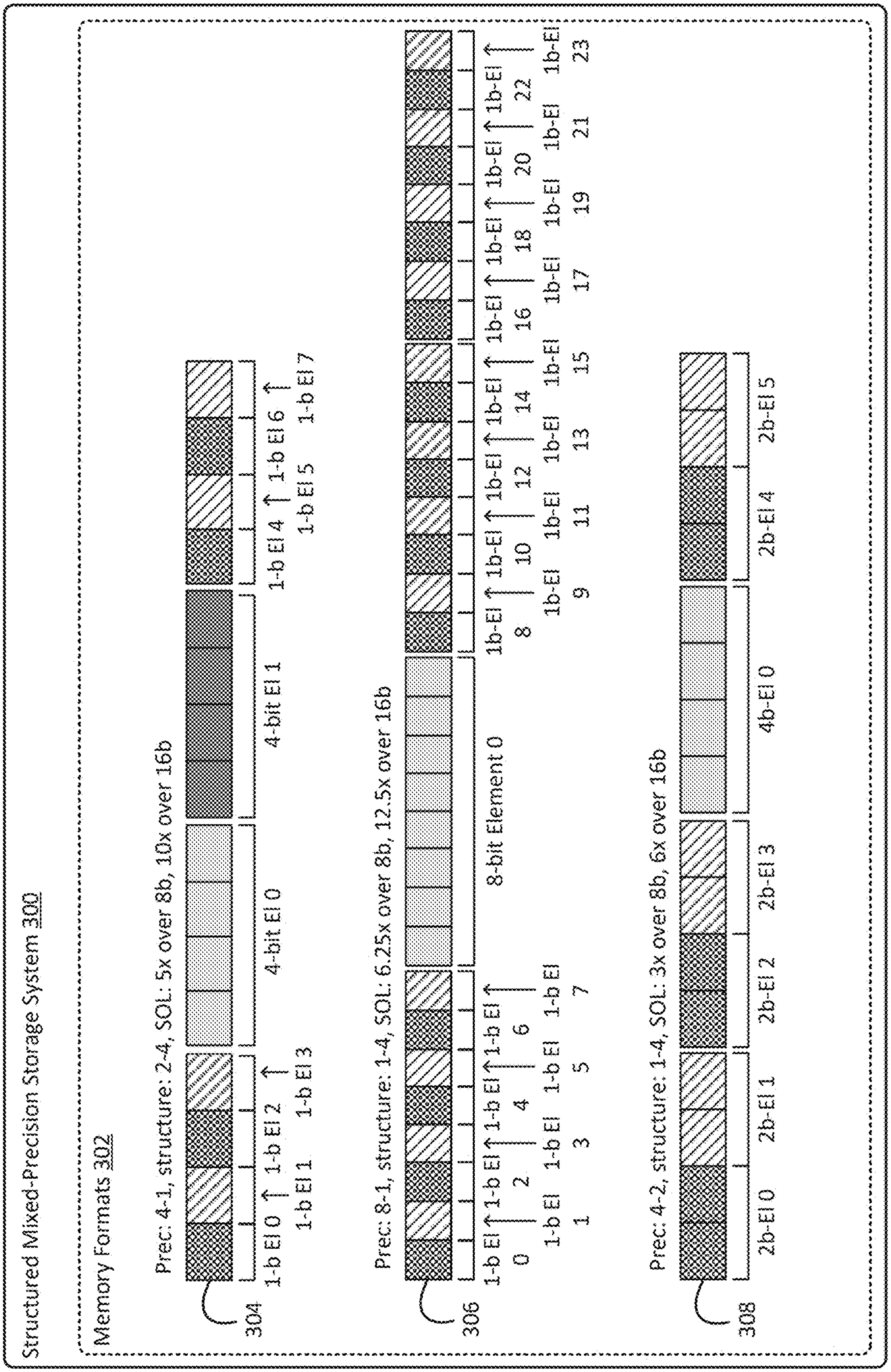
FIG. 3 illustrates a system used to format memory to store values of mixed precision according to various structures, in accordance with at least one embodiment.

In at least one embodiment, as depicted herein at least in FIGS. 2-3, a reference to E, El, Element refers to an element or value being stored or to be stored in a block of contiguous memory using a precision type. In at least one embodiment, as depicted herein at least in FIGS. 2-3, a reference to b refers to bit or bits. In at least one embodiment, as depicted herein at least in FIGS. 2-3, a rectangle filled with a grey color or pattern represents a memory location of a block of contiguous memory that can store 1-bit data. In at least one embodiment, as depicted herein at least in FIGS. 2-3, different shades of grey and different patterns represent memory locations assigned to store bits of a particular value. In at least one embodiment, as depicted herein at least in FIGS. 2-3, a contiguous series of memory locations without a gap in between represents a sub-block of contiguous memory.

In at least one embodiment, block 204 is formatted to store values using an 8-bit precision and a 4-bit precision. In at least one embodiment, A represents a number of bits used to represent a value in a higher precision and B represents a number of bits used to represent a value in lower precision. In at least one embodiment, A for block 204 is 8. In at least one embodiment, B for block 204 is 4. In at least one embodiment, precisions used to store values in block 204 is represented by notation such as Prec: 8-4, prec: 8-4, 8-4, or 8:4. In at least one embodiment, A is a multiple of B, or B is a multiple of A.

In at least one embodiment, one or more processors of structured mixed-precision storage system 200 receives or obtains from an application a number of higher-precision values to be stored in block 204. In at least one embodiment, a number of higher-precision values to be stored in a block of contiguous memory is represented by N. In at least one embodiment, N for block 204 is 2. In at least one embodiment, one or more processors of structured mixed-precision storage system 200 assigns two 8-bit sub-blocks to each store a value of 8-bit precision. In at least one embodiment, memory locations 0-7 and 16-23 of block 204 are assigned to store values in 8-bit precision. In at least one embodiment, which memory locations are assigned to store higher-precision values in a block of contiguous memory is based on factors such as a number of higher-precision values of a tensor that require storage, physical memory locations associated with a memory location, arrangement and connections of hardware (e.g., processor cores, ALUs) with physical memory locations, order of operations required to perform matrix multiplication of stored values, or some combination thereof.

In at least one embodiment, one or more processors of structured mixed-precision storage system 200 begins to generate an index of block 204 by storing indications of locations of higher-precision values in block 204. In at least one embodiment, an index indicates one or more characteristics of one or more values stored in a block of contiguous memory. In at least one embodiment, a characteristic of a value any characteristic that can be used to aid a processor in performing matrix multiplication, such as a value's first bit location, precision type, locations of specific types of bits representing that value, or some combination thereof. In at least one embodiment, an index indicates locations of higher-precision values using an indication of a memory address, a memory index value, a pointer value, or some combination thereof. In at least one embodiment, an index indicates locations of higher-precision values by indicating a memory location corresponding to a first bit (e.g., bit at position 0) of each higher-precision value. In at least one embodiment, an index indicates locations of higher-precision values by indicating a memory location corresponding to a first position of each sub-block. In at least one embodiment, an index indicates locations of higher-precision values by indicating a memory location corresponding to any position of a sub-block, including a last position of a sub-block.

In at least one embodiment, one or more processors of structured mixed-precision storage system 200 generates an index by first identifying and storing indications of locations of higher-precision values versus lower-precision values reduces computing overhead by, at least in part, reducing an amount of metadata because a fewer total number of bits are required to indicate sub-blocks of memory locations in higher precision if a number of higher-precision values is fewer than lower-precision values. In at least one embodiment, a processor generates an index by first identifying and storing indications of locations of higher-precision values versus lower-precision values reduces computing overhead by requiring fewer computing hardware resources to generate and store values of that index, in part, because an amount of metadata is reduced. In at least one embodiment, an index is any data structure that correlates a memory location with a precision type, a bit position of an array of bits that represent a value, a position of a value in a tensor, or some combination thereof. In at least one embodiment, an index is a register index.

In at least one embodiment, one or more processors of structured mixed-precision storage system 200 processor identifies, calculates, determines, or otherwise infers, memory locations to store values of lower-precisions by identifying memory locations of higher-precision values. In at least one embodiment, a processor identifies memory locations to store values of lower-precisions by, in part, identifying sub-blocks that have not been assigned to store a higher-precision value and dividing those sub-blocks into smaller sub-blocks of a length equal to a number of bits required to represent a lower-precision value. In at least one embodiment, smaller sub-blocks are referred to as lower-precision sub-blocks.

In at least one embodiment, one or more processors of structured mixed-precision storage system 200 embeds or otherwise stores one or more bits of metadata used to format a block of contiguous memory within that block of contiguous memory. In at least one embodiment, one or more bits of metadata used to format a block of contiguous memory is stored in memory separate from that block of contiguous memory. In at least one embodiment, one or more bits of an index used to identify values stored in a block of contiguous memory is embedded or otherwise stored within that block of contiguous memory. In at least one embodiment, one or more bits of an index used to identify values stored in a block of contiguous memory is stored in memory separate from that block of contiguous memory.

In at least one embodiment, one or more processors of structured mixed-precision storage system 200 generates an index that includes one or more arrays of bits. In at least one embodiment, an index includes one or more bits stored in one or more arrays to indicate a location of a first bit of a value represented by some precision type. In at least one embodiment, an index includes one or more bits including at least a portion of an address of a memory location. In at least one embodiment, an index is any type of index used to point a software program to one or more addresses of memory locations to obtain values stored in those memory locations before or during performance of that program. In at least one embodiment, an index includes one or more bits to indicate a type of precision correlated with a bit stored in a specific memory location. In at least one embodiment, an index includes at least a portion of another index of a compressed sparse matrix format. In at least one embodiment, an index includes a table, such as a hash table, used to identify locations of values of mixed precision in a block of contiguous memory. In at least one embodiment, an index includes one or more arrays of bits where every group of an n number of bits (e.g., every group of 2 bits, every group of 4 bits) corresponds to characteristics of a value stored in memory location or sub-block of a block of contiguous memory. In at least one embodiment, for example, an index includes an array of bits where every two bits are correlated with a memory location according to their positions in that array. In at least one embodiment, every group of an n number of bits of an array indicates in binary notation a characteristic of a value (e.g., precision type associated with that value, position in a tensor, program associated with that value) stored in a corresponding memory location. In at least one embodiment, any indexing method can be used to identify memory locations of values of mixed precision in contiguous block of memory.

In at least one embodiment, one or more processors of structured mixed-precision storage system 200 calculates a total number of bits of a block by multiplying a number of sub-blocks, M, to be stored in that block with a number of bits required to store a value in higher precision, A (e.g., M×A=total number of bits in a block). In at least one embodiment, a number of bits in a block of contiguous memory is referred to as a block's length. In at least one embodiment, block 204 has an M value of 4 and an A value of 8 bits, and therefore, block 204 has a total length of 32 bits (e.g., 4×8 bits=32 bits).

In at least one embodiment, one or more processors of structured mixed-precision storage system 200 calculates a total number of lower-precision values to be stored in a block of contiguous memory by subtracting a number of higher-precision values to be stored in that block, N, from a number of sub-blocks in that block, M; multiply a result of that subtraction with a number of bits required to store a value in higher precision, A; and divide a product of that multiplication by a number of bits required to store a lower-precision value (e.g., [(M−N)×A]±B=total number of lower-precision values). In at least one embodiment, a processor has formatted block 204 to have 4 sub-blocks of 8 bits each, and therefore, block 204 has an M value of 4. In at least one embodiment, a processor has formatted block 204 to store 2 values of higher precision, and therefore, block 204 has an N value of 2. In at least one embodiment, a higher precision to be used to store values in block 204 requires 8 bits, and therefore, block 204 has an A value of 8. In at least one embodiment, a lower precision to be used to store values in block 204 requires 4 bits, and therefore, block 204 has a B value of 4. In at least one embodiment, a processor calculates block 204 to be able to store 4 values represented in a 4-bit precision (e.g., [(4−2)×8]=4=4).

In at least one embodiment, one or more processors that perform matrix multiplication operations using, in part, values of one or more tensors stored in blocks of contiguous memory with a structure of 2:4 (N:M) and using precision types that use 8 bits and 4 bits (A:B), as depicted in block 204, exhibit an approximate 1.5×speed-up in completing those matrix multiplication operations when compared to performing those same operations on those same values stored in blocks of contiguous memory exclusively using an 8-bit precision type. In at least one embodiment, performing matrix multiplication operations storing values of one or more tensors in a block of contiguous memory such as block 204 exhibit an approximate 3× speed-up in completing those matrix multiplication operations when compared to performing those same operations on those same values stored in blocks of contiguous memory exclusively using an 16-bit precision type. In at least one embodiment, a speed-up is a metric based on a theoretical maximum of computing performance (e.g., maximum throughput, maximum utilization), such as a speed of light (SOL) metric.

In at least one embodiment, block 206 is another example of a 32-bit block of contiguous memory formatted to store values of mixed precision. In at least one embodiment, block 206 has a structure of 1:4 (N:M), meaning that block 206 is formatted to store one value of higher precision within four sub-blocks. In at least one embodiment, block 206 is formatted to store precisions Prec: 8:4, meaning that block 206 is formatted to store values using precision types that use 8-bits and 4-bits (A:B). In at least one embodiment, a value stored in higher-precision is stored in a second sub-block of block 206. In at least one embodiment, values stored in lower-precision are stored in remaining sub-blocks, which each hold two values of lower-precision.

In at least one embodiment, one or more processors that perform matrix multiplication operations using, in part, values of one or more tensors stored in blocks of contiguous memory with a structure of 1:4 (N:M) and using precision types that use 8 bits and 4 bits (A:B), as depicted in block 206, exhibit an approximate 1.75× speed-up in completing those matrix multiplication operations when compared to performing those same operations on those same values stored in blocks of contiguous memory exclusively using an 8-bit precision type. In at least one embodiment, performing matrix multiplication operations storing values of one or more tensors in a block of contiguous memory such as block 206 exhibit an approximate 3.5× speed-up in completing those matrix multiplication operations when compared to performing those same operations on those same values stored in blocks of contiguous memory exclusively using an 16-bit precision type.

In at least one embodiment, block 208 is another example of a 32-bit block of contiguous memory formatted to store values of mixed precision. In at least one embodiment, block 208 has a structure of 2:4 (N:M), meaning that block 208 is formatted to store two values of higher precision within four sub-blocks. In at least one embodiment, block 208 is formatted to store precisions Prec: 8:2, meaning that block 208 is formatted to store values using precision types that use 8 bits and 2 bits (A:B). In at least one embodiment, values stored in higher-precision are stored in first and third sub-blocks of block 208. In at least one embodiment, values stored in lower-precision are stored in remaining sub-blocks, which each hold two values of lower-precision.

In at least one embodiment, one or more processors that perform matrix multiplication operations using, in part, values of one or more tensors stored in blocks of contiguous memory with a structure of 2:4 (N:M) and using precision types that use 8 bits and 2 bits (A:B), as depicted in block 208, exhibit an approximate 2.5× speed-up in completing those matrix multiplication operations when compared to performing those same operations on those same values stored in blocks of contiguous memory exclusively using an 8-bit precision type. In at least one embodiment, performing matrix multiplication operations storing values of one or more tensors in a block of contiguous memory such as block 208 exhibit an approximate 6.5× speed-up in completing those matrix multiplication operations when compared to performing those same operations on those same values stored in blocks of contiguous memory exclusively using an 16-bit precision type.

In at least one embodiment, block 210 is another example of a 32-bit block of contiguous memory formatted to store values of mixed precision. In at least one embodiment, block 210 has a structure of 1:4 (N:M), meaning that block 210 is formatted to store one value of higher precision within four sub-blocks. In at least one embodiment, block 210 is formatted to store precisions Prec: 8:2, meaning that block 210 is formatted to store values using precision types that use 8 bits and 2 bits (A:B). In at least one embodiment, values stored in higher-precision are stored in first and third sub-blocks of block 210. In at least one embodiment, values stored in lower-precision are stored in remaining sub-blocks, which each hold two values of lower-precision.

In at least one embodiment, one or more processors that perform matrix multiplication operations using, in part, values of one or more tensors stored in blocks of contiguous memory with a structure of 1:4 (N:M) and using precision types that use 8 bits and 2 bits (A:B), as depicted in block 210, exhibit an approximate 3.25× speed-up in completing those matrix multiplication operations when compared to performing those same operations on those same values stored in blocks of contiguous memory exclusively using an 8-bit precision type. In at least one embodiment, performing matrix multiplication operations storing values of one or more tensors in a block of contiguous memory such as block 210 exhibit an approximate 6.5× speed-up in completing those matrix multiplication operations when compared to performing those same operations on those same values stored in blocks of contiguous memory exclusively using an 16-bit precision type.

FIG. 3 illustrates an example of a system 300 that includes one or more processors comprising one or more circuits used, at least in part, to store values of mixed precision in contiguous memory, according to at least one embodiment. In at least one embodiment, one or more aspects of one or more embodiments described herein in conjunction with FIG. 3 are combined with one or more aspects of one or more embodiments described herein at least in conjunction with FIGS. 1-2 and 4-8. In at least one embodiment, structured mixed-precision system 300 includes at least a portion of, or is at least a portion of, system 100 of FIG. 1, structured mixed-precision system 200 of FIG. 2, structured mixed-precision system 400 of FIG. 4, structured mixed-precision system 500 of FIG. 5, or some combination thereof.

In at least one embodiment, one or more processors perform one or more operations of structured mixed-precision system 300. In at least one embodiment, processor(s) that perform one or more operations of structured mixed-precision system 300 are any type of processor, portion of a processor, processor of a system, or combination of processors, described herein, including processor(s) 108 of FIG. 1, processor 908 of FIG. 9, processor complex 1010 of FIG. 10, parallel processor 1100 of FIG. 11A, graphics multiprocessor 1134 of FIG. 11B, processor 1200 of FIG. 12, processor 1300 of FIG. 13A, core 1312 of FIG. 13B, accelerator 1400 of FIG. 14, processor 1555 of FIG. 15, processor 1632 of FIG. 16, accelerated processing unit 1700 of FIG. 17, processor 1800 of FIG. 18, core 1900 of FIG. 19, TPUs 2000 of FIG. 20, vector processor 2100 of FIG. 21, many-core tiled processor 2200 of FIG. 22A, hardware 2308 of FIG. 23, CPU 2590 of FIG. 25, processor(s) 2610 of FIG. 26, a processor used in conjunction with logic 2715 illustrated in FIGS. 27A and 27B, a processor used in conjunction with training framework 2724 of FIG. 27C, or some combination thereof.

In at least one embodiment, one or more processors that perform an operation of structured mixed-precision system 300 perform one or more operations of system 100, such as an operation of structured mixed-precision storage API(s) module 106. In at least one embodiment, one or more processors that perform an operation of structured mixed-precision system 300 perform one or more operations described in conjunction with FIG. 2, such as an operation of structured mixed-precision storage system 200 to format storage. In at least one embodiment, one or more processors that perform an operation of structured mixed-precision system 300 perform one or more operations described in conjunction with FIG. 3, such as an operation of structured mixed-precision storage system 300 to format storage. In at least one embodiment, one or more processors that perform an operation of structured mixed-precision system 300 perform one or more operations described in conjunction with FIG. 4, such an operation of structured mixed-precision storage system 400 to store values used during matrix multiplication. In at least one embodiment, one or more processors that perform an operation of structured mixed-precision system 300 perform one or more operations of described in conjunction with FIG. 5, such as an operation of structured mixed-precision storage system 500 to calculate values using arithmetic logic units. In at least one embodiment, one or more processors that perform an operation of structured mixed-precision system 300 perform one or more operations described in conjunction with FIG. 6, such as generating a structure of a block of contiguous memory. In at least one embodiment, one or more processors that perform an operation of structured mixed-precision system 300 perform one or more operations described in conjunction with FIG. 7, such as a call of structured mixed-precision storage API. In at least one embodiment, one or more processors that perform an operation of structured mixed-precision system 300 perform one or more operations described in conjunction with FIG. 8, such as an API function to generate structured mixed-precision storage.

In at least one embodiment, one or more processors of structured mixed-precision storage system 300 formats one or more blocks of contiguous memory depicted as memory formats 302. In at least one embodiment, memory formats 302 depict a 16-bit and 32-bit blocks of contiguous memory with different formats used to store values of mixed precision. In at least one embodiment, one or more processors of structured mixed-precision storage system 300 formats a block of contiguous memory by using, at least in part, information about a number of sub-blocks in a block, M; a number of higher-precision values to be stored in a block, N; a number of bits required to store a higher-precision value in a block, A; or a number of bits required to store a lower-precision value in a block, B; or some combination thereof. In at least one embodiment, one or more processors of structured mixed-precision storage system 300 formats a block of contiguous memory by using, at least in part, one or more memory controller such as memory controllers 1080 of FIG. 10.

In at least one embodiment, block 304 is an example of a 16-bit block of contiguous memory formatted to store values of mixed precision. In at least one embodiment, block 304 has a structure of 2:4 (N:M), meaning that block 304 is formatted to store two values of higher precision within four sub-blocks each 4-bits in length. In at least one embodiment, block 304 is formatted to store precisions Prec: 4:1, meaning that block 304 is formatted to store values using precision types that use 4 bits and 1 bits (A:B). In at least one embodiment, values stored in higher-precision are stored in second and third sub-blocks of block 304. In at least one embodiment, values stored in lower-precision are stored in remaining sub-blocks, which each hold four values of lower-precision.

In at least one embodiment, one or more processors that perform matrix multiplication operations using, in part, values of one or more tensors stored in blocks of contiguous memory with a structure of 2:4 (N:M) and using precision types that use 8 bits and 2 bits (A:B), as depicted in block 304, exhibit an approximate 5× speed-up in completing those matrix multiplication operations when compared to performing those same operations on those same values stored in blocks of contiguous memory exclusively using an 8-bit precision type. In at least one embodiment, performing matrix multiplication operations storing values of one or more tensors in a block of contiguous memory such as block 304 exhibit an approximate 10× speed-up in completing those matrix multiplication operations when compared to performing those same operations on those same values stored in blocks of contiguous memory exclusively using an 16-bit precision type.

In at least one embodiment, block 306 is an example of a 32-bit block of contiguous memory formatted to store values of mixed precision. In at least one embodiment, block 306 has a structure of 1:4 (N:M), meaning that block 306 is formatted to store one value of higher precision within four sub-blocks each 8-bits in length. In at least one embodiment, block 306 is formatted to store precisions Prec: 8:1, meaning that block 306 is formatted to store values using precision types that use 8 bits and 1 bits (A:B). In at least one embodiment, values stored in higher-precision are stored in second sub-block of block 306. In at least one embodiment, values stored in lower-precision are stored in remaining sub-blocks, which each hold eight values of lower-precision.

In at least one embodiment, one or more processors that perform matrix multiplication operations using, in part, values of one or more tensors stored in blocks of contiguous memory with a structure of 1:4 (N:M) and using precision types that use 8 bits and 1 bits (A:B), as depicted in block 306, exhibit an approximate 6.25× speed-up in completing those matrix multiplication operations when compared to performing those same operations on those same values stored in blocks of contiguous memory exclusively using an 8-bit precision type. In at least one embodiment, performing matrix multiplication operations storing values of one or more tensors in a block of contiguous memory such as block 306 exhibit an approximate 12.5× speed-up in completing those matrix multiplication operations when compared to performing those same operations on those same values stored in blocks of contiguous memory exclusively using an 16-bit precision type.

In at least one embodiment, block 308 is an example of a 16-bit block of contiguous memory formatted to store values of mixed precision. In at least one embodiment, block 308 has a structure of 1:4 (N:M), meaning that block 308 is formatted to store one value of higher precision within four sub-blocks each 4-bits in length. In at least one embodiment, block 308 is formatted to store precisions Prec: 4:2, meaning that block 308 is formatted to store values using precision types that use 4 bits and 2 bits (A:B). In at least one embodiment, values stored in higher-precision are stored in third sub-block of block 308. In at least one embodiment, values stored in lower-precision are stored in remaining sub-blocks, which each hold two values of lower-precision.

In at least one embodiment, one or more processors that perform matrix multiplication operations using, in part, values of one or more tensors stored in blocks of contiguous memory with a structure of 1:4 (N:M) and using precision types that use 4 bits and 2 bits (A:B), as depicted in block 308, exhibit an approximate 3× speed-up in completing those matrix multiplication operations when compared to performing those same operations on those same values stored in blocks of contiguous memory exclusively using an 8-bit precision type. In at least one embodiment, performing matrix multiplication operations storing values of one or more tensors in a block of contiguous memory such as block 308 exhibit an approximate 6× speed-up in completing those matrix multiplication operations when compared to performing those same operations on those same values stored in blocks of contiguous memory exclusively using an 16-bit precision type.

Figure 4:
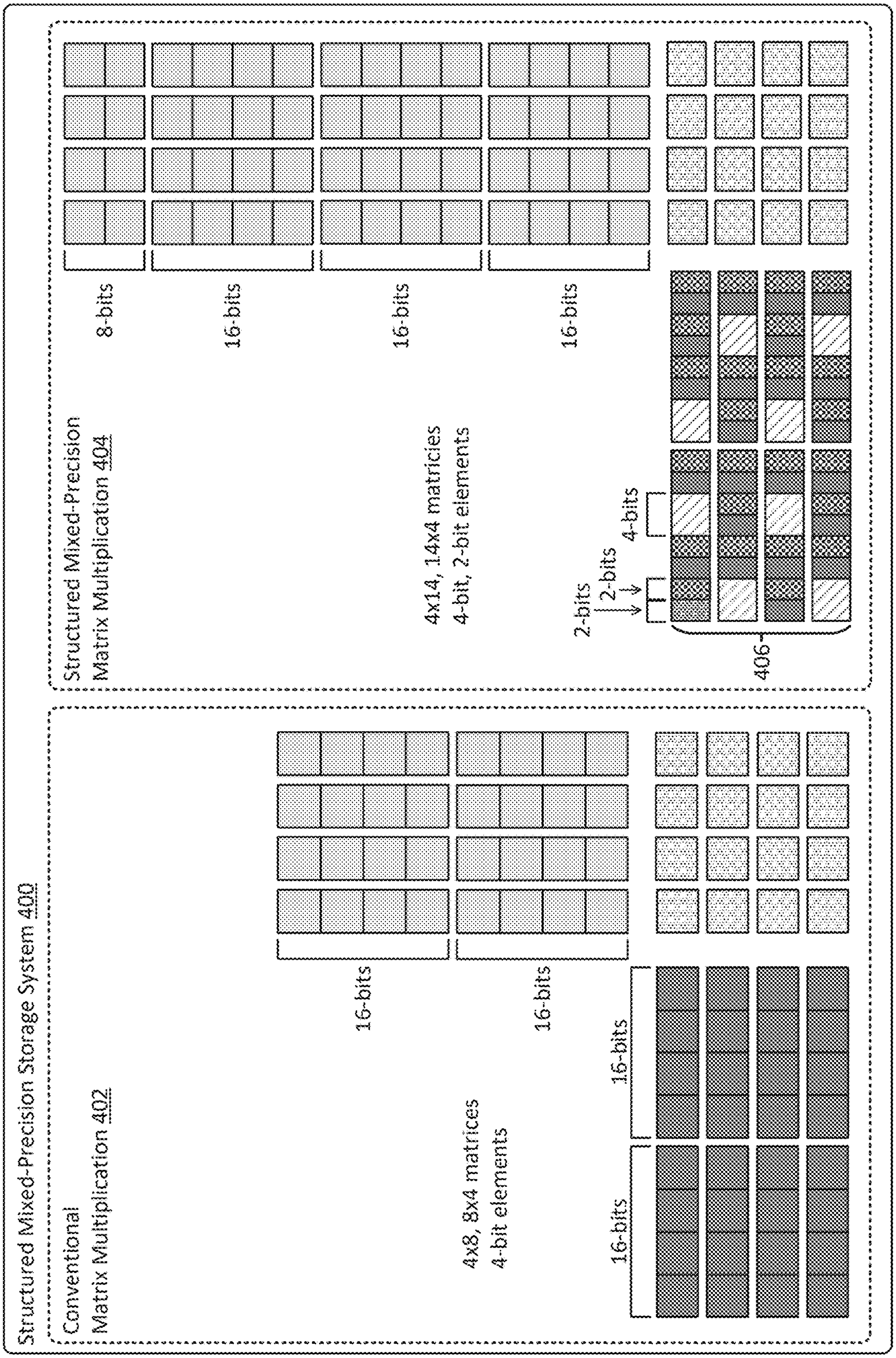
FIG. 4 illustrates a system used to format memory to store values of mixed precision used in matrix multiplication, in accordance with at least one embodiment.

FIG. 4 illustrates an example of a system 400 that includes one or more processors comprising one or more circuits used, at least in part, to store values of mixed precision in contiguous memory, according to at least one embodiment. In at least one embodiment, one or more aspects of one or more embodiments described herein in conjunction with FIG. 4 are combined with one or more aspects of one or more embodiments described herein at least in conjunction with FIGS. 1-3 and 5-8. In at least one embodiment, structured mixed-precision system 400 includes at least a portion of, or is at least a portion of, system 100 of FIG. 1, structured mixed-precision system 200 of FIG. 2, structured mixed-precision system 300 of FIG. 3, structured mixed-precision system 500 of FIG. 5, or some combination thereof.

In at least one embodiment, one or more processors perform one or more operations of structured mixed-precision system 400. In at least one embodiment, processor(s) that perform one or more operations of structured mixed-precision system 400 are any type of processor, portion of a processor, processor of a system, or combination of processors, described herein, including processor(s) 108 of FIG. 1, processor 908 of FIG. 9, processor complex 1010 of FIG. 10, parallel processor 1100 of FIG. 11A, graphics multiprocessor 1134 of FIG. 11B, processor 1200 of FIG. 12, processor 1300 of FIG. 13A, core 1312 of FIG. 13B, accelerator 1400 of FIG. 14, processor 1555 of FIG. 15, processor 1632 of FIG. 16, accelerated processing unit 1700 of FIG. 17, processor 1800 of FIG. 18, core 1900 of FIG. 19, TPUs 2000 of FIG. 20, vector processor 2100 of FIG. 21, many-core tiled processor 2200 of FIG. 22A, hardware 2308 of FIG. 23, CPU 2590 of FIG. 25, processor(s) 2610 of FIG. 26, a processor used in conjunction with logic 2715 illustrated in FIGS. 27A and 27B, a processor used in conjunction with training framework 2724 of FIG. 27C, or some combination thereof.

In at least one embodiment, one or more processors that perform an operation of structured mixed-precision system 400 perform one or more operations of system 100, such as an operation of structured mixed-precision storage API(s) module 106. In at least one embodiment, one or more processors that perform an operation of structured mixed-precision system 400 perform one or more operations described in conjunction with FIG. 2, such as an operation of structured mixed-precision storage system 200 to format storage. In at least one embodiment, one or more processors that perform an operation of structured mixed-precision system 400 perform one or more operations described in conjunction with FIG. 3, such as an operation of structured mixed-precision storage system 300 to format storage. In at least one embodiment, one or more processors that perform an operation of structured mixed-precision system 400 perform one or more operations described in conjunction with FIG. 4, such an operation of structured mixed-precision storage system 400 to store values used during matrix multiplication. In at least one embodiment, one or more processors that perform an operation of structured mixed-precision system 400 perform one or more operations of described in conjunction with FIG. 5, such as an operation of structured mixed-precision storage system 500 to calculate values using arithmetic logic units. In at least one embodiment, one or more processors that perform an operation of structured mixed-precision system 400 perform one or more operations described in conjunction with FIG. 6, such as generating a structure of a block of contiguous memory. In at least one embodiment, one or more processors that perform an operation of structured mixed-precision system 400 perform one or more operations described in conjunction with FIG. 7, such as a call of structured mixed-precision storage API. In at least one embodiment, one or more processors that perform an operation of structured mixed-precision system 400 perform one or more operations described in conjunction with FIG. 8, such as an API function to generate structured mixed-precision storage.

In at least one embodiment, structured mixed-precision storage system 400 performs matrix multiplication operations on values of two matrices as depicted with a diagram of conventional matrix multiplication 402. In at least one embodiment, a value of a matrix is referred to as an element. In at least one embodiment, conventional matrix multiplication 402 depicts, at least in part, how matrices and their values are multiplied together using matrix multiply operations included as part of an API library such as NVIDIA® CUDA® and AMD® ROCm™. In at least one embodiment, matrix dimensions us a row number by column number convention. In at least one embodiment, a column of a matrix is 4 bits wide with conventional matrix multiplication 402.

In at least one embodiment, each value of a matrix is represented using a 4-bit precision with conventional matrix multiplication 402. In at least one embodiment, with conventional matrix multiplication 402, each value is stored in 4-bit sub-blocks of multiple 16-bit blocks of contiguous memory, as represented by squares filled with a shade of grey or a pattern. In at least one embodiment, conventional matrix multiplication 402 depicts a 4×8 matrix multiplied with an 8×4 matrix. In at least one embodiment, with conventional matrix multiplication 402, a total number of values that can be multiplied together using two matrices is 64 values, with each matrix including 32 values.

In at least one embodiment, structured mixed-precision storage system 400 performs matrix multiplication operations on values of two matrices as depicted with a diagram of structured mixed-precision matrix multiplication 404. In at least one embodiment, more values are multiplied together than with conventional matrix multiplication 402 despite using an equal amount of storage for a matrix because of techniques used to format memory to store values of mixed precision, as described further herein. In at least one embodiment, structured mixed-precision matrix multiplication 404 depicts values of a matrices stored in blocks of contiguous memory using mixed precisions with matrix memory 406. In at least one embodiment, matrix 406 depicts values using a 4-bit precision and values using a 2-bit precision stored in contiguous memory locations.

In at least one embodiment, structured mixed-precision matrix multiplication 404 depicts matrix multiplication between a 4×14 matrix and a 14×4 matrix. In at least one embodiment, matrix memory 406 stores values of a 4×14 matrix. In at least one embodiment, matrix memory 406 has a structure of 1:4 (N:M), meaning that each block of contiguous memory of matrix memory 406 stores one value of higher precision in one sub-block of four sub-blocks. In at least one embodiment, matrix memory 406 stores values of precisions 4-2, meaning that matrix memory 406 stores values using a higher precision that uses 4 bits and a lower precision that uses 2 bits. In at least one embodiment, for each 16-bit block of contiguous memory, each 4-bit sub-block that does not store a value of 4-bit precision stores two values of 2-bit precision. In at least one embodiment, each row of a 4×14 matrix includes 14 values because each row includes two blocks of contiguous memory, where each block includes four sub-blocks, and one of those sub-blocks holds one value represented with 4-bits, and three sub-blocks each hold two values represented with 2-bits each.

In at least one embodiment, one or more processors perform matrix multiplication operations using, in part, values of a matrix stored in blocks of contiguous memory corresponding to positions of those values in that matrix. In at least one embodiment, one or more processors perform matrix multiplications operations using, in part, values of a matrix stored in blocks of contiguous memory, where two blocks of contiguous memory correspond to a row of a matrix, and there are four rows of contiguous memory, as depicted with matrix memory 406. In at least one embodiment, one or more processors that perform matrix multiplication operations using, in part, values of one or more matrices stored in blocks of contiguous memory with a structure of 1:4 (N:M) and using precision types that use 4 bits and 2 bits (A:B), as depicted in matrix memory 406, exhibit an approximate 8× increase in bandwidth, which is associated with a rate at which values stored in matrix memory 406 can be read from or written to memory when compared to performing those same operations on those same values stored in blocks of contiguous memory exclusively using an 4-bit precision type. In at least one embodiment, performing matrix multiplication operations storing values of a matrix as depicted with matrix memory 406 exhibit an approximate 8× increase in throughput, such as number of matrix elements processed per second, when compared to performing those same operations on those same values stored in blocks of contiguous memory exclusively using a 4-bit precision type. In at least one embodiment, with structured mixed-precision matrix multiplication 404, a total number of values that can be multiplied together using two matrices is 112 values, with each matrix including 56 values.

Figure 5:
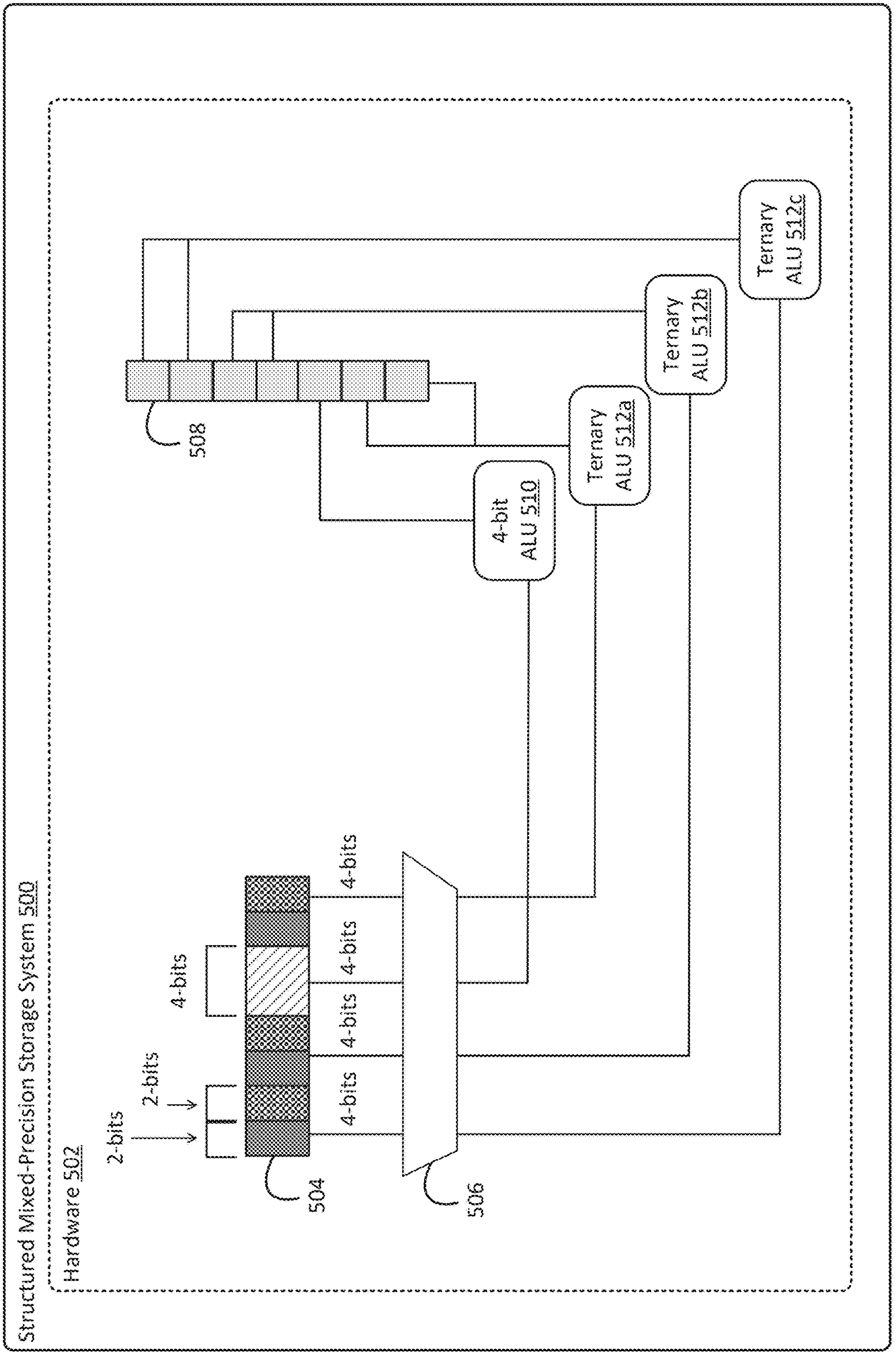
FIG. 5 illustrates hardware of a system used to format memory to store values of mixed precision, in accordance with at least one embodiment.

FIG. 5 illustrates an example of a system 500 that includes one or more processors comprising one or more circuits used, at least in part, to store values of mixed precision in contiguous memory, according to at least one embodiment. In at least one embodiment, one or more aspects of one or more embodiments described herein in conjunction with FIG. 5 are combined with one or more aspects of one or more embodiments described herein at least in conjunction with FIGS. 1-4 and 6-8. In at least one embodiment, structured mixed-precision system 500 includes at least a portion of, or is at least a portion of, system 100 of FIG. 1, structured mixed-precision system 200 of FIG. 2, structured mixed-precision system 300 of FIG. 3, structured mixed-precision system 400 of FIG. 4, or some combination thereof.

In at least one embodiment, one or more processors perform one or more operations of structured mixed-precision system 500. In at least one embodiment, processor(s) that perform one or more operations of structured mixed-precision system 500 are any type of processor, portion of a processor, processor of a system, or combination of processors, described herein, including processor(s) 108 of FIG. 1, processor 908 of FIG. 9, processor complex 1010 of FIG. 10, parallel processor 1100 of FIG. 11A, graphics multiprocessor 1134 of FIG. 11B, processor 1200 of FIG. 12, processor 1300 of FIG. 13A, core 1312 of FIG. 13B, accelerator 1400 of FIG. 14, processor 1555 of FIG. 15, processor 1632 of FIG. 16, accelerated processing unit 1700 of FIG. 17, processor 1800 of FIG. 18, core 1900 of FIG. 19, TPUs 2000 of FIG. 20, vector processor 2100 of FIG. 21, many-core tiled processor 2200 of FIG. 22A, hardware 2308 of FIG. 23, CPU 2590 of FIG. 25, processor(s) 2610 of FIG. 26, a processor used in conjunction with logic 2715 illustrated in FIGS. 27A and 27B, a processor used in conjunction with training framework 2724 of FIG. 27C, or some combination thereof.

In at least one embodiment, one or more processors that perform an operation of structured mixed-precision system 500 perform one or more operations of system 100, such as an operation of structured mixed-precision storage API(s) module 106. In at least one embodiment, one or more processors that perform an operation of structured mixed-precision system 500 perform one or more operations described in conjunction with FIG. 2, such as an operation of structured mixed-precision storage system 200 to format storage. In at least one embodiment, one or more processors that perform an operation of structured mixed-precision system 500 perform one or more operations described in conjunction with FIG. 3, such as an operation of structured mixed-precision storage system 300 to format storage. In at least one embodiment, one or more processors that perform an operation of structured mixed-precision system 400 perform one or more operations described in conjunction with FIG. 4, such an operation of structured mixed-precision storage system 400 to store values used during matrix multiplication. In at least one embodiment, one or more processors that perform an operation of structured mixed-precision system 500 perform one or more operations of described in conjunction with FIG. 5, such as an operation of structured mixed-precision storage system 500 to calculate values using arithmetic logic units. In at least one embodiment, one or more processors that perform an operation of structured mixed-precision system 500 perform one or more operations described in conjunction with FIG. 6, such as generating a structure of a block of contiguous memory. In at least one embodiment, one or more processors that perform an operation of structured mixed-precision system 500 perform one or more operations described in conjunction with FIG. 7, such as a call of structured mixed-precision storage API. In at least one embodiment, one or more processors that perform an operation of structured mixed-precision system 500 perform one or more operations described in conjunction with FIG. 8, such as an API function to generate structured mixed-precision storage.

In at least one embodiment, structured mixed-precision system 500 includes hardware used, at least in part, to perform matrix multiplication operations. In at least one embodiment, an arrangement of hardware used to perform matrix multiplication operations on values of mixed precision stored in one or more blocks of contiguous memory is depicted with a diagram of hardware 502.

In at least one embodiment, hardware 502 depicts a 16-bit block of contiguous memory, block 504, with a structure of 1:4 (N:M). In at least one embodiment, block 504 is a block of contiguous memory of matrix memory 406 of FIG. 4. In at least one embodiment, block 504 stores values of precision 4-2, meaning that block 504 stores values in precisions that use either 4 or 2 bits.

In at least one embodiment, block 504 is connected to a multiplexer 508 used to control transmission of bits representing values of a matrix. In at least one embodiment, multiplexer 508 controls transmission of bits representing values of a matrix to one or more hardware components (e.g., ALUs, ternary ALUs) used to perform one or more matrix multiplication operations.

In at least one embodiment, multiplexer 508 controls transmission of bits representing values of a matrix to one or more arithmetic logic units. In at least one embodiment, hardware used to perform matrix multiplication operations include a 4-bit ALU 510 and three ternary ALUs 512*a-c*. In at least one embodiment, 4-bit ALU 510 receives two 4-bit values representing two values of two matrices and operates on those bits as part of a matrix multiplication operation. In at least one embodiment, ternary ALUs 512*a-c* each receive two 2-bit values from one matrix and two values of a suitable precision from another matrix. In at least one embodiment, 2-bit values input to a ternary ALU may be in ternary, where each bit can be one of three possible bits. In at least one embodiment, a ternary ALU is a type of ALU that operates on ternary logic, meaning it uses three distinct states instead of traditional binary logic's two states. In at least one embodiment, three states of ternary logic are represented as −1, 0, and +1, or as 0, 1, and 2.

In at least one embodiment, 4-bit ALU 510 and ternary ALUs 512*a-c* are also connected to another block of contiguous memory, block 508. In at least one embodiment, block 508 stores values of a matrix. In at least one embodiment, block 508 stores seven values, which matches a number of values stored in block 504.

FIG. 6 illustrates an example of a process 600 that includes one or more processors comprising one or more circuits used, at least in part, to store values of mixed precision in contiguous memory, according to at least one embodiment. In at least one embodiment, one or more aspects of one or more embodiments described herein in conjunction with FIG. 6 are combined with one or more aspects of one or more embodiments described herein at least in conjunction with FIGS. 1-5 and 7-8. In at least one embodiment, process 600 includes at least a portion of, or is at least a portion of, system 100 of FIG. 1, structured mixed-precision system 200 of FIG. 2, structured mixed-precision system 300 of FIG. 3, structured mixed-precision system 400 of FIG. 4, structured mixed-precision system 500 of FIG. 5 or some combination thereof.

In at least one embodiment, one or more processors perform one or more operations of process 600. In at least one embodiment, processor(s) that perform one or more operations of process 600 are any type of processor, portion of a processor, processor of a system, or combination of processors, described herein, including processor(s) 108 of FIG. 1, processor 908 of FIG. 9, processor complex 1010 of FIG. 10, parallel processor 1100 of FIG. 11A, graphics multiprocessor 1134 of FIG. 11B, processor 1200 of FIG. 12, processor 1300 of FIG. 13A, core 1312 of FIG. 13B, accelerator 1400 of FIG. 14, processor 1555 of FIG. 15, processor 1632 of FIG. 16, accelerated processing unit 1700 of FIG. 17, processor 1800 of FIG. 18, core 1900 of FIG. 19, TPUs 2000 of FIG. 20, vector processor 2100 of FIG. 21, many-core tiled processor 2200 of FIG. 22A, hardware 2308 of FIG. 23, CPU 2590 of FIG. 25, processor(s) 2610 of FIG. 26, a processor used in conjunction with logic 2715 illustrated in FIGS. 27A and 27B, a processor used in conjunction with training framework 2724 of FIG. 27C, or some combination thereof.

In at least one embodiment, one or more processors that perform an operation of process 600 perform one or more operations of system 100, such as an operation of structured mixed-precision storage API(s) module 106. In at least one embodiment, one or more processors that perform an operation of process 600 perform one or more operations described in conjunction with FIG. 2, such as an operation of structured mixed-precision storage system 200 to format storage. In at least one embodiment, one or more processors that perform an operation of process 600 perform one or more operations described in conjunction with FIG. 3, such as an operation of structured mixed-precision storage system 300 to format storage. In at least one embodiment, one or more processors that perform an operation of structured mixed-precision system 400 perform one or more operations described in conjunction with FIG. 4, such an operation of structured mixed-precision storage system 400 to store values used during matrix multiplication. In at least one embodiment, one or more processors that perform an operation of process 600 perform one or more operations of described in conjunction with FIG. 5, such as an operation of structured mixed-precision storage system 500 to calculate values using arithmetic logic units. In at least one embodiment, one or more processors that perform an operation of process 600 perform one or more operations described in conjunction with FIG. 6, such as generating a structure of a block of contiguous memory. In at least one embodiment, one or more processors that perform an operation of process 600 perform one or more operations described in conjunction with FIG. 7, such as a call of structured mixed-precision storage API. In at least one embodiment, one or more processors that perform an operation of process 600 perform one or more operations described in conjunction with FIG. 8, such as an API function to generate structured mixed-precision storage.

In at least one embodiment, a processor begins process 600 by performing operations obtain indications of a number of higher-precision values to be stored and a number of sub-blocks of memory with operation 602, and as otherwise described herein. In at least one embodiment, an indication of a number of higher-precision values to be stored in each block of contiguous memory, N, is input and stored in a memory device by an application or a user via an API command. In at least one embodiment, an indication of a number of sub-blocks for each block of contiguous memory, M, is input and stored in a memory device by an application or user via an API command. In at least one embodiment, a processor uses N and M to format a block of contiguous memory to store values of mixed precision and to generate an index indicating locations of those values as described further herein.

In at least one embodiment, a processor continues process 600 by performing operations to obtain indications of precision types to be used to store values in a block of contiguous memory with operation 604, and as otherwise described herein. In at least one embodiment, an indication of a higher precision type, A, is input by an application or user via an API command. In at least one embodiment, an indication of a lower precision type, B, is input by an application or user via an API command. In at least one embodiment, a processor uses A and B to format a block of contiguous memory to store values of mixed precision and to generate an index indicating locations of those values as described further herein.

In at least one embodiment, a processor continues process 600 by generating an index of a memory format by identifying memory locations of higher-precision data values with operation 606, and as otherwise described herein. In at least one embodiment, a processor identifies memory locations of higher-precision data values based on various factors as described further herein. In at least one embodiment, a processor uses locations of higher-precision data values to format a block of contiguous memory to store values of mixed precision and to generate an index indicating locations of those values as described further herein.

In at least one embodiment, a processor continues process 600 by identifying memory locations of lower-precision data values with operation 608, and as otherwise described herein. In at least one embodiment, lower-precision data values are identified by inferring, calculating, or otherwise determining, them based on locations of higher-precision data values, and as otherwise described herein. In at least one embodiment, a processor generates indications of locations of lower-precision data values and includes them in an index identifying locations of values in blocks of contiguous memory. In at least one embodiment, a processor uses locations of lower-precision values to format a block of contiguous memory to store values of mixed precision and to generate an index indicating locations of those values as described further herein.

In at least one embodiment, a processor continues process 600 by storing values of a matrix in block of contiguous memory using mixed precisions with operation 610, and as otherwise described herein. In at least one embodiment, a processor stores values of one or more matrices using mixed precision as part of quantized neural network training or inferencing process to achieve a threshold level of accuracy of a neural network while decreasing an amount of computing resources required to perform that neural network.

Figure 7:
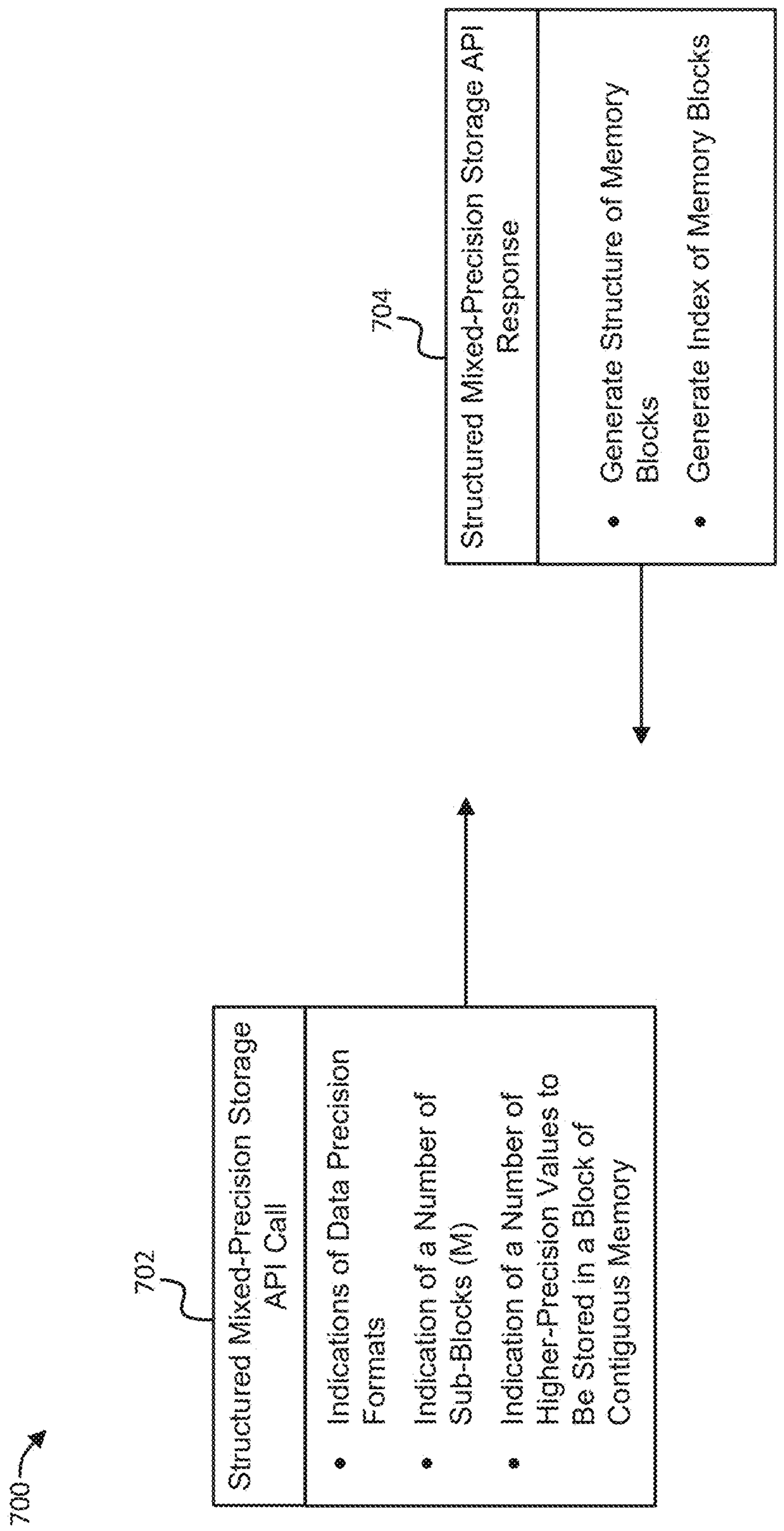
FIG. 7 illustrates an application programming interface (API) call and response used to format memory to store values of mixed precision, in accordance with at least one embodiment.

FIG. 7 illustrates an example of a system 700 that includes one or more processors to perform APIs to store values of mixed precision in a block of contiguous memory, according to at least one embodiment. In at least one embodiment, one or more aspects of one or more embodiments described herein in conjunction with FIG. 7 are combined with one or more aspects of one or more embodiments described herein at least in conjunction with FIGS. 1-6 and 8. In at least one embodiment, system 700 includes at least a portion of, or is at least a portion of, system 100 of FIG. 1, structured mixed-precision system 200 of FIG. 2, structured mixed-precision system 300 of FIG. 3, structured mixed-precision system 400 of FIG. 4, structured mixed-precision system 500 of FIG. 5 or some combination thereof.

In at least one embodiment, one or more processors perform one or more operations of system 700. In at least one embodiment, processor(s) that perform one or more operations of system 700 are any type of processor, portion of a processor, processor of a system, or combination of processors, described herein, including processor(s) 108 of FIG. 1, processor 908 of FIG. 9, processor complex 1010 of FIG. 10, parallel processor 1100 of FIG. 11A, graphics multiprocessor 1134 of FIG. 11B, processor 1200 of FIG. 12, processor 1300 of FIG. 13A, core 1312 of FIG. 13B, accelerator 1400 of FIG. 14, processor 1555 of FIG. 15, processor 1632 of FIG. 16, accelerated processing unit 1700 of FIG. 17, processor 1800 of FIG. 18, core 1900 of FIG. 19, TPUs 2000 of FIG. 20, vector processor 2100 of FIG. 21, many-core tiled processor 2200 of FIG. 22A, hardware 2308 of FIG. 23, CPU 2590 of FIG. 25, processor(s) 2610 of FIG. 26, a processor used in conjunction with logic 2715 illustrated in FIGS. 27A and 27B, a processor used in conjunction with training framework 2724 of FIG. 27C, or some combination thereof.

In at least one embodiment, one or more processors that perform an operation of system 700 perform one or more operations of system 100, such as an operation of structured mixed-precision storage API(s) module 106. In at least one embodiment, one or more processors that perform an operation of system 700 perform one or more operations described in conjunction with FIG. 2, such as an operation of structured mixed-precision storage system 200 to format storage. In at least one embodiment, one or more processors that perform an operation of system 700 perform one or more operations described in conjunction with FIG. 3, such as an operation of structured mixed-precision storage system 300 to format storage. In at least one embodiment, one or more processors that perform an operation of structured mixed-precision system 400 perform one or more operations described in conjunction with FIG. 4, such an operation of structured mixed-precision storage system 400 to store values used during matrix multiplication. In at least one embodiment, one or more processors that perform an operation of system 700 perform one or more operations of described in conjunction with FIG. 5, such as an operation of structured mixed-precision storage system 500 to calculate values using arithmetic logic units. In at least one embodiment, one or more processors that perform an operation of system 700 perform one or more operations described in conjunction with FIG. 6, such as generating a structure of a block of contiguous memory. In at least one embodiment, one or more processors that perform an operation of system 700 perform one or more operations described in conjunction with FIG. 7, such as a call of structured mixed-precision storage API. In at least one embodiment, one or more processors that perform an operation of system 700 perform one or more operations described in conjunction with FIG. 8, such as an API function to generate structured mixed-precision storage.

In at least one embodiment, structured mixed-precision storage API call 802 is used (e.g., called by a user, application, or library) to receive indications of data precision formats, A:B, a number of sub-blocks, M, and a number of higher-precision values to be stored in a block of contiguous memory as described further herein. In at least one embodiment, structured mixed-precision storage API call 802 is called by a component of a neural network training framework. In at least one embodiment, structured mixed-precision storage API call 802 is called by a component of a memory controller such as memory controllers 1080 of FIG. 10. In at least one embodiment, structured mixed-precision storage API call 802 is called by a component of a neural network training framework. In at least one embodiment, structured mixed-precision storage API call 802 is called by a user via a command line user interface. In at least one embodiment, an indication obtained or otherwise received by an API is referred to as an input. In at least one embodiment, structured mixed-precision storage API call 802 causes processor(s) to perform one or more operations described herein, including any operation described in conjunction with FIGS. 1-6 and 8.

In at least one embodiment, in response to receiving indications as inputs, structured mixed-precision API causes processor(s) to perform structured mixed-precision storage API response 804 by formatting a block of contiguous memory to store values of mixed precision as described further herein. In at least one embodiment, structured mixed-precision storage API response 804 generates an index to identify locations of values stored in a block of contiguous memory using mixed precisions as described further herein.

Figure 8:
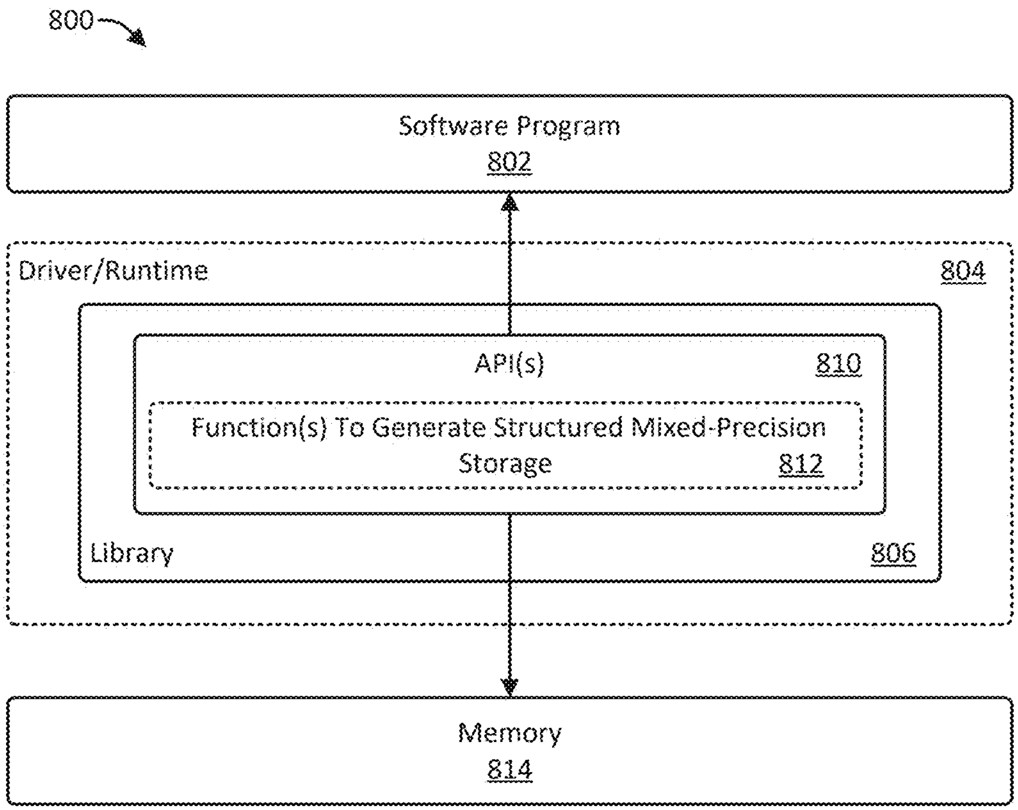
FIG. 8 illustrates a system that includes a driver and/or runtime used to format memory to store values of mixed precision, in accordance with at least one embodiment.

FIG. 8 illustrates an example of a system 800 that includes one or more processors to perform a driver and/or runtime comprising one or more libraries to provide one or more application programming interfaces (APIs) to format a block of contiguous memory to store values of mixed precision, according to at least one embodiment. In at least one embodiment, one or more aspects of one or more embodiments described herein in conjunction with FIG. 8 are combined with one or more aspects of one or more embodiments described herein at least in conjunction with FIGS. 1-7. In at least one embodiment, system 800 includes at least a portion of, or is at least a portion of, system 100 of FIG. 1, structured mixed-precision system 200 of FIG. 2, structured mixed-precision system 300 of FIG. 3, structured mixed-precision system 400 of FIG. 4, structured mixed-precision system 500 of FIG. 5 or some combination thereof.

In at least one embodiment, one or more processors perform one or more operations of system 800. In at least one embodiment, processor(s) that perform one or more operations of system 800 are any type of processor, portion of a processor, processor of a system, or combination of processors, described herein, including processor(s) 108 of FIG. 1, processor 908 of FIG. 9, processor complex 1010 of FIG. 10, parallel processor 1100 of FIG. 11A, graphics multiprocessor 1134 of FIG. 11B, processor 1200 of FIG. 12, processor 1300 of FIG. 13A, core 1312 of FIG. 13B, accelerator 1400 of FIG. 14, processor 1555 of FIG. 15, processor 1632 of FIG. 16, accelerated processing unit 1700 of FIG. 17, processor 1800 of FIG. 18, core 1900 of FIG. 19, TPUs 2000 of FIG. 20, vector processor 2100 of FIG. 21, many-core tiled processor 2200 of FIG. 22A, hardware 2308 of FIG. 23, CPU 2590 of FIG. 25, processor(s) 2610 of FIG. 26, a processor used in conjunction with logic 2715 illustrated in FIGS. 27A and 27B, a processor used in conjunction with training framework 2724 of FIG. 27C, or some combination thereof.

In at least one embodiment, one or more processors that perform an operation of system 800 perform one or more operations of system 100, such as an operation of structured mixed-precision storage API(s) module 106. In at least one embodiment, one or more processors that perform an operation of system 800 perform one or more operations described in conjunction with FIG. 2, such as an operation of structured mixed-precision storage system 200 to format storage. In at least one embodiment, one or more processors that perform an operation of system 800 perform one or more operations described in conjunction with FIG. 3, such as an operation of structured mixed-precision storage system 300 to format storage. In at least one embodiment, one or more processors that perform an operation of structured mixed-precision system 400 perform one or more operations described in conjunction with FIG. 4, such an operation of structured mixed-precision storage system 400 to store values used during matrix multiplication. In at least one embodiment, one or more processors that perform an operation of system 800 perform one or more operations of described in conjunction with FIG. 5, such as an operation of structured mixed-precision storage system 500 to calculate values using arithmetic logic units. In at least one embodiment, one or more processors that perform an operation of system 800 perform one or more operations described in conjunction with FIG. 6, such as generating a structure of a block of contiguous memory. In at least one embodiment, one or more processors that perform an operation of system 800 perform one or more operations described in conjunction with FIG. 7, such as a call of structured mixed-precision storage API.

In at least one embodiment, a software program 802 is a software module. In at least one embodiment, a software program 802 comprises one or more software modules. In at least one embodiment, one or more APIs 810 are sets of software instructions that, if executed, cause one or more processors to perform one or more computational operations. In at least one embodiment, one or more APIs 810 are distributed or otherwise provided as a part of one or more libraries 806, runtimes 804, drivers 804, and/or any other grouping of software and/or executable code further described herein. In at least one embodiment, one or more APIs 810 perform one or more computational operations in response to invocation by software programs 802. In at least one embodiment, a software program 802 is a collection of software code, commands, instructions, or other sequences of text to instruct a computing device to perform one or more computational operations and/or invoke one or more other sets of instructions, such as APIs 810 or function(s) 812, to be executed. In at least one embodiment, functionality provided by one or more APIs 810 include software functions, such as those usable to accelerate one or more portions of software programs 802 using one or more parallel processing units (PPUs), such as graphics processing units (GPUs). In at least one embodiment, a software program is a compiler.

In at least one embodiment, APIs 810 are hardware interfaces to one or more circuits to perform one or more computational operations. In at least one embodiment, one or more software APIs 810 described herein are implemented as one or more circuits to perform one or more techniques described herein. In at least one embodiment, one or more software programs 802 comprise instructions that, if executed, cause one or more hardware devices and/or circuits to perform one or more techniques further described herein.

In at least one embodiment, software programs 802, such as user-implemented software programs, utilize one or more application programming interfaces (APIs) 810 to perform various computing operations or any computing operation performed by parallel processing units (PPUs), such as graphics processing units (GPUs), as further described herein. In at least one embodiment, one or more APIs 810 provide a set of callable function(s) 812, referred to herein as APIs, API functions, and/or functions, that individually perform one or more computing operations, such as computing operations related to parallel computing. For example, in an embodiment, one or more APIs 810 provide function(s) 812 to cause processor(s) to perform functions to format a block of contiguous memory to store values of mixed precision as described further herein. in an embodiment, one or more APIs 810 provide function(s) 812 to cause processor(s) to perform functions to generate an index used to identify values stored in a block of contiguous memory in mixed precision as described further herein. In at least one embodiment, API(s) 810 provide one or more function(s) 812 that are one or more neural networks, such as a pre-trained LLM.

In at least one embodiment, one or more software programs 802 interact or otherwise communicate with one or more APIs 810 to perform one or more computing operations using one or more PPUs, such as GPUs. In at least one embodiment, one or more computing operations using one or more PPUs comprise at least one or more groups of computing operations to be accelerated by execution at least in part by said one or more PPUs. In at least one embodiment, one or more software programs 802 interact with one or more APIs 810 to facilitate parallel computing using a remote or local interface.

In at least one embodiment, an interface is software instructions that, if executed, provide access to one or more function(s) 812 provided by one or more APIs 810. In at least one embodiment, a software program 802 uses a local interface when a software developer compiles one or more software programs 802 in conjunction with one or more libraries 806 comprising or otherwise providing access to one or more APIs 810. In at least one embodiment, one or more software programs 802 are compiled statically in conjunction with pre-compiled libraries 806 or uncompiled source code comprising instructions to perform one or more APIs 810. In at least one embodiment, one or more software programs 802 are compiled dynamically and said one or more software programs utilize a linker to link to one or more pre-compiled libraries 806 comprising one or more APIs 810.

In at least one embodiment, a software program 802 uses a remote interface when a software developer executes a software program that utilizes or otherwise communicates with a library 806 comprising one or more APIs 810 over a network or other remote communication medium. In at least one embodiment, one or more libraries 806 comprising one or more APIs 810 are to be performed by a remote computing service, such as a computing resource services provider. In another embodiment, one or more libraries 806 comprising one or more APIs 810 are to be performed by any other computing host providing said one or more APIs 810 to one or more software programs 802.

In at least one embodiment, a processor performing or using one or more software programs 802 calls, uses, performs, or otherwise implements one or more APIs 810 to allocate and otherwise manage memory to be used by said software programs 802. In at least one embodiment, one or more software programs 802 utilize one or more APIs 810 to allocate and otherwise manage memory to be used by one or more portions of said software programs 802 to be accelerated using one or more PPUs, such as GPUs or any other accelerator or processor further described herein. Those software programs 802 may be performed by one or more processors based, at least in part, on latency of interconnects coupled to one or more processors using function(s) 812 provided, in an embodiment, by one or more APIs 810.

In at least one embodiment, an API 810 is an API to facilitate parallel computing. In at least one embodiment, an API 810 is any other API further described herein. In at least one embodiment, an API 810 is provided by a driver and/or runtime 804. In at least one embodiment, an API 810 is provided by a CUDA user-mode driver. In at least one embodiment, an API 810 is provided by a CUDA runtime. In at least one embodiment, a driver 804 is data values and software instructions that, if executed, perform or otherwise facilitate operation of one or more function(s) 812 of an API 810 during load and execution of one or more portions of a software program 802. In at least one embodiment, a runtime 804 is data values and software instructions that, if executed, perform or otherwise facilitate operation of one or more function(s) 812 of an API 810 during execution of a software program 802. In at least one embodiment, one or more software programs 802 utilize one or more APIs 810 implemented or otherwise provided by a driver and/or runtime 804 to perform combined arithmetic operations by said one or more software programs 802 during execution by one or more PPUs, such as GPUs.

In at least one embodiment, one or more software programs 802 utilize one or more APIs 810 provided by a driver and/or runtime 804 to perform combined arithmetic operations of one or more PPUs, such as GPUs. In at least one embodiment, one or more APIs 810 provide combined arithmetic operations through a driver and/or runtime 804, as described above. In at least one embodiment, one or more software programs 802 utilize one or more APIs 810 provided by a driver and/or runtime 804 to allocate or otherwise reserve one or more blocks of memory 814 of one or more PPUs, such as GPUs. In at least one embodiment, one or more software programs 802 utilize one or more APIs 810 provided by a driver and/or runtime 804 to allocate or otherwise reserve blocks of memory. In at least one embodiment, one or more APIs 810 are to perform combined mathematical functions as described herein.

In at least one embodiment, to improve software programs 802 usability and/or optimization of one or more portions of said software programs 802 to be accelerated by one or more PPUs, such as GPUs, one or more APIs 810 provide one or more API function(s) 812 to perform a scheduling system usable or used by one or more computing devices as described herein. In at least one embodiment, a processor performs one or more software programs to combine two or more application programming interfaces (APIs) into a single API. In at least one embodiment, a processor uses an API to cause a scheduler to select a thread selection mechanism and/or otherwise perform operations described herein. In at least one embodiment, an API invokes a scheduler to cause a resource allocation. In at least one embodiment, a processor uses an exemplary API to schedule one or more instructions to be performed by one or more processors based, at least in part, on latency of one or more interconnects coupled to these one or more processors.

In at least one embodiment, memory 814 is system memory 1090 of computing SOC 1000. In at least one embodiment, memory 814 is processor memory. In at least one embodiment, memory 814 is any form of hardware that stores data and is referred to as storage or data storage. In at least one embodiment, memory 814 stores data used in various operations described herein, including values of mixed precision used in matrix multiplication operations.

In at least one embodiment, memory 814 is a computer readable storage medium and/or code stored on said computer readable storage medium in a form of a computer program including a plurality of computer readable instructions executable by one or more processors. In at least one embodiment, a computer readable storage medium is a non-transitory computer readable medium. In at least one embodiment, at least some computer readable instructions usable to perform operations described herein are not stored solely using transitory signals (e.g., a propagating transient electric or electromagnetic transmission). In at least one embodiment, a non-transitory computer readable medium does not necessarily include non-transitory data storage circuitry (e.g., buffers, caches, and queues) within transceivers of transitory signals. In at least one embodiment, memory 814 is implemented as a non-transitory computer readable storage medium storing executable instructions that, if executed by one or more processors of a computer system, cause one or more processors to use one or more indices comprising a plurality of bits, each indicating one or more operands stored contiguously based, at least in part, on a precision of those one or more operands.

Data Center

Figure 9:
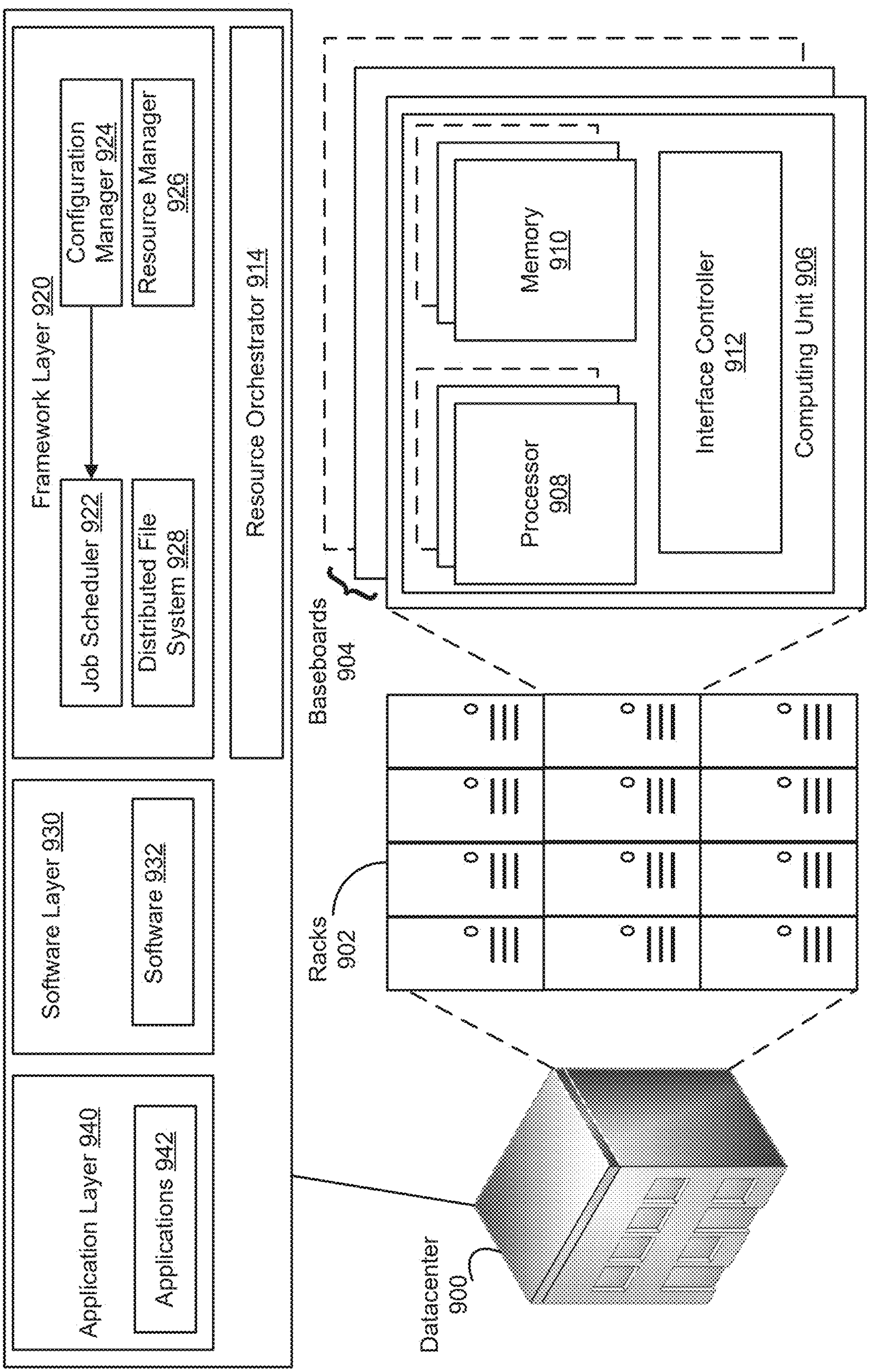
FIG. 9 illustrates an example data center system, in accordance with at least one embodiment.

FIG. 9 illustrates an example data center 900, in accordance with at least one embodiment. Data center 900 may include one or more rooms having racks 902 and auxiliary equipment used to house one or more racks 902 and one or more baseboards 904. Rack 902 can include one or more baseboards 904. Rack 902 can include a housing that receives and supports individual baseboards 904. Operational aspects of rack 902 may be regulated at a rack level, corresponding to a group of baseboards 904, or at a baseboard level, corresponding to individual baseboards 904, among other options. Rack 902 or baseboards 904 can have particularly selected maximum operating parameters, such as, but not limited to, power consumption, operating frequencies, and others. Data center 900 can be supported by various cooling systems, such as, but not limited to, cooling towers, cooling loops, pumps, and other support systems. Cooling systems may include sensors and controllers to monitor and managing cooling properties for racks 902. Baseboards 904 within racks 902 can get operational power from one or more power distribution units (PDUs; not shown). PDUs may be arranged within racks 902, for example between racks 902 including baseboards 904, or within racks 902 that also house baseboards 904.

Racks 902 and baseboards 904 can include sub-systems, modules, add-in cards, and other semiconductor components. Baseboards 904 can include one or more computing units 906 that can include one or more processors 908, one or more memory 910, and an interface controller 912. Computing units 906 may include any number of processors, such as, but not limited to, central processing units ("CPUs"), graphics processing units ("GPUs"), or other processors (including accelerators, field programmable gate arrays (FPGAs), graphics processors, etc.), including any processors described herein, such as, but not limited to, the processors in FIGS. 10-22. Computing units 906 can include one or more memory storage devices 910 (e.g., dynamic read-only memory, solid state storage or disk drives), as well as network input/output ("NW I/O") devices, network switches, virtual machines ("VMs"), power modules, and cooling modules, etc. One or more computing units 906 may be a server having one or more of above-mentioned computing resources.

Computing units 906 can include separate groupings of computing units housed within one or more racks (not shown), or many racks housed in data centers at various geographical locations (also not shown). Separate groupings of computing units may include grouped compute, network, memory or storage resources that may be configured or allocated to support one or more workloads. Several computing units (e.g., including CPUs and/or other processors) may be grouped within one or more racks to provide compute resources to support one or more workloads. A resource orchestrator 914 may configure or otherwise control one or more computing units 906 or groups of computing units. Resource orchestrator 914 may include a software design infrastructure ("SDI") management entity for data center 900. Resource orchestrator 914 may include hardware, software or some combination thereof.

Data center 900 can include any one of or any combination of a framework layer 920, a software layer 930 and an application layer 940. As shown in FIG. 9, framework layer 920 includes a job scheduler 922, a configuration manager 924, a resource manager 926 and a distributed file system 928. Framework layer 920 may include a framework to support software 932 of software layer 930 and/or one or more application(s) 942 of application layer 940. Software 932 or application(s) 942 may respectively include web-based service software or applications, such as, but not limited to, those provided by Amazon Web Services, Google Cloud and Microsoft Azure. Framework layer 920 may be a type of free and open-source software web application framework such as, but not limited to, Apache Spark™ (hereinafter "Spark") that may utilize distributed file system 928 for large-scale data processing (e.g., "big data"). Job scheduler 922 may include a Spark driver to facilitate scheduling of workloads supported by various layers of data center 900. Configuration manager 924 may be capable of configuring different layers such as, but not limited to, software layer 930 and framework layer 920 including Spark and distributed file system 928 for supporting large-scale data processing. Resource manager 926 may be capable of managing clustered or grouped computing units 906 mapped to or allocated for support of distributed file system 928 and job scheduler 922. Resource manager 926 may coordinate with resource orchestrator 914 to manage these mapped or allocated computing resources.

Software 932 can be included in software layer 930 and may include software used by at least portions of a computing unit 906, one or more computing units 906, groups of computing units 906, and/or distributed file system 928 of framework layer 920. One or more types of software may include, but are not limited to, Internet web page search software, e-mail virus scan software, database software, and streaming video content software.

Application(s) 942 can be included in application layer 940 and may include one or more types of applications used by at least portions of a computing unit 906, one or more computing units 906, groups of computing units 906, and/or distributed file system 928 of framework layer 920. One or more types of applications may include, but are not limited to, any number of a genomics application, a cognitive compute, application and a machine learning application, including training or inferencing software, machine learning framework software (e.g., PyTorch, TensorFlow, Caffe, etc.) or other machine learning applications used in conjunction with one or more embodiments.

Any of configuration manager 924, resource manager 926, and resource orchestrator 914 may implement any number and type of self-modifying actions based on any amount and type of data acquired in any technically feasible fashion. Self-modifying actions may relieve a data center operator of data center 900 from making possibly bad configuration decisions and possibly avoiding underutilized and/or poor performing portions of a data center.

Data center 900 may include tools, services, software or other resources to train one or more machine learning models or predict or infer information using one or more machine learning models in accordance with one or more embodiments described herein. For example, a machine learning model may be trained by calculating weight parameters in accordance with a neural network architecture using software and computing resources described above with respect to data center 900. Trained machine learning models corresponding to one or more neural networks may be used to infer or predict information using resources described above with respect to data center 900 by using weight parameters calculated through one or more training techniques described herein.

Data center 900 may use CPUs, application-specific integrated circuits (ASICs), GPUs, FPGAs, or other hardware (e.g., embodiments in FIGS. 10-22) to perform some or all of processes and techniques described elsewhere herein, such as, but not limited to, training and/or inferencing using above-described resources. Moreover, one or more software and/or hardware resources described above may be configured as a service to allow users to train or performing inferencing of information, such as, but not limited to, image recognition, speech recognition, or other artificial intelligence services.

In at least one embodiment, processor 908 includes at least a portion of, or is at least a portion of, one or more of processors described herein at least in conjunction with FIGS. 1-8 AND FIGS. 10-22. In at least one embodiment, processor 908 is at least a portion of, or includes at least a portion of, processor(s) 104 of FIG. 1. In at least one embodiment, processor 908 comprises one or more circuits to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein. In at least one embodiment, one or more circuits of processor 908 is configured by software 932 to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein. Data center 900 may use logic, CPUs, application-specific integrated circuits (ASICs), GPUs, FPGAs, or other hardware (e.g., embodiments in FIGS. 10-22) to perform any of the operations described above or elsewhere herein.

Processors

The following figures set forth, without limitation, example processors and processing systems that can be used to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform some or all of processes, operations and/or and techniques described elsewhere herein. Example processors and processing systems can be configured by software to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein. Processors and processing systems can include logic, central processing units (CPUs), application-specific integrated circuits (ASICs), graphics processing units (GPUs), field programmable arrays (FPGAs), XPUs (i.e., any compute architecture that best fits the need of an application) or other hardware (e.g., embodiments in FIGS. 10-22) to perform any of the operations described above, below, or elsewhere herein. Processors and/or processing systems described herein can include one or more circuits that can be used to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein. As used herein, one or more circuits can be configured by software to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein. FIGS. 27A and 27B illustrate logic 2715 which, as described elsewhere herein, can be used in one or more devices to perform operations such as, but not limited to, those discussed herein in accordance with at least one embodiment. Logic can refer, for example, to any combination of software logic, hardware logic, and/or firmware logic to provide functionality and/or operations described herein, wherein logic may be, collectively or individually, embodied as circuitry that forms part of a larger system, for example, an integrated circuit (IC), an application-specific integrated circuit (ASIC), a field programmable array (FPGA), system-on-chip (SoC), or one or processors (e.g., CPU, GPU).

Figure 10:
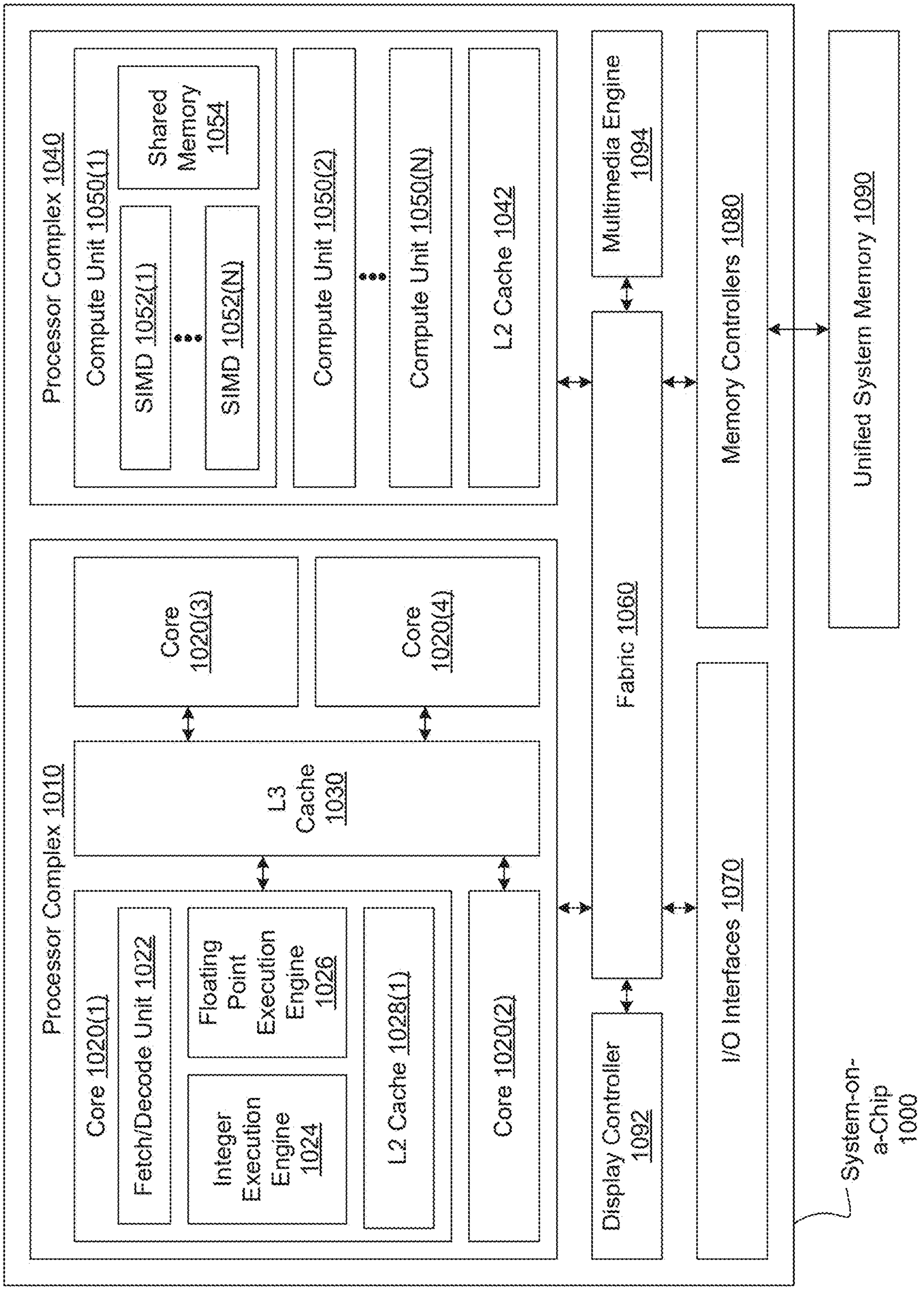
FIG. 10 illustrates an system-on-a-chip (SOC), in accordance with at least one embodiment.

FIG. 10 illustrates a processor which is a system-on-a-chip (SOC) 1000 (which may be referred to as system-on-chip, a superchip, or another name), in accordance with at least one embodiment. SOC 1000 can include processor complex 1010 and processor complex 1040. SOC 1000 can include any number of processor complexes 1010 and/or processor complexes 1040 that may include any number of processors that are described herein, such as, but not limited to, those in FIGS. 10-22, in any combination. For example, processor 1010 may include a central processing unit (CPU), and processor 1040 may include a graphics processor. Alternatively, processor 1010 may include a graphics processor, and processor 1040 may include a graphics processor. SOC 1000 may include any number of display controllers 1092, any number of multimedia engines 1094, any number of I/O Interfaces 1070, any number of memory controllers 1080, and any number of fabrics 1060 in any combination. For explanatory purposes, multiple instances of like objects are denoted herein with reference numbers identifying the object and parenthetical numbers identifying the instance where needed. SOC 1000 can include a processor from Broadcom in Palo Alto, CA.

Processor complex 1010 can include a CPU, processor complex 1040 can include a GPU, and SOC 1000 can include a processing unit that integrates 1010 and 1040 onto a single chip. Some tasks may be assigned to processor complex 1010 and other tasks may be assigned to processor complex 1040. Processor complex 1010 can be configured to execute main control software associated with SOC 1000, such as, but not limited to, an operating system. Processor complex 1010 can be the master processor of SOC 1000, controlling and coordinating operations of other processors. Processor complex 1010 can issue commands that control the operation of processor complex 1040 to perform some or all of the operations described herein. Processor complex 1010 can be configured to execute host executable code derived from CUDA or other source code (e.g., HIP source code), and processor complex 1040 can be configured to execute device executable code derived from CUDA or other source code in order to perform any of the operations described herein.

Processor complex 1010 can include cores 1020(1)-1020(4) and a cache (e.g., L3 cache) 1030 to store information to perform operations described herein. Processor complex 1010 may include any number of cores 1020 and any number and type of caches in any combination. Cores 1020 can be configured to execute instructions of a particular instruction set architecture ("ISA") to perform some or all of the operations described herein. Each core 1020 can include a CPU core. Core 1020(1)-1020(4) can be referred to as a computing units or compute units. SOC 1000 can includes any number of processor complexes 1010, fabric 1060, I/O interfaces 1070, and memory controllers 1080.

Each core 1020 can include a fetch/decode unit 1022, an integer execution engine 1024, a floating point execution engine 1026, and an L2 cache 1028. Fetch/decode unit 1022 can fetch instructions to perform some or all of the operations described herein (such as, but not limited to, an API that is compiled into instructions) and decode such instructions, generate micro-operations, and dispatch separate micro-instructions to integer execution engine 1024 and/or floating point execution engine 1026. Fetch/decode unit 1022 can concurrently dispatch one micro-instruction to integer execution engine 1024 and another micro-instruction to floating point execution engine 1026. Integer execution engine 1024 can execute integer and memory operations. Floating point engine 1026 can execute floating point and vector operations. Fetch-decode unit 1022 can dispatch micro-instructions to one or more execution engines that replaces both integer execution engine 1024 and floating point execution engine 1026.

Each core 1020(*i*), where i is an integer representing a particular instance of core 1020, may access L2 cache 1028(*i*) included in core 1020(*i*). Each core 1020 included in core complex 1010(*j*), where j is an integer representing a particular instance of core complex 1010, can be connected to other cores 1020 included in core complex 1010(*j*) via L3 cache 1030(*j*) included in core complex 1010(*j*). Cores 1020 included in core complex 1010(*j*), where j is an integer representing a particular instance of core complex 1010, can access all of L3 cache 1030(*j*) included in core complex 1010(*j*). L3 cache 1030 may include any number of slices.

Processor complex 1040 can be a graphics complex that can be configured to perform compute operations (e.g., compute operations involved in operations described herein) in a highly-parallel fashion. Processor complex 1040 can be configured to execute graphics pipeline operations such as, but not limited to, draw commands, pixel operations, geometric computations, and other operations associated with rendering an image to a display. Processor complex 1040 can be configured to execute operations unrelated to graphics, such as, but not limited to, neural network training and/or simulations. Processor complex 1040 can be configured to execute both operations related to graphics and operations unrelated to graphics.

Processor complex 1040 can include any number of compute units 1050(1)-1050(N), where N is any integer greater than 1, and an L2 cache 1042. Compute units 1050 can share L2 cache 1042, which may store information to be used to perform some or all of the operations described herein. L2 cache 1042 can be partitioned. Processor complex 1040 can include any number of compute units 1050 and any number (including zero) and type of caches. Processor complex 1040 can include any amount of dedicated graphics hardware.

Each compute unit 1050 can include any number of SIMD units 1052(1)-1052(N), where N is any integer greater than 1, and a shared memory 1054. Each SIMD unit 1052 can implement a SIMD architecture and can be configured to some or all of the operations described herein, in parallel. Each compute unit 1050 may execute any number of thread blocks, but each thread block can execute on a single compute unit 1050, although in some embodiments a thread block can execute on multiple compute units. A thread block can include any number of threads of execution. A workgroup can be a thread block. Each SIMD unit 1052 can execute a group of threads. A group of threads (e.g., 16 threads), which can also be referred to as a warp, or subgroup, or wavefront (e.g., as used by AMD and Intel), where each thread in the warp, wave, subgroup, or wavefront can belong to a single thread block and is configured to process a different set of data based on a single set of instructions. Predication can be used to disable one or more threads in a warp, subgroup, or wavefront. A lane can be a thread. A work item can be a thread, such as, but not limited to, e.g., with OpenCL. Different warps, subgroups, or wavefronts in a thread block may synchronize together and communicate via shared memory 1054. Each compute unit 1050 can include one or more thread block clusters, where a thread block cluster can enable programmatic control of locality at a granularity larger than a single thread block of a single streaming multiprocessor (SM). Thread block clusters (also referred to as "clusters") can enable multiple thread blocks running concurrently across streaming multiprocessors to synchronize and collaboratively fetch, exchange, or otherwise use data. In at least one embodiment, streaming multiprocessors ("SMs") can be referred to streaming microprocessors, stream processors ("SPs"), stream processing units ("SPUs"), compute units ("CUs"), execution units ("EUs"), and/or slices, where a slice in this context can refer to a portion of processing resources in a processing unit (e.g., 16 cores, a ray tracing unit, a thread director or scheduler).

Fabric 1060 can be a system interconnect that facilitates data and control transmissions across processor complex 1010, processor complex 1040, I/O interfaces 1070, memory controllers 1080, display controller 1092, and multimedia engine 1094, e.g., to perform some or all of the operations described herein. SOC 1000 may include any amount and type of system interconnect in addition to or instead of fabric 1060 that facilitates data and control transmissions across any number and type of directly or indirectly linked components that may be internal or external to SOC 1000. I/O interfaces 1070 can be representative of any number and type of I/O interfaces (e.g., PCI, PCI-Extended ("PCI-X"), PCIe, gigabit Ethernet ("GBE"), USB, etc.). Various types of peripheral devices can be coupled to I/O interfaces 1070. Peripheral devices that can be coupled to I/O interfaces 1070 may include keyboards, mice, printers, scanners, joysticks or other types of game controllers, media recording devices, external storage devices, network interface cards, and so forth.

Display controller 1092 may display images on one or more display device(s), such as, but not limited to, a liquid crystal display ("LCD") device. Multimedia engine 1094 can include any amount and type of circuitry that is related to multimedia, such as, but not limited to, a video decoder, a video encoder, an image signal processor, etc. Memory controllers 1080 may facilitate data transfers between SOC 1000 and a unified system memory 1090. Processor complex 1010 and processor complex 1040 may share unified system memory 1090. Unified system memory 1090 can include various types of memory devices, including dynamic random access memory (DRAM) or graphics random access memory, such as, but not limited to, synchronous graphics random access memory (SGRAM), including graphics double data rate (GDDR) memory. Unified system memory 1090 may include 3D stacked memory, including but not limited to high bandwidth memory (HBM), HBM2e, or HDM3.

SOC 1000 may implement a memory subsystem that includes any amount and type of memory controllers 1080 and memory devices (e.g., shared memory 1054) that may be dedicated to one component or shared among multiple components in order to perform any of the operations described herein. SOC 1000 can implement a cache subsystem that includes one or more cache memories (e.g., L2 caches 1028, L3 cache 1030, and L2 cache 1042) that may each be private to or shared between any number of components (e.g., cores 1020, core complex 1010, SIMD units 1052, compute units 1050, and processor complex 1040).

In at least one embodiment, SOC 1000 includes one or more processors that are at least a portion of, or include at least a portion of, one or more of processors described herein at least in conjunction with FIGS. 1-8 and FIGS. 10-22. In at least one embodiment, SOC 1000 includes one or more processors that are at least a portion of, or includes at least a portion of, processor(s) 104 of FIG. 1. In at least one embodiment, SOC 1000 includes one or more processors that comprise one or more circuits to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein. In at least one embodiment, SOC 1000 includes one or more processors configured by software to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein.

Figure 11A:
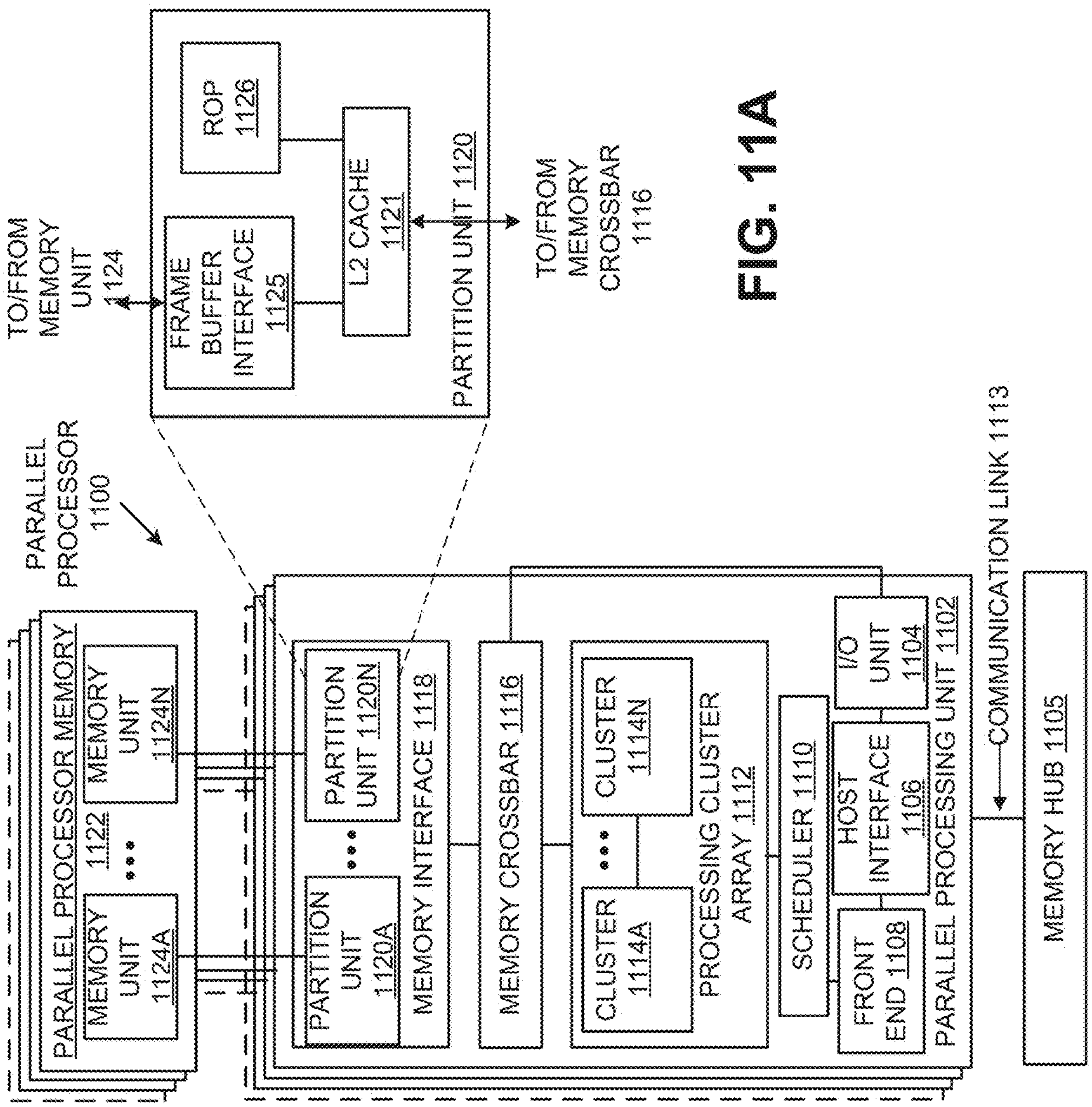
FIG. 11A illustrates a parallel processor, in accordance with at least one embodiment.

FIG. 11A illustrates a parallel processor 1100, in accordance with at least one embodiment. Parallel processor 1100 may be implemented using one or more circuits and may be referred to as a programmable processor (e.g., a CPU and/or GPU), logic, an application specific integrated circuit (ASIC), a field programmable gate array (FPGA) or other hardware (e.g., embodiments in FIGS. 10-22) to perform any of the operations described above or elsewhere herein.

Parallel processor 1100 can include a parallel processing unit 1102 to perform any of the operations described above or elsewhere herein. Parallel processing unit 1102 can include an I/O unit 1104 that enables communication with other devices, including other instances of parallel processing unit 1102. I/O unit 1104 may be directly connected to other devices. I/O unit 1104 may connect with other devices via use of a hub or switch interface, such as, but not limited to, a memory hub 1105. Connections between memory hub 1105 and I/O unit 1104 can form a communication link 1113. I/O unit 1104 may connect with a host interface 1106 and a memory crossbar 1116, where host interface 1106 receives commands directed to performing processing operations and memory crossbar 1116 receives commands directed to performing memory operations.

When host interface 1106 receives a command buffer via I/O unit 1104, host interface 1106 can direct work operations to perform those commands to a front end 1108. Front end 1108 can couple with a scheduler 1110 (which may be referred to as a sequencer), which is configured to distribute commands or other work items to a processing cluster array 1112. Scheduler 1110 can ensure that processing cluster array 1112 is properly configured and in a valid state before tasks may be distributed to a cluster of processing cluster array 1112. Scheduler 1110 may be implemented via firmware logic executing on a microcontroller. Microcontroller-implemented scheduler 1110 can be configurable to perform complex scheduling and work distribution operations at coarse and fine granularity, enabling rapid preemption and context switching of threads executing on processing array 1112. Host software can prove workloads for scheduling on processing cluster array 1112 via one of multiple graphics processing paths. Workloads can then be automatically distributed across processing array cluster 1112 by scheduler 1110 logic within a microcontroller including scheduler 1110.

Processing cluster array 1112 can perform any of the operations described above or elsewhere herein and can include up to "N" processing clusters (e.g., cluster 1114A, cluster 1114B, through cluster 1114N), where "N" represents a positive integer (which may be a different integer "N" than used in other figures). Each cluster 1114A-1114N of processing cluster array 1112 can execute a large number of concurrent threads. Scheduler 1110 can allocate work to clusters 1114A-1114N of processing cluster array 1112 using various scheduling and/or work distribution algorithms, which may vary depending on workload arising for each type of program or computation. Scheduling can be handled dynamically by scheduler 1110, or can be assisted in part by compiler logic during compilation of program logic configured for execution by processing cluster array 1112. Different clusters 1114A-1114N of processing cluster array 1112 can be allocated for processing different types of programs or for performing different types of computations.

Processing cluster array 1112 can be configured to perform various types of parallel processing operations, such as, but not limited to, any of the operations described above or elsewhere herein. Processing cluster array 1112 can be configured to perform general-purpose parallel compute operations. For example, processing cluster array 1112 can include logic to execute processing tasks including filtering of video and/or audio data, performing modeling operations, including physics operations, and performing data transformations.

Processing cluster array 1112 can be configured to perform parallel graphics processing operations. Processing cluster array 1112 can include additional logic to support execution of such graphics processing operations, including but not limited to, texture sampling logic to perform texture operations, as well as tessellation logic and other vertex processing logic. Processing cluster array 1112 can be configured to execute graphics processing related shader programs such as, but not limited to, vertex shaders, tessellation shaders, geometry shaders, and pixel shaders. Parallel processing unit 1102 can transfer data from system memory via I/O unit 1104 for processing. During processing, transferred data can be stored to on-chip memory (e.g., parallel processor memory 1122) during processing, then written back to system memory.

When parallel processing unit 1102 is used to perform graphics processing, scheduler 1110 can be configured to divide a processing workload into approximately equal sized tasks, to better enable distribution of graphics processing operations to multiple clusters 1114A-1114N of processing cluster array 1112. Portions of processing cluster array 1112 can be configured to perform different types of processing. For example, a first portion may be configured to perform vertex shading and topology generation, a second portion may be configured to perform tessellation and geometry shading, and a third portion may be configured to perform pixel shading or other screen space operations, to produce a rendered image for display. Intermediate data produced by one or more of clusters 1114A-1114N may be stored in buffers to allow intermediate data to be transmitted between clusters 1114A-1114N for further processing.

Processing cluster array 1112 can receive processing tasks to be executed via scheduler 1110, which receives commands defining processing tasks from front end 1108. Processing tasks can include indices of data to be processed, e.g., surface (patch) data, primitive data, vertex data, and/or pixel data, as well as state parameters and commands defining how data is to be processed (e.g., what program is to be executed). Scheduler 1110 may be configured to fetch indices corresponding to tasks or may receive indices from front end 1108. Front end 1108 can be configured to ensure processing cluster array 1112 is configured to a valid state before a workload specified by incoming command buffers (e.g., batch-buffers, push buffers, etc.) is initiated.

Each of one or more instances of parallel processing unit 1102 can couple with a parallel processor memory 1122 to perform any of the operations described above or elsewhere herein. Parallel processor memory 1122 can be accessed via memory crossbar 1116, which can receive memory requests from processing cluster array 1112 as well as I/O unit 1104. Memory crossbar 1116 can access parallel processor memory 1122 via a memory interface 1118. Memory interface 1118 can include multiple partition units (e.g., partition unit 1120A, partition unit 1120B, through partition unit 1120N) that can each couple to a portion (e.g., memory unit) of parallel processor memory 1122. A number of partition units 1120A-1120N can be configured to be equal to a number of memory units, such that a first partition unit 1120A has a corresponding first memory unit 1124A, a second partition unit 1120B has a corresponding memory unit 1124B, and an N-th partition unit 1120N has a corresponding N-th memory unit 1124N. A number of partition units 1120A-1120N may not be equal to a number of memory units.

Memory units 1124A-1124N can include various types of memory devices, including dynamic random access memory (DRAM) or graphics random access memory, such as, but not limited to, synchronous graphics random access memory (SGRAM), including graphics double data rate (GDDR) memory. Memory units 1124A-1124N may also include 3D stacked memory, including but not limited to high bandwidth memory (HBM), HBM2e, or HDM3. Render targets, such as, but not limited to, frame buffers or texture maps may be stored across memory units 1124A-1124N, allowing partition units 1120A-1120N to write portions of each render target in parallel to efficiently use available bandwidth of parallel processor memory 1122. A local instance of parallel processor memory 1122 may be excluded in favor of a unified memory design that utilizes system memory in conjunction with local cache memory.

Any one of clusters 1114A-1114N of processing cluster array 1112 can process data that will be written to any of memory units 1124A-1124N within parallel processor memory 1122. Memory crossbar 1116 can be configured to transfer an output of each cluster 1114A-1114N to any partition unit 1120A-1120N or to another cluster 1114A-1114N, which can perform additional processing operations on an output. Each cluster 1114A-1114N can communicate with memory interface 1118 through memory crossbar 1116 to read from or write to various external memory devices. Memory crossbar 1116 can have a connection to memory interface 1118 to communicate with I/O unit 1104, as well as a connection to a local instance of parallel processor memory 1122, enabling processing units within different processing clusters 1114A-1114N to communicate with system memory or other memory that is not local to parallel processing unit 1102. Memory crossbar 1116 can use virtual channels to separate traffic streams between clusters 1114A-1114N and partition units 1120A-1120N.

Multiple instances of parallel processing unit 1102 can be provided on a single add-in card, or multiple add-in cards can be interconnected. Different instances of parallel processing unit 1102 can be configured to interoperate even if different instances have different numbers of processing cores, different amounts of local parallel processor memory, and/or other configuration differences. For example, some instances of parallel processing unit 1102 can include higher precision floating point units relative to other instances. Systems incorporating one or more instances of parallel processing unit 1102 or parallel processor 1100 can be implemented in a variety of configurations and form factors, including but not limited to desktop, laptop, or handheld personal computers, servers, workstations, game consoles, and/or embedded systems.

FIG. 11A further includes a block diagram of a partition unit 1120, in accordance with at least one embodiment. Partition unit 1120 is an instance of one of partition units 1120A-1120N of FIG. 11A. Partition unit 1120 can include an L2 cache 1121, a frame buffer interface 1125, and a ROP 1126 (raster operations unit). L2 cache 1121 can be a read/write cache that is configured to perform load and store operations received from memory crossbar 1116 and ROP 1126. Read misses and urgent write-back requests can be output by L2 cache 1121 to frame buffer interface 1125 for processing. Updates can also be sent to a frame buffer via frame buffer interface 1125 for processing. Frame buffer interface 1125 may interface with one of memory units in parallel processor memory, such as, but not limited to, memory units 1124A-1124N of FIG. 11A (e.g., within parallel processor memory 1122).

ROP 1126 can be a processing unit that performs raster operations such as, but not limited to, stencil, z test, blending, etc. ROP 1126 can then output processed graphics data that is stored in graphics memory. ROP 1126 can include compression logic to compress depth or color data that is written to memory and decompress depth or color data that is read from memory. Compression logic can be lossless compression logic that makes use of one or more of multiple compression algorithms. A type of compression that is performed by ROP 1126 can vary based on statistical characteristics of data to be compressed. For example, delta color compression is performed on depth and color data on a per-tile basis.

ROP 1126 can be included within each processing cluster (e.g., cluster 1114A-1114N of FIG. 11A) instead of within partition unit 1120. Read and write requests for pixel data may be transmitted over memory crossbar 1116 instead of pixel fragment data. Processed graphics data may be displayed on a display routed for further processing by processor(s), or routed for further processing by one of processing entities within parallel processor 1100 of FIG. 11A.

In at least one embodiment, parallel processor 1100 includes one or more processors that are at least a portion of, or include at least a portion of, one or more of processors described herein at least in conjunction with FIGS. 1-8 and FIGS. 10-22. In at least one embodiment, parallel processor 1100 includes one or more processors that are at least a portion of, or includes at least a portion of, processor(s) 104 of FIG. 1. In at least one embodiment, parallel processor 1100 includes one or more processors that comprise one or more circuits to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein. In at least one embodiment, parallel processor 1100 includes one or more circuits configured by software to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein.

Figure 11C:
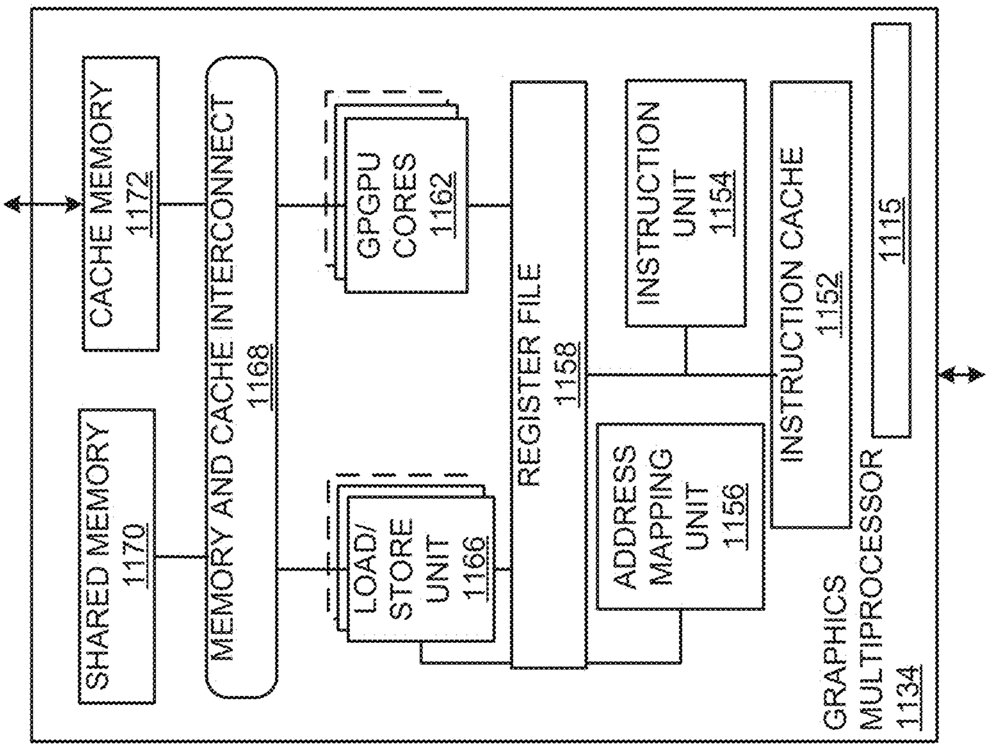
FIG. 11C illustrates a graphics multiprocessor, in accordance with at least one embodiment.
Figure 11B:
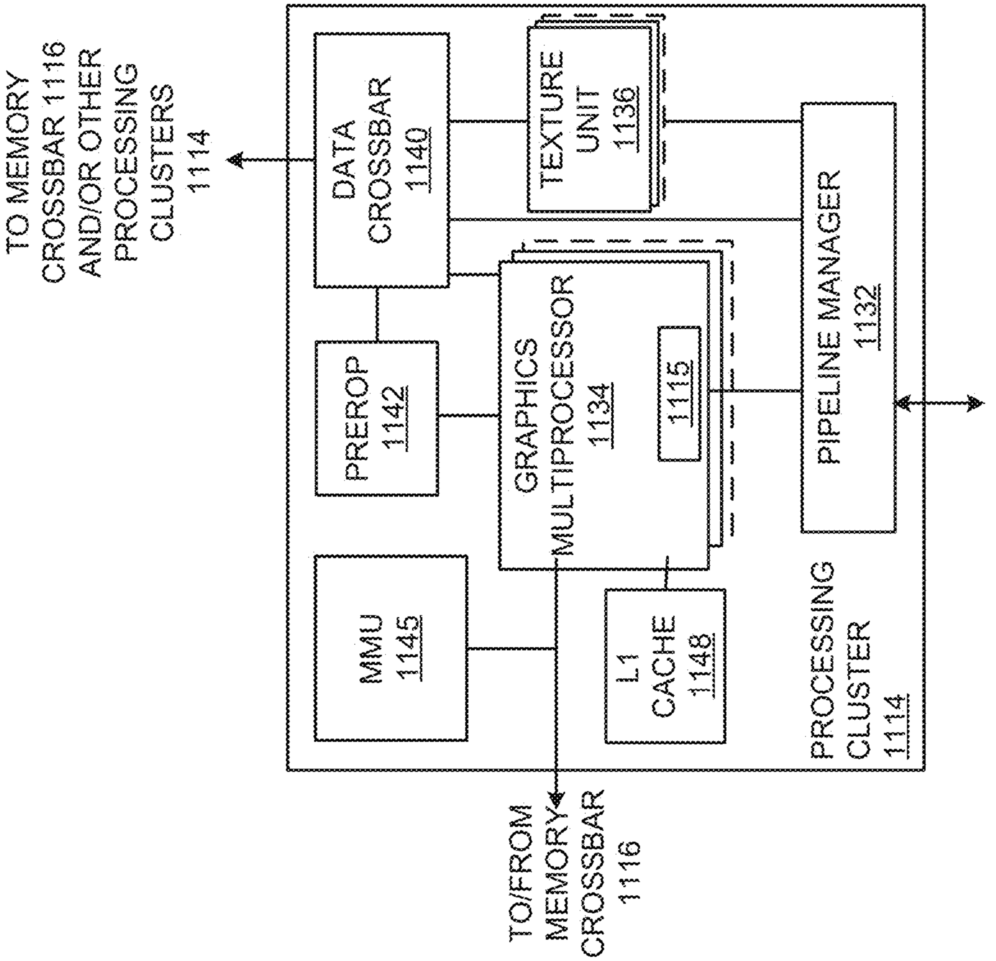
FIG. 11B illustrates a processing cluster, in accordance with at least one embodiment.

FIG. 11B includes a block diagram of a processing cluster 1114 within a parallel processing unit, in accordance with at least one embodiment. A processing cluster can be an instance of one of processing clusters 1114A-1114N of FIG. 11A that can be used to perform any of the operations described above or elsewhere herein. Processing cluster 1114 can be configured to execute many threads in parallel, where "thread" refers to an instance of a particular program executing on a particular set of input data. Single-instruction, multiple-data (SIMD) instruction issue techniques can be used to support parallel execution of a large number of threads without providing multiple independent instruction units. Single-instruction, multiple-thread (SIMT) techniques may be used to support parallel execution of a large number of generally synchronized threads, using a common instruction unit configured to issue instructions to a set of processing engines within each one of processing clusters.

Operation of processing cluster 1114 can be controlled via a pipeline manager 1132 that distributes processing tasks to SIMT parallel processors. Pipeline manager 1132 can receive instructions from scheduler 1110 of FIG. 11A and manages execution of those instructions via a graphics multiprocessor 1134 and/or a texture unit 1136. Graphics multiprocessor 1134 may be an example instance of a SIMT parallel processor. However, various types of SIMT parallel processors of differing architectures may be included within processing cluster 1114. One or more instances of graphics multiprocessor 1134 can be included within a processing cluster 1114. Graphics multiprocessor 1134 can process data and a data crossbar 1140 can be used to distribute processed data to one of multiple possible destinations, including other shader units. Pipeline manager 1132 can facilitate distribution of processed data by specifying destinations for processed data to be distributed via data crossbar 1140.

Each graphics multiprocessor 1134 within processing cluster 1114 can include an identical set of functional execution logic (e.g., arithmetic logic units, load-store units, etc.) to perform computations for any of the operations described above or elsewhere herein. Functional execution logic can be configured in a pipelined manner in which new instructions can be issued before previous instructions may be complete. Functional execution logic can support a variety of operations including integer and floating point arithmetic, comparison operations, Boolean operations, bit-shifting, and computation of various algebraic functions. Same functional-unit hardware can be leveraged to perform different operations and any combination of functional units may be present.

Instructions transmitted to processing cluster 1114 may constitute a thread, which can also be referred to as a warp, subgroup, wave, or a wavefront. A set of threads executing across a set of parallel processing engines can be referred to as a thread group. A thread group can execute a common program on different input data. Each thread within a thread group can be assigned to a different processing engine within a graphics multiprocessor 1134. A thread group may include fewer threads than a number of processing engines within graphics multiprocessor 1134. When a thread group includes fewer threads than a number of processing engines, one or more of processing engines may be idle during cycles in which that thread group is being processed. A thread group may also include more threads than a number of processing engines within graphics multiprocessor 1134. When a thread group includes more threads than number of processing engines within graphics multiprocessor 1134, processing can be performed over consecutive clock cycles. Multiple thread groups can be executed concurrently on a graphics multiprocessor 1134.

Graphics multiprocessor 1134 includes an internal cache memory to perform load and store operations, such as, but not limited to, any of the operations described above or elsewhere herein. Graphics multiprocessor 1134 can forego an internal cache and use a cache memory (e.g., L1 cache 1148) within processing cluster 1114. Each graphics multiprocessor 1134 may also have access to L2 caches within partition units (e.g., partition units 1120A-1120N of FIG. 11A) that can be shared among all processing clusters 1114 and may be used to transfer data between threads. Graphics multiprocessor 1134 may also access off-chip global memory, which can include one or more of local parallel processor memory and/or system memory. Any memory external to parallel processing unit 1102 may be used as global memory. Processing cluster 1114 can include multiple instances of graphics multiprocessor 1134 and can share common instructions and data, which may be stored in L1 cache 1148.

Each processing cluster 1114 may include an MMU 1145 (memory management unit) that can be configured to map virtual addresses into physical addresses. One or more instances of MMU 1145 may reside within memory interface 1118 of FIG. 11A. MMU 1145 can include a set of page table entries (PTEs) used to map a virtual address to a physical address of a tile and optionally a cache line index. MMU 1145 may include address translation lookaside buffers (TLB) or caches that may reside within graphics multiprocessor 1134 or L1 1148 cache or processing cluster 1114. A physical address can be processed to distribute surface data access locally to allow for efficient request interleaving among partition units. A cache line index may be used to determine whether a request for a cache line is a hit or miss.

A processing cluster 1114 may be configured such that each graphics multiprocessor 1134 is coupled to a texture unit 1136 for performing texture mapping operations, e.g., determining texture sample positions, reading texture data, and filtering texture data. Texture data can be read from an internal texture L1 cache (not shown) or from an L1 cache within graphics multiprocessor 1134 and can be fetched from an L2 cache, local parallel processor memory, or system memory, as needed. Each graphics multiprocessor 1134 can output processed tasks to data crossbar 1140 to provide processed task to another processing cluster 1114 for further processing or to store processed task in an L2 cache, local parallel processor memory, or system memory via memory crossbar 1116. A preROP 1142 (pre-raster operations unit) can be configured to receive data from graphics multiprocessor 1134, and direct data to ROP units, which may be located with partition units as described herein (e.g., partition units 1120A-1120N of FIG. 11A). PreROP 1142 unit can perform optimizations for color blending, organizing pixel color data, and performing address translations.

In at least one embodiment, processing cluster 1114 includes one or more processors that are at least a portion of, or include at least a portion of, one or more of processors described herein at least in conjunction with FIGS. 1-8 and FIGS. 10-22. In at least one embodiment, processing cluster 1114 includes one or more processors that are at least a portion of, or includes at least a portion of, processor(s) 104 of FIG. 1. In at least one embodiment, processing cluster 1114 includes one or more processors that comprise one or more circuits to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein. In at least one embodiment, processing cluster 1114 includes one or more circuits configured by software to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein.

FIG. 11C shows a graphics multiprocessor 1134, in accordance with at least one embodiment, e.g., to perform any of the operations described above or elsewhere herein. Graphics multiprocessor 1134 can couple with pipeline manager 1132 of processing cluster 1114. Graphics multiprocessor 1134 can include an execution pipeline including but not limited to an instruction cache 1152 (that, e.g., can store instructions, such as, not limited to compiled API instructions), an instruction unit 1154, an address mapping unit 1156, a register file 1158, one or more general purpose graphics processing unit (GPGPU) cores 1162, and one or more load/store units 1166, where one or more load/store units 1166 can perform load/store operations to load/store instructions corresponding to performing an operation. GPGPU cores 1162 and load/store units 1166 can be coupled with cache memory 1172 and shared memory 1170 via a memory and cache interconnect 1168. GPGPU cores 1162 can be part of an SoC such as, but not limited to, part of integrated circuit 1000 in FIG. 10.

Instruction cache 1152 can receive a stream of instructions (e.g., to perform any of the operations described above or elsewhere herein) to execute from pipeline manager 1132. Instructions can be cached in instruction cache 1152 and dispatched for execution by an instruction unit 1154. Instruction unit 1154 can dispatch instructions as thread groups (e.g., warps, subgroups, wavefronts, or waves), with each thread of thread group assigned to a different execution unit within GPGPU cores 1162. An instruction can access any of a local, shared, or global address space by specifying an address within a unified address space. Address mapping unit 1156 can be used to translate addresses in a unified address space into a distinct memory address that can be accessed by load/store units 1166.

Register file 1158 can provide a set of registers for functional units of graphics multiprocessor 1134. Register file 1158 may provide temporary storage for operands connected to data paths of functional units (e.g., GPGPU cores 1162, load/store units 1166) of graphics multiprocessor 1134. Register file 1158 may be divided between each of functional units such that each functional unit is allocated a dedicated portion of register file 1158. Register file 1158 can be divided between different warps (which may be referred to as wavefronts, subgroups, and/or waves or threads) being executed by graphics multiprocessor 1134.

GPGPU cores 1162 can each include floating point units (FPUs) and/or integer arithmetic logic units (ALUs) that can be used to execute instructions of graphics multiprocessor 1134. GPGPU cores 1162 can be similar in architecture or can differ in architecture. A first portion of GPGPU cores 1162 can include a single precision FPU and an integer ALU while a second portion of GPGPU cores include a double precision FPU. FPUs can implement IEEE 754-2008 standard floating point arithmetic or enable variable precision floating point arithmetic. Graphics multiprocessor 1134 can additionally include one or more fixed function or special function units to perform specific functions such as, but not limited to, copy rectangle or pixel blending operations. One or more of GPGPU cores 1162 can also include fixed or special function logic.

GPGPU cores 1162 can include SIMD logic capable of performing a single instruction on multiple sets of data. GPGPU cores 1162 can physically execute SIMD4, SIMD8, and SIMD16 instructions and logically execute SIMD1, SIMD2, and SIMD32 instructions. SIMD instructions for GPGPU cores can be generated at compile time by a shader compiler or automatically generated when executing programs written and compiled for single program multiple data (SPMD) or SIMT architectures. Multiple threads of a program can be configured for an SIMT execution model that can be executed via a single SIMD instruction. For example, eight SIMT threads that perform same or similar operations can be executed in parallel via a single SIMD8 logic unit.

Memory and cache interconnect 1168 can include an interconnect network that connects each functional unit of graphics multiprocessor 1134 to register file 1158 and to shared memory 1170. Memory and cache interconnect 1168 may be a crossbar interconnect that allows load/store unit 1166 to implement load and store operations between shared memory 1170 and register file 1158. register file 1158 can operate at a same frequency as GPGPU cores 1162, thus data transfer between GPGPU cores 1162 and register file 1158 can have very low latency. Shared memory 1170 can be used to enable communication between threads that execute on functional units within graphics multiprocessor 1134. Cache memory 1172 can be used as a data cache for example, to cache texture data communicated between functional units and texture unit 1136. Shared memory 1170 can also be used as a program managed cache. Threads executing on GPGPU cores 1162 can programmatically store data within shared memory in addition to automatically cached data that is stored within cache memory 1172.

A parallel processor or GPGPU as described herein may be communicatively coupled to host/processor cores to accelerate graphics operations, machine-learning operations, pattern analysis operations, and various general purpose GPU (GPGPU) functions. A GPU may be communicatively coupled to host processor/cores over a bus or other interconnect (e.g., a high-speed interconnect such as, but not limited to, PCIe or NVLink). An SoC may include a parallel processor or GPGPU as described herein, where said parallel processor or said GPGPU is performed on said SoC. A GPU may be integrated on a package or chip as cores and communicatively coupled to cores over an internal processor bus/interconnect internal to a package or chip. Regardless a manner in which a GPU is connected, processor cores may allocate work to such GPU in a form of sequences of commands/instructions contained in a work descriptor. GPU then may use dedicated circuitry/logic for efficiently processing these commands/instructions to perform any of the operations described above or elsewhere herein.

In at least one embodiment, graphics multiprocessor 1134 includes one or more processors that are at least a portion of, or include at least a portion of, one or more of processors described herein at least in conjunction with FIGS. 1-8 and FIGS. 10-22. In at least one embodiment, graphics multiprocessor 1134 includes one or more processors that are at least a portion of, or includes at least a portion of, processor(s) 104 of FIG. 1. In at least one embodiment, graphics multiprocessor 1134 includes one or more processors that comprise one or more circuits to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein. One or more circuits of one or more processors of graphics multiprocessor 1134 can be configured by software to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein.

Figure 12:
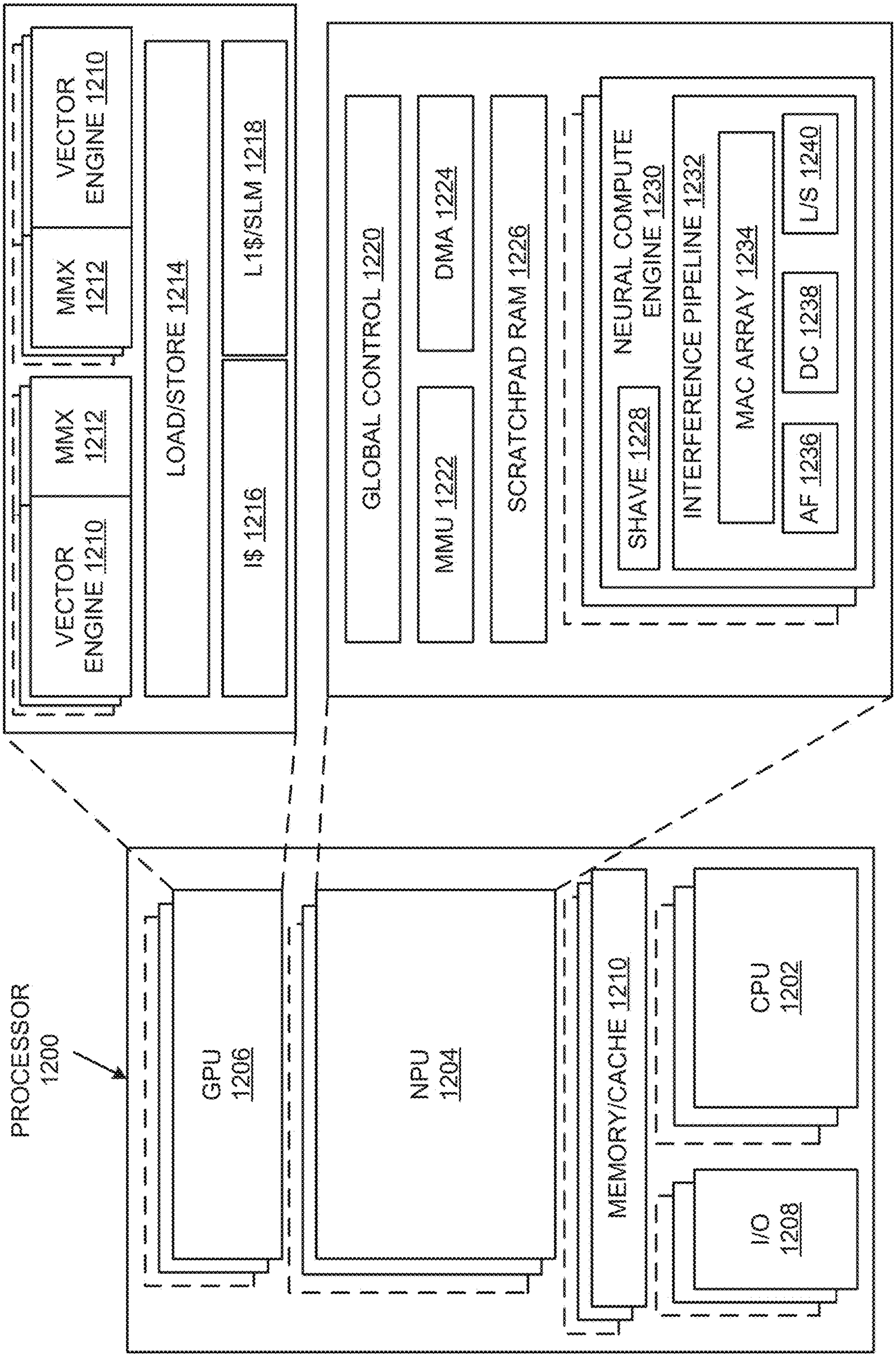
FIG. 12 illustrates an accelerator processor, in accordance with at least one embodiment.

FIG. 12 shows a processor 1200, in accordance with at least one embodiment. Processor 1200 can include a processor with hybrid architecture (e.g., Lunar Lake or Meteor Lake) from Intel Corporation in Santa Clara, CA or another processor that shares at least some of the components described herein. Processor 1200 can include one or more Central Processing Unit(s) (CPU 1202), one or more Graphics Processing Unit(s) (GPU 1206), and/or one or more Neural Processing Unit(s) (NPU 1208) that can be, e.g., a dedicated AI accelerator that offloads artificial intelligence (AI) workloads from the CPU and GPU. Processor 1200 can use instructions that, if executed cause processor 1200 and/or any of its components to perform some or all of processes and techniques described elsewhere herein. Processor 1200 may include any number of memory and cache units 1210 to facilitate processing amongst the different components. Memory and cache 1210 on processor 1200 may include one or more levels of cache (e.g., L1, L2, L3, and/or last-level cache) and high-bandwidth memory (e.g., HBM2e or HBM3) in any combination. With respect to processor 1200 and any of its components described above or elsewhere herein, one or more of APIs described herein can, for example, get compiled into instructions, which may be fetched by instruction fetch logic or equivalents, decoded by a processor decoder or equivalents, scheduled (e.g., in order or out of order) for execution by a scheduler or equivalents, executed by execution logic or equivalents, reordered, and then retired by retirement logic or equivalents. API(s) (and/or compiled instructions including API(s)) can be stored in any storage outside or inside of the processor (e.g., in cache and/or memory). A result of API(s) can then be stored in storage within or outside of the processor, including registers, DRAM, flash, SRAM, cache, or other memory. One or more of APIs described herein can include a call.

Processor 1200 can include compute engines as CPUs 1202 and can include any number of cores, such as, but not limited to, up to 16 cores/22 threads. Cores in CPU 1202 can include P-cores (Performance), E-cores (Efficient) & LP-E cores (Low-power Efficient). Performance-cores can be used for low latency single-threaded, compute-intensive workloads, while Efficient-cores can be used for multi-threaded, less compute-intensive workloads. Low-power Efficient cores can be used for scalable multithreaded performance and offloading background tasks. P-cores can be used for single & limited threading performance, whereas E- and LP-E cores can be used for multi-threaded throughput and power efficiency.

GPU 1206 can include any number of graphics engines, such as, but not limited to, Intel® Arc™ graphics engines (Xe LPG) with 8 Xe cores (up to 128 Execution Units or EUs). As shown in FIG. 12, GPU 1206 can include vector engines 1210 and matrix engines 1212, that, for example, can run FP, INT, and matrix operation tasks all at the same time or separately or in batches. GPU 1206 can include a load/store unit 1214, as well as other memory, such as, but not limited to, an instruction cache (I$) 1216 and L1 cache/subsystem local memory (SLM) 1218 that can, e.g., store instructions to perform any of the operations described above or elsewhere herein.

NPU 1204 can include one or more Intel® AI Boost built-in neural processing unit(s) (NPUs). NPU 1204 can be enumerated to the host processor as an integrated PCIe device. NPU 1204 can include one or more (e.g., two) Neural Compute Engine (NCE) tiles 1230. Each tile can be configured with any combination of, but not limited to, (e.g., 2000) Multiply Accumulate (MAC) Engines 1234, a Post Processing Engine (not shown), a AI DSP Processor (not shown), and memory (2 MB of dedicated SRAM) per tile as shown in FIG. 12. For general compute needs, Neural Compute Engines 1230 can include Streaming Hybrid Architecture Vector Engines (SHAVE) 1228 for high performance parallel computing, which can include DMA (Direct Memory Access) engines 1224 to shuttle the data between system memory DRAM (Dynamic Random Access Memory) 1226 and a software managed cache. Built-in device MMU (Memory Management Unit) 1222 plus IOMMU (Input-Output Memory Management Unit) (not shown) can support multiple simultaneous hardware contexts and provide security isolation between execution contexts as per MCDM (Microsoft Compute Driver Model) architecture. Processor 1200 can also include a media unit (not shown) that is included on or separately from the XCDs or other components of the processor to enable video playback and video processing of compressed or non-compressed data, such using HEVC, AV1, VP9 and AVC HW accelerated decode support and HEVC, VP9 and AVC HW accelerated encode support.

A Intel® Thread Director, which includes firmware that is built into the processor, can prioritize and manage distribution of workloads, sending tasks to optimized cores. For example, Thread Director can tie P-cores, E-cores and/or LP-E cores (described above) together with task-scheduling capabilities and ability to send less-demanding tasks to the E-cores or LP-E cores. Intel® Deep Learning Boost (Intel® DL Boost) (not shown) can provide built in AI acceleration for training and inference workloads, and may include VNNI (for CPU) and DP4a (for GPU) instruction set support. This instruction set may be optimized with Open VINO™ Toolkit and oneAPI to accelerate INT8 inferencing. A software stack, e.g., as described elsewhere herein, can be used to enable AI inference using OpenVINO™ toolkit. Processor 1200 can be configured to execute an application program, such as, but not limited to, a CUDA program.

In at least one embodiment, processor 1200 includes one or more processors that are at least a portion of, or include at least a portion of, one or more of processors described herein at least in conjunction with FIGS. 1-8 and FIGS. 10-22. In at least one embodiment, processor 1200 includes one or more processors that are at least a portion of, or includes at least a portion of, processor(s) 104 of FIG. 1. In at least one embodiment, processor 1200 includes one or more processors that comprise one or more circuits to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein. One or more circuits of processor 1200 can be configured by software to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein.

Processor 1200 can alternatively include a processor based on AI Engine Direct architecture from Qualcomm Corporation in Santa Clara, CA or another processor that shares at least some of the components described herein. that may include any number of NPUs, GPUs, CPUs and other related components, such as, but not limited to, NPU 1204 as a Hexagon NPU, GPU 1206 as a Adreno GPU, CPU 1202 as a Kryo or Qualcomm Oryon CPU, as well as a Qualcomm Sensing Hub (not shown) and a memory subsystem 1210, in any combination. Hexagon NPU 1204 can include a power rail a micro-tile inferencing unit, a hardware acceleration unit, a tensor unit, a scalar unit, and a vector unit (all not shown), which can have dedicated memory or share memory (e.g., cache or memory, such HBM3) for, e.g., storing instructions to perform any of the operations described above or elsewhere herein. Adreno GPU 1206 can provide graphics and parallel processing for AI in formats, such as, but not limited to, 32-bit floating point (FP32), 16-bit floating point (FP16), and 8-bit integer (INT8). Kryo or Qualcomm Oryon CPUs 1202 can perform AI workloads, and can handle contextualization for pervasive generative AI applications. CPU 1202 can also include an instruction fetch unit, a rename and retire unit, a memory management unit, a vector execution unit, an integer execution unit, and a load and store unit for processing and instruction management. With respect to processor 1200 and any of its components described above or elsewhere herein, one or more of APIs described herein can, for example, get compiled into instructions, which may be fetched by the instruction fetch unit, decoded by a processor decoder or equivalents, scheduled (e.g., in order or out of order) for execution by a scheduler or equivalents, executed by execution logic or equivalents, reordered, and then retired by the rename and retire unit. API(s) (and/or compiled instructions including API(s)) can be stored in any storage outside or inside of the processor (e.g., in cache and/or memory). Any number of CPU cores 1202 may be included in any number of CPU cluster(s) that can be coupled to memory and/or cache, such as, but not limited to a shared L2 cache. Memory can be separate or shared, e.g., CPU clusters of CPU cores 1202 can couple to memory subsystem 1210 that can include fabric, system level cache and any number of memory management units that can, for example, read and write memory (e.g., DRAM). Qualcomm Sensing Hub (not shown) includes micro NPUs, a power rail, and traditional sensors (a gyrometer, accelerometer, even a barometer) with voice and data streams. Memory subsystem 1210 can include memory and cache on processor 1200, which may include one or more levels of cache (e.g., L1, L2, L3, and/or last-level cache) and high-bandwidth memory (e.g., HBM2e or HBM3) in any combination, e.g., for storing information and/or instructions to perform any of the operations described above or elsewhere herein. All or some of the memory and/or cache in memory subsystem 1210 can be shared or used individually by any one or combinations of components (e.g., GPU 1206, NPU 1204, and CPU 1202) on processor 1200.

Qualcomm AI Engine 1200 may be programmed and controlled with an a software stack to perform some or all of the operations described herein, and include, e.g., a Qualcomm® Neural Processing SDK for inferencing with versions for Android, Linux, and Windows. Developer libraries and services support the latest programming languages, virtual platforms, and compilers. At a lower level of the software stack, system software includes the basic real-time operating system (RTOS), system interfaces, and drivers. Software stack supports different operating systems, including Android, Windows, Linux, and QNX, and deployment and monitoring infrastructure like Prometheus, Kubernetes, and Docker. For direct cross-platform access to the GPU, OpenCL and DirectML may be supported. For the CPU, a LLVM compiler infrastructure optimizations enable accelerated and efficient AI inference. With respect to Qualcomm AI Engine 1200 and any of its components described above or elsewhere herein, one or more of APIs described herein can, for example, get compiled into instructions, which may be fetched by instruction fetch logic or equivalents, decoded by a processor decoder or equivalents, scheduled (e.g., in order or out of order) for execution by a scheduler or equivalents, executed by execution logic or equivalents, reordered, and then retired by retirement logic or equivalents. API(s) (and/or compiled instructions including API(s)) can be stored in any storage outside or inside of the processor (e.g., in cache and/or memory). A result of API(s) can then be stored in storage within or outside of the processor, including registers, DRAM, flash, SRAM, cache, or other memory.

In at least one embodiment, processor 1200 or Qualcomm AI Engine 1200 includes one or more processors that are at least a portion of, or include at least a portion of, one or more of processors described herein at least in conjunction with FIGS. 1-8 and FIGS. 10-22. In at least one embodiment, processor 1200 or Qualcomm AI Engine 1200 includes one or more processors that are at least a portion of, or includes at least a portion of, processor(s) 104 of FIG. 1. In at least one embodiment, processor 1200 or Qualcomm AI Engine 1200 includes one or more processors that comprise one or more circuits to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein. One or more circuits of processor 1200 or Qualcomm AI Engine 1200 can be configured by software to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein.

Figure 13A:
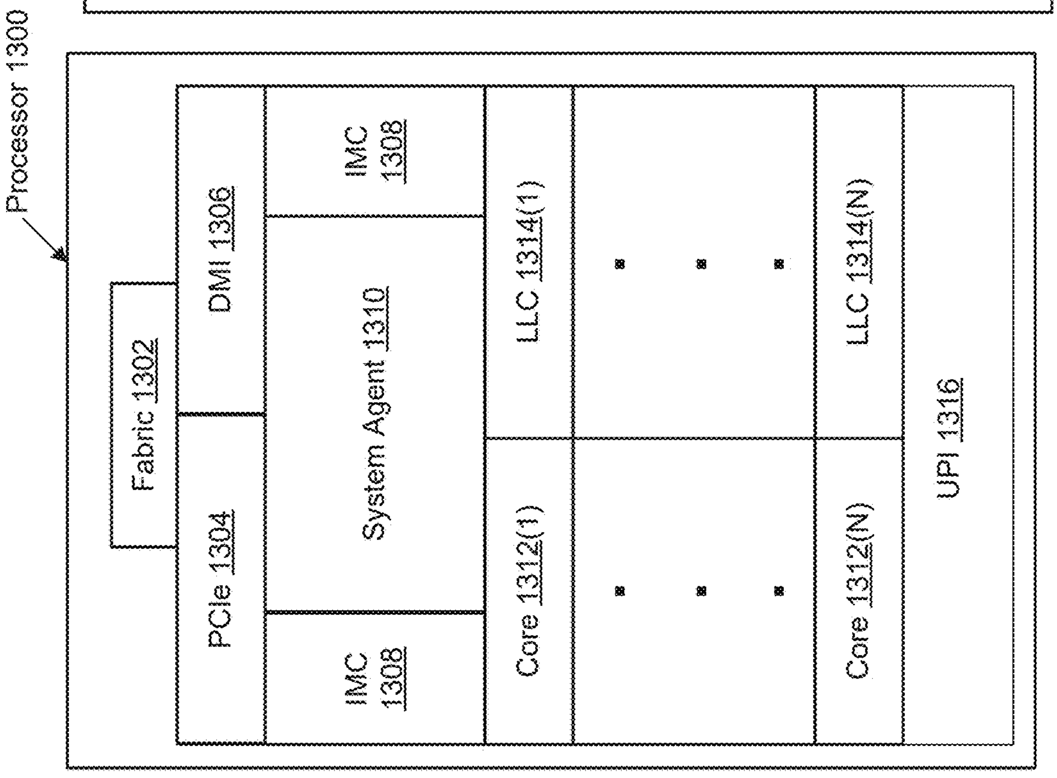
FIG. 13A illustrate a central processing unit, in accordance with at least one embodiment.

FIG. 13A illustrates a processor 1300, in accordance with at least one embodiment. Processor 1300 can include an processor with scalable family from Intel Corporation in Santa Clara, CA or another processor that shares at least some of the components described herein. Processor 1300 can include one or more cores 1312(1)-1312(N), where N is any integer greater than 1 that can perform the operations described elsewhere herein. Cores 1312(1)-1312(N) can be interlinked together using ring and/or mesh interconnects. With the mesh interconnects architecture, an array of vertical and horizontal communication paths may allow traversal from one core to another 1312(1)-1312(N) through a shortest path (hop on vertical path to correct row, and hop across horizontal path to correct column). For mesh interconnects, a die can house cores 1312(1)-1312(N) and can include a grid of converged mesh stops (CMS) that may be associated (e.g., 1:1) with cores 1312(1)-1312(N). Each core can be associated with one lower level cache (LLC) slice 1314(1)-1314(N), or cores 1312(1)-1312(N) can share cache, e.g., lower level cache. LLCs 1314(1)-1314(N) can be inclusive by incorporating blocks in higher level cache (e.g., L2 cache) or non-inclusive (having blocks that may be not present in higher level cache). Each core and LLC slice can include a Caching and Home Agent (CHA) (not shown) that can maintain cache coherency by providing scalability of resources across mesh interconnects for Intel® Ultra Path Interconnect (Intel® UPI 1316) cache coherency functionality. UPI 1316 can provide a coherent interconnect for scalable systems and can allow for multiple processors to share a single shared address space through links, such as, but not limited to, two or three UPI links per processor.

Processor 1300 can also include the System Agent 1310 that can house and/or perform various functionalities, such as, but not limited to, memory management, display functions, and/or input/output (I/O) functions. For example, processor 1300 can include one or more integrated memory controller(s) (IMC) 1308. IMC 1308 can control and manage memory, such as, but not limited to, different memory types e.g., DDR ram, like DDR4 or others described elsewhere herein. System Agent 1310 can include a display controller (not shown) to support display(s). System Agent 1310 can also incorporate PCIe 1304 (e.g., up to 20 lanes of PCIe), e.g., that can connect with an external dedicated graphics hookup over DMI bus (e.g., Intel's DMI 3.0 bus) 1306. System Agent 1310 can include an Image Processing Unit (IPU) (not shown) which incorporates an image signal processor (ISP) on-die. Fabric 1302 can provide scalability for connecting to other nodes (e.g., processors, such as processor 1300), and can, for example, be used with Cornelis Networks, an element of Intel® Scalable System Framework, that delivers the performance for high performance computing (HPC) workloads and the ability to scale to tens of thousands of nodes.

Figure 13B:
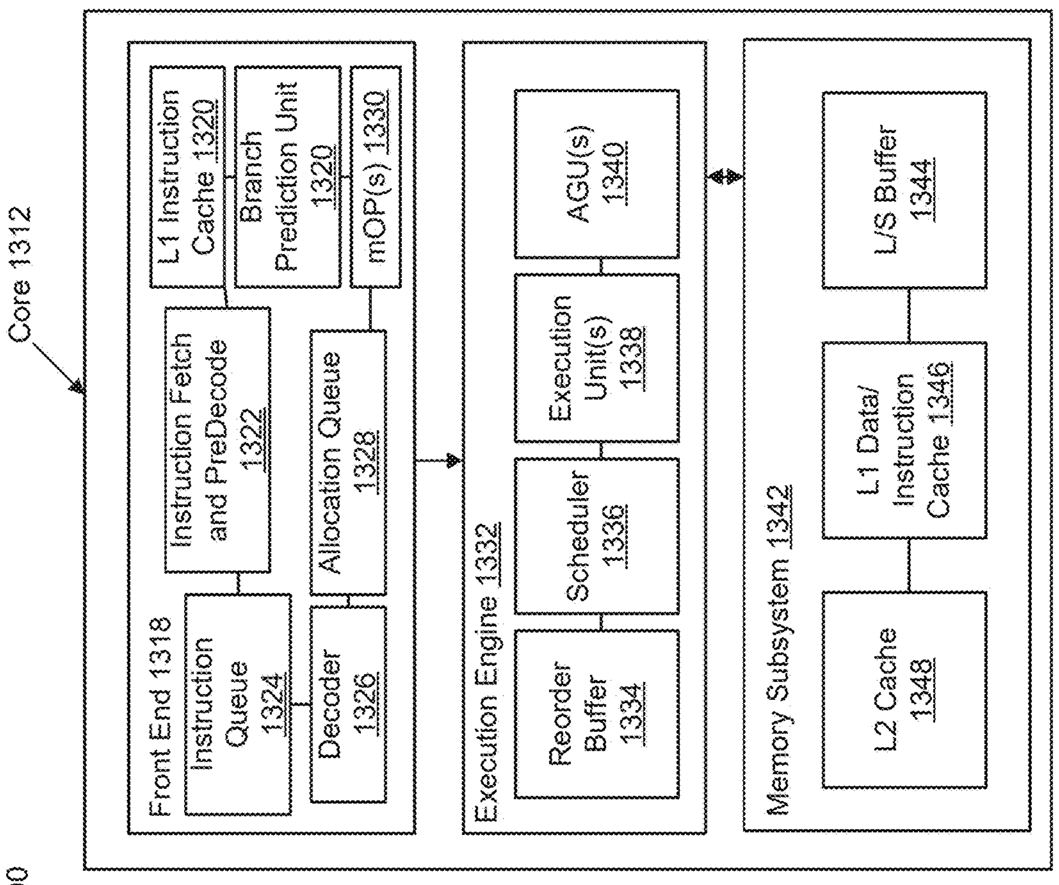
FIG. 13B illustrates a core of a central processing unit in FIG. 13A, in accordance with at least one embodiment.

FIG. 13B illustrates components within core 1312, in accordance with at least one embodiment. Core 1312 can include front-end 1318, back-end or execution engine 1332, and memory subsystem 1342. Front-end 1318 can provide execution engine 1332 with operations (e.g., operations described elsewhere herein) by decoding instructions stored in memory. For example, front-end 1318 can include a micro-operations (μOps) cache path and/or a legacy path, along with branch prediction unit 1320 that can determine paths instructions. A legacy path for instructions may include fetching variable-length (e.g., x86) instructions from L1 instruction cache, queuing the instructions in instruction queue 1324, and decoding instructions using decoder 1326 into μOps that can be provided to allocation queue 1328. In the alternative, a μOPs cache path may include a cache containing already decoded μOps (μOps 1330) that can be sent to allocation queue 1328. Allocation queue 1328 can perform as an interface between front-end 1318 and execution engine 1332, and can provide instructions to execution engine 1332. One or more of API(s) described herein can, for example, get compiled into instructions that can be stored, processed, and executed by front-end 1318, execution engine 1332, and stored in memory subsystem 1342.

Execution engine 1332 can receive micro-operations into reorder buffer 1334, which can register allocation, rename, and retire μOPs. From the reorder buffer, OPs can be sent to scheduler 1336 that can be connected one or more different execution units 1338. Execution units 1338 can perform, e.g., basic arithmetic logic unit (ALU) operations, multiplication, division, and/or more complex operations, such as, but not limited to, various vector operations. Scheduler 1336 may manage queuing μOPs for one or more of execution units 1338 depending, e.g., on operations needed to be performed.

Memory subsystem 1342 can process load and store requests as well as ordering operations. For example, μOPs may relate to memory access (e.g. load and store), and those can be sent on dedicated scheduler ports that can perform those memory operations. Store and load operations, for example, can be sent to load and store buffer(s) 1344. Memory subsystem 1342 can also include shared or separate L1 data and instruction cache 1346, as well as L2 cache 1348 that can be used and shared by L1 data and instruction cache 1346. As described above for FIG. 13A, each core 1312 can be connected to a slice of a third level of cache (e.g., LLC 1314) that can be shared by all core 1312.

In at least one embodiment, processor 1300 includes one or more processors that are at least a portion of, or include at least a portion of, one or more of processors described herein at least in conjunction with FIGS. 1-8 and FIGS. 10-22. In at least one embodiment, processor 1300 includes one or more processors that are at least a portion of, or includes at least a portion of, processor(s) 104 of FIG. 1. In at least one embodiment, processor 1300 includes one or more processors that comprise one or more circuits to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein. One or more circuits of processor 1300 can be configured by software to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein.

Figure 14:
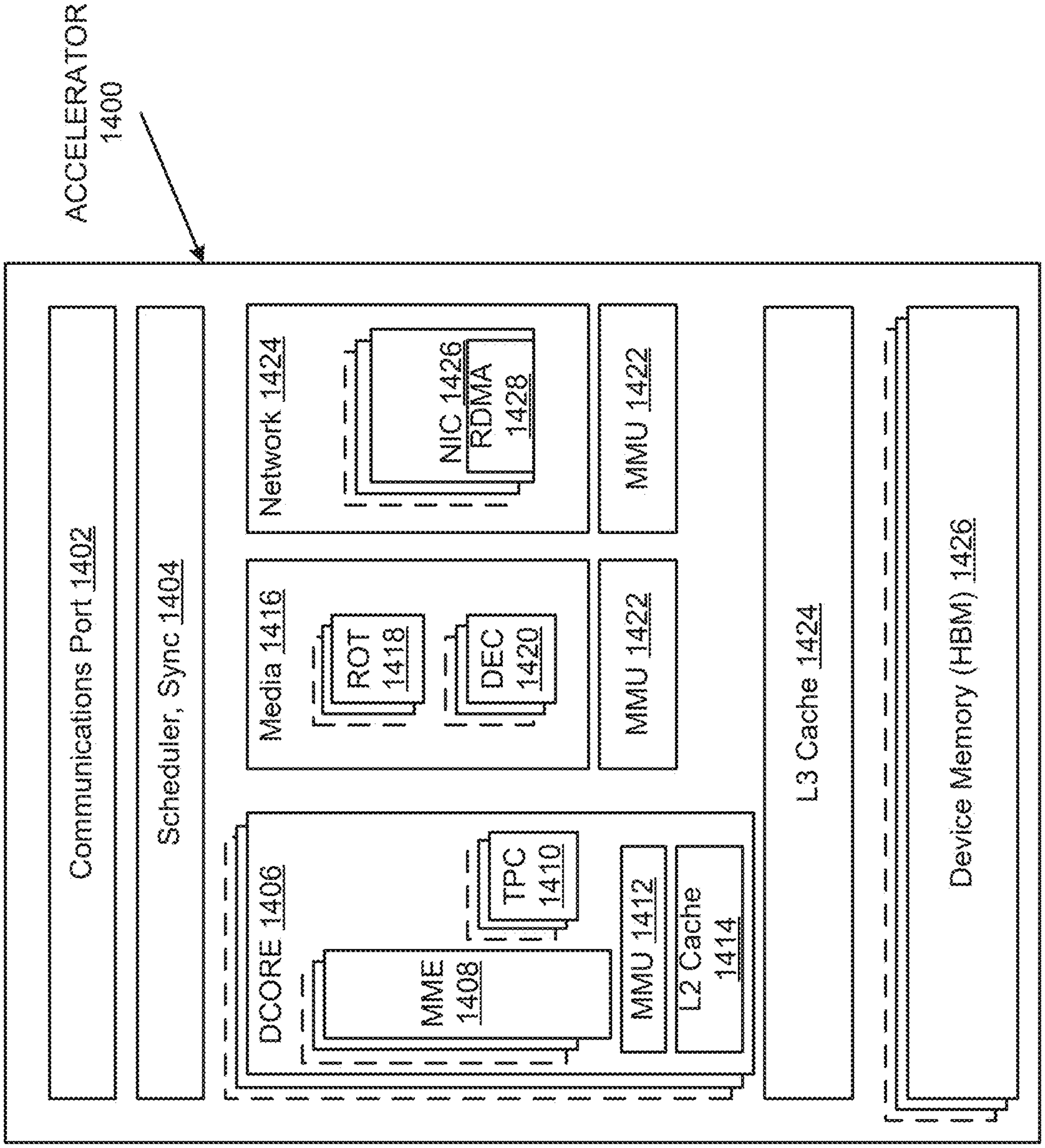
FIG. 14 illustrates another accelerator processor, in accordance with at least one embodiment.

FIG. 14 illustrates an AI accelerator 1400, in accordance with at least one embodiment. Processor 1400 can include a processor with AI accelerator architecture from Intel Corporation in Santa Clara, CA or another processor that shares at least some of the components described herein. AI accelerator 1400 may use instructions that, if executed by AI accelerator 1400, cause AI accelerator 1400 to perform some or all of processes and techniques described elsewhere herein. For example, with respect to AI accelerator 1400 and any of its components described above or elsewhere herein, one or more of APIs described herein can, for example, get compiled into instructions, which may be fetched by instruction fetch logic or equivalents, decoded by a processor decoder or equivalents, scheduled (e.g., in order or out of order) for execution by a scheduler or equivalents, executed by execution logic or equivalents, reordered, and then retired by retirement logic or equivalents. API(s) (and/or compiled instructions including API(s)) can be stored in any storage outside or inside of the processor (e.g., in cache and/or memory). A result of API(s) can then be stored in storage within or outside of the processor, including registers, DRAM, flash, SRAM, cache, or other memory. AI accelerator 1400 may include one or more compute dies that can include homogeneous or heterogeneous processors. Compute dies may include one or more central processing units (CPU), one or more graphics processing units (GPU), or combinations of both.

In at least one embodiment, compute dies may include compute engines to perform AI computations. In at least one embodiment, AI accelerator 1400 compute dies may be split into any number of (e.g., four) clusters that may be referred to as a DCORE (Deep Learning Core) 1406 and contain any number of Matrix Multiplication Engines (MMEs) 1408, Tensor Processor Cores (TPCs) 1410, and L2 Cache 1414, in any combination. MME(s) 1408 can perform operations that use Matrix Multiplication, like fully connected layers, convolutions and batched-General Matrix Multiplications (GEMMs). MMEs 1408 may be equipped with Multiply-Accumulate Units (MACs) (not shown) that, for example, may perform General Matrix Multiplication (GEMM) operations, such as, but not limited to, an A×B multiplication that involves generating tensor C[N×M] from two input tensors, A[N×K] and B[K×N]. MME(s) 1408 may be programmed with the array dimensions, locations, data types, and various execution operands. MME(s) 1408 can retrieve tensors A and B from memory, pulling them into its streaming buffers for the matrix multiplication to be performed in parallel by the MACs. MME(s) 1408 may push tensor C back to memory upon completion. TPC(s) 1410 may include any number of scalar units for performing scalar operations, any number of vector units for performing vector operations, any number of register files or local memory units (e.g., a vector local memory), and load and store components for instructions, which can be coupled to memory or cache (e.g., HBM, L3 cache and/or L2 cache) (all not shown). TPCs can support different types of parallel processing, e.g., Very Long Instruction Word (VLIW) Single-Instruction Multiple-Data (SIMD) that supports data types, such as, but not limited to, FP32, BF16, FP16 & FP8 (both E4M3 and E5M2), UINT32, INT32, UINT16, INT16, UINT8 and INT8 datatypes. Any number of compute dies may be connected through an interconnect. An interconnect among the compute dies can be over an interposer bridge that, e.g., is transparent to software.

Memory on AI Accelerator 1400 may include one or more levels of cache (e.g., L1, L2, L3, and/or last-level cache) and high-bandwidth memory (e.g., HBM2e or HBM3) in any combination. Memory and/or cache systems can be unified or separate. Compute dies of AI accelerator 1400 may include on-die memory that includes one or more levels (e.g., two-levels) of cache. On-die SRAM or other memory described elsewhere herein can be used as a uniformly accessible last-level cache (L3) or split to slices of L2 cache that may be accessible to groups of MMEs 1408 and TPCs 1410. Using the on-die memory as L2 or L3 cache can be fully configurable by software, which dynamically may decide per I/O tensor its optimal cache allocation. AI Accelerator 1400 may include one or more Memory Management Units (MMUs) 1422 for managing memory, such as allowing AI accelerator 1400 memory subsystem to operate in a virtual space when accessing VRAM.

AI accelerator 1400 may include a communications port (e.g., a PCIe Gen5 X16 port) 1402 for communicating with a host and Scheduling and Synchronization Unit 1404. AI accelerator 1400 may include Media Unit 1416 that may include any number or combinations of Media Decoder Engines (DECs) 1420 and Rotator Engines (ROT) 1418. AI accelerator 1400 may include a network unit 1424 that may include any number or combinations of network ports 1426 and the accompanied RDMA Engine(s) 1428, L2 Cache, and memory (e.g., HBM2e or HBM3) stacks. AI accelerator 1400 can incorporate a programmable Control Path entity (not shown) to manage the parallel and efficient execution of various engines. Control Path can include Submission Queues (SQs) that may be issued by the runtime system, Completion Queues (CQs) that may be used for job completion reporting, a Programmable Scheduling Mechanism that may be utilized for task scheduling, a Programmable Hardware Synchronization Mechanism or 'Sync Manager (SM)' that may be used for hardware synchronization, a Programmable Interrupt Service Mechanism or 'Interrupt Manager (INTR)' that can enable the passing of asynchronous events to drivers.

AI accelerator 1400 may include media decoding units that support Video Formats, such as, but not limited to, HEVC, Progressive H.264, SVC base layer, MVC, VP9, JPEG, Progressive JPEG. AI accelerator 1400 may support post processing of decoded media streams, such as, but not limited to, image down-scaling (resizing the image), vertical and horizontal scaling at different scaling ratios, Image up-scaling, Image cropping, bilinear scaling, and Lancos scaling. AI accelerator 1400 may implement two post processing channels per decoder unit, one with scalar (up and down) and one just to output the original image. AI accelerator 1400 may include a hardware rotator engine that performs the following transformations of an input image: 2D rotation, 3D rotation, Projection, distorting and undistorting images, resampling input data at user-defined coordinates, and rescaling.

RDMA 1428 over Converged Ethernet on AI accelerator 1400 may enable scaling from a single node (i.e., a single AI Accelerator 1400 to hundreds or thousands of nodes or AI Accelerators 1400). NW Subsystem 1424 can include an Intel® Gaudi® Communication Library (IGCL), a master conductor that orchestrates data movement, and a programable scheduling mechanism that can enable smooth activation of engines while maintaining task dependencies. A accelerator networking sub-system can include Gigabit Ethernet NIC ports 1426, a Layer2 MAC (not shown), and RDMA Engines 1428. AI Accelerator 1400 can include Aggregation Engines for performing summing activities. All engines in processor 1400 can operate in parallel, e.g., MME(s) 1408, TPC(s) 1410 and NIC(s) 1426 can all work at the same time. There can be dependency between operations running on different engines, e.g., the output of one engine can be used as the input of another engine, and/or MME, TPC and NIC can be scheduled to run in parallel. When one engine has completed its executing operation, another engine can be scheduled to start working on the next operation (immediately upon readiness of its inputs).

AI Accelerator 1400 can be operated and controlled using software layer 1428 that may include low-level components, such as, but not limited to, a graph compiler, an automatic kernel fuser and a library of precompiled kernels, as well as integration to AI ecosystems, such as, but not limited to, PyTorch, DeepSpeed, Hugging Face, vLLM, Ray and more, or as described elsewhere herein with respect to software and programming platforms. Software layer 1428 may include implementations of algorithms, such as, but not limited to, Paged Attention, Flash Attention and more. Software layer 1428 may generate optimized binary code that implements the given model topology, such as, but not limited to, performing operator fusion, data layout management, parallelization, pipelining and memory management, and graph-level optimizations.

In at least one embodiment, AI accelerator 1400 includes one or more processors that are at least a portion of, or include at least a portion of, one or more of processors described herein at least in conjunction with FIGS. 1-8 and FIGS. 10-22. In at least one embodiment, AI accelerator 1400 includes one or more processors that are at least a portion of, or includes at least a portion of, processor(s) 104 of FIG. 1. In at least one embodiment, AI accelerator 1400 includes one or more processors that comprise one or more circuits to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein. One or more circuits of AI accelerator 1400 can be configured by software to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein.

Figure 15:
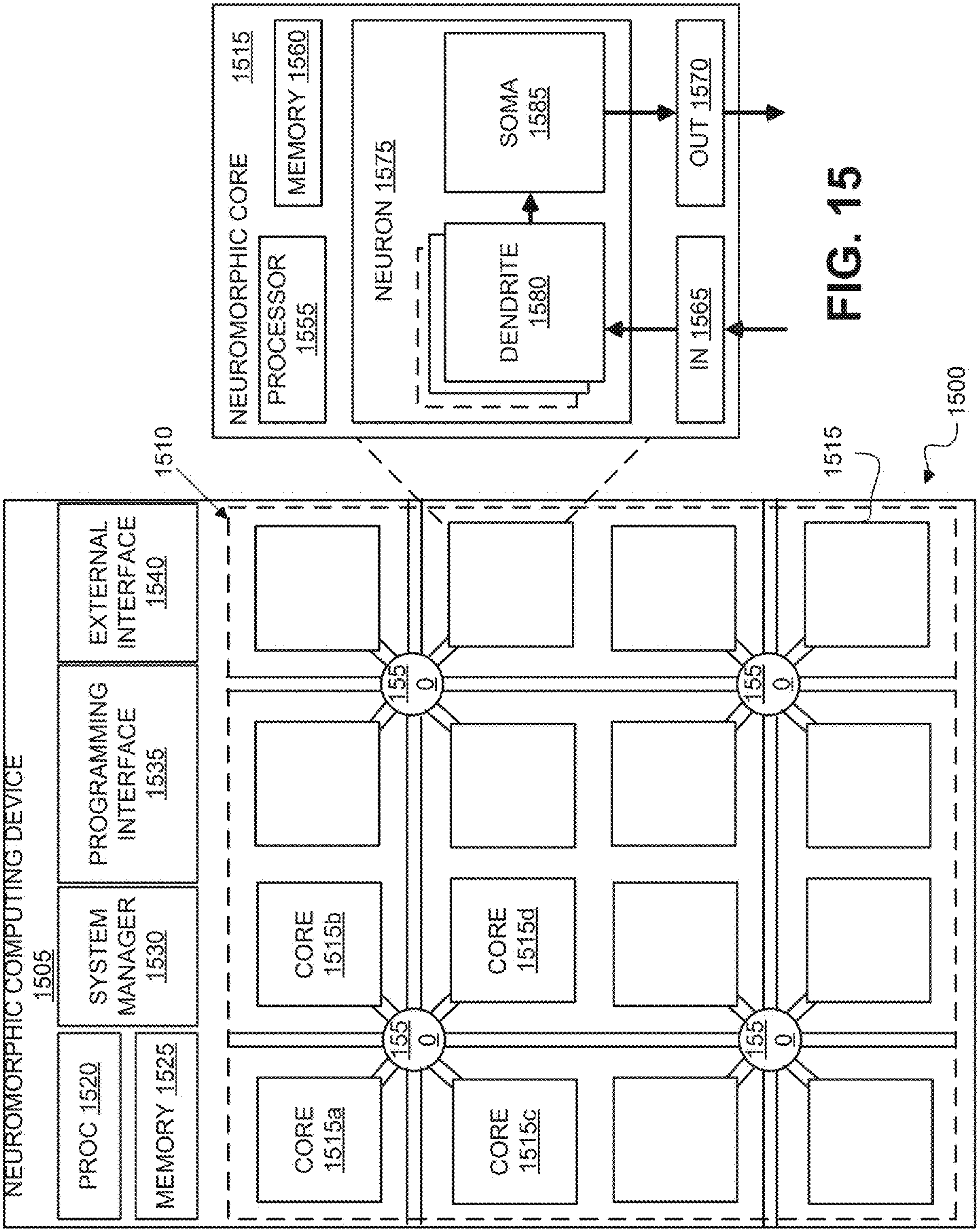
FIG. 15 illustrates a neuromorphic processor, in accordance with at least one embodiment.

A neuromorphic computing system is described that adopts a multicore architecture where each core houses the computing elements including neurons, synapses with on-chip learning capability, and local memory to store synaptic weights and routing tables. FIG. 15 is a simplified block diagram 1500 illustrating an example of at least a portion of such a neuromorphic computing device 1505, in accordance with at least one embodiment. Neuromorphic computing device 1505 can include a neuromorphic processor from Intel Corporation in Santa Clara, CA or another processor that shares at least some of the components described herein. As shown in this example, a device 1505 may be provided with a network 1510 of multiple neural network cores interconnected by an on-device network such that multiple different connections may be potentially defined between the cores. For instance, a network 1510 of spiking neural network cores may be provided in the device 1505 and may each communicate via short packetized spike messages sent from core to core over the network channels. Each core (e.g., 1515) may possess processing and memory resources and logic to implement some number of primitive nonlinear temporal computing elements, such as, but not limited to, multiple (e.g., 1000+) distinct artificial neurons (referred to herein as "neurons"). For instance, each core may be capable of concurrently implementing multiple neurons such that the collection of neuromorphic cores may implement many multiples of neurons using the device. With respect to neuromorphic computing device 1505 and any of its components described above or elsewhere herein, one or more of APIs or equivalents described herein can, for example, get compiled into instructions or equivalents, which may be fetched by instruction fetch logic or equivalents, decoded by a processor decoder or equivalents, scheduled (e.g., in order or out of order) for execution by a scheduler or equivalents, executed by execution logic or equivalents, reordered, and then retired by retirement logic or equivalents. API(s) (and/or compiled instructions including API(s)) can be stored in any storage outside or inside of the processor (e.g., in cache and/or memory). A result of API(s) can then be stored in storage within or outside of the processor, including registers, DRAM, flash, SRAM, cache, or other memory equivalents.

Continuing with the example of FIG. 15, a neuromorphic computing device 1505 may additionally include a processor 1520 and system memory 1525 to implement one or more components to manage and provide functionality of the device. For instance, a system manager 1530 may be provided to manage global attributes and operations of the device (e.g., attributes affecting the network of cores 1510, multiple cores in the network, interconnections of the device 1505 with other devices, manage access to global system memory 1525, among other potential examples). In one example, a system manager 1530 may manage the definition and provisioning of a specific routing tables to the various routers in the network 1510, orchestration of a network definition and attributes (e.g., weights, decay rates, etc.) to be applied in the network, core synchronization and time multiplexing management, routing of inputs to the appropriate cores, among other potential functions.

As another example, a neuromorphic computing device 1505 may additionally include a programming interface 1535 through which a user or system may specify a neural network definition to be applied (e.g., through a routing table and individual neuron properties) and implemented by the mesh 1510 of neuromorphic cores. A software-based programming tool may be provided with or separate from the neuromorphic computing device 1505 through which a user may provide a definition for a particular neural network to be implemented using the network 1510 of neuromorphic cores. The programming interface 1535 may take the input of the programmer to then generate corresponding routing tables and populate local memory of individual neuromorphic cores (e.g., 1515) with the specified parameters to implement a corresponding, customized network of artificial neurons implemented by the neuromorphic cores.

In some cases, a neuromorphic computing device 1505 may advantageously interface with and interoperate with other devices, including general purpose computing devices, to realize certain applications and use cases. Accordingly, external interface logic 1540 may be provided in some cases to communicate (e.g., over one or more defined communication protocols) with one or more other devices. An external interface 1540 may be utilized to accept input data from another device or external memory controller acting as the source of the input data. An external interface 1540 may be additionally or alternatively utilized to allow results or output of computations of a neural network implemented using the neuromorphic computing device 1505 to be provided to another device (e.g., another general purpose processor implementing a machine learning algorithm) to realize additional applications and enhancements, among other examples.

As shown in FIG. 15, a network 1510 of multiple neural network cores interconnected by an on-device network is shown illustrating a portion of a network fabric interconnecting multiple neuromorphic cores (e.g., 1515 *a-d*). For instance, a number of neuromorphic cores (e.g., 1515 *a-d*) may be provided in a mesh, with each core being interconnected by a network including a number of routers (e.g., 1550). In one implementation, each neuromorphic core (e.g., 1515 *a-d*) may be connected to a single one of the routers (e.g., 1550) and each of the routers may be connected to at least one other router (as shown at 1510 in FIG. 15). As an example, in one particular implementation, four neuromorphic cores (e.g., 1515 *a-d*) may be connected to a single router (e.g., 1550) and each of the routers may be connected to two or more other routers to form a manycore mesh, allowing each of the neuromorphic cores to interconnect with each other neuromorphic core in the device. Moreover, as each neuromorphic core may be configured to implement multiple distinct neurons, the router network of the device may similarly enable connections, or artificial synapses (or, simply, "synapses"), to be defined between any two of the potentially many (e.g., 30,000+) neurons defined using the network of neuromorphic cores provided in a neuromorphic computing device.

FIG. 15 shows a block diagram illustrating internal components of one example implementation of a neuromorphic core 1515. In one example, a single neuromorphic core may implement some number of neurons (e.g. 1024) that share architectural resources of the neuromorphic core in a time-multiplexed manner. In one example, each neuromorphic core 1515 may include a processor block 1555 capable of performing arithmetic functions and routing in connection with the realization of a digitally implemented artificial neuron, such as, but not limited to, explained herein. Each neuromorphic core 1515 may additionally provide local memory in which a routing table may be stored and accessed for a neural network, accumulated potential of each soma of each neuron implemented using the core may be tracked, parameters of each neuron implemented by the core may be recorded, among other data and usage. Components, or architectural resources, of a neuromorphic core 1515 may further include an input interface 1565 to accept input spike messages generated by other neurons on other neuromorphic cores and an output interface 1570 to send spike messages to other neuromorphic cores over the mesh network. In some instances, routing logic for the neuromorphic core 1515 may be at least partially implemented using the output interface 1570. Further, in some cases, a core (e.g., 1515) may implement multiple neurons within an example SNN and some of these neurons may be interconnected. In such instances, spike messages sent between the neurons hosted on the particular core may forego communication over the routing fabric of the neuromorphic computing device and may instead by managed locally at the particular neuromorphic core.

Each neuromorphic core may additionally include logic to implement, for each neuron 1575, an artificial dendrite 1580 and an artificial soma 1585 (referred to herein, simply, as "dendrite" and "soma" respectively). The dendrite 1580 may be a hardware-implemented process that receives spikes from the network. The soma 1585 may be a hardware-implemented process that receives each dendrite's accumulated neurotransmitter amounts for the current time and evolves each dendrite and soma's potential state to generate outgoing spike messages at the appropriate times. A dendrite 1580 may be defined for each connection receiving inputs from another source (e.g., another neuron). In one implementation, the dendrite process 1580 may receive and handle spike messages as they serially arrive in time-multiplexed fashion from the network. As spikes are received, the neuron's activation (tracked using the soma 1585 (and local memory 1560)) may increase. When the neuron's activation exceeds a threshold set for the neuron 1575, the neuron may generate a spike message that is propagated to a fixed set of fanout neurons via the output interface 1570. The network distributes the spike messages to all destination neurons, and in response those neurons, in turn, may update their activations in a transient, time-dependent manner, and so on, potentially causing the activation of some of these destination neurons to also surpass corresponding thresholds and trigger further spike messages, as in real biological neural networks.

As noted above, a neuromorphic computing device may reliably implement a spike-based model of neural computation. Such models may also be referred to as Spiking Neural Networks (SNNs). In addition to neuronal and synaptic state, SNNs also incorporate the concept of time. For instance, in an SNN, communication occurs over event-driven action potentials, or spikes, that convey no explicit information other than the spike time as well as an implicit source and destination neuron pair corresponding to the transmission of the spike. Computation occurs in each neuron as a result of the dynamic, nonlinear integration of weighted spike input. In some implementations, recurrence and dynamic feedback may be incorporated within an SNN computational model. Further, a variety of network connectivity models may be adopted to model various real world networks or relationships, including fully connected (all-to-all) networks, feed-forward trees, fully random projections, "small world" networks, among other examples. A homogeneous, two-dimensional network of neuromorphic cores, such as, but not limited to, shown in the example of FIG. 15 may advantageously supports all of these network models. As all cores of the device may be connected, all neurons defined in the cores may be therefore also fully connected through some number of router hops. The device may further include fully configurable routing tables to define a variety of different neural networks by allowing each core's neurons to distribute their spikes to any number of cores in the mesh to realize fully arbitrary connectivity graphs.

In an improved implementation of a system capable of supporting SNNs, such as, but not limited to, the very large scale integration (VLSI) hardware device illustrated in the example of FIG. 9, high speed and reliable circuits may be provided to implement SNNs to model the information processing algorithms as employed by the brain, but in a more programmable manner. For instance, while a biological brain can only implement a specific set of defined behaviors, as conditioned by years of development, a neuromorphic processor device may provide the capability to rapidly reprogram all neural parameters. Accordingly, a single neuromorphic processor may be utilized to realize a broader range of behaviors than those provided by a single slice of biological brain tissue. This distinction may be realized by adopting a neuromorphic processor with neuromorphic design realizations that differ markedly from those of the neural circuits found in nature.

As an example, a neuromorphic processor may utilize time-multiplexed computation in both the spike communication network and the neuron machinery of the device to implement SNNs. Accordingly, the same physical circuitry of the processor device may be shared among many neurons to realize higher neuron density. With time multiplexing, the network can connect N cores with O(N) total wiring length, whereas discrete point-to-point wiring would scale as O(N2), realizing a significant reduction in wiring resources to accommodate planar and non-plastic VLSI wiring technologies, among other examples. In the neuromorphic cores, time multiplexing may be implemented through dense memory allocation, for instance, using Static Random Access Memory (SRAM), with shared buses, address decoding logic, and other multiplexed logic elements. State of each neuron may be stored in the processor's memory, with data describing each neuron state including state of each neuron's collective synapses, all currents and voltages over its membrane, among other example information (such as, but not limited to, configuration and other information).

A neuromorphic processor may adopt a "digital" implementation that diverts from other processors adopting more "analog" or "isomorphic" neuromorphic approaches. For instance, a digital implementation may implement the integration of synaptic current using digital adder and multiplier circuits, as opposed to the analog isomorphic neuromorphic approaches that accumulate charge on capacitors in an electrically analogous manner to how neurons accumulate synaptic charge on their lipid membranes. The accumulated synaptic charge may be stored, for instance, for each neuron in local memory of the corresponding core. Further, at the architectural level of an example digital neuromorphic processor, reliable and deterministic operation may be realized by synchronizing time across the network of cores such that any two executions of the design, given the same initial conditions and configuration, will produce identical results. Asynchrony may be preserved at the circuit level to allow individual cores to operate as fast and freely as possible, while maintaining determinism at the system level. Accordingly, the notion of time as a temporal variable may be abstracted away in the neural computations, separating it from the "wall clock" time that the hardware utilized to perform the computation. Accordingly, in some implementation, a time synchronization mechanism may be provided that globally synchronizes the neuromorphic cores at discrete time intervals. The synchronization mechanism allows the system to complete a neural computation as fast as the circuitry allows, with a divergence between run time and the biological time that the neuromorphic system models.

In operation, the neuromorphic mesh device may begin in an idle state with all neuromorphic cores inactive. As each core asynchronously cycles through its neurons, it generates spike messages that the mesh interconnect routes to the appropriate destination cores containing all destination neurons. As the implementation of multiple neurons on a single neuromorphic core may be time-multiplexed, a time step may be defined in which all spikes involving the multiple neurons may be processed and considered using the shared resources of a corresponding core. As each core finishes servicing its neurons for a respective time step, the cores may, in some implementations, communicate (e.g., using a handshake) with neighboring cores using synchronization messages to flush the mesh of all spike messages in flight, allowing the cores to safely determine that all spikes have been serviced for the time step. At that point all cores may be considered synchronized, allowing them to advance their time step and return to the initial state and begin the next time step.

Given this context, and as introduced above, a device (e.g., 1505) implementing a mesh 1510 of interconnected neuromorphic cores may be provided, with the core implementing potentially multiple artificial neurons capable of being interconnected to implement an SNN. Each neuromorphic core (e.g., 1515) may provide two loosely coupled asynchronous processes: an input dendrite process (e.g., 1580) that receives spikes from the network and applies them to the appropriate destination dendrite compartments at the appropriate future times, and an output soma process (e.g., 1585) that receives each dendrite compartment's accumulated neurotransmitter amounts for the current time and evolves each dendrite and soma's membrane potential state, generating outgoing spike messages at the appropriate times (e.g., when a threshold potential of the soma has been reached). Note that, from a biological perspective, the dendrite and soma names used here only approximate the role of these functions and should not be interpreted too literally.

In at least one embodiment, neuromorphic computing device 1505 includes one or more processors that are at least a portion of, or include at least a portion of, one or more of processors described herein at least in conjunction with FIGS. 1-8 and FIGS. 10-22. In at least one embodiment, neuromorphic computing device 1505 includes one or more processors that are at least a portion of, or includes at least a portion of, processor(s) 104 of FIG. 1. In at least one embodiment, neuromorphic computing device 1505 includes one or more processors that comprise one or more circuits to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein. One or more circuits of neuromorphic computing device 1505 can be configured by software to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein.

Figure 16:
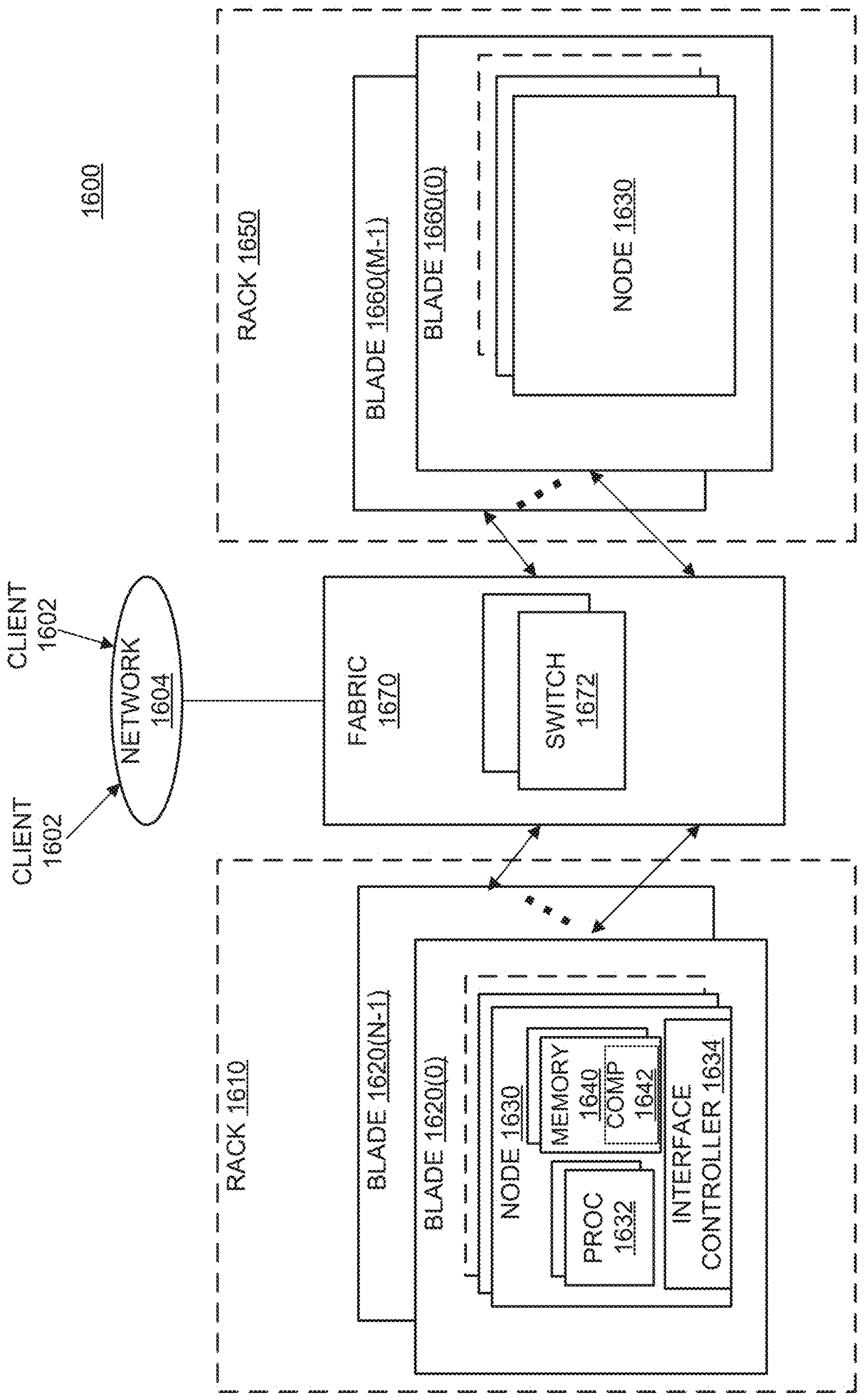
FIG. 16 illustrates a supercomputer, in accordance with at least one embodiment.

FIG. 16 is a block diagram of an embodiment of a multi-node network in which remote memory computation can be implemented, in accordance with any embodiment. System 1600 may represent a network of nodes described herein that can, e.g., be used to perform some or all of the operations described herein. System 1600 can represent a data center. System 1600 may represent a server farm. System 1600 may represent a data cloud or a processing cloud. System 1600 can represent a supercomputer. System 1600 may include tens, hundreds, or thousands of nodes. The nodes of system 1600 may include processors, such as, but not limited to, central processing units (CPUs), graphics processing units (GPUs), or any combination of processors described herein, such as, but not limited to, other processors in FIGS. 10-22. With respect to any of the processors in system 1600 and any of its components described above or elsewhere herein, one or more of APIs or equivalents described herein can, for example, get compiled into instructions or equivalents, which may be fetched by instruction fetch logic or equivalents, decoded by a processor decoder or equivalents, scheduled (e.g., in order or out of order) for execution by a scheduler or equivalents, executed by execution logic or equivalents, reordered, and then retired by retirement logic or equivalents. API(s) (and/or compiled instructions including API(s)) can be stored in any storage outside or inside of the processor (e.g., in cache and/or memory). A result of API(s) can then be stored in storage within or outside of the processor, including registers, DRAM, flash, SRAM, cache, or other memory equivalents. System 1600 may include over nine thousand nodes, with each node including two Intel Xeon Max processors, six Intel Max series GPUs and a unified memory architecture, such as, but not limited to, that used in the Intel Aurora Supercomputer from the Intel Corporation in Santa Clara, CA or another supercomputer that shares at least some of the components described herein.

One or more clients 1602 make requests over network 1604 to system 1600. Network 1604 represents one or more local networks, or wide area networks, or a combination. Clients 1602 can be human or machine clients, which generate requests for the execution of operations by system 1600. System 1600 executes applications or data computation tasks requested by clients 1602.

System 1600 can include one or more racks, which represent structural and interconnect resources to house and interconnect multiple computation nodes. Rack 1610 can include multiple nodes 1630. rack 1610 may host multiple blade components 1620. Hosting can refer to providing power, structural or mechanical support, and interconnection. Blades 1620 can refer to computing resources on printed circuit boards (PCBs), where a PCB houses the hardware components for one or more nodes 1630. Blades 1620 may or may not include a chassis or housing or other "box" other than that provided by rack 1610. Blades 1620 may include housing with exposed connector to connect into rack 1610. System 1600 may or may not include rack 1610, and each blade 1620 can include a chassis or housing that can stack or otherwise reside in close proximity to other blades and allow interconnection of nodes 1630. System 1600 may include 10,624 compute blades, which include 63,744 Intel Max Series GPUs and 21,248 Intel Xeon Max CPUs across 166 racks.

System 1600 can include fabric 1670, which represents one or more interconnectors for nodes 1630. Fabric 1670 can include multiple switches 1672 or routers or other hardware to route signals among nodes 1630. Additionally, fabric 1670 can couple system 1600 to network 1604 for access by clients 1602. In addition to routing equipment, fabric 1670 can be considered to include the cables or ports or other hardware equipment to couples nodes 1630 together. Fabric 1670 can have one or more associated protocols to manage the routing of signals through system 1600. The protocol or protocols is at least partly dependent on the hardware equipment used in system 1600.

As illustrated, rack 1610 can include N blades 1620. In addition to rack 1610, system 1600 can include rack 1650. As illustrated, rack 1650 may include M blades 1660. M is not necessarily the same as N; thus, it will be understood that various different hardware equipment components could be used, and coupled together into system 1600 over fabric 1670. Blades 1660 can be the same or similar to blades 1620. Nodes 1630 can be any type of node as described herein, and may not be necessarily all the same type of node. System 1600 is not limited to being homogenous, nor is it limited to not being homogenous.

A node in blade 1620(0) is illustrated in detail. However, other nodes in system 1600 can be the same or similar. At least some nodes 1630 may be computation nodes, with processor 1632 and memory 1640. A computation node refers to a node with processing resources (e.g., one or more processors) that executes an operating system and can receive and process one or more tasks. At least some nodes 1630 can include storage server nodes with a server as processing resources 1632 and memory 1640. A storage server refers to a node with more storage resources than a computation node, and rather than having processors for the execution of tasks, a storage server includes processing resources to manage access to the storage nodes within the storage server.

Node 1630 can include interface controller 1634, which can represent logic to control access by node 1630 to fabric 1670. Logic can include hardware resources to interconnect to the physical interconnection hardware. Logic can include software or firmware logic to manage the interconnection. Interface controller 1634 can be or includes a host fabric interface, which can be a fabric interface in accordance with any embodiment described herein.

Node 1630 may include memory subsystem 1640. Memory 1640 can include memory computation resources (comp) 1642, which represent one or more capabilities by memory 1640 to perform memory computations. System 1600 enables remote memory operations, such as, but not limited to, the operations described elsewhere herein. Thus, nodes 1630 can request memory computations by remote nodes, where data for the computation remains local to the executing node instead of being sent over fabric 1670 or instead of being sent from the memory to the fabric interface. In response to execution of the memory computation, the executing node can provide a result to the requesting node.

Processor 1632 can include one or more separate processors. Each separate processor can include a single processing unit, a multicore processing unit, or a combination. The processing unit can be a primary processor such as, but not limited to, a CPU (central processing unit), a peripheral processor such as, but not limited to, a GPU (graphics processing unit), or a combination. Memory 1640 can be or include memory devices and a memory controller.

Reference to memory devices can apply to different memory types. Memory devices generally refer to volatile memory technologies. Volatile memory is memory whose state (and therefore the data stored on it) is indeterminate if power is interrupted to the device. Nonvolatile memory refers to memory whose state is determinate even if power is interrupted to the device. Dynamic volatile memory requires refreshing the data stored in the device to maintain state. One example of dynamic volatile memory includes DRAM (dynamic random access memory), or some variant such as, but not limited to, synchronous DRAM (SDRAM). A memory subsystem as described herein may be compatible with a number of memory technologies, such as, but not limited to, DDR3 (dual data rate version 3, original release by JEDEC (Joint Electronic Device Engineering Council) on Jun. 27, 2007, currently on release 21), DDR4 (DDR version 4, initial specification published in September 2012 by JEDEC), DDR4E (DDR version 4, extended, currently in discussion by JEDEC), LPDDR3 (low power DDR version 3, JESD209-3B, August 2013 by JEDEC), LPDDR4 (LOW POWER DOUBLE DATA RATE (LPDDR) version 4, JESD209-4, originally published by JEDEC in August 2014), WIO2 (Wide I/O 2 (WideI02), JESD229-2, originally published by JEDEC in August 2014), HBM (HIGH BANDWIDTH MEMORY DRAM, JESD235, originally published by JEDEC in October 2013), DDR5 (DDR version 5, currently in discussion by JEDEC), LPDDR5 (currently in discussion by JEDEC), HBM2 (HBM version 2), currently in discussion by JEDEC), or others or combinations of memory technologies, and technologies based on derivatives or extensions of such specifications.

In addition to, or alternatively to, volatile memory, in one embodiment, reference to memory devices can refer to a nonvolatile memory device whose state is determinate even if power is interrupted to the device. In one embodiment, the nonvolatile memory device is a block addressable memory device, such as, but not limited to, NAND or NOR technologies. Thus, a memory device can also include a future generation nonvolatile devices, such as, but not limited to, a three dimensional crosspoint (3DXP) memory device, other byte addressable nonvolatile memory devices, or memory devices that use chalcogenide phase change material (e.g., chalcogenide glass). In one embodiment, the memory device can be or include multi-threshold level NAND flash memory, NOR flash memory, single or multi-level phase change memory (PCM) or phase change memory with a switch (PCMS), a resistive memory, nanowire memory, ferroelectric transistor random access memory (FeTRAM), magnetoresistive random access memory (MRAM) memory that incorporates memristor technology, or spin transfer torque (STT)-MRAM, or a combination of any of the above, or other memory.

In at least one embodiment, system 1600 includes one or more processors that are at least a portion of, or include at least a portion of, one or more of processors described herein at least in conjunction with FIGS. 1-8 and FIGS. 10-22. In at least one embodiment, system 1600 includes one or more processors that are at least a portion of, or includes at least a portion of, processor(s) 104 of FIG. 1. In at least one embodiment, system 1600 includes one or more processors that comprise one or more circuits to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein. One or more circuits of system 1600 can be configured by software to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein.

FIG. 17 illustrates accelerated processing unit 1700, in accordance with at least one embodiment. Accelerated processing unit 1700 can include a processor based on CDNA architecture from AMD Corporation in Santa Clara, CA or another processor that shares at least some of the components described herein. Accelerated processing unit 1700 can include one or more accelerator complex dies (XCDs) 1704 for performing operations described elsewhere herein, such as, but not limited to, graphics processing and/or parallel processing as well as computations with instruction-level parallelism, including support for a broad range of precisions (INT8, FP8, BF16, FP16, TF32, FP32, and FP64) and sparse matrix data (i.e. sparsity). XCDs may, in some instances, be referred to as Graphics Compute Dies (GCDs). Accelerated processing unit 1700 can include one or more complex compute dies (CCDs) 1706 for performing operations described elsewhere herein, such as, but not limited to, those operations performed by host processors. CCDs may, in some instances, be referred to as core complexes or CCXs, such as, but not limited to, CCXs used in AMD Ryzen processors. XCDs and CCDs can share any type of cache or memory (e.g., one or more memory units 1702), or have cache or memory allocated to each XCD or CCD or groups of XCDs or CCDs. For example, on-package AMD Infinity Fabric connects XCDs and CCD into shared AMD Infinity Cache 1708 and, in some embodiments, high-bandwidth memory (e.g., HMB3). Accelerated processing unit 1700 can include an AMD MI300*a* processor that includes three CPU chiplets (or CCDs) and six accelerator chiplets (XCDs) on top of four input-output dies (IODs) that may be layered on a piece of silicon that links them together (e.g., via AMD Infinity Fabric) to eight stacks of high-bandwidth DRAM that ring the superchip. An AMD MI300*x* processor substitutes the CCDs for two more XCDs, for an accelerator-only system.

Accelerated processing unit 1700 can include one or more input/output (I/O) interfaces. For example, XCDs 1704 and CCDs 1706 can be together on one or more input-output dies (IODs) 1710 that can include one or more I/O interfaces. IODs 1710 can include of any number and type of I/O interfaces (e.g., PCI, PCI-Extended ("PCI-X"), PCIe, gigabit Ethernet ("GBE"), USB, etc.). Various types of peripheral devices can be coupled to I/O interfaces 1770. I/O interfaces from IODs 1710 can also be used for connected one or more accelerated processing units 1700, e.g., in a server architecture.

Accelerated processing unit 1700 can include one or more memory units 1702 for storing instructions and other information used to perform operations described elsewhere herein. Memory units 1702 can include any volatile memory, such as, but not limited to, memory types described elsewhere herein and can include, e.g., high-bandwidth memory (e.g., HMB3) or high-bandwidth DRAM. Memory associated with accelerated processing unit 1700 (e.g., memory units 1702) can include system memory that can be used, for example, for commands, instructions and constants, and inputs and outputs. Memory units 1702 can also include device memory that can be used as storage and, for example, for commands, instructions and constants, and inputs and outputs, as return buffer(s) and for private data. Memory units 1702 can be linked to one or more IODs 1710. In at least on embodiment, L1 cache 1720 starts a memory hierarchy that includes shared L2 cache 1728, e.g., within the XCDs. AMD Infinity Cache™, which is a last level cache (LLC) located on an active I/O die (IOD). CCDs 1706 and XCDs 1704 may have separate or shared memory. AMD Infinity Architecture and AMD Infinity Fabric™ technology can enable coherent, high-throughput unification of GPU and CPU chiplet technologies (e.g., XCDs, CCDs, and/or CCXs) with memory (e.g., stacked HBM3 memory) in single devices and across multi-device platforms.

As shown in FIG. 17, an XCD 1704 can include a shared set of global resources 1730, which can include hardware scheduler 1732 and Asynchronous Compute Engines (ACE) 1724 that send tasks (e.g., compute shader workgroups) to Compute Units (CUs or cores) 1734. ACEs 1724 (e.g., four) can be each associated with CUs 1734 (e.g., 40 CUs), and some of the CUs can be disabled for yield management. CUs 1734 can have dedicated cache or share cache (e.g., L2 cache) 1728 that may be used to coalesce all the memory traffic for the die. CUs 1734 can include threaded and parallel processor cores including instruction fetching and scheduling with Scheduler(S) 1712, matrix core unit (MCU) 1716 and shader core (SC) 1718 (e.g., execution units for scalar, vector and matrix data types), as well as load/store pipelines with an L1 cache 1720 and Local Data Share (LDS) 1714. Local data share can include, for example, a scratch RAM with built-in arithmetic capabilities that allow data to be shared between threads in a workgroup. An instruction cache 1740 (e.g., for storing and providing the instructions for performing operations described elsewhere herein) and a constant cache 1738 can be connected to one or more CUs and can be shared between two CUs. Matrix cores 1716 can process a variety of data types, such as, but not limited to, INT8, FP8, FP16, BF16 and TF32 data types. Accelerated processing unit 1700 can include compute units 1734 that may be arranged in an array format, e.g., as a data-parallel-processor (DPP) array. Ultra-threaded dispatch processor 1742 can communicate with compute units 1734, and command processor 1744 can read commands that the host has written to memory-mapped registers in a system-memory address space (not shown). Command processor 1744 can send hardware-generated interrupts to a host processor (e.g., a CCD) when the command is completed. Memory controller 1736 can also have direct access to all device memory and the host-specified areas of system memory. To satisfy read and write requests, memory controller 1736 can perform functions of a direct-memory access (DMA) controller, including computing memory-address offsets based on the format of the requested data in memory. For example, one or more of APIs described herein can, for example, get compiled into instructions that can be stored in instruction cache 1740 and then fetched by instruction fetch logic in processor 1740, decoded by a processor decoder or equivalents, scheduled (e.g., in order or out of order) for execution by a scheduler or equivalents, executed by execution logic or equivalents, reordered, and then retired by the retirement logic or equivalents. API(s) (and/or compiled instructions including API(s)) can be stored in any storage outside or inside of processor 1700 (e.g., in cache and/or memory). A result of API(s) can then be stored in storage within or outside of the processor, including registers, DRAM, flash, SRAM, cache, or other memory equivalents.

An application can include a program running on a host processor (e.g., a CCD) and programs, called kernels, running on one or more XCDs. Programs can be controlled by host commands that set internal base-address and other configuration registers, specify a data domain on which the accelerated processing unit 1700 can operate, invalidate and flush caches on accelerated processing unit 1700, and cause accelerated processing unit 1700 to begin execution of a program. Kernels can be referred to as programs executed by accelerated processing unit 1700. A kernel can be executed independently on every work item, or as groups of work-items that can be referred to as a wavefront, which can execute the kernel on all work-items in the group (e.g., 64) in one pass. Compute units 1734 can include a scalar arithmetic logic unit (ALU), which can operates on one value per wavefront (common to all work items), a vector ALU, which can operate on unique values per work-item, a local data share 1714, which can allow work-items within a workgroup to communicate and share data, a scalar memory (not shown), which can transfer data between scalar general-purpose registers (SGPRs) and memory through a cache, and vector memory, which can transfer data between vector general-purpose registers (VGPRs) and memory, including sampling texture maps. Kernel control flow can be handled using scalar ALU instructions, which can includes if/else, branches and looping. Scalar ALU (SALU) and memory instructions can work on an entire wavefront and operate on one or more SGPRs. Vector memory and ALU instructions can operate on all work-items in the wavefront at one time.

In at least one embodiment, accelerated processing unit 1700 includes one or more processors that are at least a portion of, or include at least a portion of, one or more of processors described herein at least in conjunction with FIGS. 1-8 and FIGS. 10-22. In at least one embodiment, accelerated processing unit 1700 includes one or more processors that are at least a portion of, or includes at least a portion of, processor(s) 104 of FIG. 1. In at least one embodiment, accelerated processing unit 1700 includes one or more processors that comprise one or more circuits to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein. One or more circuits of accelerated processing unit 1700 can be configured by software to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein.

FIG. 18 illustrates a processor 1800, such as, but not limited to, a processor based on a Zen architecture (such as, e.g., Zen 1, 2, 3, 4, 5 or other) from AMD Corporation in Santa Clara, CA or another processor that shares at least some of the components described herein. Processor 1800 includes one or more CPU dies 1802(1)-1802(N), where N is any integer greater than 1. CPU die 1802 can include any number of processor cores 1816 (e.g., to perform any of the operations described elsewhere herein) and any number of cache memories (e.g., to store instructions and other information to perform any of the operations described elsewhere herein), in any combination. For example, L2 Cache units 1818 can be coupled to processor core(s) 1816, which can share and/or couple individually to L2 Cache units 1818. Processor cores 1816 can couple to L3 cache 1822 individually and/or share L3 Cache, which can be a lowest level cache (LLC) 1822 for access to data and other information used by the processor cores 1816. One or more processor cores 1816 and one or more L2 Cache units 1818 can be included in a core complex (CCX) 1820 that can include (e.g., a 32 MB) shared cache (e.g., L3 cache 1822). Core complex 1820 can be fabricated onto a die (CCD or CPU die) 1802. For example, up to 12 core complexes 1820 can be configured into a processor along with 8 CPU dies 1802 to provide up to 96 processor cores 1816 for the processor. A 'Zen 4c' core complex 1820, for example, can include up to eight cores 1816 and a shared 16 MB L3 cache 1822. Two of these core complexes 1820 can be combined onto a single CPU die 1802 for 16 cores per die and a total of 32 MB of L3 cache 1822 per die. Up to eight of CPU dies 1802 may be combined with an I/O unit 1804 to provide CPUs with up to 128 processor cores 1816. Up to four 'Zen 4c' dies described above can be combined to provide CPUs with up to 64 processor cores 1816.

Processor 1800 can include a variety of configurations for input/output operations that are described further herein. I/O unit 1804 can include one or more memory controllers 1806 that can manage memory usage (e.g., DDR5 memory) for processor 1800. I/O unit 1804 may include one or more SATA disk controllers for managing storage 1812 and one or more Compute Express Link (CXL™) 1.1+ memory controllers 1814 that can provide CPU-to-device and CPU-to-memory connections and can be flexibly assigned to specific functions at server design time. I/O unit 1804 may include PCIe controller 1808 for connecting peripherals and other components connected to processor 1800. I/O unit 1804 may include USB ports 1810 for connecting to other components separate from processor 1800. CPU dies 1802 can support any number of connections, e.g., one or two connections, to I/O unit 1804. As shown, I/O unit 1804 includes the components described further herein, and I/O unit 1804 can be a I/O die that houses several different components. Memory controller 1806, PCIe controller 1808, USB ports 1810, SATA controller 1812, and/or CXL controller 1814 can be integrated anywhere within processor 1800 either separately or in any groups or combinations thereof.

Processor 1800 can include Infinity Fabric 1824 interconnects (which can be similar to or based on PCIe architectures) that can provide connections among CPUs (e.g., CPU dies 1802(1)-1802(N)), graphics processor(s) 1826, inference engine(s) 1832, and other components in the multi-chip architecture, such as secure processor(s) 1828 and I/O unit 1804. One or more AMD Infinity Fabric™ interconnects 1810 can connect to CPU dies 1802(1)-1802(N) and serve as a connection that is used between CPUs. One or more Infinity Fabric connections 1810 can connect each CPU die 1802 to the I/O unit 1810.

In at least one embodiment, processor 1800 can include central processing units (CPUs) and other associated hardware and software described above and further herein. Processor 1800 can also include graphics processor(s) 1826. Graphics processor 1826 can be used for image generation and processing, as well as other computations and operations described further herein. Graphics processor 1826 can be based on RDNA 3 or 3.5 architecture from AMD in Santa Clara, CA. Graphics processor 1826 can include graphics compute dies (GCDs) and memory cache dies (MCDs). GCDs can include any number of compute units (CUs) for graphics or other processing, such as operations performed by arithmetic logic units (ALUs) that are described further herein. Graphics processor 1826 can include L2 cache that can be used by compute units. MCDs (not shown) can include any number of memory units and can include cache, such as L3 cache, as well as memory interfaces for coupling to memory, such as memory 1842(1)-(N), where N is an integer. Components within graphics processor 1826 can be connected using various approaches, such as using Infinity Fabric 1824 interconnects outside or within graphics processor 1826.

Inference engine 1832 can provide neural processing capabilities for processor 1800 for computational processes that are used for neural networks, deep learning, and other artificial intelligence-related operations described further herein. Processor 1800 can include secure processor(s) 1828 for managing security of the processor, display controller 1830 for controlling displays, a system management unit 1834 for managing and operating some or all of the components on processor 1800, multimedia engines 1836 for audio and video operations, fusion controller hub 1838 for managing USB, SATA and PCIe connections to the processor, and sensor fusion hub 1840 for managing sensors, such as accelerometers. Processor 1800 can also include memory 1842(1)-(N), where N is any integer. Memory can include different memory types, such as LPDDR5 and/or DDR5, or others described elsewhere herein.

For performing operations described further herein, processor 1800 can include an execution pipeline including a front-end that can include a cache (e.g., L1 cache) that stores instructions (not shown). Flow of instructions can be modified by a branch predictor. Instructions can be decoded by a decoder, dispatched to a back-end for execution, and renamed. Instruction fetch and decode pipes, for example, can be dispatched to integer or floating point execution operations that can be scheduled by a scheduler and transferred to vector and/or general-purpose registers. Floating point multiplier and/or add operations can be processed, and arithmetic logic units (ALUs) can also be used to perform computations, such as arithmetic and logic operations. Outputs from the computation units can be coupled to a load/store queue, which can be connected to cache, such as L1 cache and/or L2 cache.

With respect to processor 1800 and any of its components described above or elsewhere herein, one or more of APIs or equivalents described herein can, for example, get compiled into instructions or equivalents (e.g., AVX-512 instructions based on an SIMD model), which may be fetched by instruction fetch logic or equivalents, decoded by a processor decoder or equivalents, scheduled (e.g., in order or out of order) for execution by a scheduler or equivalents, executed by execution logic or equivalents, reordered, and then retired by retirement logic or equivalents. API(s) (and/or compiled instructions including API(s)) can be stored in any storage outside or inside of the processor (e.g., in cache and/or memory). A result of API(s) can then be stored in storage within or outside of the processor, including registers, DRAM, flash, SRAM, cache, or other memory equivalents.

In at least one embodiment, processor 1800 includes one or more processors that are at least a portion of, or include at least a portion of, one or more of processors described herein at least in conjunction with FIGS. 1-8 and FIGS. 10-22. In at least one embodiment, processor 1800 includes one or more processors that are at least a portion of, or includes at least a portion of, processor(s) 104 of FIG. 1. In at least one embodiment, processor 1800 includes one or more processors that comprise one or more circuits to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein. One or more circuits of processor 1800 can be configured by software to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein.

FIG. 19 illustrates an example of a processing core 1900 that may implement Arm architecture (e.g., v9.0-A) or another processor that shares at least some of the components described herein. Neoverse™ V2 core 1900 can be implemented inside a DynamIQ Shared Unit (DSU) cluster via DSU-110 interconnect 1954 for connected one or more cores, e.g., for parallel processing. Neoverse™ V2 core may be implemented as a single core in a DSU cluster that is configured for Direct connect, with or without L3 cache, snoop filter, or Snoop Control Unit (SCU) logic (not shown). Neoverse™ V2 core can include a CPU bridge 1952 that connects core 1900 to DSU-110 interconnect, which can also connect core 1900 to an external memory system and the rest of a system-on-a-chip. The L1 instruction memory system 1902 can fetch instructions from an instruction cache 1904 and deliver the instructions (e.g., one or more APIs described herein that may be compiled into instructions) to an instruction decode unit 1910, e.g., to perform some or all of the operations described above or elsewhere herein. L1 instruction memory system 1902 may include L1 instruction cache 1904, e.g., with 64-byte cache lines, L1 instruction Translation Lookaside Buffer (TLB) 1906, e.g., with native support for 4 KB, 16 KB, 64 KB, and 2 MB page sizes, Macro-Operation Cache (MOP) 1908 (e.g., 1536-entry, 4-way skewed associative L0 MOP cache), which can contain decoded and optimized instructions for higher performance. Instruction decode unit 1910 can decode AArch64 instructions into internal format. Register rename unit 1912 can perform register renaming to facilitate out-of-order execution and dispatches decoded instructions to various issue queues. Instruction issue unit 1914 can control when decoded instructions may be dispatched to the execution pipelines, and it can include issue queues for storing instructions pending dispatch to execution pipelines. Integer execution pipeline 1916 can be included in an execution pipeline and include integer execute unit 1918 that can perform arithmetic and logical data processing operations. Vector execute unit 1920 can be included in an execution pipeline and can perform Advanced SIMD and floating-point operations (FPU) 1922, execute Scalable Vector Extension (SVE) and Scalable Vector Extension 2 (SVE2) instructions 1924, and can optionally execute the cryptographic instructions (Crypto) 1926. Advanced SIMD can include media and signal processing architecture that adds instructions primarily for audio, video, 3D graphics, image, and speech processing. A floating-point architecture provides support for single-precision and double-precision floating-point operations. L1 data memory system 1930 can execute load and store instructions, as well as service memory coherency requests. L1 data memory system 1930 can include an L1 data cache 1932 and a fully associative L1 data TLB 1934 with native support for 4 KB, 16 KB and 64 KB page sizes and 2 MB and 512 MB block sizes. Memory Management Unit (MMU) 1928 can provide fine-grained memory system control through a set of virtual-to-physical address mappings and memory attributes that can be held in translation tables, which can be saved into TLB 1934 when an address is translated. L2 memory system 1936 can include L2 cache 1938, and it can be connected to DSU-110 1954 through an asynchronous CPU bridge 1952. Neoverse™ V2 core 1900 can support a range of debug, test, and trace options including a trace unit 1942 and a trace buffer 1940, and an Embedded Logic Analyzer (ELA) 1948. Neoverse™ V2 core 1900 can implement the Statistical Profiling Extension (SPE) 1944 to provide a statistical view of the performance characteristics of executed instructions that software writers can use to optimize their code for better performance. Performance Monitoring Unit (PMU) 1946 can provide performance monitors that can be configured to gather statistics on the operation of each core and the memory system. The information can be used for debug and code profiling. Generic Interrupt Controller (GIC) CPU interface 1950, when integrated with an external distributor component, can be a resource for supporting and managing interrupts in a cluster system. In a cluster, there can be one CPU bridge 1952 between each Neoverse™ V2 core 1900 and DSU-110 1954. CPU bridge 1952 can control buffering and synchronization between core 1900 and the DSU-110 1954. CPU bridge 1952 can be asynchronous to allow different frequency, power, and area implementation points for each core 1900. CPU bridge 1952 can run synchronously without affecting the other interfaces such as, but not limited to, debug and trace which can be asynchronous.

In at least one embodiment, core 1900 is at least a portion of, or includes at least a portion of, one or more of processors described herein at least in conjunction with FIGS. 1-8 and FIGS. 10-22. In at least one embodiment, core 1900 is at least a portion of, or includes at least a portion of, processor(s) 104 of FIG. 1. In at least one embodiment, core 1900 includes one or more processors that comprise one or more circuits to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein. One or more circuits of core 1900 can be configured by software to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein.

FIG. 20 illustrates one or more chips including one or more tensor processing units (TPUs) 2000, in accordance with at least one embodiment. TPUs 2000 in FIG. 20 can include application specific integrated circuits (ASICs), e.g., to perform some or all of the operations described above or elsewhere herein, such as, but not limited to, accelerate machine learning workloads performing matrix operations. TPUs 2000 may be ASICs from Alphabet Corporation in Mountain View, CA. Cloud TPU includes a cloud service that makes TPUs available as a scalable resource for processing tasks, such as, but not limited to, machine learning workloads that can run on frameworks such as, but not limited to, TensorFlow, Pytorch, and JAX.

Chip 2000 can include any number of TPUs that can include tensor cores 2006. Tensor core 2006 can include one or more core sequencer 2008, vector processing unit (VPU) 2010, matrix multiply unit (MXU) 2012(A)-2014(N), where N is any integer greater than 1, and a transpose permute unit 2016. Core Sequencer 2008 can fetch (e.g., VLIW (Very Long Instruction Word)) instructions from core's 2006 Instruction Memory (Imem), execute scalar operations using a scalar data memory (Smem) and scalar registers (Sregs) (not shown), and forward vector instructions to Vector Processing Unit (VPU) (2010. The instructions can, for example, launch eight operations: two scalar, two vector ALU, vector load and store, and a pair of slots that queue data to and from the matrix multiply and transpose units. VPU 2010 can perform vector operations using a large on-chip vector memory (Vmem), and vector registers (Vregs). VPU 2010 can stream data to and from the MXU through decoupling FIFOs. VPU 2010 can collect and distribute data to Vmem via data-level parallelism (2D matrix and vector functional units) and instruction-level parallelism (8 operations per instruction). A large two-dimensional matrix multiply unit (MXU) 2012(A)-2012(N) can, e.g., use a systolic array to reduce area and energy plus large, software-controlled on-chip memories instead of caches. Transpose Reduction Permute Unit 2016 can do (e.g., 128×128) matrix transposes, reductions, and permutations of the VPU 2010 lanes. High Bandwidth Memory 2004 can be used for applications on chip. One or more chips 2000 can be connected together for computing. For example, one or more chips 2000 can be connected as a torus, e.g., a 2D torus. Chip 2000 can also include any number (e.g., four) Inter-Core Interconnect (ICI) links 2018 that can enable direct connections between chips to form a supercomputer.

With respect to any of the processors in chip 2000 and any of its components described above or elsewhere herein, one or more of APIs or equivalents described herein can, for example, get compiled into instructions or equivalents, which may be fetched by instruction fetch logic or equivalents, decoded by a processor decoder or equivalents, scheduled (e.g., in order or out of order) for execution by a scheduler or equivalents, executed by execution logic or equivalents, reordered, and then retired by retirement logic or equivalents. API(s) (and/or compiled instructions including API(s)) can be stored in any storage outside or inside of the processor (e.g., in cache and/or memory). A result of API(s) can then be stored in storage within or outside of the processor, including registers, DRAM, flash, SRAM, cache, or other memory equivalents.

In at least one embodiment, chip 2000 is at least a portion of, or includes at least a portion of, one or more of processors described herein at least in conjunction with FIGS. 1-8 and FIGS. 10-22. In at least one embodiment, chip 2000 includes one or more processors that are at least a portion of, or includes at least a portion of, processor(s) 104 of FIG. 1. In at least one embodiment, chip 2000 includes one or more processors that comprise one or more circuits to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein. In at least one embodiment, one or more circuits of chip 2000 can be configured by software to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein.

FIG. 21 illustrates a vector processor, in accordance with at least one embodiment. Vector processor 2100 may support a RISC-V standard. Vector processor 2100 can include one more cores 2110 (e.g., scalar units) with one or more Vector Processing Units (VPUs) 2142 (e.g., vector units) that can, e.g., perform some or all of the operations described above or elsewhere herein. Core 2110 may include Andes Custom Extension (ACE) 2116 that can be used for communication of customized instructions for the processor 2100. Core 2110 may include 1-cycle multiplier and 1-cycle instruction/data local memory (ILM/DLM) for increased parallelism by allowing simultaneous instruction fetches and data accesses. Memory management unit (MMU) 2124 may manage system memory and cache, and provide for branch execution, issuance of instruction pairs, L1 instruction/data caches and local memory storage. Core 2110 can include Physical memory protection and programmable physical memory attribute unit (PMP/PPMA) 2122. Core 2110 can include a digital signal processor (DSP) 2128, and a floating-point unit (FPU) 2126 as well as load-store unit (LSU) 2132 to interface with the memory hierarchy (D$ 2134 and I$ 2130). Core 2110 can include branch prediction unit 2118 and multiplier unit 2120.

Vector processing unit (VPU) 2142 can include one or more vector functional units (FUs) 2146(A)-2146(N) that can be chained together for parallel processing, independent memory paths for RISC-V vector (RVV) load/store via ACE-RVV 2148 and Andes Streaming port (ASP) 2144 load/store, and a vector load/store unit (VLSU) 2150.

Vector processor 2100 can include bus interfaces, such as, but not limited to, L2 cache memory port 2156 for cacheable access, a MMIO port 2154 for non-cacheable access, an input-output coherence Port (IOCP) 2158 for cacheless bus master, local memory access ports for ILM/DLM 2112 and high-bandwidth vector memory (HVM) 2136 access, a shared peripheral port (SPP) 2152 for external peripherals. Other memory ports include LM slave port AXI 2102 and HVM subordinate port AXI 2104.

With respect to any of the processors in processor 2100 and any of its components described above or elsewhere herein, one or more of APIs or equivalents described herein can, for example, get compiled into instructions or equivalents, which may be fetched by instruction fetch logic or equivalents, decoded by a processor decoder or equivalents, scheduled (e.g., in order or out of order) for execution by a scheduler or equivalents, executed by execution logic or equivalents, reordered, and then retired by retirement logic or equivalents. API(s) (and/or compiled instructions including API(s)) can be stored in any storage outside or inside of the processor (e.g., in cache and/or memory). A result of API(s) can then be stored in storage within or outside of the processor, including registers, DRAM, flash, SRAM, cache, or other memory equivalents.

In at least one embodiment, vector processor 2100 includes one or more processors that are at least a portion of, or include at least a portion of, one or more of processors described herein at least in conjunction with FIGS. 1-8 and FIGS. 10-22. In at least one embodiment, vector processor 2100 includes one or more processors that are at least a portion of, or includes at least a portion of, processor(s) 104 of FIG. 1. In at least one embodiment, vector processor 2100 includes one or more processors that comprise one or more circuits to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein. In at least one embodiment, one or more circuits of vector processor 2100 can be configured by software to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein.

FIG. 22A illustrates a diagram of an example many-core tiled processor microarchitecture. Many-core tiled processor in FIG. 22 can include a language processing processor. As illustrated in FIG. 22A, each "tile" of the processor architecture is a processing element tied together using a network-on-chip (NoC) that can be used, e.g., to perform some or all of the operations described above or elsewhere herein. For example, each tile may have an instruction dispatch 2204 and an integer (INT) 2206 and floating-point (FP) unit 2208 as well as load-store unit (LSU) 2212 to interface with the memory hierarchy (data cache (D$) 2210 and instruction cache (I$) 2214) and a network (NET) 2216 interface for communication with other tiles of the architecture. Some tiles in processor 2200 may include memory controller 2202 for managing and controlling memory, as described further herein. Processor 2200 can have a functional slice architecture. Processor 2200 may be located on an application specific integrated circuit (ASIC), and FIG. 22A may represent the layout of the ASIC. Processor 2200 can include a co-processor that is designed to execute instructions for a predictive model. The predictive model is any model that is configured to make a prediction from input data. The predictive model can use a classifier to make a classification prediction. The predictive model may be a machine learning model such as, but not limited to, a tensor flow model, and the processor 2200 is a tensor streaming processor.

Processor 2200 can employ different microarchitectures, which disaggregates the functional units shown in each tile in FIG. 22B. Instead, the functional tiles of the processor 2200 may be aggregated into a plurality of functional process units (hereafter referred to as "slices") 2204, each corresponding to a particular function type (e.g., FP/INT

2218, NET 2220, MEM 2222). For example, as illustrated in FIG. 22B, each slice may correspond to a column of functional tiles extending in a north-south direction. In addition, the processor also includes communication lanes to carry data between the tiles of different slices, each running horizontally in an east-west direction. Each communication lane may be connected to each of slices 2204 of the processor 2200.

Slices 2204 of the processor 2200 may each correspond to a different function, and may include arithmetic logic slices (e.g., FP/INT 2218), lane switching slices (e.g., NET 2220), and memory slices (e.g., MEM 2222). The arithmetic logic units execute one or more arithmetic and/or logic operations on the data received via the communication lanes to generate output data. Examples of arithmetic logic units may be matrix multiplication units and vector multiplication units. The memory slices include memory cells that store data. The memory slices can provide the data to other slices through the communication lanes. The memory slices can also receive data from other slices through the communication lanes. The lane switching slices can configurably route data from one communication lane to any other communication lane. For example, data from a first lane can be provided to a second lane through a lane switching slice. In some embodiments, the lane switching slice can be implemented as a crossbar switch. Each slice 2204 also includes its own instruction queue (not shown) that stores instructions, and an instruction control unit (ICU) to control execution of the instructions. The instructions in a given instruction queue may be executed only by tiles in its associated functional slice and may not be executed by the other slice of the processor.

By arranging the tiles of the processor 2200 into different functional slices 2204, the on-chip instruction and control flow of the processor 2200 can be decoupled from the data flow. For example, one arrow in FIG. 22B illustrates the flow of instructions within the processor architecture, in accordance with some embodiments. Another arrow in FIG. 22B illustrates data flow within the processor architecture, in accordance with at least one embodiment. As illustrated, the instructions and control flow flows in a first direction across the tiles of the processor 2200 (e.g., north-south, along the length of the functional slices, as shown by the first arrow), while the data flows flow in a second direction across the tiles of the processor 2200 (e.g., east-west, across the functional slices, as shown by the second arrow) that is perpendicular to the first direction.

Different functional slices of the processor may correspond to MEM 2222 (memory), VXM (vector execution module), MXM (matrix execution module), NIM (numerical interpretation module), and SXM (switching and permutation module). Each slice may include N tiles that may all be controlled by the same instruction control unit (ICU) (not shown). Each of those slices may operate completely independently and can only be coordinated using barrier-like synchronization primitives or through the compiler by exploiting "tractable determinism." Each tile of the processor can correspond to an execution unit organized as an ×M SIMD tile. For example, each tile of the on-chip memory of the processor may be organized to store an L-element vector atomically. As such, a MEM slice having N tiles may work together to store or process a large vector (e.g., having a total of N×M elements).

The tiles in the same slice may execute instructions in a "staggered" fashion where instructions may be issued tile-by-tile within the slice over a period of N cycles. Functional slices may be arranged physically on-chip to allow efficient data-flow for pipelined execution across hundreds of cycles for common patterns. Data flows can perform a single "u-turn" (change in direction) corresponding to a single matrix operation before being written back to memory, in some embodiments, a particular data flow may change direction multiple times (due to multiple matrix and vector operations) before the resulting data is written back into memory.

To get good single-thread performance, a conventional multi-core processor design (e.g., as illustrated in FIG. 22A) typically needs to dedicate a significant portion of silicon area for exposing and exploiting instruction-level parallelism (ILP). This usually involves register renaming schemes and large instruction windows over which the instructions have no explicit understanding of the hardware on which it will execute, all the while maintaining the illusion of in-order program execution. In contrast, when using a processor (e.g., TSP) having a functional slice architecture, the TSP compiler generates an explicit plan for how the processor will execute the microprogram. The compiler specifies when each operation will be executed, which functional slices will perform the work, and which STREAM registers hold the operands. The compiler maintains a high-fidelity (cycle accurate) model of the TSP's hardware state so the microprogram can orchestrate the data flow.

Processor 2200 (e.g., TSP) can use a Web-hosted compiler that takes as its input a model (e.g., a ML model such as, but not limited to, a TensorFlow model) and emits a proprietary instruction stream targeting the processor TSP hardware. The compiler is responsible for coordinating the control and data flow of the program, and specifies any instruction-level parallelism by explicitly bundling instructions that can and should execute concurrently so that they may be dispatched together. The primary hardware structure is the architecturally-visible streaming register file (STREAMs), described in greater detail below, which serves as the conduit through which operands flow from MEM slices (e.g., SRAM) to functional slices and vice versa.

The MEM unit of the processor serves as: (1) storage for model parameters, microprograms and the data on which they operate, and (2) network-on-chip (NoC) for communicating data operands from MEM to the functional slices and computed results back to MEM. In some embodiments, the on-chip memory consumes ~75% of the chip area of the processor. In some embodiments, due to the bandwidth requirements of the processor, the on-chip memory of the MEM tiles may comprise SRAM, and not DRAM. The on-chip memory capacity of the processor determines (i) the number of ML models that can simultaneously reside on-chip, (ii) size of any given model, and (iii) partitioning of large models to fit into multi-chip systems. In some embodiments, the MEM system of the processor provides a plurality of memory slices organized into two different hemispheres (referred to as "MEM WEST" and "MEM EAST", respectively).

The memory slices of each hemisphere may mirrored, such that slices may be physically numbered {0, . . . . L} in the East hemisphere 410, and {L, . . . 0} in the West hemisphere 405, such that the memory slice 0 for each hemisphere corresponds to the slice closest to the VXM slices 415 between the hemispheres, where each hemisphere comprises L slices. The direction of data transfer towards the center of the chip may be referred to as inwards, while data transfer toward the outer (Eastern or Western most) edge of the chip may be referred to as outwards. Although the hemispheres of memory of the processor may be referred to as east and west, it is understood that in other embodiments, other names may be used to refer to the different hemispheres of memory.

In some embodiments, a streaming register file, referred to as STREAMS, transfers operands and results between SRAM of the MEM slices and the functional slices of the processor. In some embodiments, a plurality of MEM slices (e.g., between 2 and 10 adjacent MEM slices) may be physically organized as a set. Each set of slices may be located between a pair of STREAM register files, such that each slice is able to read or write to the STREAM registers in either direction. By placing STREAM register files between sets of MEM slices, a number of cycles needed for data operands to be transmitted across a hemisphere is decreased (e.g., by a factor corresponding to the number of slices per set). The number of slices per set may be configured based upon a distance over which data may be transmitted over a single clock cycle.

With respect to any of the processors in FIG. 22 and any components described above or elsewhere herein, one or more of APIs or equivalents described herein can, for example, get compiled into instructions or equivalents, which may be fetched by instruction fetch logic or equivalents, decoded by a processor decoder or equivalents, scheduled (e.g., in order or out of order) for execution by a scheduler or equivalents, executed by execution logic or equivalents, reordered, and then retired by retirement logic or equivalents. API(s) (and/or compiled instructions including API(s)) can be stored in any storage outside or inside of the processor (e.g., in cache and/or memory). A result of API(s) can then be stored in storage within or outside of the processor, including registers, DRAM, flash, SRAM, cache, or other memory equivalents.

In at least one embodiment, processor 2200 includes one or more processors that are at least a portion of, or include at least a portion of, one or more of processors described herein at least in conjunction with FIGS. 1-8 and FIGS. 10-22. In at least one embodiment, processor 2200 includes one or more processors that are at least a portion of, or include at least a portion of, processor(s) 104 of FIG. 1. In at least one embodiment, processor 2200 includes one or more processors that comprise one or more circuits to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein. In at least one embodiment, one or more circuits of processor 2200 can be configured by software to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein.

Software Constructions

The following figures set forth, without limitation, examples of software constructs for implementing at least one embodiment.

Figure 23:
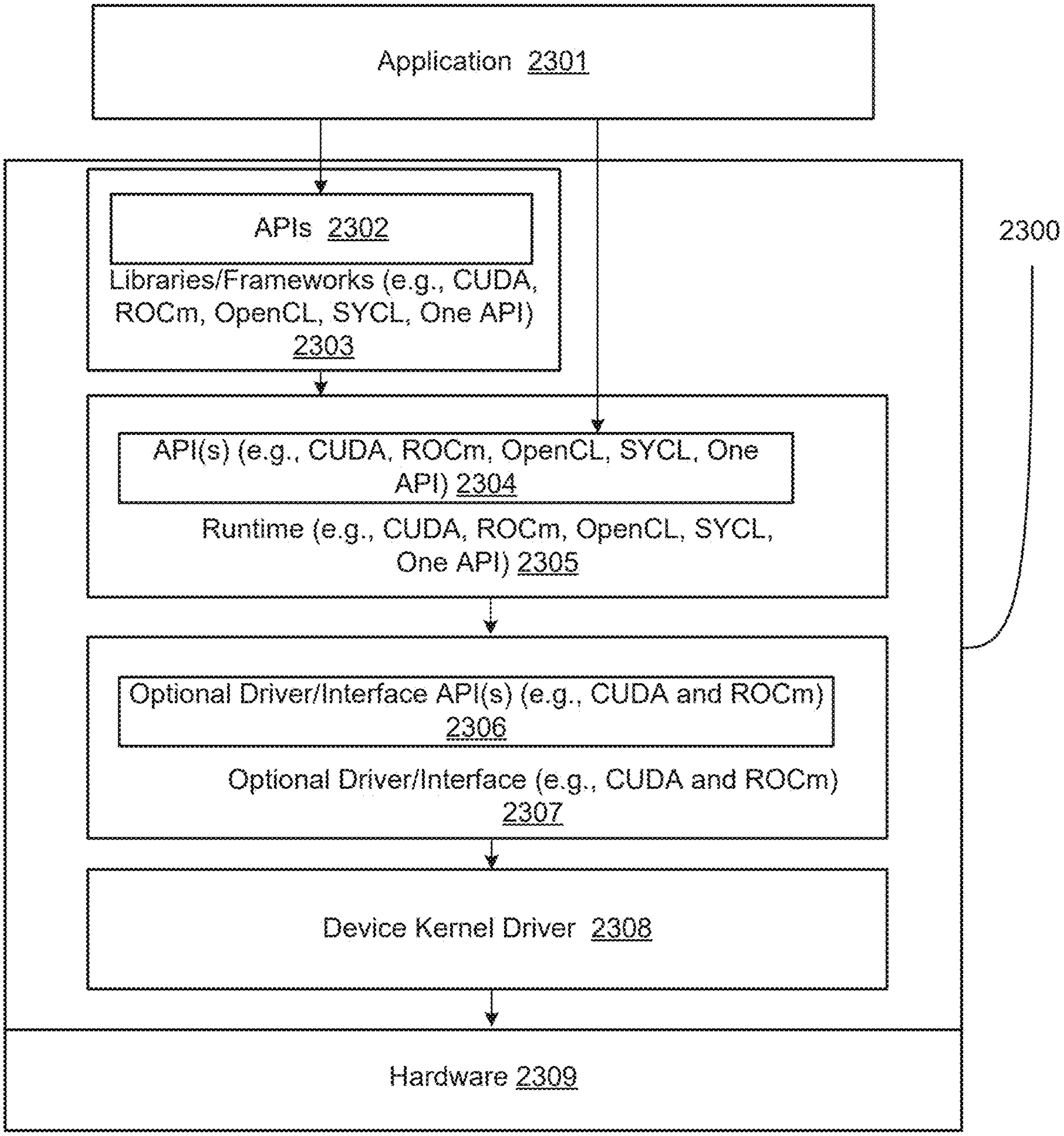
FIG. 23 illustrates a software stack of a programming platform, in accordance with at least one embodiment.

FIG. 23 illustrates a software stack of a programming platform, in accordance with at least one embodiment. A programming platform can include a platform for leveraging hardware on a computing system to accelerate computational tasks. A programming platform may be accessible to software developers through libraries, compiler directives, and/or extensions to programming languages, in at least one embodiment. A programming platform may be CUDA, Radeon Open Compute Platform ("ROCm"), OpenCL (OpenCL™ is developed by Khronos group), SYCL, or Intel oneAPI.

A software stack 2300 of a programming platform can provide an execution environment for an application 2301. Application 2301 may include any computer software capable of being launched on software stack 2300. Application 2301 may include an artificial intelligence ("AI")/machine learning ("ML") application, a high performance computing ("HPC") application, a virtual desktop infrastructure ("VDI"), or a data center workload.

Application 2301 and software stack 2300 run on hardware 2308. Hardware 2308 may include one or more GPUs, CPUs, FPGAs, AI engines, and/or other types of compute devices that support a programming platform. Software stack 2300 may be vendor specific and compatible with only devices from particular vendor(s), such as CUDA, ROCm, OneAPI, OpenCL, or other implementations. Hardware 2308 can include a host connected to one more devices that can be accessed to perform computational tasks via application programming interface ("API") calls. A device within hardware 2308 may include a GPU, FPGA, AI engine, or other compute device (but may also include a CPU) and its memory, as opposed to a host within hardware 2308 that may include a CPU (but may also include a compute device) and its memory, in at least one embodiment. With respect to any of the hardware 2308 described above or elsewhere herein, one or more of APIs described herein can, for example, get compiled into instructions, which may be fetched by instruction fetch logic, decoded by a processor decoder, scheduled (e.g., in order or out of order) for execution by a scheduler, executed by execution logic, reordered, and then retired by the retirement logic. API(s) (and/or compiled instructions including API(s)) can be stored in any storage outside or inside of the processor (e.g., in cache and/or memory). A result of API(s) can then be stored in storage within or outside of the processor, including registers, DRAM, flash, SRAM, cache, or other memory. One or more of APIs described herein can include a call. One or more of APIs described herein can include a library or a portion of a library to perform a function described by the call. One or more of APIs described herein can include a call and a library or portion of a library to perform a function described by the call.

Software stack 2300 of a programming platform can include a number of libraries 2303, a runtime 2305, an optional driver/interface 2307, and a device kernel driver 2308. Each of libraries 2303 may include data and programming code that can be used by computer programs and leveraged during software development. Libraries 2303 may include pre-written code and subroutines, classes, values, type specifications, configuration data, documentation, help data, and/or message templates. Libraries 2303 can include functions that may be optimized for execution on one or more types of devices. Libraries 2303 may include functions for performing mathematical, deep learning, and/or other types of operations on devices. Libraries 2303 can be associated with corresponding APIs 2302, which may include one or more APIs, that expose functions implemented in libraries 2303. A processor (e.g. CPU, GPU) may perform, call, or otherwise use one or more APIs to prioritize kernels. For example, a first kernel (e.g., parent) can launch a second kernel (e.g., child kernel), and said second kernel can be used by a processor to launch additional kernels (e.g., grandchildren kernels) independent of said first kernel. A processor may perform an API or calls an API from memory to be performed to support dynamic stream priority (e.g., updating priority while a stream is being used to perform operations). For example, when a processor performs said API, it allows a programmer to copy stream priority from one stream to one or more other streams.

Software stack 2300 may include an API to support dynamic stream priority (e.g., updating priority while a stream is being used to perform operations), which can allow a programmer to set priority of a stream at any time after creation. Software stack 2300 can include an API to support dynamic stream priority (e.g., updating priority while the stream is being used to perform operations), which may allow a programmer to obtain current priority of a stream, where the priority is one of a plurality of attributes of a stream. Software stack 2300 can include an API to support dynamic stream priority (e.g., updating priority while the stream is being used to perform operations), which may allow a programmer to obtain current priority of a stream as a single attribute. Software stack 2300 can include an API to support dynamic stream priority (e.g., updating priority while the stream is being used to perform operations), which allows a programmer to launch a kernel to perform operations on a stream at a set priority, which may be different from the stream priority. Software stack 2300 may include an API to indicate whether an object (e.g., a thread synchronization object such as, but not limited to, a barrier) tracks whether all data movement operations for a set of threads operating on a GPU may be complete has a specified state after a specified period of time, where a specified state can be a state indicating that data has been moved and is ready for use, and is specified using an expected parity value as an input to the API.

Software stack 2300 can include one or more APIs to updated kernels. A processor can perform an API or call an API from memory to be performed to update to an existing API is to support context-free kernels, which may allow a programmer to add a kernel node to a graph without a graphics context, so that a graphics context can be dynamically associated with a kernel at runtime. Software stack 2300 may include one or more APIs to allow a programmer to obtain a kernel identifier and a graphics context as separate parameters from a kernel node, so that parameters to be obtained from kernels and from context-free kernels. Software stack 2300 can include one or more APIs to use parallel processor(s), such as, but not limited to, one or more graphics processing units, to launch task graphs (e.g., task graphs) and to execute one or more task graphs (e.g., including one or more programs).

Software stack 2300 may include one or more APIs to associate one or more instructions with one or more memory ordering operations, such as, but not limited to, a fence or membar operation. Instructions can be associated with one or more domains such that a memory ordering operation is executed in association to one or more particular domains without interfering with instructions of other domains. An API can indicate a thread has arrived (e.g., at a thread synchronization barrier), or finished a stage of work in relation to asynchronous data movement operations on a GPU. Software stack 2300 may include one or more to allow programmers to manually indicate an expected transaction count when a thread has finished a stage of work, which can be used to update an object that tracks whether all data movement operations for a set of threads may be complete.

Application 2301 can be written as source code that is compiled into executable code, as discussed in greater detail below in conjunction with FIGS. 24 and 25. Executable code of application 2301 may run, at least in part, on an execution environment provided by software stack 2300. During execution of application 2301, code may be reached that needs to run on a device, as opposed to a host. In such a case, runtime 2305 may be called to load and launch requisite code on the device. Runtime 2305 may include any technically feasible runtime system that is able to support execution of application 2301.

Runtime 2305 can be implemented as one or more runtime libraries associated with corresponding APIs, which are shown as API(s) 2304. One or more of such runtime libraries may include functions for memory management, execution control, device management, error handling, and/or synchronization, among other things. Memory management functions may include functions to allocate, deallocate, and copy device memory, as well as transfer data between host memory and device memory. Execution control functions may include functions to launch a function (sometimes referred to as a "kernel" when a function is a global function callable from a host) on a device and set attribute values in a buffer maintained by a runtime library for a given function to be executed on a device.

Runtime libraries and corresponding API(s) 2304 may be implemented in any technically feasible manner. One (or any number of) API may expose a low-level set of functions for fine-grained control of a device, while another (or any number of) API may expose a higher-level set of such functions. A high-level runtime API may be built on top of a low-level API. One or more of runtime APIs may be language-specific APIs that may be layered on top of a language-independent runtime API.

An optional driver or interface 2307 may be implemented, e.g., for CUDA and ROCm implementations, that are described further below. Optional driver/interface 2307 may be associated with optional driver or interface API(s), such as, but not limited to, CUDA and/or ROCm API(s).

One or more processors disclosed in "processing systems" can perform, access, or otherwise use software stack 2300. For example, system-on-a-chip 1000, parallel processor 1100, graphics multiprocessor 1134, processor 1200, processor 1300, accelerator 1400, neuromorphic processor 1505, supercomputer 1600, acceleration processing unit 1700, processor 1800, processor 1900, tensor processing unit 2000, processor 2100, and language processing unit 2200 can perform, use, call, or otherwise implement (e.g., through accessing a memory) one or more APIs included in software stack 2300.

Device kernel driver 2308 can be configured to facilitate communication with an underlying device. Device kernel driver 2308 may provide low-level functionalities upon which APIs, such as, but not limited to, API(s) 2304, and/or other software relies. Device kernel driver 2308 may be configured to compile intermediate representation ("IR") code into binary code at runtime. For CUDA or other implementations such as, but not limited to, ROCm, OneAPI, or OpenCL, device kernel driver 2308 may compile Parallel Thread Execution ("PTX") IR code that is not hardware specific into binary code for a specific target device at runtime (with caching of compiled binary code), which is also sometimes referred to as "finalizing" code. Doing so may permit finalized code to run on a target device, which may not have existed when source code was originally compiled into PTX code. Alternatively, device source code may be compiled into binary code offline, without requiring device kernel driver 2308 to compile IR code at runtime.

Processors described elsewhere herein, such as, but not limited to, processors in FIGS. 1-8 and 10-22 can include one or more circuits to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein. In at least one embodiment, one or more circuits can be configured by software, e.g., software stack 2300 to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein.

In accordance with at least one embodiment, software stack 2300 of FIG. 23 can be performed in a CUDA implementation. A CUDA software stack 2300, on which an application 2301 may be launched, may include CUDA libraries 2303, a CUDA runtime 2305, a CUDA driver 2307, and a device kernel driver 2308. CUDA software stack 2300 can execute on hardware (e.g., graphics multiprocessor 1134 that may include a GPU that supports CUDA and is developed by NVIDIA Corporation of Santa Clara, CA.

Application 2301, CUDA runtime 2305, and device kernel driver 2308 can perform functionalities that are described above and elsewhere herein. CUDA driver 2307 can include a library (libcuda.so) that may implement a CUDA driver API 2306. Similar to a CUDA runtime API 2304 implemented by a CUDA runtime library (cudart), CUDA driver API 2306 may expose functions for memory management, execution control, device management, error handling, synchronization, and/or graphics interoperability, among other things. CUDA driver API 2306 can differ from CUDA runtime API 2304 in that CUDA runtime API 2304 simplifies device code management by providing implicit initialization, context (analogous to a process) management, and module (analogous to dynamically loaded libraries) management. In contrast to high-level CUDA runtime API 2304, CUDA driver API 2306 can be a low-level API providing more fine-grained control of the device, particularly with respect to contexts and module loading. CUDA driver API 2306 may expose functions for context management that may be not exposed by CUDA runtime API 2304. CUDA driver API 2306 may also be language-independent and support, e.g., OpenCL, in addition to CUDA runtime API 2304. Further, development libraries, including CUDA runtime 2305, may be considered as separate from driver components, including user-mode CUDA driver 2307 and kernel-mode device driver 2308 (also sometimes referred to as a "display" driver).

CUDA libraries 2303 may include mathematical libraries, deep learning libraries, parallel algorithm libraries, and/or signal/image/video processing libraries, which parallel computing applications such as, but not limited to, application 2301 may utilize. CUDA libraries 2303 may include mathematical libraries such as, but not limited to, a cuBLAS library that is an implementation of Basic Linear Algebra Subprograms ("BLAS") for performing linear algebra operations, a cuFFT library for computing fast Fourier transforms ("FFTs"), and a cuRAND library for generating random numbers, among others. CUDA libraries 2303 may include deep learning libraries such as, but not limited to, a cuDNN library of primitives for deep neural networks and a TensorRT platform for high-performance deep learning inference, among others.

In at least one embodiment, processors described elsewhere herein, such as, but not limited to, processors in FIGS. 1-8 and 10-22 can include one or more circuits to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein. In at least one embodiment, one or more circuits can be configured by software, e.g., software stack 2300 to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein.

In accordance with at least one embodiment, software stack 2300 of FIG. 23 can be performed in a ROCm implementation. A ROCm software stack 2300, on which an application 2301 may be launched, includes a language runtime 2303, a system runtime 2305, a thunk 2307, and a ROCm kernel driver 2308. ROCm software stack 2300 executes on hardware 2309, which may include a GPU that supports ROCm and is developed by AMD Corporation of Santa Clara, CA.

Application 2301 may perform similar functionalities as discussed above in conjunction with FIG. 23. In addition, language runtime 2303 and system runtime 2305 may perform similar functionalities as runtime 2305 discussed above in conjunction with FIG. 23. Language runtime 2303 and system runtime 2305 may differ in that system runtime 2305 is a language-independent runtime that implements a ROCr system runtime API 2304 and makes use of a Heterogeneous System Architecture ("HSA") Runtime API. HSA runtime API can include a thin, user-mode API that exposes interfaces to access and interact with an AMD GPU, including functions for memory management, execution control via architected dispatch of kernels, error handling, system and agent information, and runtime initialization and shutdown, among other things. In contrast to system runtime 2305, language runtime 2303 can be an implementation of a language-specific runtime API 2302 layered on top of ROCr system runtime API 2304. Language runtime API may include a Heterogeneous compute Interface for Portability ("HIP") language runtime API, a Heterogeneous Compute Compiler ("HCC") language runtime API, or an OpenCL API, among others. HIP language in particular is an extension of C++ programming language with functionally similar versions of CUDA mechanisms, and a HIP language runtime API may include functions that may be similar to those of CUDA runtime API discussed above in conjunction with FIG. 23, such as, but not limited to, functions for memory management, execution control, device management, error handling, and synchronization, among other things.

Thunk (ROCt) 2307 can be an interface 2306 that can be used to interact with underlying ROCm driver 2308. ROCm driver 2308 can be a ROCK driver, which is a combination of an AMDGPU driver and a HSA kernel driver (amdkfd). AMDGPU driver can be a device kernel driver for GPUs developed by AMD that performs similar functionalities as device kernel driver 2309 discussed above in conjunction with FIG. 23. HSA kernel driver can be a driver permitting different types of processors to share system resources more effectively via hardware features.

Various libraries (not shown) may be included in ROCm software stack 2300 above language runtime 2303 and provide functionality similar to CUDA libraries 2303, discussed above in conjunction with FIG. 23. Various libraries may include mathematical, deep learning, and/or other libraries such as, but not limited to, a hipBLAS library that implements functions similar to those of CUDA cuBLAS, a rocFFT library for computing FFTs that is similar to CUDA cuFFT, among others.

Processors described elsewhere herein, such as, but not limited to, processors in FIGS. 1-8 and 10-22 can include one or more circuits to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein. In at least one embodiment, one or more circuits can be configured by software, e.g., software stack 2300 to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein.

In accordance with at least one embodiment, software stack 2300 of FIG. 23 can be performed in a OpenCL implementation. An OpenCL software stack 2300, on which an application 2301 may be launched, can include an OpenCL framework 2303, an OpenCL runtime 2305, and a driver 2308. OpenCL software stack 2300 may execute on hardware 2309 that is not vendor-specific. As OpenCL is supported by devices developed by different vendors, specific OpenCL drivers may be required to interoperate with hardware from such vendors.

Application 2301, OpenCL runtime 2305, device kernel driver 2308, and hardware 2309 may perform similar functionalities as other implementations of application 2301, runtime 2305, device kernel driver 2308, and hardware 2309, respectively, that are discussed above in conjunction with FIG. 23. Application 2301 can further include an OpenCL kernel (not shown) with code that is to be executed on a device.

OpenCL may define a "platform" that allows a host to control devices connected to the host. An OpenCL framework can provide a platform layer API and a runtime API, shown as platform API 2302 and runtime API 2304. Runtime API 2304 can use contexts to manage execution of kernels on devices. Each identified device may be associated with a respective context, which runtime API 2304 may use to manage command queues, program objects, and kernel objects, share memory objects, among other things, for that device. Platform API 2302 can expose functions that permit device contexts to be used to select and initialize devices, submit work to devices via command queues, and enable data transfer to and from devices, among other things. In addition, OpenCL framework can provide various built-in functions (not shown), including math functions, relational functions, and image processing functions, among others.

A compiler (not shown) can also be included in OpenCL framework 2303. Source code may be compiled offline prior to executing an application or online during execution of an application. In contrast to CUDA and ROCm, OpenCL applications may be compiled online by a compiler that is representative of any number of compilers that may be used to compile source code and/or IR code, such as, but not limited to, Standard Portable Intermediate Representation ("SPIR-V") code, into binary code. Alternatively, OpenCL applications may be compiled offline, prior to execution of such applications.

In at least one embodiment, processors described elsewhere herein, such as, but not limited to, processors in FIGS. 1-8 and 10-22 can include one or more circuits to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein. In at least one embodiment, one or more circuits can be configured by software, e.g., software stack 2300 to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein.

In accordance with at least one embodiment, software can be supported by a programming platform that is configured to support various programming models, middlewares and/or libraries, and frameworks that an application may rely upon. Application may be an AI/ML application implemented using, for example, a deep learning framework such as, but not limited to, MXNet, PyTorch, or TensorFlow, which may rely on libraries such as, but not limited to, cuDNN, NVIDIA Collective Communications Library ("NCCL"), and/or NVIDA Developer Data Loading Library ("DALI") CUDA libraries to provide accelerated computing on underlying hardware.

Programming platform may be one of a CUDA, ROCm, or OpenCL platform described above in conjunction with FIG. 23. Programming platform can support multiple programming models, which may be abstractions of an underlying computing system permitting expressions of algorithms and data structures. Programming models may expose features of underlying hardware in order to improve performance. Programming models may include CUDA, HIP, OpenCL, C++ Accelerated Massive Parallelism ("C++ AMP"), Open Multi-Processing ("OpenMP"), Open Accelerators ("OpenACC"), and/or Vulcan Compute.

Libraries and/or middlewares may provide implementations of abstractions of programming models. Such libraries can include data and programming code that may be used by computer programs and leveraged during software development. Such middlewares can include software that provides services to applications beyond those available from programming platform. Libraries and/or middlewares may include cuBLAS, cuFFT, cuRAND, and other CUDA libraries, or rocBLAS, rocFFT, rocRAND, and other ROCm libraries. In addition, libraries and/or middlewares may include NCCL and ROCm Communication Collectives Library ("RCCL") libraries providing communication routines for GPUs, a MIOpen library for deep learning acceleration, and/or an Eigen library for linear algebra, matrix and vector operations, geometrical transformations, numerical solvers, and related algorithms.

Application frameworks may depend on libraries and/or middlewares. Each of application frameworks can be a software framework used to implement a standard structure of application software. Returning to the AI/ML example discussed above, an AI/ML application may be implemented using a framework such as, but not limited to, Caffe, Caffe2, TensorFlow, Keras, PyTorch, or MxNet deep learning frameworks, for example.

In at least one embodiment, processors described elsewhere herein, such as, but not limited to, processors in FIGS. 1-8 and 10-22 can include one or more circuits to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein. In at least one embodiment, one or more circuits can be configured by software, e.g., programming platforms described herein, to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein.

Figure 24:
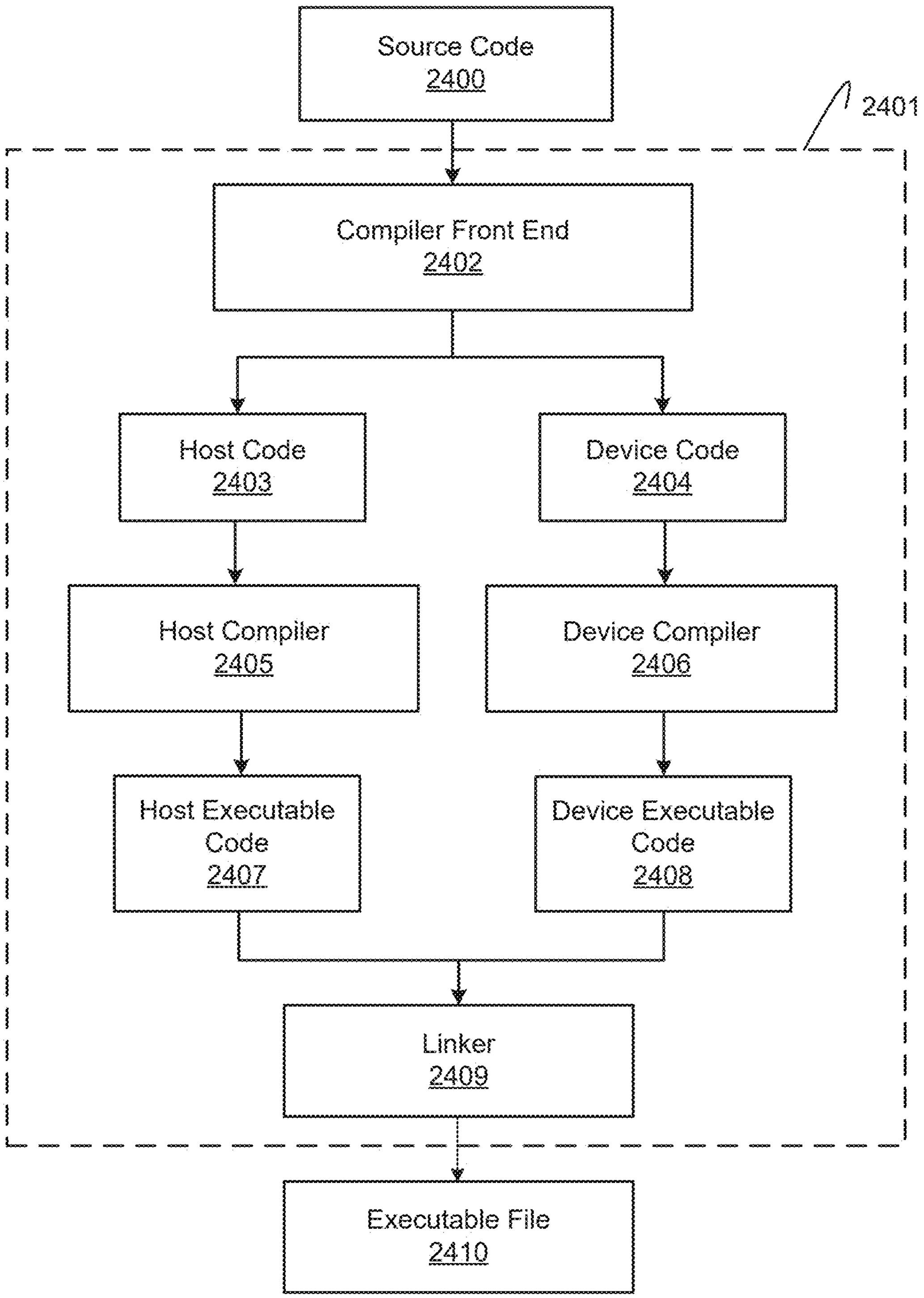
FIG. 24 illustrates software that is supported by a programming platform, in accordance with at least one embodiment.

FIG. 24 illustrates compiling code to execute on one of programming platforms of FIG. 23 described above, in accordance with at least one embodiment. A compiler 2401 is configured to receive source code 2400, compile source code 2400, and output an executable file 2410. Complier 2401 can be configured to convert source code 2400 into host executable code 2407 for execution on a host and device executable code 2408 for execution on a device. Source code 2400 may either be compiled offline prior to execution of an application, or online during execution of an application. Source code 2400 may include code in any programming language supported by compiler 2401, such as, but not limited to, C++, C, Fortran, etc. Source code 2400 may be included in a single-source file having a mixture of host code and device code, with locations of device code being indicated therein. A single-source file may be a.cu file that includes CUDA code or a.hip.cpp file that includes HIP code or a file in another format that includes both host code and device code. Alternatively, source code 3300 may include multiple source code files, rather than a single-source file, into which host code and device code may be separated. Compiler 2401 includes or has access to one or more libraries to recognize a sequence of API calls to perform a single fused API, where a single fused API is a combined API for two or more APIs. In at least one embodiment, compiler 2401 may be an NVIDIA CUDA compiler ("NVCC") for compiling CUDA code in.cu files, or a HCC compiler for compiling HIP code in.hip.cpp files, or other compilers.

Compiler 2401 can be configured to compile source code 2400 into host executable code 2407 for execution on a host and device executable code 2408 for execution on a device. Compiler 2401 performs operations including parsing source code 2400 into an abstract system tree (AST), performing optimizations, and generating executable code. When source code 2400 includes a single-source file, compiler 2401 may separate device code from host code in such a single-source file, compile device code and host code into device executable code 2408 and host executable code 2407, respectively, and link device executable code 2408 and host executable code 2407 together in a single file.

Compiler 2401 can include a compiler front end 2402, a host compiler 2405, a device compiler 2406, and a linker 2409. Compiler front end 2402 can be configured to separate device code 2404 from host code 2403 in source code 2400. Device code 2404 may be compiled by device compiler 2406 into device executable code 2408, which as described may include binary code or IR code, in at least one embodiment. Separately, host code 2403 may be compiled by host compiler 2405 into host executable code 2407. For NVCC other compilers, such as, but not limited to, those for oneAPI, ROCm, and OpenCL, host compiler 2405 may be a general purpose C/C++ compiler that outputs native object code, while device compiler 2406 may be a Low Level Virtual Machine ("LLVM")-based compiler that forks a LLVM compiler infrastructure and outputs PTX code or binary code. For HCC, both host compiler 2405 and device compiler 2406 may be LLVM-based compilers that output target binary code.

Subsequent to compiling source code 2400 into host executable code 2407 and device executable code 2408, linker 2409 can link host and device executable code 2407 and 2408 together in executable file 2410. Native object code for a host and PTX or binary code for a device may be linked together in an Executable and Linkable Format ("ELF") file, which is a container format used to store object code. Host executable code 2407 and device executable code 2408 may be in any suitable format, such as, but not limited to, binary code and/or IR code. In the case of CUDA, host executable code 2407 may include native object code and device executable code 2408 may include code in PTX intermediate representation, in at least one embodiment. In the case of ROCm, both host executable code 2407 and device executable code 2408 may include target binary code, in at least one embodiment. Other implementations, such as, but not limited to, oneAPI, OpenCL are contemplated and can be performed similarly to the CUDA and ROCm implementations above.

Source code 2400 may be translated prior to compiling source code. Source code is passed through a translation tool (not shown), which translates source code 2400 into translated source code. A compiler 2401 can be used to compile translated source code into host executable code 2407 and device executable code 2408 in a process that is similar to compilation of source code 2400 by compiler 2401 into host executable code 2407 and device executable code 2408, as discussed above in conjunction with FIG. 24.

A translation performed by translation tool can be used to port source code 2400 for execution in a different environment than that in which it was originally intended to run. Translation tool may include a HIP translator that is used to "hipify" CUDA code intended for a CUDA platform into HIP code that can be compiled and executed on a ROCm platform. Translation of source code 2400 may include parsing source code 2400 and converting calls to API(s) provided by one programming model (e.g., CUDA) into corresponding calls to API(s) provided by another programming model (e.g., HIP), as discussed in greater detail below in conjunction with FIG. 25. Returning to the example of hipifying CUDA code, calls to CUDA runtime API, CUDA driver API, and/or CUDA libraries may be converted to corresponding HIP API calls. Automated translations performed by translation tool 2401 may sometimes be incomplete, requiring additional, manual effort to fully port source code 2400.

One or more techniques described herein may utilize other methods of converting one type of code to another type of code to enable interchangeability between different device architectures. In at least one embodiment, an application for one platform (e.g., a CUDA application) can be compiled into code for implementation on another platform (e.g., an AMD processor, Intel processor, or other processor). For example, source code 2400 can include source code for one platform (e.g., CUDA). Compiler 2401 can compile the source 2400 into an executable file 2410 that can be used by another platform (e.g., AMD or Intel). Programming toolkits can allow applications for one platform (e.g., CUDA) to be compiled (e.g., natively) for another platform (e.g., AMD or Intel). For example, a GPGPU programming toolkit can allow for CUDA applications to be natively compiled for AMD GPUs. Programs (e.g., CUDA programs) or its build system do not have to be modified or translated to another language before compiling to code for another platform. A compiler may accept the same command-line options and programming dialect (e.g., CUDA dialect) as another compiler (e.g., nvcc for CUDA), serving as a drop-in replacement to impersonate an installation of a toolkit (e.g., NVIDIA CUDA Toolkit), so existing build tools and scripts (e.g., like cmake) work without further modification. In at least one embodiment, an nvcc-compatible compiler can be used to compile nvcc-dialect CUDA for AMD GPUs, including PTX asm. Implementations of CUDA runtime and driver APIs for AMD GPUs can be used. Libraries (e.g., open source wrapper libraries) can provide APIs, such as “CUDA-X” APIs by delegating to the corresponding ROCm libraries. An example implementation includes SCALE from Spectral Compute in London, England. Instead of providing a new way to write GPGPU software, SCALE allows programs written using the widely-popular CUDA language to be directly compiled for AMD GPUs. Additional implementations can include a Clang compiler that provides a language front-end and tooling infrastructure for languages in the C language family (C, C++, Objective C/C++, OpenCL, CUDA, and RenderScript). In at least one embodiment, compilers described herein, such as, but not limited to compiler 2401, compiler 2405, and/or compiler 2406 can include one or more circuits to compile code (e.g., CUDA, HIP, OpenCL, OneAPI, or others) to use one or more indices comprising a plurality of bits, each indicating one or more operands stored contiguously based, at least in part, on a precision of the one or more operands, and/or perform any of the operations described above or elsewhere herein.

Figure 25:
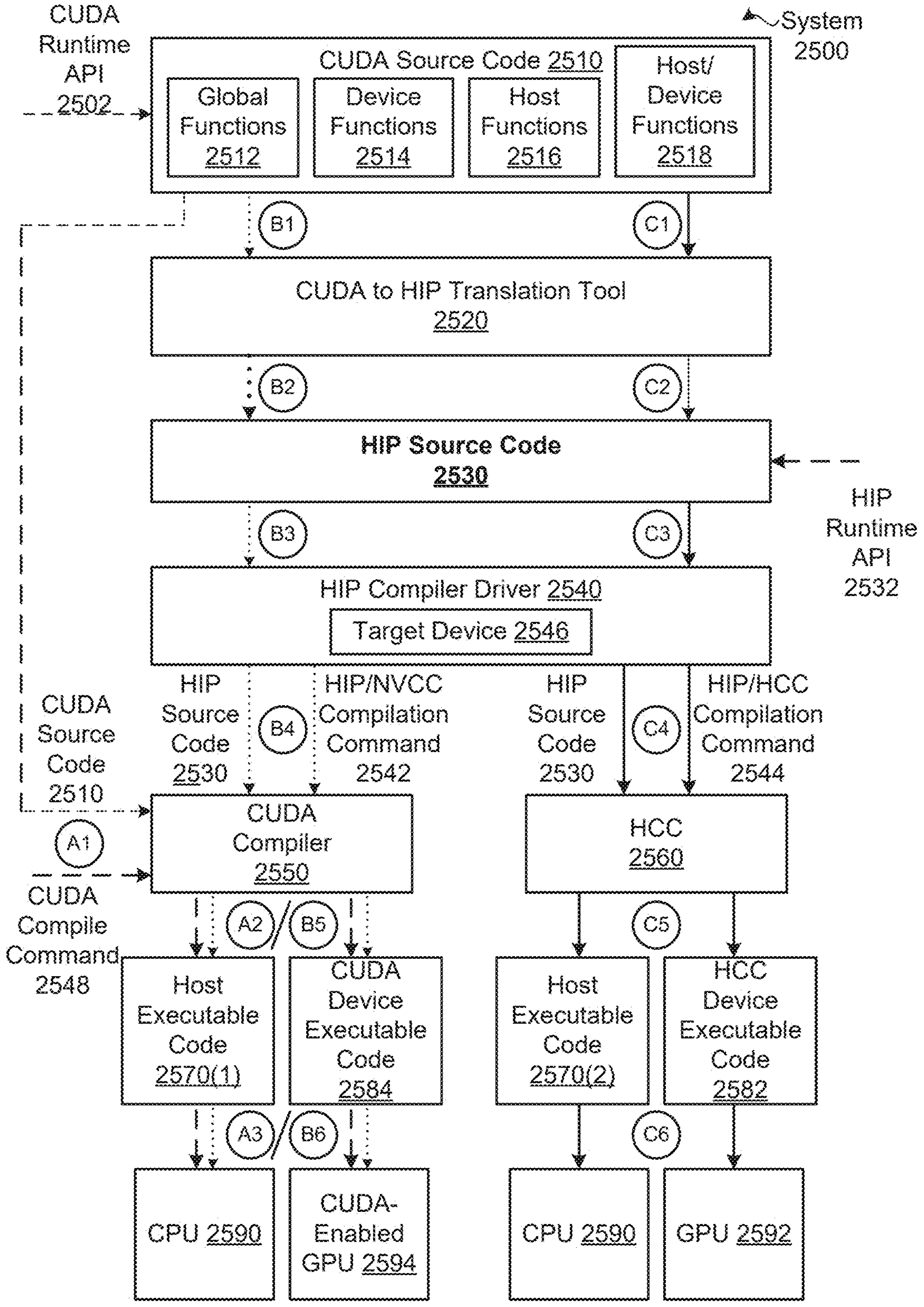
FIG. 25 illustrates compiling code to execute on programming platforms of FIG. 24, in accordance with at least one embodiment.

FIG. 25 illustrates a system 2500 configured to compile and execute CUDA source code 2510 using different types of processing units, in accordance with at least one embodiment. System 2500 includes CUDA source code 2510, a CUDA compiler 2550, host executable code 2570(1), host executable code 2570(2), CUDA device executable code 2584, a CPU 2590, a CUDA-enabled GPU 2594, a GPU 2592, a CUDA to HIP translation tool 2520, HIP source code 2530, a HIP compiler driver 2540, an HCC 2560, and HCC device executable code 2582.

CUDA source code 2510 may be a collection of human-readable code in a CUDA programming language. A CUDA programming language can be an extension of the C++ programming language that includes mechanisms to define device code and distinguish between device code and host code. Device code can include source code that, after compilation, is executable in parallel on a device. A device may be a processor that is optimized for parallel instruction processing, such as, but not limited to, CUDA-enabled GPU 2590, GPU 2592, or another GPGPU, etc. Host code is source code that, after compilation, is executable on a host. A host is a processor that is optimized for sequential instruction processing, such as, but not limited to, CPU 2590.

CUDA source code 2510 can include any number (including zero) of global functions 2512, any number (including zero) of device functions 2514, any number (including zero) of host functions 2516, and any number (including zero) of host/device functions 2518. Global functions 2512, device functions 2514, host functions 2516, and host/device functions 2518 may be mixed in CUDA source code 2510. Each of global functions 2512 may be executable on a device and callable from a host. One or more of global functions 2512 may therefore act as entry points to a device. Each of global functions 2512 can be a kernel. In a technique known as dynamic parallelism, one or more of global functions 2512 can define a kernel that is executable on a device and callable from such a device. A kernel can be executed N (where N is any positive integer) times in parallel by N different threads on a device during execution.

Each of device functions 2514 can be executed on a device and callable from such a device only. Each of host functions 2516 can be executed on a host and callable from such a host only. Each of host/device functions 2516 may define both a host version of a function that is executable on a host and callable from such a host only and a device version of the function that is executable on a device and callable from such a device only.

CUDA source code 2510 may also include any number of calls to any number of functions that may be defined via a CUDA runtime API 2502. CUDA runtime API 2502 may include any number of functions that execute on a host to allocate and deallocate device memory, transfer data between host memory and device memory, manage systems with multiple devices, etc. CUDA source code 2510 may also include any number of calls to any number of functions that may be specified in any number of other CUDA APIs. A CUDA API may be any API that is designed for use by CUDA code. CUDA APIs can include CUDA runtime API 2502, a CUDA driver API, APIs for any number of CUDA libraries, etc, including any API(s) described elsewhere herein. Relative to CUDA runtime API 2502, a CUDA driver API can be a lower-level API but can provide finer-grained control of a device. Examples of CUDA libraries include cuBLAS, cuFFT, cuRAND, cuDNN, etc.

CUDA compiler 2550 may compile input CUDA code (e.g., CUDA source code 2510) to generate host executable code 2570(1) and CUDA device executable code 2584. CUDA compiler 2550 may be, but is not limited to, NVCC. Host executable code 2570(1) can be a compiled version of host code included in input source code that is executable on CPU 2590. CPU 2590 may be any processor that is optimized for sequential instruction processing.

CUDA device executable code 2584 may be a compiled version of device code included in input source code that is executable on CUDA-enabled GPU 2594. CUDA device executable code 2584 may include binary code. CUDA device executable code 2584 can include IR code, such as, but not limited to, PTX code, that is further compiled at runtime into binary code for a specific target device (e.g., CUDA-enabled GPU 2594) by a device driver. CUDA-enabled GPU 2594 may include any processor that is optimized for parallel instruction processing and that supports CUDA. CUDA-enabled GPU 2594 may be developed by NVIDIA Corporation of Santa Clara, CA.

CUDA to HIP translation tool 2520 can be configured to translate CUDA source code 2510 to functionally similar HIP source code 2530. HIP source code 2530 may include a collection of human-readable code in a HIP programming language. HIP code can include human-readable code in a HIP programming language. A HIP programming language can include an extension of the C++ programming language that includes functionally similar versions of CUDA mechanisms to define device code and distinguish between device code and host code. A HIP programming language may include a subset of functionality of a CUDA programming language. For example, a HIP programming language includes mechanism(s) to define global functions 2512, but such a HIP programming language may lack support for dynamic parallelism and therefore global functions 2512 defined in HIP code may be callable from a host only.

HIP source code 2530 may include any number (including zero) of global functions 2512, any number (including zero) of device functions 2514, any number (including zero) of host functions 2516, and any number (including zero) of host/device functions 2518. HIP source code 2530 may also include any number of calls to any number of functions that may be specified in a HIP runtime API 2532. HIP runtime API 2532 may include functionally similar versions of a subset of functions included in CUDA runtime API 2502. HIP source code 2530 may also include any number of calls to any number of functions that may be specified in any number of other HIP APIs. A HIP API may be any API that is designed for use by HIP code and/or ROCm. HIP APIs may include HIP runtime API 2532, a HIP driver API, APIs for any number of HIP libraries, APIs for any number of ROCm libraries, etc.

CUDA to HIP translation tool 2520 can convert each kernel call in CUDA code from a CUDA syntax to a HIP syntax and can convert any number of other CUDA calls in CUDA code to any number of other functionally similar HIP calls. A CUDA call can include a call to a function specified in a CUDA API, and a HIP call can include a call to a function specified in a HIP API. CUDA to HIP translation tool 2520 may convert any number of calls to functions specified in CUDA runtime API 2502 to any number of calls to functions specified in HIP runtime API 2532.

CUDA to HIP translation tool 2520 can include a tool known as hipify-perl that executes a text-based translation process. CUDA to HIP translation tool 2520 can include a tool known as hipify-clang that, relative to hipify-perl, executes a more complex and more robust translation process that involves parsing CUDA code using clang (a compiler front-end) and then translating resulting symbols. Converting CUDA code to HIP code may include modifications (e.g., manual edits) in addition to those performed by CUDA to HIP translation tool 2520.

HIP compiler driver 2540 can include a front end that determines a target device 2546 and then configures a compiler that is compatible with target device 2546 to compile HIP source code 2530. Target device 2546 can include a processor that is optimized for parallel instruction processing. HIP compiler driver 2540 may determine target device 2546 in any technically feasible fashion.

If target device 2546 is compatible with CUDA (e.g., CUDA-enabled GPU 2594), then HIP compiler driver 2540 can generate a HIP/NVCC compilation command 2542. HIP/NVCC compilation command 2542 can configure CUDA compiler 2550 to compile HIP source code 2530 using a HIP to CUDA translation header and a CUDA runtime library. In response to HIP/NVCC compilation command 2542, CUDA compiler 2550 may generate host executable code 2570(1) and CUDA device executable code 2584.

If target device 2546 is not compatible with CUDA, then HIP compiler driver 2540 may generate a HIP/HCC compilation command 2544. HIP/HCC compilation command 2544 can configure HCC 2560 to compile HIP source code 2530 using an HCC header and a HIP/HCC runtime library. In response to HIP/HCC compilation command 2544, HCC 2560 may generate host executable code 2570(2) and HCC device executable code 2582. HCC device executable code 2582 may be a compiled version of device code included in HIP source code 2530 that is executable on GPU 2592. GPU 2592 may be any processor that is optimized for parallel instruction processing, is not compatible with CUDA, and is compatible with HCC. GPU 2592 can be developed by AMD Corporation of Santa Clara, CA. GPU 2592 can include a non-CUDA-enabled GPU 2592.

For explanatory purposes only, three different flows that may be implemented in at least one embodiment to compile CUDA source code 2510 for execution on CPU 2590 and different devices are depicted in FIG. 25. A direct CUDA flow can compile CUDA source code 2510 for execution on CPU 2590 and CUDA-enabled GPU 2594 without translating CUDA source code 2510 to HIP source code 2530. An indirect CUDA flow can translate CUDA source code 2510 to HIP source code 2530 and then compiles HIP source code 2530 for execution on CPU 2590 and CUDA-enabled GPU 2594. A CUDA/HCC flow can translate CUDA source code 2510 to HIP source code 2530 and then can compile HIP source code 2530 for execution on CPU 2590 and GPU 2592.

A direct CUDA flow that may be implemented is depicted via dashed lines and a series of bubbles annotated A1-A3. As depicted with bubble annotated A1, CUDA compiler 2550 can receive CUDA source code 2510 and a CUDA compile command 2548 that can configure CUDA compiler 2550 to compile CUDA source code 2510. CUDA source code 2510 that can be used in a direct CUDA flow can be written in a CUDA programming language that is based on a programming language other than C++ (e.g., C, Fortran, Python, Java, etc.). In response to CUDA compile command 2548, CUDA compiler 2550 can generate host executable code 2570(1) and CUDA device executable code 2584 (depicted with bubble annotated A2). As depicted with bubble annotated A3, host executable code 2570(1) and CUDA device executable code 2584 may be executed on, respectively, CPU 2590 and CUDA-enabled GPU 2594. CUDA device executable code 2584 can include binary code. CUDA device executable code 2584 can include PTX code and can be further compiled into binary code for a specific target device at runtime.

An indirect CUDA flow that may be implemented is depicted via dotted lines and a series of bubbles annotated B1-B6. As depicted with bubble annotated B1, CUDA to HIP translation tool 2520 can receive CUDA source code 2510. As depicted with bubble annotated B2, CUDA to HIP translation tool 2520 can translate CUDA source code 2510 to HIP source code 2530. As depicted with bubble annotated B3, HIP compiler driver 2540 can receive HIP source code 2530 and can determine that target device 2546 is CUDA-enabled.

As depicted with bubble annotated B4, HIP compiler driver 2540 can generate HIP/NVCC compilation command 2542 and can transmit both HIP/NVCC compilation command 2542 and HIP source code 2530 to CUDA compiler 2550. HIP/NVCC compilation command 2542 can configure CUDA compiler 2550 to compile HIP source code 2530 using a HIP to CUDA translation header and a CUDA runtime library. HIP to CUDA translation header can translate any number of mechanisms (e.g., functions) specified in any number of HIP APIs to any number of mechanisms specified in any number of CUDA APIs. CUDA compiler 2550 may use HIP to CUDA translation header in conjunction with a CUDA runtime library corresponding to CUDA runtime API 2502 to generate host executable code 2570(1) and CUDA device executable code 2584. In response to HIP/NVCC compilation command 2542, CUDA compiler 2550 can generate host executable code 2570(1) and CUDA device executable code 2584 (depicted with bubble annotated B5). As depicted with bubble annotated B6, host executable code 2570(1) and CUDA device executable code 2584 may be executed on, respectively, CPU 2590 and CUDA-enabled GPU 2594. CUDA device executable code 2584 can include binary code. CUDA device executable code 2584 can include PTX code and can be further compiled into binary code for a specific target device at runtime.

A CUDA/HCC flow that may be implemented is depicted via solid lines and a series of bubbles annotated C1-C6. As depicted with bubble annotated C1, CUDA to HIP translation tool 2520 can receive CUDA source code 2510. As depicted with bubble annotated C2, CUDA to HIP translation tool 2520 can translate CUDA source code 2510 to HIP source code 2530. As depicted with bubble annotated C3, HIP compiler driver 2540 can receive HIP source code 2530 and can determine that target device 2546 is not CUDA-enabled.

HIP compiler driver 2540 may generate HIP/HCC compilation command 2544 and may transmit both HIP/HCC compilation command 2544 and HIP source code 2530 to HCC 2560 (depicted with bubble annotated C4). HIP/HCC compilation command 2544 can configure HCC 2560 to compile HIP source code 2530 using an HCC header and a HIP/HCC runtime library. HIP/HCC runtime library can correspond to HIP runtime API 2532. HCC header may include any number and type of interoperability mechanisms for HIP and HCC. In response to HIP/HCC compilation command 2544, HCC 2560 can generate host executable code 2570(2) and HCC device executable code 2582 (depicted with bubble annotated C5). As depicted with bubble annotated C6, host executable code 2570(2) and HCC device executable code 2582 may be executed on, respectively, CPU 2590 and GPU 2592.

After CUDA source code 2510 is translated to HIP source code 2530, HIP compiler driver 2540 may subsequently be used to generate executable code for either CUDA-enabled GPU 2594 or GPU 2592 without re-executing CUDA to HIP translation tool 2520. CUDA to HIP translation tool 2520 can translate CUDA source code 2510 to HIP source code 2530 that is then stored in memory. HIP compiler driver 2540 can then configure HCC 2560 to generate host executable code 2570(2) and HCC device executable code 2582 based on HIP source code 2530. In at least one embodiment, HIP compiler driver 2540 subsequently configures CUDA compiler 2550 to generate host executable code 2570(1) and CUDA device executable code 2584 based on stored HIP source code 2530.

An example kernel may be translated by CUDA-to-HIP translation tool 2520 of FIG. 25, in accordance with at least one embodiment. CUDA source code 2510 partitions an overall problem that a given kernel is designed to solve into relatively coarse sub-problems that can independently be solved using thread blocks. Each thread block includes any number of threads. Each sub-problem can be partitioned into relatively fine pieces that can be solved cooperatively in parallel by threads within a thread block. Threads within a thread block can cooperate by sharing data through shared memory and by synchronizing execution to coordinate memory accesses.

CUDA source code 2510 can organize thread blocks associated with a given kernel into a one-dimensional, a two-dimensional, or a three-dimensional grid of thread blocks. Each thread block includes any number of threads, and a grid includes any number of thread blocks.

A kernel can be a function in device code that is defined using a "_global_" declaration specifier. The dimension of a grid that executes a kernel for a given kernel call and associated streams may be specified using a CUDA kernel launch syntax. CUDA kernel launch syntax is specified as "KernelName<<<GridSize, BlockSize, SharedMemorySize, Stream>>>(KernelArguments);". An execution configuration syntax can include a "<<< . . . >>>" construct that is inserted between a kernel name ("KernelName") and a parenthesized list of kernel arguments ("KernelArguments"). CUDA kernel launch syntax can include a CUDA launch function syntax instead of an execution configuration syntax.

"GridSize" can be of a type dim3 and specify the dimension and size of a grid. Type dim3 may be a CUDA-defined structure that includes unsigned integers x, y, and z. If z is not specified, then z may default to one. If y is not specified, then y may default to one. The number of thread blocks in a grid can be equal to the product of GridSize.x, GridSize.y, and GridSize.z. "BlockSize" can be of type dim3 and specify the dimension and size of each thread block. The number of threads per thread block may be equal to the product of BlockSize.x, BlockSize.y, and BlockSize.z. Each thread that executes a kernel may be given a unique thread ID that is accessible within the kernel through a built-in variable (e.g., "threadIdx").

With respect to CUDA kernel launch syntax, "SharedMemorySize" may be an optional argument that may specify a number of bytes in a shared memory that is dynamically allocated per thread block for a given kernel call in addition to statically allocated memory. With respect to CUDA kernel launch syntax, SharedMemorySize may default to zero. With respect to CUDA kernel launch syntax, "Stream" may be an optional argument that specifies an associated stream and defaults to zero to specify a default stream. A stream may be a sequence of commands (possibly issued by different host threads) that execute in order. Different streams may execute commands out of order with respect to one another or concurrently.

CUDA source code 2510 may include a kernel definition for an example kernel "MatAdd" and a main function. Main function may be host code that executes on a host and includes a kernel call that causes kernel MatAdd to execute on a device. Kernel MatAdd can add two matrices A and B of size N×N, where N is a positive integer, and store the result in a matrix C. Main function can define a threadsPerBlock variable as 16 by 16 and a numBlocks variable as N/16 by N/16. Main function can then specify kernel call "MatAdd<<<numBlocks, threadsPerBlock>>>(A, B, C);". As per CUDA kernel launch syntax, kernel MatAdd can be executed using a grid of thread blocks having a dimension N/16 by N/16, where each thread block has a dimension of 16 by 16. Each thread block can include 256 threads, a grid can be created with enough blocks to have one thread per matrix element, and each thread in such a grid may execute kernel MatAdd to perform one pair-wise addition.

While translating CUDA source code 2510 to HIP source code 2530, CUDA to HIP translation tool 2520 may translate each kernel call in CUDA source code 2510 from CUDA kernel launch syntax to a HIP kernel launch syntax and may convert any number of other CUDA calls in source code 2510 to any number of other functionally similar HIP calls. HIP kernel launch syntax can be specified as “hipLaunchKernelGGL (KernelName, GridSize, BlockSize, SharedMemory Size, Stream, KernelArguments);”. Each of KernelName, GridSize, BlockSize, ShareMemorySize, Stream, and KernelArguments can have the same meaning in HIP kernel launch syntax as in CUDA kernel launch syntax (described previously herein). Arguments SharedMemorySize and Stream can be required in HIP kernel launch syntax and can be optional in CUDA kernel launch syntax.

A portion of HIP source code 2530 can be identical to a portion of CUDA source code 2510 depicted except for a kernel call that causes kernel MatAdd to execute on a device. Kernel MatAdd may be defined in HIP source code 2530 with the same “_global_” declaration specifier with which kernel MatAdd is defined in CUDA source code 2510. A kernel call in HIP source code 2530 may be “hipLaunchKernelGGL (MatAdd, numBlocks, threadsPerBlock, 0, 0, A, B, C);”, while a corresponding kernel call in CUDA source code 2510 is “MatAdd<<<numBlocks, threadsPerBlock>>> (A, B, C);”.

Other implementations are contemplated and can be performed similarly to the CUDA and HIP implementations above, such as oneAPI, OpenCL, and other programming platforms. Code can be translated in any direction. For example, CUDA can be translated to HIP, and CUDA can be translated to OpenCL. SnuCL-Tr and CUCL can be used to translate OpenCL to CUDA or CUDA to OpenCL, respectively. Compiled code or intermediate representations (e.g., CUDA PTX code) can also be translated to run on other processor platforms (e.g., AMD or Intel). For example, PTX code can be translated to run on Intel or AMD processors using a translation tool, such as ZLUDA.

One or more techniques described herein can utilize a oneAPI programming model. A oneAPI programming model can refer to a programming model for interacting with various compute accelerator architectures. OneAPI may refer to an application programming interface (API) designed to interact with various compute accelerator architectures. A oneAPI programming model may utilize a DPC++ programming language. A DPC++ programming language may refer to a high-level language for data parallel programming productivity. A DPC++ programming language can be based at least in part on C and/or C++ programming languages. A oneAPI programming model can be a programming model such as, but not limited to, those developed by Intel Corporation of Santa Clara, CA.

OneAPI and/or oneAPI programming model can be utilized to interact with various accelerator, GPU, processor, and/or variations thereof, architectures. OneAPI may include a set of libraries that implement various functionalities. OneAPI may include at least a oneAPI DPC++ library, a oneAPI math kernel library, a oneAPI data analytics library, a oneAPI deep neural network library, a oneAPI collective communications library, a oneAPI threading building blocks library, a oneAPI video processing library, and/or variations thereof.

A oneAPI DPC++ library, also referred to as oneDPL, can be a library that implements algorithms and functions to accelerate DPC++ kernel programming. OneDPL may implement one or more standard template library (STL) functions. OneDPL can implement one or more parallel STL functions. OneDPL can provide a set of library classes and functions such as, but not limited to, parallel algorithms, iterators, function object classes, range-based API, and/or variations thereof. OneDPL can implement one or more classes and/or functions of a C++ standard library. OneDPL can implement one or more random number generator functions.

A oneAPI math kernel library, also referred to as oneMKL, can be a library that implements various optimized and parallelized routines for various mathematical functions and/or operations. OneMKL can implement one or more basic linear algebra subprograms (BLAS) and/or linear algebra package (LAPACK) dense linear algebra routines. OneMKL may implement one or more sparse BLAS linear algebra routines. OneMKL can implement one or more random number generators (RNGs). OneMKL may implement one or more vector mathematics (VM) routines for mathematical operations on vectors. OneMKL may implement one or more Fast Fourier Transform (FFT) functions.

A oneAPI data analytics library, also referred to as oneDAL, can include a library that implements various data analysis applications and distributed computations. OneDAL can implement various algorithms for preprocessing, transformation, analysis, modeling, validation, and decision making for data analytics, in batch, online, and distributed processing modes of computation. OneDAL can implement various C++ and/or Java APIs and various connectors to one or more data sources. OneDAL may implement DPC++ API extensions to a traditional C++ interface and enables GPU usage for various algorithms.

A oneAPI deep neural network library, also referred to as oneDNN, can include a library that implements various deep learning functions. OneDNN may implement various neural network, machine learning, and deep learning functions, algorithms, and/or variations thereof.

A oneAPI collective communications library, also referred to as oneCCL, can include a library that implements various applications for deep learning and machine learning workloads. OneCCL can be built upon lower-level communication middleware, such as, but not limited to, message passing interface (MPI) and libfabrics. OneCCL can enable a set of deep learning specific optimizations, such as, but not limited to, prioritization, persistent operations, out of order executions, and/or variations thereof. OneCCL can implement various CPU and GPU functions.

A oneAPI threading building blocks library, also referred to as oneTBB, can include a library that implements various parallelized processes for various applications. OneTBB can be utilized for task-based, shared parallel programming on a host. OneTBB may implement generic parallel algorithms. OneTBB may implement concurrent containers. OneTBB may implement a scalable memory allocator. OneTBB may implement a work-stealing task scheduler. OneTBB may implement low-level synchronization primitives. OneTBB may be compiler-independent and usable on various processors, such as, but not limited to, GPUs, PPUs, CPUs, and/or variations thereof.

A oneAPI video processing library, also referred to as oneVPL, can include a library that is utilized for accelerating video processing in one or more applications. OneVPL can implement various video decoding, encoding, and processing functions. OneVPL can implement various functions for media pipelines on CPUs, GPUs, and other accelerators. OneVPL can implement device discovery and selection in media centric and video analytics workloads. OneVPL can implement API primitives for zero-copy buffer sharing.

A oneAPI programming model may utilize a DPC++ programming language. A DPC++ programming language can include a programming language that can include functionally similar versions of CUDA mechanisms to define device code and distinguish between device code and host code. A DPC++ programming language may include a subset of functionality of a CUDA programming language. One or more CUDA programming model operations may be performed using a oneAPI programming model using a DPC++ programming language.

Any application programming interface (API) described herein can be compiled into one or more instructions, operations, or any other signal by a compiler, interpreter, or other software tool. Compilation can include generating one or more machine-executable instructions, operations, or other signals from source code. An API compiled into one or more instructions, operations, or other signals, when performed, can cause one or more processors such as, but not limited to, processors described, e.g., in FIGS. 10-22, or any other logic circuit further described herein to perform one or more computing operations.

In at least one embodiment, translation tools described elsewhere herein, such as, but not limited to, can include one or more circuits to translate CUDA code to use one or more indices comprising a plurality of bits, each indicating one or more operands stored contiguously based, at least in part, on a precision of the one or more operands, to HIP, oneAPI, OpenCL, or any other language used to perform any of the operations described above or elsewhere herein. In at least one embodiment, one or more circuits can be configured by software to translate CUDA code to use one or more indices comprising a plurality of bits, each indicating one or more operands stored contiguously based, at least in part, on a precision of the one or more operands, to HIP, oneAPI, OpenCL, or any other language used to perform any of the operations described above or elsewhere herein.

Autonomous Vehicle

FIG. 26 illustrates an example of an autonomous vehicle 2600, in accordance with at least one embodiment. Autonomous vehicle 2600 (alternatively referred to herein as "vehicle 2600") may be a passenger vehicle, such as, but not limited to, a car, a truck, a bus, and/or another type of vehicle that accommodates one or more passengers. In at least one embodiment, vehicle 2600 may be a semi-tractor-trailer truck used for hauling cargo. Vehicle 2600 may be an airplane, robotic vehicle, or other kind of vehicle.

Autonomous vehicles may be described in terms of automation levels, defined by National Highway Traffic Safety Administration ("NHTSA"), a division of US Department of Transportation, and Society of Automotive Engineers ("SAE") "Taxonomy and Definitions for Terms Related to Driving Automation Systems for On-Road Motor Vehicles" (e.g., Standard No. J3016-201806, published on Jun. 15, 2018, Standard No. J3016-201609, published on Sep. 30, 2016, and previous and future versions of this standard). In at least one embodiment, vehicle 2600 may be capable of functionality in accordance with one or more of Level 1 through Level 5 of autonomous driving levels. For example, in at least one embodiment, vehicle 2600 may be capable of conditional automation (Level 3), high automation (Level 4), and/or full automation (Level 5), depending on embodiment.

Vehicle 2600 may include components such as, but not limited to, a chassis, a vehicle body, wheels (e.g., 2, 4, 6, 8, 18, etc.), tires, axles, and other components of a vehicle. Vehicle 2600 may include a propulsion system 2650, such as, but not limited to, an internal combustion engine, hybrid electric power plant, an all-electric engine, and/or another propulsion system type. Propulsion system 2650 may be connected to a drive train of vehicle 2600, which may include a transmission, to enable propulsion of vehicle 2600. Propulsion system 2650 may be controlled in response to receiving signals from a throttle/accelerator(s) 2652.

A steering system 2654, which may include a steering wheel, is used to steer vehicle 2600 (e.g., along a desired path or route) when propulsion system 2650 is operating (e.g., when vehicle 2600 is in motion). Steering system 2654 may receive signals from steering actuator(s) 2656. A steering wheel may be optional for full automation (Level 5) functionality. A brake sensor system 2646 may be used to operate vehicle brakes in response to receiving signals from brake actuator(s) 2648 and/or brake sensors.

Controller(s) 2636, which may include one or more system on chips ("SoCs") and/or graphics processing unit(s) ("GPU(s)"), can provide signals (e.g., representative of commands) to one or more components and/or systems of vehicle 2600. For instance, controller(s) 2636 may send signals to operate vehicle brakes via brake actuator(s) 2648, to operate steering system 2654 via steering actuator(s) 2656, to operate propulsion system 2650 via throttle/accelerator(s) 2652. Controller(s) 2636 may include one or more onboard (e.g., integrated) computing devices that process sensor signals, and output operation commands (e.g., signals representing commands) to enable autonomous driving and/or to assist a human driver in driving vehicle 2600. Controller(s) 2636 may include a first controller for autonomous driving functions, a second controller for functional safety functions, a third controller for artificial intelligence functionality (e.g., computer vision), a fourth controller for infotainment functionality, a fifth controller for redundancy in emergency conditions, and/or other controllers. A single controller may handle two or more of above functionalities, two or more controllers may handle a single functionality, and/or any combination thereof.

Controller(s) 2636 may provide signals for controlling one or more components and/or systems of vehicle 2600 in response to sensor data received from one or more sensors (e.g., sensor inputs). Sensor data may be received from, for example, global navigation satellite systems ("GNSS") sensor(s) 2658 (e.g., Global Positioning System sensor(s)), RADAR sensor(s) 2660, ultrasonic sensor(s) 2662, LIDAR sensor(s) 2664, inertial measurement unit ("IMU") sensor(s) 2666 (e.g., accelerometer(s), gyroscope(s), a magnetic compass or magnetic compasses, magnetometer(s), etc.), microphone(s) 2696, stereo camera(s) 2668, wide-view camera(s) 2670 (e.g., fisheye cameras), infrared camera(s) 2672, surround camera(s) 2674 (e.g., 360 degree cameras), long-range cameras 2698, mid-range camera(s) 2676, speed sensor(s) 2644 (e.g., for measuring speed of vehicle 2600), vibration sensor(s) 2642, steering sensor(s) 2640, brake sensor(s) (e.g., as part of brake sensor system 2646), and/or other sensor types.

One or more of controller(s) 2636 may receive inputs (e.g., represented by input data) from an instrument cluster 2632 of vehicle 2600 and provide outputs (e.g., represented by output data, display data, etc.) via a human-machine interface ("HMI") display 2634, an audible annunciator, a loudspeaker, and/or via other components of vehicle 2600. Outputs may include information such as, but not limited to, vehicle velocity, speed, time, map data (e.g., a High Definition map (not shown), location data (e.g., vehicle's 2600 location, such as, but not limited to, on a map), direction, location of other vehicles (e.g., an occupancy grid), information about objects and status of objects as perceived by controller(s) 2636, etc. For example, HMI display 2634 may display information about presence of one or more objects (e.g., a street sign, caution sign, traffic light changing, etc.), and/or information about driving maneuvers vehicle has made, is making, or will make (e.g., changing lanes now, taking exit 34B in two miles, etc.).

Each of components, features, and systems of vehicle 2600 in FIG. 26 may be connected via a bus 2602. Bus 2602 may include a CAN data interface (alternatively referred to herein as a "CAN bus"). A CAN may be a network inside vehicle 2600 used to aid in control of various features and functionality of vehicle 2600, such as, but not limited to, actuation of brakes, acceleration, braking, steering, windshield wipers, etc. Bus 2602 may be configured to have dozens or even hundreds of nodes, each with its own unique identifier (e.g., a CAN ID). Bus 2602 may be read to find steering wheel angle, ground speed, engine revolutions per minute ("RPMs"), button positions, and/or other vehicle status indicators. Bus 2602 may be a CAN bus that is ASIL B compliant.

In addition to, or alternatively from CAN, FlexRay and/or Ethernet protocols may be used. There may be any number of busses forming bus 2602, which may include zero or more CAN busses, zero or more FlexRay busses, zero or more Ethernet busses, and/or zero or more other types of busses using different protocols. Two or more busses may be used to perform different functions, and/or may be used for redundancy. For example, a first bus may be used for collision avoidance functionality and a second bus may be used for actuation control. Each bus of bus 2602 may communicate with any of components of vehicle 2600, and two or more busses of bus 2602 may communicate with corresponding components. Each of any number of system(s) on chip(s) ("SoC(s)") 2604 (such as, but not limited to, SoC 2604(A) and SoC 2604(B)), each of controller(s) 2636, and/or each computer within vehicle may have access to same input data (e.g., inputs from sensors of vehicle 2600), and may be connected to a common bus, such CAN bus.

Any number of cameras can be positioned at any choice of camera locations and fields of view for autonomous vehicle 2600 of FIG. 26A, in accordance with at least one embodiment. Cameras and respective fields of view may be one example embodiment and are not intended to be limiting. For instance, additional and/or alternative cameras may be included and/or cameras may be located at different locations on vehicle 2600.

Camera types for cameras may include digital cameras that may be adapted for use with components and/or systems of vehicle 2600. Camera(s) may operate at automotive safety integrity level ("ASIL") B and/or at another ASIL. Camera types may be capable of any image capture rate, such as, but not limited to, 60 frames per second (fps), 1220 fps, 240 fps, etc., depending on embodiment. Cameras may be capable of using rolling shutters, global shutters, another type of shutter, or a combination thereof. In at least one embodiment, color filter array may include a red clear clear clear ("RCCC") color filter array, a red clear clear blue ("RCCB") color filter array, a red blue green clear ("RBGC") color filter array, a Foveon X3 color filter array, a Bayer sensors ("RGGB") color filter array, a monochrome sensor color filter array, and/or another type of color filter array. Clear pixel cameras, such as, but not limited to, cameras with an RCCC, an RCCB, and/or an RBGC color filter array, may be used in an effort to increase light sensitivity.

One or more of camera(s) may be used to perform advanced driver assistance systems ("ADAS") functions (e.g., as part of a redundant or fail-safe design). For example, a Multi-Function Mono Camera may be installed to provide functions including lane departure warning, traffic sign assist and intelligent headlamp control. One or more of camera(s) (e.g., all cameras) may record and provide image data (e.g., video) simultaneously.

One or more cameras may be mounted in a mounting assembly, such as, but not limited to, a custom designed (three-dimensional ("3D") printed) assembly, in order to cut out stray light and reflections from within vehicle 2600 (e.g., reflections from dashboard reflected in windshield mirrors) which may interfere with camera image data capture abilities. With reference to wing-mirror mounting assemblies, wing-mirror assemblies may be custom 3D printed so that a camera mounting plate matches a shape of a wing-mirror. Camera(s) may be integrated into wing-mirrors. For side-view cameras, camera(s) may also be integrated within four pillars at each corner of a cabin.

Cameras with a field of view that include portions of an environment in front of vehicle 2600 (e.g., front-facing cameras) may be used for surround view, to help identify forward facing paths and obstacles, as well as aid in, with help of one or more of controller(s) 2636 and/or control SoCs, providing information critical to generating an occupancy grid and/or determining preferred vehicle paths. Front-facing cameras may be used to perform many similar ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as, but not limited to, traffic sign recognition.

A variety of cameras may be used in a front-facing configuration, including, for example, a monocular camera platform that includes a CMOS ("complementary metal oxide semiconductor") color imager. A wide-view camera 2670 may be used to perceive objects coming into view from a periphery (e.g., pedestrians, crossing traffic or bicycles). There may be any number (including zero) wide-view cameras 2670 on vehicle 2600. Any number of long-range camera(s) 2698 (e.g., a long-view stereo camera pair) may be used for depth-based object detection, especially for objects for which a neural network has not yet been trained. Long-range camera(s) 2698 may also be used for object detection and classification, as well as basic object tracking.

Any number of stereo camera(s) 2668 may also be included in a front-facing configuration. One or more of stereo camera(s) 2668 may include an integrated control unit comprising a scalable processing unit, which may provide a programmable logic ("FPGA") and a multi-core microprocessor with an integrated Controller Area Network ("CAN") or Ethernet interface on a single chip. Such a unit may be used to generate a 3D map of an environment of vehicle 2600, including a distance estimate for all points in an image. One or more of stereo camera(s) 2668 may include compact stereo vision sensor(s) that may include two camera lenses (one each on left and right) and an image processing chip that may measure distance from vehicle 2600 to target object and use generated information (e.g., metadata) to activate autonomous emergency braking and lane departure warning functions. Other types of stereo camera(s) 2668 may be used in addition to, or alternatively from, those described herein.

Cameras with a field of view that include portions of environment to sides of vehicle 2600 (e.g., side-view cameras) may be used for surround view, providing information used to create and update an occupancy grid, as well as to generate side impact collision warnings. For example, surround camera(s) 2674 (e.g., four surround cameras) could be positioned on vehicle 2600. Surround camera(s) 2674 may include any number and combination of wide-view cameras, fisheye camera(s), 360 degree camera(s), and/or similar cameras. For instance, four fisheye cameras may be positioned on a front, a rear, and sides of vehicle 2600. Vehicle 2600 may use three surround camera(s) 2674 (e.g., left, right, and rear), and may leverage one or more other camera(s) (e.g., a forward-facing camera) as a fourth surround-view camera.

Cameras with a field of view that include portions of an environment behind vehicle 2600 (e.g., rear-view cameras) may be used for parking assistance, surround view, rear collision warnings, and creating and updating an occupancy grid. A wide variety of cameras may be used including, but not limited to, cameras that may be also suitable as a front-facing camera(s) (e.g., long-range cameras 2698 and/or mid-range camera(s) 2676, stereo camera(s) 2668, infrared camera(s) 2672, etc.,) as described herein.

Vehicle 2600 may include any number of SoCs 2604 or other processors described elsewhere herein, such as, but not limited to, processors and/or components illustrated and described for FIGS. 10-22. Each of SoCs 2604 may include central processing units ("CPU(s)") 2606, graphics processing units ("GPU(s)") 2608, processor(s) 2610, cache(s) 2612, accelerator(s) 2614, data store(s) 2616, and/or other components and features not illustrated. SoC(s) 2604 may be used to control vehicle 2600 in a variety of platforms and systems. For example, SoC(s) 2604 may be combined in a system (e.g., system of vehicle 2600) with a High Definition ("HD") map 2622 which may obtain map refreshes and/or updates via network interface 2624 from one or more servers (not shown).

CPU(s) 2606 may include a CPU cluster or CPU complex (alternatively referred to herein as a "CCPLEX"). CPU(s) 2606 may include multiple cores and/or level two ("L2") caches. For instance, CPU(s) 2606 may include eight cores in a coherent multi-processor configuration. CPU(s) 2606 may include four dual-core clusters where each cluster has a dedicated L2 cache (e.g., a 2 megabyte (MB) L2 cache). CPU(s) 2606 (e.g., CCPLEX) may be configured to support simultaneous cluster operations enabling any combination of clusters of CPU(s) 2606 to be active at any given time.

One or more of CPU(s) 2606 may implement power management capabilities that include one or more of following features: individual hardware blocks may be clock-gated automatically when idle to save dynamic power; each core clock may be gated when such core is not actively executing instructions due to execution of Wait for Interrupt ("WFI")/Wait for Event ("WFE") instructions; each core may be independently power-gated; each core cluster may be independently clock-gated when all cores may be clock-gated or power-gated; and/or each core cluster may be independently power-gated when all cores may be power-gated. CPU(s) 2606 may further implement an enhanced algorithm for managing power states, where allowed power states and expected wakeup times may be specified, and hardware/microcode determines which best power state to enter for core, cluster, and CCPLEX. Processing cores may support simplified power state entry sequences in software with work offloaded to microcode.

GPU(s) 2608 may include an integrated GPU (alternatively referred to herein as an "iGPU"). GPU(s) 2608 may be programmable and may be efficient for parallel workloads. GPU(s) 2608 may use an enhanced tensor instruction set. GPU(s) 2608 may include one or more streaming microprocessors, where each streaming microprocessor may include a level one ("L1") cache (e.g., an L1 cache with at least 96 KB storage capacity), and two or more streaming microprocessors may share an L2 cache (e.g., an L2 cache with a 512 KB storage capacity). GPU(s) 2608 may include at least eight streaming microprocessors. GPU(s) 2608 may use compute application programming interface(s) (API(s)). GPU(s) 2608 may use one or more parallel computing platforms and/or programming models (e.g., NVIDIA's CUDA model). Streaming microprocessors may be referred to as streaming multiprocessors ("SMs"), stream processors ("SPs"), stream processing units ("SPUs"), compute units ("CUs"), execution units ("EUs"), and/or slices, where a slice in this context can refer to a portion of processing resources in a processing unit (e.g., 16 cores, a ray tracing unit, a thread director or scheduler).

One or more of GPU(s) 2608 may be power-optimized for best performance in automotive and embedded use cases. For example, GPU(s) 2608 could be fabricated on Fin field-effect transistor ("FinFET") circuitry. Each streaming microprocessor may incorporate a number of mixed-precision processing cores partitioned into multiple blocks. For example, 64 PF32 cores and 32 FP64 cores could be partitioned into four processing blocks. Each processing block could be allocated 16 FP32 cores, 8 FP64 cores, 16 INT32 cores, two mixed-precision NVIDIA Tensor cores for deep learning matrix arithmetic, a level zero ("L0") instruction cache, a scheduler (e.g., warp scheduler) or sequencer, a dispatch unit, and/or a 64 KB register file. Streaming microprocessors may include independent parallel integer and floating-point data paths to provide for efficient execution of workloads with a mix of computation and addressing calculations. Streaming microprocessors may include independent thread scheduling capability to enable finer-grain synchronization and cooperation between parallel threads. Streaming microprocessors may include a combined L1 data cache and shared memory unit in order to improve performance while simplifying programming.

One or more of GPU(s) 2608 may include a high bandwidth memory ("HBM") and/or a 16 GB HBM2 memory subsystem to provide, in some examples, about 900 GB/second peak memory bandwidth. In addition to, or alternatively from, HBM memory, a synchronous graphics random-access memory ("SGRAM") may be used, such as, but not limited to, a graphics double data rate type five synchronous random-access memory ("GDDR5").

GPU(s) 2608 may include unified memory technology. Address translation services ("ATS") support may be used to allow GPU(s) 2608 to access CPU(s) 2606 page tables directly. When a GPU of GPU(s) 2608 memory management unit ("MMU") experiences a miss, an address translation request may be transmitted to CPU(s) 2606. In response, 2 CPU of CPU(s) 2606 may look in its page tables for a virtual-to-physical mapping for an address and transmit translation back to GPU(s) 2608. Unified memory technology may allow a single unified virtual address space for memory of both CPU(s) 2606 and GPU(s) 2608, thereby simplifying GPU(s) 2608 programming and porting of applications to GPU(s) 2608.

GPU(s) 2608 may include any number of access counters that may keep track of frequency of access of GPU(s) 2608 to memory of other processors. Access counter(s) may help ensure that memory pages may be moved to physical memory of a processor that is accessing pages most frequently, thereby improving efficiency for memory ranges shared between processors.

One or more of SoC(s) 2604 may include any number of cache(s) 2612, including those described herein. For example, cache(s) 2612 could include a level three ("L3") cache that is available to both CPU(s) 2606 and GPU(s) 2608 (e.g., that is connected to CPU(s) 2606 and GPU(s)

2608). Cache(s) 2612 may include a write-back cache that may keep track of states of lines, such as, but not limited to, by using a cache coherence protocol (e.g., MEI, MESI, MSI, etc.). A L3 cache may include 4 MB of memory or more, depending on embodiment, although smaller cache sizes may be used.

One or more of SoC(s) 2604 may include one or more accelerator(s) 2614 (e.g., hardware accelerators, software accelerators, or a combination thereof). SoC(s) 2604 may include a hardware acceleration cluster that may include optimized hardware accelerators and/or large on-chip memory. Large on-chip memory (e.g., 4 MB of SRAM), may enable a hardware acceleration cluster to accelerate neural networks and other calculations. A hardware acceleration cluster may be used to complement GPU(s) 2608 and to off-load some of tasks of GPU(s) 2608 (e.g., to free up more cycles of GPU(s) 2608 for performing other tasks). Accelerator(s) 2614 could be used for targeted workloads (e.g., perception, convolutional neural networks ("CNNs"), recurrent neural networks ("RNNs"), etc.) that may be stable enough to be amenable to acceleration. A CNN may include a region-based or regional convolutional neural networks ("RCNNs") and Fast RCNNs (e.g., as used for object detection) or other type of CNN.

Accelerator(s) 2614 (e.g., hardware acceleration cluster) may include one or more deep learning accelerator ("DLA"). DLA(s) may include one or more Tensor processing units ("TPUs") that may be configured to provide an additional ten trillion operations per second for deep learning applications and inferencing, such as TPU(s) described herein, e.g., in FIG. 20. TPUs may be accelerators configured to, and optimized for, performing image processing functions (e.g., for CNNs, RCNNs, etc.). DLA(s) may further be optimized for a specific set of neural network types and floating point operations, as well as inferencing. Design of DLA(s) may provide more performance per millimeter than a typical general-purpose GPU, and typically vastly exceeds performance of a CPU. TPU(s) may perform several functions, including a single-instance convolution function, supporting, for example, INT8, INT16, and FP16 data types for both features and weights, as well as post-processor functions. DLA(s) may quickly and efficiently execute neural networks, especially CNNs, on processed or unprocessed data for any of a variety of functions, including, for example: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

DLA(s) may perform any function of GPU(s) 2608, and by using an inference accelerator, for example, a designer may target either DLA(s) or GPU(s) 2608 for any function. For example, a designer may focus processing of CNNs and floating point operations on DLA(s) and leave other functions to GPU(s) 2608 and/or accelerator(s) 2614.

Accelerator(s) 2614 may include programmable vision accelerator ("PVA"), which may alternatively be referred to herein as a computer vision accelerator. PVA may be designed and configured to accelerate computer vision algorithms for advanced driver assistance system ("ADAS") 2638, autonomous driving, augmented reality ("AR") applications, and/or virtual reality ("VR") applications. PVA may provide a balance between performance and flexibility. For example, each PVA may include, for example, any number of reduced instruction set computer ("RISC") cores, direct memory access ("DMA"), and/or any number of vector processors.

RISC cores may interact with image sensors (e.g., image sensors of any cameras described herein), image signal processor(s), etc. Each RISC core may include any amount of memory. RISC cores may use any of a number of protocols, depending on embodiment. RISC cores may execute a real-time operating system ("RTOS"). RISC cores may be implemented using one or more integrated circuit devices, application specific integrated circuits ("ASICs"), and/or memory devices. For example, RISC cores could include an instruction cache and/or a tightly coupled RAM.

DMA may enable components of PVA to access system memory independently of CPU(s) 2606. DMA may support any number of features used to provide optimization to a PVA including supporting multi-dimensional addressing and/or circular addressing. DMA may support up to six or more dimensions of addressing, which may include block width, block height, block depth, horizontal block stepping, vertical block stepping, and/or depth stepping.

Vector processors may be programmable processors that may be designed to efficiently and flexibly execute programming for computer vision algorithms and provide signal processing capabilities. A PVA may include a PVA core and two vector processing subsystem partitions. A PVA core may include a processor subsystem, DMA engine(s) (e.g., two DMA engines), and/or other peripherals. A vector processing subsystem may operate as a primary processing engine of a PVA, and may include a vector processing unit ("VPU"), an instruction cache, and/or vector memory (e.g., "VMEM"). VPU core may include a digital signal processor such as, but not limited to, a single instruction, multiple data ("SIMD"), very long instruction word ("VLIW") digital signal processor. A combination of SIMD and VLIW may enhance throughput and speed.

Each of vector processors may include an instruction cache and may be coupled to dedicated memory. As a result, each of vector processors may be configured to execute independently of other vector processors. Vector processors that may be included in a particular PVA may be configured to employ data parallelism. For instance, plurality of vector processors included in a single PVA may execute a common computer vision algorithm, but on different regions of an image. Vector processors included in a particular PVA may simultaneously execute different computer vision algorithms, on one image, or even execute different algorithms on sequential images or portions of an image. Among other things, any number of PVAs may be included in hardware acceleration cluster and any number of vector processors may be included in each PVA. PVA may include additional error correcting code ("ECC") memory, to enhance overall system safety.

Accelerator(s) 2614 may include a computer vision network on-chip and static random-access memory ("SRAM"), for providing a high-bandwidth, low latency SRAM for accelerator(s) 2614. On-chip memory may include at least 4 MB SRAM, including, for example, eight field-configurable memory blocks, that may be accessible by both a PVA and a DLA. Each pair of memory blocks may include an advanced peripheral bus ("APB") interface, configuration circuitry, a controller, and a multiplexer. Any type of memory may be used. A PVA and a DLA may access memory via a backbone that provides a PVA and a DLA with high-speed access to memory. A backbone may include a computer vision network on-chip that interconnects a PVA and a DLA to memory (e.g., using APB).

A computer vision network on-chip may include an interface that determines, before transmission of any control signal/address/data, that both a PVA and a DLA provide ready and valid signals. An interface may provide for separate phases and separate channels for transmitting control signals/addresses/data, as well as burst-type communications for continuous data transfer. An interface may comply with International Organization for Standardization ("ISO") 26262 or International Electrotechnical Commission ("IEC") 61508 standards, although other standards and protocols may be used.

One or more of SoC(s) 2604 may include a real-time ray-tracing hardware accelerator. Real-time ray-tracing hardware accelerator may be used to quickly and efficiently determine positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

Accelerator(s) 2614 can have a wide array of uses for autonomous driving. A PVA may be used for key processing stages in ADAS and autonomous vehicles. A PVA's capabilities may be a good match for algorithmic domains needing predictable processing, at low power and low latency. In other words, a PVA can perform well on semi-dense or dense regular computation, even on small data sets, which might require predictable run-times with low latency and low power. In vehicle 2600, PVAs might be designed to run classic computer vision algorithms, as they can be efficient at object detection and operating on integer math. For example, a PVA is used to perform computer stereo vision. A semi-global matching-based algorithm may be used in some examples, although this is not intended to be limiting. Applications for Level 3-5 autonomous driving use motion estimation/stereo matching on-the-fly (e.g., structure from motion, pedestrian recognition, lane detection, etc.). A PVA may perform computer stereo vision functions on inputs from two monocular cameras. A PVA may be used to perform dense optical flow. For example, a PVA could process raw RADAR data (e.g., using a 4D Fast Fourier Transform) to provide processed RADAR data. A PVA is used for time of flight depth processing, by processing raw time of flight data to provide processed time of flight data, for example.

A DLA may be used to run any type of network to enhance control and driving safety, including, for example, a neural network that outputs a measure of confidence for each object detection. Confidence may be represented or interpreted as a probability, or as providing a relative "weight" of each detection compared to other detections. A confidence measure enables a system to make further decisions regarding which detections should be considered as true positive detections rather than false positive detections. A system may set a threshold value for confidence and consider only detections exceeding threshold value as true positive detections. When an automatic emergency braking ("AEB") system is used, false positive detections can cause vehicle to automatically perform emergency braking, which is obviously undesirable. Highly confident detections may be considered as triggers for AEB. a DLA may run a neural network for regressing confidence value. A neural network may take as its input at least some subset of parameters, such as, but not limited to, bounding box dimensions, ground plane estimate obtained (e.g., from another subsystem), output from IMU sensor(s) 2666 that correlates with vehicle 2600 orientation, distance, 3D location estimates of object obtained from neural network and/or other sensors (e.g., LIDAR sensor(s) 2664 or RADAR sensor(s) 2660), among others.

One or more of SoC(s) 2604 may include data store(s) 2616 (e.g., memory). Data store(s) 2616 may be on-chip memory of SoC(s) 2604, which may store neural networks to be executed on GPU(s) 2608 and/or a DLA. Data store(s) 2616 may be large enough in capacity to store multiple instances of neural networks for redundancy and safety. Data store(s) 2616 may comprise L2 or L3 cache(s).

One or more of SoC(s) 2604 may include any number of processor(s) 2610 (e.g., embedded processors). Processor(s) 2610 may include a boot and power management processor that may be a dedicated processor and subsystem to handle boot power and management functions and related security enforcement. A boot and power management processor may be a part of a boot sequence of SoC(s) 2604 and may provide runtime power management services. A boot power and management processor may provide clock and voltage programming, assistance in system low power state transitions, management of SoC(s) 2604 thermals and temperature sensors, and/or management of SoC(s) 2604 power states. Each temperature sensor may be implemented as a ring-oscillator whose output frequency is proportional to temperature, and SoC(s) 2604 may use ring-oscillators to detect temperatures of CPU(s) 2606, GPU(s) 2608, and/or accelerator(s) 2614. If temperatures may be determined to exceed a threshold, then a boot and power management processor may enter a temperature fault routine and put SoC(s) 2604 into a lower power state and/or put vehicle 2600 into a chauffeur to safe stop mode (e.g., bring vehicle 2600 to a safe stop).

Processor(s) 2610 may further include a set of embedded processors that may serve as an audio processing engine which may be an audio subsystem that enables full hardware support for multi-channel audio over multiple interfaces, and a broad and flexible range of audio I/O interfaces. An audio processing engine is a dedicated processor core with a digital signal processor with dedicated RAM.

Processor(s) 2610 may further include an always-on processor engine that may provide necessary hardware features to support low power sensor management and wake use cases. An always-on processor engine may include a processor core, a tightly coupled RAM, supporting peripherals (e.g., timers and interrupt controllers), various I/O controller peripherals, and routing logic.

Processor(s) 2610 may further include a safety cluster engine that may include a dedicated processor subsystem to handle safety management for automotive applications. A safety cluster engine may include two or more processor cores, a tightly coupled RAM, support peripherals (e.g., timers, an interrupt controller, etc.), and/or routing logic. In a safety mode, two or more cores may operate, in a lockstep mode and function as a single core with comparison logic to detect any differences between their operations. Processor(s) 2610 may further include a real-time camera engine that may include a dedicated processor subsystem for handling real-time camera management. Processor(s) 2610 may further include a high-dynamic range signal processor that may include an image signal processor that is a hardware engine that is part of a camera processing pipeline.

Processor(s) 2610 may include a video image compositor that may be a processing block (e.g., implemented on a microprocessor) that implements video post-processing functions needed by a video playback application to produce a final image for a player window. A video image compositor may perform lens distortion correction on wide-view camera(s) 2670, surround camera(s) 2674, and/or on in-cabin monitoring camera sensor(s). In-cabin monitoring camera sensor(s) may be preferably monitored by a neural network running on another instance of SoC 2604, configured to identify in cabin events and respond accordingly. An in-cabin system may perform lip reading to activate cellular service and place a phone call, dictate emails, change a vehicle's destination, activate or change a vehicle's infotainment system and settings, or provide voice-activated web surfing. Certain functions may be available to a driver when a vehicle is operating in an autonomous mode and may be disabled otherwise.

A video image compositor may include enhanced temporal noise reduction for both spatial and temporal noise reduction. For example, where motion occurs in a video, noise reduction weights spatial information appropriately, decreasing weights of information provided by adjacent frames. Where an image or portion of an image does not include motion, temporal noise reduction performed by video image compositor may use information from a previous image to reduce noise in a current image.

A video image compositor may also be configured to perform stereo rectification on input stereo lens frames. A video image compositor may further be used for user interface composition when an operating system desktop is in use, and GPU(s) 2608 may not be required to continuously render new surfaces. When GPU(s) 2608 are powered on and active doing 3D rendering, a video image compositor may be used to offload GPU(s) 2608 to improve performance and responsiveness.

One or more SoC of SoC(s) 2604 may further include a mobile industry processor interface ("MIPI") camera serial interface for receiving video and input from cameras, a high-speed interface, and/or a video input block that may be used for a camera and related pixel input functions. One or more of SoC(s) 2604 may further include an input/output controller(s) that may be controlled by software and may be used for receiving I/O signals that may be uncommitted to a specific role.

One or more SoC of SoC(s) 2604 may further include a broad range of peripheral interfaces to enable communication with peripherals, audio encoders/decoders ("codecs"), power management, and/or other devices. SoC(s) 2604 may be used to process data from cameras (e.g., connected over Gigabit Multimedia Serial Link and Ethernet channels), sensors (e.g., LIDAR sensor(s) 2664, RADAR sensor(s) 2660, etc. that may be connected over Ethernet channels), data from bus 2602 (e.g., speed of vehicle 2600, steering wheel position, etc.), data from GNSS sensor(s) 2658 (e.g., connected over a Ethernet bus or a CAN bus), etc. One or more SoC of SoC(s) 2604 may further include dedicated high-performance mass storage controllers that may include their own DMA engines, and that may be used to free CPU(s) 2606 from routine data management tasks.

SoC(s) 2604 may be an end-to-end platform with a flexible architecture that spans automation Levels 3-5, thereby providing a comprehensive functional safety architecture that leverages and makes efficient use of computer vision and ADAS techniques for diversity and redundancy, and provides a platform for a flexible, reliable driving software stack, along with deep learning tools. SoC(s) 2604 may be faster, more reliable, and even more energy-efficient and space-efficient than conventional systems. For example, accelerator(s) 2614, when combined with CPU(s) 2606, GPU(s) 2608, and data store(s) 2616, may provide for a fast, efficient platform for Level 3-5 autonomous vehicles.

Computer vision algorithms may be executed on CPUs, which may be configured using a high-level programming language, such as, but not limited to, C, to execute a wide variety of processing algorithms across a wide variety of visual data. However, CPUs may be oftentimes unable to meet performance requirements of many computer vision applications, such as, but not limited to, those related to execution time and power consumption, for example. Many CPUs may be unable to execute complex object detection algorithms in real-time, which is used in in-vehicle ADAS applications and in practical Level 3-5 autonomous vehicles.

Embodiments described herein allow for multiple neural networks to be performed simultaneously and/or sequentially, and for results to be combined together to enable Level 3-5 autonomous driving functionality. For example, a CNN executing on a DLA or a discrete GPU (e.g., GPU(s) 2620) may include text and word recognition, allowing reading and understanding of traffic signs, including signs for which a neural network has not been specifically trained. A DLA may further include a neural network that is able to identify, interpret, and provide semantic understanding of a sign, and to pass that semantic understanding to path planning modules running on a CPU Complex.

Multiple neural networks may be run simultaneously, as for Level 3, 4, or 5 driving. For example, a warning sign stating "Caution: flashing lights indicate icy conditions," along with an electric light, may be independently or collectively interpreted by several neural networks. Such warning sign itself may be identified as a traffic sign by a first deployed neural network (e.g., a neural network that has been trained), text "flashing lights indicate icy conditions" may be interpreted by a second deployed neural network, which informs a vehicle's path planning software (preferably executing on a CPU Complex) that when flashing lights may be detected, icy conditions exist. A flashing light may be identified by operating a third deployed neural network over multiple frames, informing a vehicle's path-planning software of a presence (or an absence) of flashing lights. All three neural networks may run simultaneously, such as, but not limited to, within a DLA and/or on GPU(s) 2608.

A CNN for facial recognition and vehicle owner identification may use data from camera sensors to identify presence of an authorized driver and/or owner of vehicle 2600. An always-on sensor processing engine may be used to unlock a vehicle when an owner approaches a driver door and turns on lights, and, in a security mode, to disable such vehicle when an owner leaves such vehicle. In this way, SoC(s) 2604 can provide for security against theft and/or carjacking.

A CNN for emergency vehicle detection and identification may use data from microphones 2696 to detect and identify emergency vehicle sirens. SoC(s) 2604 use a CNN for classifying environmental and urban sounds, as well as classifying visual data. A CNN running on a DLA is trained to identify a relative closing speed of an emergency vehicle (e.g., by using a Doppler effect). A CNN may also be trained to identify emergency vehicles specific to a local area in which a vehicle is operating, as identified by GNSS sensor(s) 2658. When operating in Europe, a CNN may seek to detect European sirens, and when in North America, a CNN may seek to identify only North American sirens. Once an emergency vehicle is detected, a control program may be used to execute an emergency vehicle safety routine, slowing a vehicle, pulling over to a side of a road, parking a vehicle, and/or idling a vehicle, with assistance of ultrasonic sensor(s) 2662, until emergency vehicles pass.

Vehicle 2600 may include CPU(s) 2618 (e.g., discrete CPU(s), or dCPU(s)), that may be coupled to SoC(s) 2604 via a high-speed interconnect (e.g., PCIe). CPU(s) 2618 may include an X86 processor, for example. CPU(s) 2618 may be used to perform any of a variety of functions, including arbitrating potentially inconsistent results between ADAS sensors and SoC(s) 2604, and/or monitoring status and health of controller(s) 2636 and/or an infotainment system on a chip ("infotainment SoC") 2630, for example. SoC(s) 2604 may include one or more interconnects, and an interconnect can include a peripheral component interconnect express (PCIe).

Vehicle 2600 may include GPU(s) 2620 (e.g., discrete GPU(s), or dGPU(s)), that may be coupled to SoC(s) 2604 via a high-speed interconnect (e.g., NVIDIA's NVLINK channel). GPU(s) 2620 may provide additional artificial intelligence functionality, such as, but not limited to, by executing redundant and/or different neural networks, and may be used to train and/or update neural networks based at least in part on input (e.g., sensor data) from sensors of a vehicle 2600.

Vehicle 2600 may further include network interface 2624 which may include wireless antenna(s) (e.g., one or more wireless antennas 2626 for different communication protocols, such as, but not limited to, a cellular antenna, a Bluetooth antenna, etc.). Network interface 2624 may be used to enable wireless connectivity to Internet cloud services (e.g., with server(s) and/or other network devices), with other vehicles, and/or with computing devices (e.g., client devices of passengers). To communicate with other vehicles, a direct link may be established between vehicle 2600 and another vehicle and/or an indirect link may be established (e.g., across networks and over the Internet). Direct links may be provided using a vehicle-to-vehicle communication link. A vehicle-to-vehicle communication link may provide vehicle 2600 information about vehicles in proximity to vehicle 2600 (e.g., vehicles in front of, on a side of, and/or behind vehicle 2600). Such aforementioned functionality may be part of a cooperative adaptive cruise control functionality of vehicle 2600.

Network interface 2624 may include an SoC that provides modulation and demodulation functionality and enables controller(s) 2636 to communicate over wireless networks. Network interface 2624 may include a radio frequency front-end for up-conversion from baseband to radio frequency, and down conversion from radio frequency to baseband. Frequency conversions may be performed in any technically feasible fashion. For example, frequency conversions could be performed through well-known processes, and/or using super-heterodyne processes. Radio frequency front end functionality may be provided by a separate chip. Network interfaces may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

Vehicle 2600 may further include data store(s) 2628 which may include off-chip (e.g., off SoC(s) 2604) storage. Data store(s) 2628 may include one or more storage elements including RAM, SRAM, dynamic random-access memory ("DRAM"), video random-access memory ("VRAM"), flash memory, hard disks, and/or other components and/or devices that may store at least one bit of data.

Vehicle 2600 may further include GNSS sensor(s) 2658 (e.g., GPS and/or assisted GPS sensors), to assist in mapping, perception, occupancy grid generation, and/or path planning functions. Any number of GNSS sensor(s) 2658 may be used, including, for example, a GPS using a USB connector with an Ethernet-to-Serial (e.g., RS-232) bridge.

Vehicle 2600 may further include RADAR sensor(s) 2660. RADAR sensor(s) 2660 may be used by vehicle 2600 for long-range vehicle detection, even in darkness and/or severe weather conditions. RADAR functional safety levels may be ASIL B. RADAR sensor(s) 2660 may use a CAN bus and/or bus 2602 (e.g., to transmit data generated by RADAR sensor(s) 2660) for control and to access object tracking data, with access to Ethernet channels to access raw data in some examples. A wide variety of RADAR sensor types may be used. For example, RADAR sensor(s) 2660 may be suitable for front, rear, and side RADAR use. One or more sensor of RADAR sensors(s) 2660 is a Pulse Doppler RADAR sensor.

RADAR sensor(s) 2660 may include different configurations, such as, but not limited to, long-range with narrow field of view, short-range with wide field of view, short-range side coverage, etc. Long-range RADAR may be used for adaptive cruise control functionality. Long-range RADAR systems may provide a broad field of view realized by two or more independent scans, such as, but not limited to, within a 250 m (meter) range. RADAR sensor(s) 2660 may help in distinguishing between static and moving objects, and may be used by ADAS system 2638 for emergency brake assist and forward collision warning. Sensors 2660 (*s*) included in a long-range RADAR system may include monostatic multimodal RADAR with multiple (e.g., six or more) fixed RADAR antennae and a high-speed CAN and FlexRay interface. With six antennae, a central four antennae may create a focused beam pattern, designed to record vehicle's 2600 surroundings at higher speeds with minimal interference from traffic in adjacent lanes. Another two antennae may expand field of view, making it possible to quickly detect vehicles entering or leaving a lane of vehicle 2600.

Mid-range RADAR systems may include, as an example, a range of up to 160 m (front) or 80 m (rear), and a field of view of up to 42 degrees (front) or 150 degrees (rear). Short-range RADAR systems may include any number of RADAR sensor(s) 2660 designed to be installed at both ends of a rear bumper. When installed at both ends of a rear bumper, a RADAR sensor system may create two beams that constantly monitor blind spots in a rear direction and next to a vehicle. Short-range RADAR systems may be used in ADAS system 2638 for blind spot detection and/or lane change assist.

Vehicle 2600 may further include ultrasonic sensor(s) 2662. Ultrasonic sensor(s) 2662, which may be positioned at a front, a back, and/or side location of vehicle 2600, may be used for parking assist and/or to create and update an occupancy grid. A wide variety of ultrasonic sensor(s) 2662 may be used, and different ultrasonic sensor(s) 2662 may be used for different ranges of detection (e.g., 2.5 m, 4 m). Ultrasonic sensor(s) 2662 may operate at functional safety levels of ASIL B.

Vehicle 2600 may include LIDAR sensor(s) 2664. LIDAR sensor(s) 2664 may be used for object and pedestrian detection, emergency braking, collision avoidance, and/or other functions. LIDAR sensor(s) 2664 may operate at functional safety level ASIL B. Vehicle 2600 may include multiple LIDAR sensors 2664 (e.g., two, four, six, etc.) that may use an Ethernet channel (e.g., to provide data to a Gigabit Ethernet switch).

LIDAR sensor(s) 2664 may be capable of providing a list of objects and their distances for a 360-degree field of view. Commercially available LIDAR sensor(s) 2664 may have an advertised range of approximately 100 m, with an accuracy of 2 cm to 3 cm, and with support for a 100 Mbps Ethernet connection, for example. One or more non-protruding LIDAR sensors may be used. LIDAR sensor(s) 2664 may include a small device that may be embedded into a front, a rear, a side, and/or a corner location of vehicle 2600. LIDAR sensor(s) 2664, in such an embodiment, may provide up to a 120-degree horizontal and 35-degree vertical field-of-view, with a 200 m range even for low-reflectivity objects. Front-mounted LIDAR sensor(s) 2664 may be configured for a horizontal field of view between 45 degrees and 135 degrees.

LIDAR technologies, such as, but not limited to, 3D flash LIDAR, may also be used. 3D flash LIDAR uses a flash of a laser as a transmission source, to illuminate surroundings of vehicle 2600 up to approximately 200 m. A flash LIDAR unit may include a receptor, which records laser pulse transit time and reflected light on each pixel, which in turn corresponds to a range from vehicle 2600 to objects. Flash LIDAR may allow for highly accurate and distortion-free images of surroundings to be generated with every laser flash. Four flash LIDAR sensors may be deployed, one at each side of vehicle 2600. 3D flash LIDAR systems include a solid-state 3D staring array LIDAR camera with no moving parts other than a fan (e.g., a non-scanning LIDAR device). Flash LIDAR device may use a 5 nanosecond class I (eye-safe) laser pulse per frame and may capture reflected laser light as a 3D range point cloud and co-registered intensity data.

Vehicle 2600 may further include IMU sensor(s) 2666. IMU sensor(s) 2666 may be located at a center of a rear axle of vehicle 2600. IMU sensor(s) 2666 may include, for example, accelerometer(s), magnetometer(s), gyroscope(s), a magnetic compass, magnetic compasses, and/or other sensor types. In six-axis applications, but not limited to, IMU sensor(s) 2666 may include accelerometers and gyroscopes. In nine-axis applications, but not limited to, IMU sensor(s) 2666 may include accelerometers, gyroscopes, and magnetometers.

IMU sensor(s) 2666 may be implemented as a miniature, high performance GPS-Aided Inertial Navigation System ("GPS/INS") that combines micro-electro-mechanical systems ("MEMS") inertial sensors, a high-sensitivity GPS receiver, and advanced Kalman filtering algorithms to provide estimates of position, velocity, and attitude. IMU sensor(s) 2666 may enable vehicle 2600 to estimate its heading without requiring input from a magnetic sensor by directly observing and correlating changes in velocity from a GPS to IMU sensor(s) 2666. IMU sensor(s) 2666 and GNSS sensor(s) 2658 may be combined in a single integrated unit.

Vehicle 2600 may include microphone(s) 2696 placed in and/or around vehicle 2600. Microphone(s) 2696 may be used for emergency vehicle detection and identification, among other things.

Vehicle 2600 may further include any number of camera types, including stereo camera(s) 2668, wide-view camera(s) 2670, infrared camera(s) 2672, surround camera(s) 2674, long-range camera(s) 2698, mid-range camera(s) 2676, and/or other camera types. Cameras may be used to capture image data around an entire periphery of vehicle 2600. Types of cameras used may depend on vehicle 2600. Any combination of camera types may be used to provide necessary coverage around vehicle 2600. A number of cameras deployed may differ depending on embodiment. For example, vehicle 2600 could include six cameras, seven cameras, ten cameras, twelve cameras, or another number of cameras. Cameras may support, as an example, Gigabit Multimedia Serial Link ("GMSL") and/or Gigabit Ethernet communications. Each camera might be as described with more detail previously herein.

Vehicle 2600 may further include vibration sensor(s) 2642. Vibration sensor(s) 2642 may measure vibrations of components of vehicle 2600, such as, but not limited to, axle(s). For example, changes in vibrations may indicate a change in road surfaces. When two or more vibration sensors 2642 may be used, differences between vibrations may be used to determine friction or slippage of road surface (e.g., when a difference in vibration is between a power-driven axle and a freely rotating axle).

Vehicle 2600 may include ADAS system 2638. ADAS system 2638 may include an SoC, in some examples. ADAS system 2638 may include any number and combination of an autonomous/adaptive/automatic cruise control ("ACC") system, a cooperative adaptive cruise control ("CACC") system, a forward crash warning ("FCW") system, an automatic emergency braking ("AEB") system, a lane departure warning ("LDW") system, a lane keep assist ("LKA") system, a blind spot warning ("BSW") system, a rear cross-traffic warning ("RCTW") system, a collision warning ("CW") system, a lane centering ("LC") system, and/or other systems, features, and/or functionality.

ACC system may use RADAR sensor(s) 2660, LIDAR sensor(s) 2664, and/or any number of camera(s). ACC system may include a longitudinal ACC system and/or a lateral ACC system. A longitudinal ACC system monitors and controls distance to another vehicle immediately ahead of vehicle 2600 and automatically adjusts speed of vehicle 2600 to maintain a safe distance from vehicles ahead. A lateral ACC system performs distance keeping, and advises vehicle 2600 to change lanes when necessary. A lateral ACC is related to other ADAS applications, such as, but not limited to, LC and CW.

A CACC system uses information from other vehicles that may be received via network interface 2624 and/or wireless antenna(s) 2626 from other vehicles via a wireless link, or indirectly, over a network connection (e.g., over the Internet). Direct links may be provided by a vehicle-to-vehicle ("V2V") communication link, while indirect links may be provided by an infrastructure-to-vehicle ("I2V") communication link. In general, V2V communication provides information about immediately preceding vehicles (e.g., vehicles immediately ahead of and in same lane as vehicle 2600), while I2V communication provides information about traffic further ahead. A CACC system may include either or both I2V and V2V information sources. Given information of vehicles ahead of vehicle 2600, a CACC system may be more reliable and it has potential to improve traffic flow smoothness and reduce congestion on road.

An FCW system is designed to alert a driver to a hazard, so that such driver may take corrective action. An FCW system uses a front-facing camera and/or RADAR sensor(s) 2660, coupled to a dedicated processor, DSP, FPGA, and/or ASIC, that is electrically coupled to provide driver feedback, such as, but not limited to, a display, speaker, and/or vibrating component. An FCW system may provide a warning, such as, but not limited to, in form of a sound, visual warning, vibration and/or a quick brake pulse.

An AEB system detects an impending forward collision with another vehicle or other object, and may automatically apply brakes if a driver does not take corrective action within a specified time or distance parameter. AEB system may use front-facing camera(s) and/or RADAR sensor(s) 2660, coupled to a dedicated processor, DSP, FPGA, and/or ASIC. When an AEB system detects a hazard, it will typically first alert a driver to take corrective action to avoid collision and, if that driver does not take corrective action, that AEB system may automatically apply brakes in an effort to prevent, or at least mitigate, an impact of a predicted collision. An AEB system may include techniques such as, but not limited to, dynamic brake support and/or crash imminent braking.

An LDW system provides visual, audible, and/or tactile warnings, such as, but not limited to, steering wheel or seat vibrations, to alert driver when vehicle 2600 crosses lane markings. An LDW system does not activate when a driver indicates an intentional lane departure, such as, but not limited to, by activating a turn signal. An LDW system may use front-side facing cameras, coupled to a dedicated processor, DSP, FPGA, and/or ASIC, that is electrically coupled to provide driver feedback, such as, but not limited to, a display, speaker, and/or vibrating component. An LKA system is a variation of an LDW system. An LKA system provides steering input or braking to correct vehicle 2600 if vehicle 2600 starts to exit its lane.

A BSW system detects and warns a driver of vehicles in an automobile's blind spot. A BSW system may provide a visual, audible, and/or tactile alert to indicate that merging or changing lanes is unsafe. A BSW system may provide an additional warning when a driver uses a turn signal. A BSW system may use rear-side facing camera(s) and/or RADAR sensor(s) 2660, coupled to a dedicated processor, DSP, FPGA, and/or ASIC, that is electrically coupled to driver feedback, such as, but not limited to, a display, speaker, and/or vibrating component.

An RCTW system may provide visual, audible, and/or tactile notification when an object is detected outside a rear-camera range when vehicle 2600 is backing up. An RCTW system includes an AEB system to ensure that vehicle brakes may be applied to avoid a crash. An RCTW system may use one or more rear-facing RADAR sensor(s) 2660, coupled to a dedicated processor, DSP, FPGA, and/or ASIC, that is electrically coupled to provide driver feedback, such as, but not limited to, a display, speaker, and/or vibrating component.

Conventional ADAS systems may be prone to false positive results which may be annoying and distracting to a driver, but typically may not be catastrophic, because conventional ADAS systems alert a driver and allow that driver to decide whether a safety condition truly exists and act accordingly. Vehicle 2600 itself decides, in case of conflicting results, whether to heed result from a primary computer or a secondary computer (e.g., a first controller or a second controller of controllers 2636). For example, ADAS system 2638 may be a backup and/or secondary computer for providing perception information to a backup computer rationality module. A backup computer rationality monitor may run redundant diverse software on hardware components to detect faults in perception and dynamic driving tasks. Outputs from ADAS system 2638 may be provided to a supervisory MCU. If outputs from a primary computer and outputs from a secondary computer conflict, a supervisory MCU can determine how to reconcile conflict to ensure safe operation.

A primary computer may be configured to provide a supervisory MCU with a confidence score, indicating that primary computer's confidence in a chosen result. If that confidence score exceeds a threshold, that supervisory MCU may follow that primary computer's direction, regardless of whether that secondary computer provides a conflicting or inconsistent result. Where a confidence score does not meet a threshold, and where primary and secondary computers indicate different results (e.g., a conflict), a supervisory MCU may arbitrate between computers to determine an appropriate outcome.

A supervisory MCU may be configured to run a neural network(s) that is trained and configured to determine, based at least in part on outputs from a primary computer and outputs from a secondary computer, conditions under which that secondary computer provides false alarms. Neural network(s) in a supervisory MCU may learn when a secondary computer's output may be trusted, and when it cannot. For example, when that secondary computer is a RADAR-based FCW system, a neural network(s) in that supervisory MCU may learn when an FCW system is identifying metallic objects that may not be, in fact, hazards, such as, but not limited to, a drainage grate or manhole cover that triggers an alarm. When a secondary computer is a camera-based LDW system, a neural network in a supervisory MCU may learn to override LDW when bicyclists or pedestrians may be present and a lane departure is, in fact, a safest maneuver. A supervisory MCU may include at least one of a DLA or a GPU suitable for running neural network(s) with associated memory. A supervisory MCU may comprise and/or be included as a component of SoC(s) 2604.

ADAS system 2638 may include a secondary computer that performs ADAS functionality using traditional rules of computer vision, and that secondary computer may use classic computer vision rules (if-then), and presence of a neural network(s) in a supervisory MCU may improve reliability, safety and performance. For example, diverse implementation and intentional non-identity makes an overall system more fault-tolerant, especially to faults caused by software (or software-hardware interface) functionality. For example, if there is a software bug or error in software running on a primary computer, and non-identical software code running on a secondary computer provides a consistent overall result, then a supervisory MCU may have greater confidence that an overall result is correct, and a bug in software or hardware on that primary computer is not causing a material error.

An output of ADAS system 2638 may be fed into a primary computer's perception block and/or a primary computer's dynamic driving task block. For example, if ADAS system 2638 indicates a forward crash warning due to an object immediately ahead, a perception block may use this information when identifying objects. A secondary computer may have its own neural network that is trained and thus reduces a risk of false positives, as described herein.

Vehicle 2600 may further include infotainment SoC 2630 (e.g., an in-vehicle infotainment system (IVI)). Although illustrated and described as an SoC, infotainment system SoC 2630, may not be an SoC, and may include two or more discrete components. Infotainment SoC 2630 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, WiFi, etc.), and/or information services (e.g., navigation systems, rear-parking assistance, a radio data system, vehicle related information such as, but not limited to, fuel level, total distance covered, brake fuel level, oil level, door open/close, air filter information, etc.) to vehicle 2600. For example, infotainment SoC 2630 could include radios, disk players, navigation systems, video players, USB and Bluetooth connectivity, carputers, in-car entertainment, WiFi, steering wheel audio controls, hands free voice control, a heads-up display ("HUD"), HMI display 2634, a telematics device, a control panel (e.g., for controlling and/or interacting with various components, features, and/or systems), and/or other components. Infotainment SoC 2630 may further be used to provide information (e.g., visual and/or audible) to user(s) of vehicle 2600, such as, but not limited to, information from ADAS system 2638, autonomous driving information such as, but not limited to, planned vehicle maneuvers, trajectories, surrounding environment information (e.g., intersection information, vehicle information, road information, etc.), and/or other information.

Infotainment SoC 2630 may include any amount and type of GPU functionality. Infotainment SoC 2630 may communicate over bus 2602 with other devices, systems, and/or components of vehicle 2600. Infotainment SoC 2630 may be coupled to a supervisory MCU such that a GPU of an infotainment system may perform some self-driving functions in event that primary controller(s) 2636 (e.g., primary and/or backup computers of vehicle 2600) fail. Infotainment SoC 2630 may put vehicle 2600 into a chauffeur to safe stop mode, as described herein.

Vehicle 2600 may further include instrument cluster 2632 (e.g., a digital dash, an electronic instrument cluster, a digital instrument panel, etc.). Instrument cluster 2632 may include a controller and/or supercomputer (e.g., a discrete controller or supercomputer). Instrument cluster 2632 may include any number and combination of a set of instrumentation such as, but not limited to, a speedometer, fuel level, oil pressure, tachometer, odometer, turn indicators, gearshift position indicator, seat belt warning light(s), parking-brake warning light(s), engine-malfunction light(s), supplemental restraint system (e.g., airbag) information, lighting controls, safety system controls, navigation information, etc. Information may be displayed and/or shared among infotainment SoC 2630 and instrument cluster 2632. Instrument cluster 2632 may be included as part of infotainment SoC 2630, or vice versa.

System may include server(s), network(s), and any number and type of vehicles, including vehicle 2600. Server(s) may include a plurality of GPUs, PCIe switches, and/or CPUs. GPUs, CPUs, and PCIe switches may be interconnected with high-speed interconnects such as, but not limited to, for example, NVLink interfaces developed by NVIDIA and/or PCIe connections. GPUs can be connected via any interconnects, such as NVLink and/or NVSwitch SoC, and GPUs and PCIe switches can be, for example, connected via PCIe interconnects. Each of server(s) may include any number of GPUs, CPUs, and/or PCIe switches, in any combination. For example, server(s) could each include eight, sixteen, thirty-two, and/or more GPUs.

Server(s) may receive, over network(s) and from vehicles, image data representative of images showing unexpected or changed road conditions, such as, but not limited to, recently commenced road-work. Server(s) may transmit, over network(s) and to vehicles, neural networks, updated or otherwise, and/or map information, including information regarding traffic and road conditions. Updates to map information may include updates for HD map, such as, but not limited to, information regarding construction sites, potholes, detours, flooding, and/or other obstructions. Neural networks, and/or map information may have resulted from new training and/or experiences represented in data received from any number of vehicles in an environment, and/or based at least in part on training performed at a data center (e.g., using server(s) and/or other servers).

Server(s) may be used to train machine learning models (e.g., neural networks) based at least in part on training data. Training data may be generated by vehicles, and/or may be generated in a simulation (e.g., using a game engine). Any amount of training data can be tagged (e.g., where associated neural network benefits from supervised learning) and/or undergoes other pre-processing. Any amount of training data may not be tagged and/or pre-processed (e.g., where associated neural network does not require supervised learning). Once machine learning models are trained, machine learning models may be used by vehicles (e.g., transmitted to vehicles over network(s)), and/or machine learning models may be used by server(s) to remotely monitor vehicles.

Server(s) may receive data from vehicles and apply data to up-to-date real-time neural networks for real-time intelligent inferencing. Server(s) may include deep-learning supercomputers and/or dedicated AI computers powered by GPU(s), such as, but not limited to, a DGX and DGX Station machines developed by NVIDIA. Alternatively, server(s) may include deep learning infrastructure that uses CPU-powered data centers.

Deep-learning infrastructure of server(s) may be capable of fast, real-time inferencing, and may use that capability to evaluate and verify health of processors, software, and/or associated hardware in vehicle 2600. For example, deep-learning infrastructure may receive periodic updates from vehicle 2600, such as, but not limited to, a sequence of images and/or objects that vehicle 2600 has located in that sequence of images (e.g., via computer vision and/or other machine learning object classification techniques). Deep-learning infrastructure may run its own neural network to identify objects and compare them with objects identified by vehicle 2600 and, if results do not match and deep-learning infrastructure concludes that AI in vehicle 2600 is malfunctioning, then server(s) may transmit a signal to vehicle instructing a fail-safe computer of vehicle 2600 to assume control, notify passengers, and complete a safe parking maneuver.

Server(s) may include GPU(s) and one or more programmable inference accelerators (e.g., NVIDIA's TensorRT 3 devices). A combination of GPU-powered servers and inference acceleration may make real-time responsiveness possible. Where performance is less critical, servers powered by CPUs, FPGAs, and other processors may be used for inferencing.

In at least one embodiment, autonomous vehicle 2600 includes one or more processors that are at least a portion of, or include at least a portion of, one or more of processors described herein at least in conjunction with FIGS. 1-8 and FIGS. 10-22. In at least one embodiment, autonomous vehicle 2600 includes one or more processors that are at least a portion of, or include at least a portion of, processor(s) 104 of FIG. 1. In at least one embodiment, autonomos vehicle 2600 includes one or more processors that comprise one or more circuits to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein. One or more circuits of autonomous vehicle 2600 can be configured by software, e.g., programming platforms described herein, to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein.

Cloud and Web-Based Services

The following description sets forth, without limitation, cloud-based and/or web-based services and/or systems includes one or more processors that are at least a portion of, or include at least a portion of, one or more of processors described herein at least in conjunction with FIGS. 1-8 and FIGS. 10-22. In at least one embodiment, cloud-based and/or web-based services and/or systems includes one or more processors that are at least a portion of, or include at least a portion of, processor(s) 104 of FIG. 1. In at least one embodiment, cloud-based and/or web-based services and/or systems includes one or more processors that comprise one or more circuits to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform some or all of processes, operations and/or and techniques described elsewhere herein. In at least one embodiment, one or more circuits of one or more processors of cloud-based and/or web-based services and/or systems can be configured by software to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein.

Cloud computing can include a style of computing in which dynamically scalable and often virtualized resources are provided as a service over the Internet. Users need not have knowledge of, expertise in, or control over technology infrastructure, which can be referred to as "in the cloud," that supports them. Cloud computing may incorporate infrastructure as a service, platform as a service, software as a service, and other variations that have a common theme of reliance on the Internet for satisfying computing needs of users. A typical cloud deployment, such as in a private cloud (e.g., enterprise network), or a data center (DC) in a public cloud (e.g., Internet) can include thousands of servers (or alternatively, VMs), hundreds of Ethernet, Fiber Channel or Fiber Channel over Ethernet (FCOE) ports, switching and storage infrastructure, etc. A cloud can also include network services infrastructure like IPsec VPN hubs, firewalls, load balancers, wide area network (WAN) optimizers etc. Remote subscribers can access cloud applications and services securely by connecting via a VPN tunnel, such as an IPsec VPN tunnel.

Cloud computing may include a model for enabling convenient, on-demand network access to a shared pool of configurable computing resources (e.g., networks, servers, storage, applications, and services) that can be rapidly provisioned and released with minimal management effort or service provider interaction.

Cloud computing may be characterized by on-demand self-service, in which a consumer can unilaterally provision computing capabilities, such as server time and network storage, as needed automatically without requiring human inter-action with each service's provider. Cloud computing may be characterized by broad network access, in which capabilities are available over a network and accessed through standard mechanisms that promote use by heterogeneous thin or thick client platforms (e.g., mobile phones, laptops, and PDAs). Cloud computing may be characterized by resource pooling, in which a provider's computing resources are pooled to serve multiple consumers using a multi-tenant model, with different physical and virtual resources dynamically as-signed and reassigned according to consumer demand. In at least one embodiment, there is a sense of location independence in that a customer generally has no control or knowledge over an exact location of provided resources, but may be able to specify location at a higher level of abstraction (e.g., country, state, or datacenter). Examples of resources include storage, processing, memory, network bandwidth, and virtual machines. Cloud computing may be characterized by rapid elasticity, in which capabilities can be rapidly and elastically provisioned, in some cases automatically, to quickly scale out and rapidly released to quickly scale in. In at least one embodiment, to a consumer, capabilities available for provisioning often appear to be unlimited and can be purchased in any quantity at any time. Cloud computing may be characterized by measured service, in which cloud systems automatically control and optimize resource use by leveraging a metering capability at some level of abstraction appropriate to a type of service (e.g., storage, processing, bandwidth, and active user accounts). Resource usage can be monitored, controlled, and reported providing transparency for both a provider and consumer of a utilized service.

Cloud computing may be associated with various services. Cloud Software as a Service (SaaS) may refer to as service in which a capability provided to a consumer is to use a provider's applications running on a cloud infrastructure. Applications can be accessible from various client devices through a thin client interface such as a web browser (e.g., web-based email). In at least one embodiment, consumer does not manage or control underlying cloud infrastructure including network, servers, operating systems, storage, or even individual application capabilities, with a possible exception of limited user-specific application configuration settings.

Cloud Platform as a Service (PaaS) may refer to a service in which a capability provided to consumer is to deploy onto cloud infrastructure consumer-created or acquired applications created using programming languages and tools supported by a provider. In at least one embodiment, a consumer does not manage or control underlying cloud infrastructure including networks, servers, operating systems, or storage, but has control over deployed applications and possibly application hosting environment configurations.

Cloud Infrastructure as a Service (IaaS) may refer to a service in which a capability provided to a consumer is to provision processing, storage, networks, and other fundamental computing resources where a consumer is able to deploy and run arbitrary software, which can include operating systems and applications. In at least one embodiment, consumer does not manage or control underlying cloud infrastructure, but has control over operating systems, storage, deployed applications, and possibly limited control of select networking components (e.g., host firewalls).

Cloud computing may be deployed in various ways. A private cloud may refer to a cloud infrastructure that is operated solely for an organization. A private cloud may be managed by an organization or a third party and may exist on-premises or off-premises. A community cloud may refer to a cloud infrastructure that is shared by several organizations and supports a specific community that has shared concerns (e.g., mission, security requirements, policy, and compliance considerations). A community cloud may be managed by organizations or a third party and may exist on-premises or off-premises. A public cloud may refer to a cloud infrastructure that is made available to a general public or a large industry group and is owned by an organization providing cloud services. A hybrid cloud may refer to a cloud infrastructure that is a composition of two or more clouds (private, community, or public) that remain unique entities, but are bound together by standardized or proprietary technology that enables data and application portability (e.g., cloud bursting for load-balancing between clouds). A cloud computing environment is service oriented with a focus on statelessness, low coupling, modularity, and semantic interoperability.

Logic and Neural Network Training and Deployment

The following figures set forth, without limitation, examples of logic and artificial intelligence-based systems that can be used to implement functionality and/or operations described herein.

FIGS. 27A and 27B illustrate logic 2715 which, as described elsewhere herein, can be used in one or more devices or systems (e.g., such as any of the processors, data centers, cloud or web-based services described herein) to perform operations such as, but not limited to, those discussed herein, in accordance with at least one embodiment. Logic can refer to any combination of software logic, hardware logic, and/or firmware logic to provide functionality and/or operations described herein, wherein logic may be, collectively or individually, embodied as circuitry that forms part of a larger system, for example, an integrated circuit (IC), an application-specific integrated circuit (ASIC), a field programmable array (FPGA), system-on-chip (SoC), or one or more processors (e.g., CPU, GPU). Logic 2715 illustrated in FIGS. 27A and 27B may be used in conjunction with an application-specific integrated circuit ("ASIC"), such as, but not limited to, a TensorFlow® Processing Unit from Google, an inference processing unit (IPU) from Graphcore™, or a Nervana® (e.g., "Lake Crest") processor from Intel Corp. Logic 2715 illustrated in FIGS. 27A and 27B may be used in conjunction with central processing unit ("CPU") hardware, graphics processing unit ("GPU") hardware or other hardware, such as, but not limited to, field programmable gate arrays ("FPGAs").

Logic 2715 can be used to perform inferencing and/or training operations associated with one or more embodiments. Logic 2715 may be inference and/or training logic. In at least one embodiment, FIG. 27A illustrates inference and/or training logic 2715 used to perform inferencing and/or training operations associated with one or more embodiments. Inference and/or training logic 2715 may include code and/or data storage 2701 to store forward and/or output weight and/or input/output data, and/or other parameters to configure neurons or layers of a neural network trained and/or used for inferencing in aspects of one or more embodiments. Training logic 2715 may include, or be coupled to code and/or data storage 2701 to store graph code or other software to control timing and/or order, in which weight and/or other parameter information is to be loaded to configure, logic, including integer and/or floating point units (collectively, arithmetic logic units (ALUs). Code, such as, but not limited to, graph code, can load weight or other parameter information into processor ALUs based on an architecture of a neural network to which such code corresponds. Code and/or data storage 2701 can store weight parameters and/or input/output data of each layer of a neural network trained or used in conjunction with one or more embodiments during forward propagation of input/output data and/or weight parameters during training and/or inferencing using aspects of one or more embodiments. Any portion of code and/or data storage 2701 may be included with other on-chip or off-chip data storage, including a processor's L1, L2, or L3 cache or system memory.

Any portion of code and/or data storage 2701 may be internal or external to one or more processors or other hardware logic devices or circuits. Code and/or code and/or data storage 2701 may be cache memory, dynamic randomly addressable memory ("DRAM"), static randomly addressable memory ("SRAM"), non-volatile memory (e.g., flash memory), or other storage. A choice of whether code and/or code and/or data storage 2701 is internal or external to a processor, for example, or comprising DRAM, SRAM, flash or some other storage type may depend on available storage on-chip versus off-chip, latency requirements of training and/or inferencing functions being performed, batch size of data used in inferencing and/or training of a neural network, or some combination of these factors.

Inference and/or training logic 2715 may include a code and/or data storage 2705 to store backward and/or output weight and/or input/output data corresponding to neurons or layers of a neural network trained and/or used for inferencing in aspects of one or more embodiments. Code and/or data storage 2705 can store weight parameters and/or input/output data of each layer of a neural network trained or used in conjunction with one or more embodiments during backward propagation of input/output data and/or weight parameters during training and/or inferencing using aspects of one or more embodiments. Training logic 2715 may include, or be coupled to code and/or data storage 2705 to store graph code or other software to control timing and/or order, in which weight and/or other parameter information is to be loaded to configure, logic, including integer and/or floating point units (collectively, arithmetic logic units (ALUs).

Code, such as, but not limited to, graph code, may cause loading of weight or other parameter information into processor ALUs based on an architecture of a neural network to which such code corresponds. Any portion of code and/or data storage 2705 may be included with other on-chip or off-chip data storage, including a processor's L1, L2, or L3 cache or system memory. Any portion of code and/or data storage 2705 may be internal or external to one or more processors or other hardware logic devices or circuits. Code and/or data storage 2705 may be cache memory, DRAM, SRAM, non-volatile memory (e.g., flash memory), or other storage. A choice of whether code and/or data storage 2705 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

Code and/or data storage 2701 and code and/or data storage 2705 may be separate storage structures. Code and/or data storage 2701 and code and/or data storage 2705 may be a combined storage structure. Code and/or data storage 2701 and code and/or data storage 2705 may be partially combined and partially separate. Any portion of code and/or data storage 2701 and code and/or data storage 2705 may be included with other on-chip or off-chip data storage, including a processor's L1, L2, or L3 cache or system memory.

Inference and/or training logic 2715 may include one or more arithmetic logic unit(s) ("ALU(s)") 2710, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 2720 that may be functions of input/ output and/or weight parameter data stored in code and/or data storage 2701 and/or code and/or data storage 2705. Activations stored in activation storage 2720 may be generated according to linear algebraic and or matrix-based mathematics performed by ALU(s) 2710 in response to performing instructions or other code, wherein weight values stored in code and/or data storage 2705 and/or data storage 2701 may be used as operands along with other values, such as, but not limited to, bias values, gradient information, momentum values, or other parameters or hyperparameters, any or all of which may be stored in code and/or data storage 2705 or code and/or data storage 2701 or another storage on or off-chip.

ALU(s) 2710 can be included within one or more processors or other hardware logic devices or circuits, whereas in another embodiment, ALU(s) 2710 may be external to a processor or other hardware logic device or circuit that uses them (e.g., a co-processor). ALUs 2710 may be included within a processor's execution units or otherwise within a bank of ALUs accessible by a processor's execution units either within same processor or distributed between different processors of different types (e.g., central processing units, graphics processing units, fixed function units, etc.). Code and/or data storage 2701, code and/or data storage 2705, and activation storage 2720 may share a processor or other hardware logic device or circuit, whereas in another embodiment, they may be in different processors or other hardware logic devices or circuits, or some combination of same and different processors or other hardware logic devices or circuits. Any portion of activation storage 2720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

Activation storage 2720 may be cache memory, DRAM, SRAM, non-volatile memory (e.g., flash memory), or other storage. Activation storage 2720 may be completely or partially within or external to one or more processors or other logical circuits. A choice of whether activation storage 2720 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 2715 illustrated in FIG. 27A may be used in conjunction with an application-specific integrated circuit ("ASIC"), such as, but not limited to, a TensorFlow® Processing Unit from Google, an inference processing unit (IPU) from Graphcore™, or a Nervana® (e.g., "Lake Crest") processor from Intel Corp. In at least one embodiment, inference and/or training logic 2715 illustrated in FIG. 27A may be used in conjunction with central processing unit ("CPU") hardware, graphics processing unit ("GPU") hardware or other hardware, such as, but not limited to, field programmable gate arrays ("FPGAs").

FIG. 27B illustrates inference and/or training logic 2715, in accordance with at least one embodiment. Inference and/or training logic 2715 may include hardware logic in which computational resources may be dedicated or otherwise exclusively used in conjunction with weight values or other information corresponding to one or more layers of neurons within a neural network. Inference and/or training logic 2715 illustrated in FIG. 27B may be used in conjunction with an application-specific integrated circuit (ASIC), such as, but not limited to, TensorFlow® Processing Unit from Google, an inference processing unit (IPU) from Graphcore™, or a Nervana® (e.g., "Lake Crest") processor from Intel Corp. Inference and/or training logic 2715 illustrated in FIG. 27B may be used in conjunction with central processing unit (CPU) hardware, graphics processing unit (GPU) hardware or other hardware, such as, but not limited to, field programmable gate arrays (FPGAs). Inference and/or training logic 2715 can include code and/or data storage 2701 and code and/or data storage 2705, which may be used to store code (e.g., graph code), weight values and/or other information, including bias values, gradient information, momentum values, and/or other parameter or hyperparameter information. In FIG. 27B, for example, each of code and/or data storage 2701 and code and/or data storage 2705 is associated with a dedicated computational resource, such as, but not limited to, computational hardware 2702 and computational hardware 2706, respectively. Each of computational hardware 2702 and computational hardware 2706 can include one or more ALUs that perform mathematical functions, such as, but not limited to, linear algebraic functions, only on information stored in code and/or data storage 2701 and code and/or data storage 2705, respectively, result of which is stored in activation storage 2720.

Each of code and/or data storage 2701 and 2705 and corresponding computational hardware 2702 and 2706, respectively, correspond to different layers of a neural network, such that resulting activation from one storage/computational pair 2701/2702 of code and/or data storage 2701 and computational hardware 2702 is provided as an input to a next storage/computational pair 2705/2706 of code and/or data storage 2705 and computational hardware 2706, in order to mirror a conceptual organization of a neural network. Each of storage/computational pairs 2701/2702 and 2705/2706 may correspond to more than one neural network layer. Additional storage/computation pairs (not shown) subsequent to or in parallel with storage/computation pairs 2701/2702 and 2705/2706 may be included in inference and/or training logic 2715.

In at least one embodiment, logic 2715 described elsewhere herein, includes one or more processors that are at least a portion of, or include at least a portion of, one or more of processors described herein at least in conjunction with FIGS. 1-8 and FIGS. 10-22. In at least one embodiment, logic 2715 includes one or more processors that are at least a portion of, or include at least a portion of, processor(s) 104 of FIG. 1. In at least one embodiment, logic 2715 includes one or more processors that comprise one or more circuits to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein. One or more circuits of logic 2715 can be configured by software described herein, to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein.

Figure 27C:
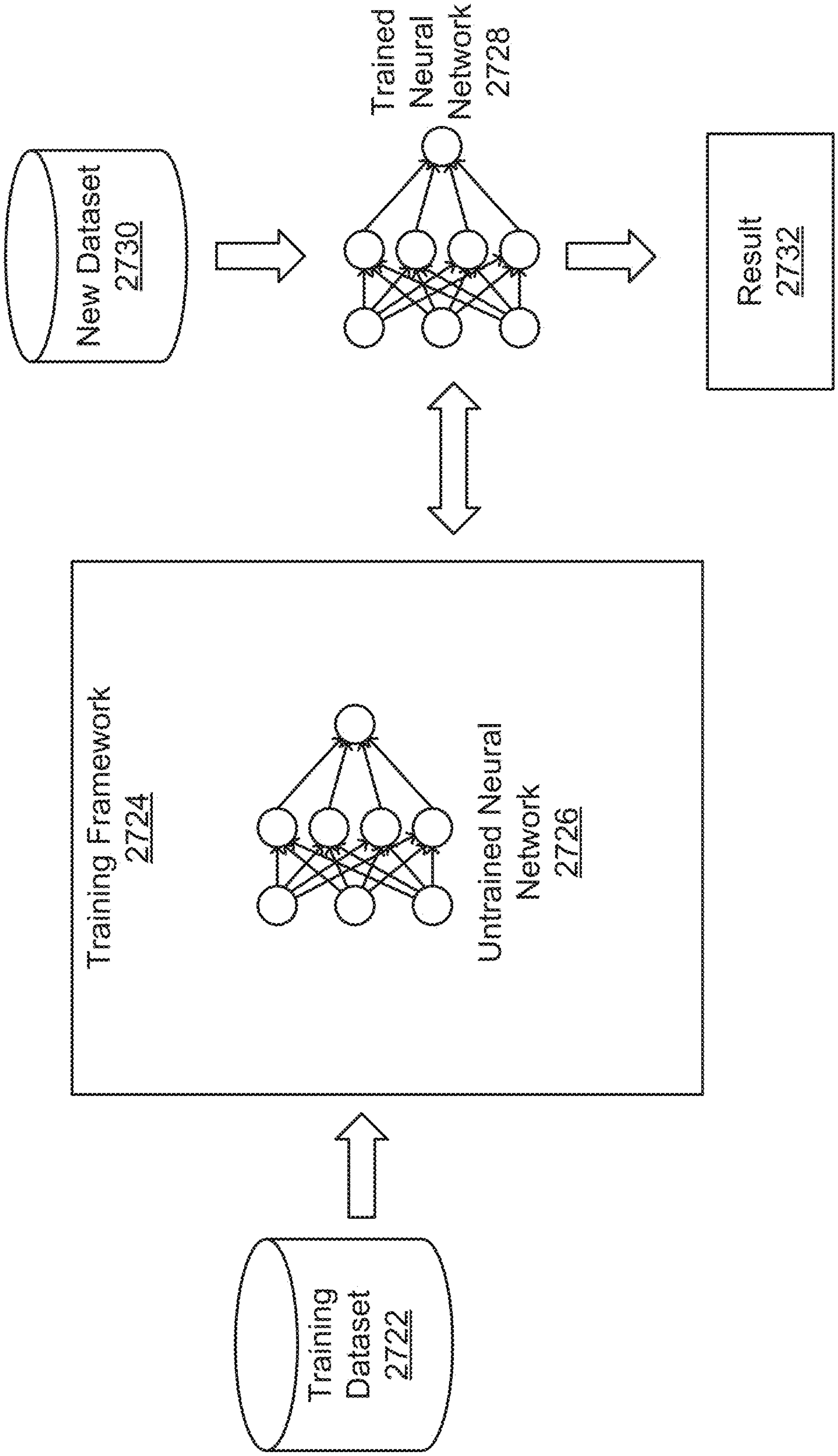
FIG. 27C illustrates training and deployment of a neural network, in accordance with at least one embodiment.

FIG. 27C illustrates training and deployment of a deep neural network, in accordance with at least one embodiment. An untrained neural network 2726 can be trained using a training dataset 2722. Training framework 2724 can be a PyTorch framework, and/or a training framework 2704 can include a TensorFlow, Boost, Caffe, Microsoft Cognitive Toolkit/CNTK, MXNet, Chainer, Keras, Deeplearning4j, or other training framework. Training framework 2724 can train an untrained neural network 2726 and enables it to be trained using processing resources described herein to generate a trained neural network 2728. Weights may be chosen randomly or by pre-training using a deep belief network. Training may be performed in either a supervised, partially supervised, or unsupervised manner.

Untrained neural network 2726 can be trained using supervised learning, wherein training dataset 2722 includes an input paired with a desired output for an input, or where training dataset 2722 includes input having a known output and an output of neural network 2726 is manually graded. Untrained neural network 2726 can be trained in a supervised manner and processes inputs from training dataset 2722 and compares resulting outputs against a set of expected or desired outputs. Errors can then be propagated back through untrained neural network 2726. Training framework 2724 can adjust weights that control untrained neural network 2726. Training framework 2724 can include tools to monitor how well untrained neural network 2726 is converging towards a model, such as, but not limited to, trained neural network 2728, suitable to generating correct answers, such as, but not limited to, in result 2732, based on input data such as, but not limited to, a new dataset 2730. Training framework 2724 can train untrained neural network 2726 repeatedly while adjust weights to refine an output of untrained neural network 2726 using a loss function and adjustment algorithm, such as, but not limited to, stochastic gradient descent. Training framework 2724 can train untrained neural network 2726 until untrained neural network 2726 achieves a desired accuracy. Trained neural network 2728 can then be deployed to implement any number of machine learning operations.

Untrained neural network 2726 can be trained using unsupervised learning, wherein untrained neural network 2726 attempts to train itself using unlabeled data. Unsupervised learning training dataset 2722 can include input data without any associated output data or "ground truth" data. Untrained neural network 2726 can learn groupings within training dataset 2722 and can determine how individual inputs may be related to untrained dataset 2722. Unsupervised training can be used to generate a self-organizing map in trained neural network 2728 capable of performing operations useful in reducing dimensionality of new dataset 2730. Unsupervised training can also be used to perform anomaly detection, which allows identification of data points in new dataset 2730 that deviate from normal patterns of new dataset 2730.

Semi-supervised learning may be used, which is a technique in which in training dataset 2722 includes a mix of labeled and unlabeled data. Training framework 2724 may be used to perform incremental learning, such as, but not limited to, through transferred learning techniques. Incremental learning can enable trained neural network 2728 to adapt to new dataset 2730 without forgetting knowledge instilled within trained neural network 2728 during initial training.

Training framework 2724 can include a framework processed in connection with a software development toolkit such as, but not limited to, an OpenVINO (Open Visual Inference and Neural network Optimization) toolkit. An OpenVINO toolkit can include a toolkit such as, but not limited to, those developed by Intel Corporation of Santa Clara, CA.

Figure 28:
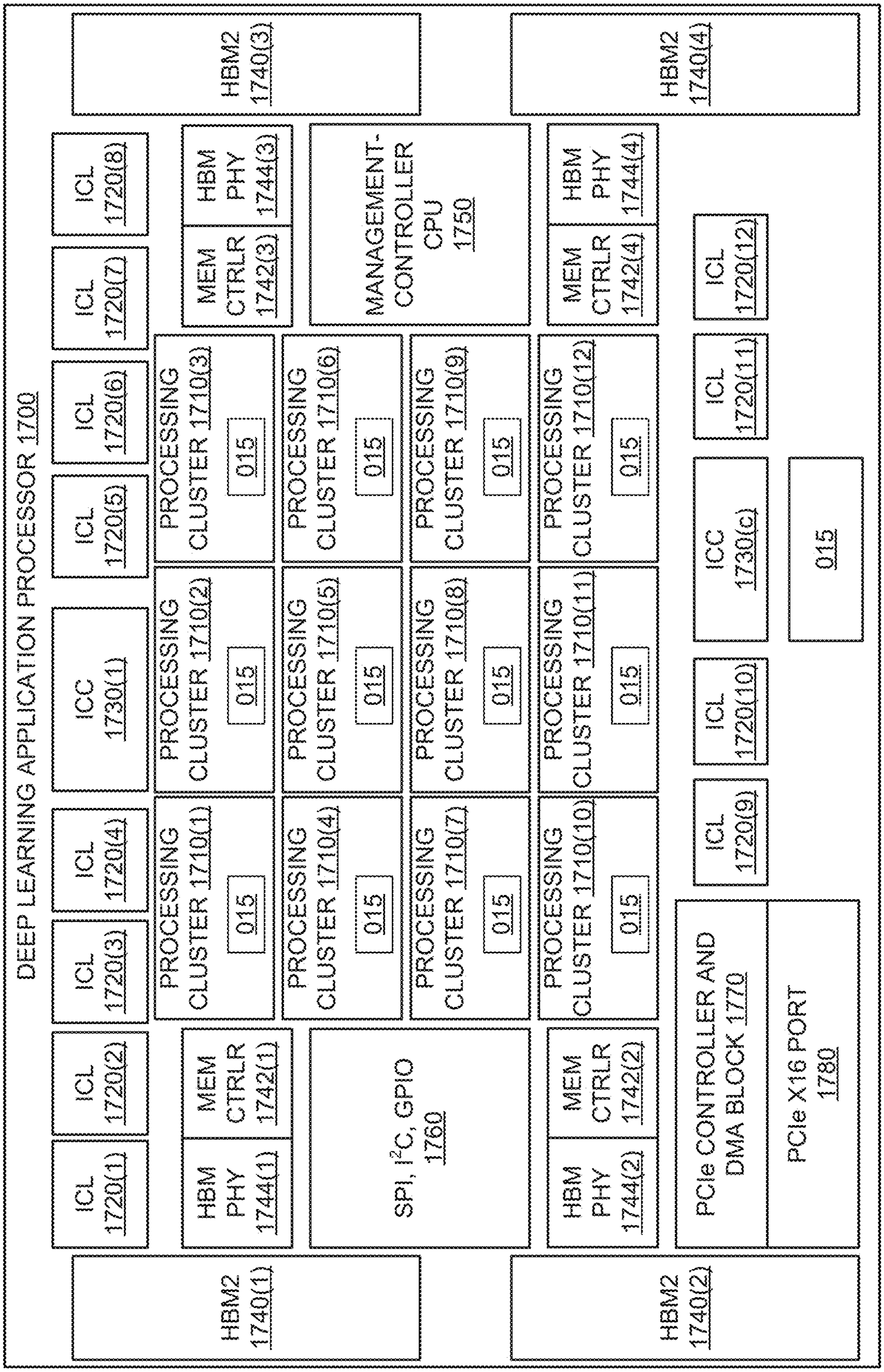
FIG. 28 illustrates a deep learning application processor, in accordance with at least one embodiment.

FIG. 28 illustrates a deep learning application processor 2800, according to at least one embodiment. In at least one embodiment, deep learning application processor 2800 uses instructions that, if executed by deep learning application processor 2800, cause deep learning application processor 2800 to perform some or all of processes and techniques described throughout this disclosure. In at least one embodiment, deep learning application processor 2800 is an application-specific integrated circuit (ASIC). In at least one embodiment, application processor 2800 performs matrix multiply operations either "hard-wired" into hardware as a result of performing one or more instructions or both. In at least one embodiment, deep learning application processor 2800 includes, without limitation, processing clusters 2810(1)-2810(12), Inter-Chip Links ("ICLs") 2820(1)-2820(12), Inter-Chip Controllers ("ICCs") 2830(1)-2830(2), high-bandwidth memory second generation ("HBM2") 2840(1)-2840(4), memory controllers ("Mem Ctrlrs") 2842(1)-2842(4), high bandwidth memory physical layer ("HBM PHY") 2844(1)-2844(4), a management-controller central processing unit ("management-controller CPU") 2850, a Serial Peripheral Interface, Inter-Integrated Circuit, and General Purpose Input/Output block ("SPI, $I^2C$, GPIO") 2860, a peripheral component interconnect express controller and direct memory access block ("PCIe Controller and DMA") 2870, and a sixteen-lane peripheral component interconnect express port ("PCI Express× 16") 2880.

In at least one embodiment, processing clusters 2810 may perform deep learning operations, including inference or prediction operations based on weight parameters calculated one or more training techniques, including those described herein. In at least one embodiment, each processing cluster 2810 may include, without limitation, any number and type of processors. In at least one embodiment, deep learning application processor 2800 may include any number and type of processing clusters 2800. In at least one embodiment, Inter-Chip Links 2820 are bi-directional. In at least one embodiment, Inter-Chip Links 2820 and Inter-Chip Controllers 2830 enable multiple deep learning application processors 2800 to exchange information, including activation information resulting from performing one or more machine learning algorithms embodied in one or more neural networks. In at least one embodiment, deep learning application processor 2800 may include any number (including zero) and type of ICLs 2820 and ICCs 2830.

In at least one embodiment, HBM2s 2840 provide a total of 32 Gigabytes (GB) of memory. In at least one embodiment, HBM2 2840(*i*) is associated with both memory controller 2842(*i*) and HBM PHY 2844(*i*) where "i" is an arbitrary integer. In at least one embodiment, any number of HBM2s 2840 may provide any type and total amount of high bandwidth memory and may be associated with any number (including zero) and type of memory controllers 2842 and HBM PHYs 2844. In at least one embodiment, SPI, I2C, GPIO 2860, PCIe Controller and DMA 2870, and/or PCIe 2880 may be replaced with any number and type of blocks that enable any number and type of communication standards in any technically feasible fashion.

Logic 915 are used to perform inferencing and/or training operations associated with one or more embodiments. Details regarding logic 915 are provided herein in conjunction with FIGS. 9A and/or 9B. In at least one embodiment, deep learning application processor is used to train a machine learning model, such as a neural network, to predict or infer information provided to deep learning application processor 2800. In at least one embodiment, deep learning application processor 2800 is used to infer or predict information based on a trained machine learning model (e.g., neural network) that has been trained by another processor or system or by deep learning application processor 2800. In at least one embodiment, processor 2800 may be used to perform one or more neural network use cases described herein.

In at least one embodiment, processor 2800 includes at least a portion of, or is at least a portion of, one or more of processors described herein at least in conjunction with FIGS. 1-8 AND FIGS. 10-22. In at least one embodiment, processor 2800 is at least a portion of, or includes at least a portion of, processor(s) 104 of FIG. 1. In at least one embodiment, processor 2800 comprises one or more circuits to use comprises one or more circuits to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein. In at least one embodiment, one or more circuits of processor 2800 is configured by software to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein.

Figure 29:
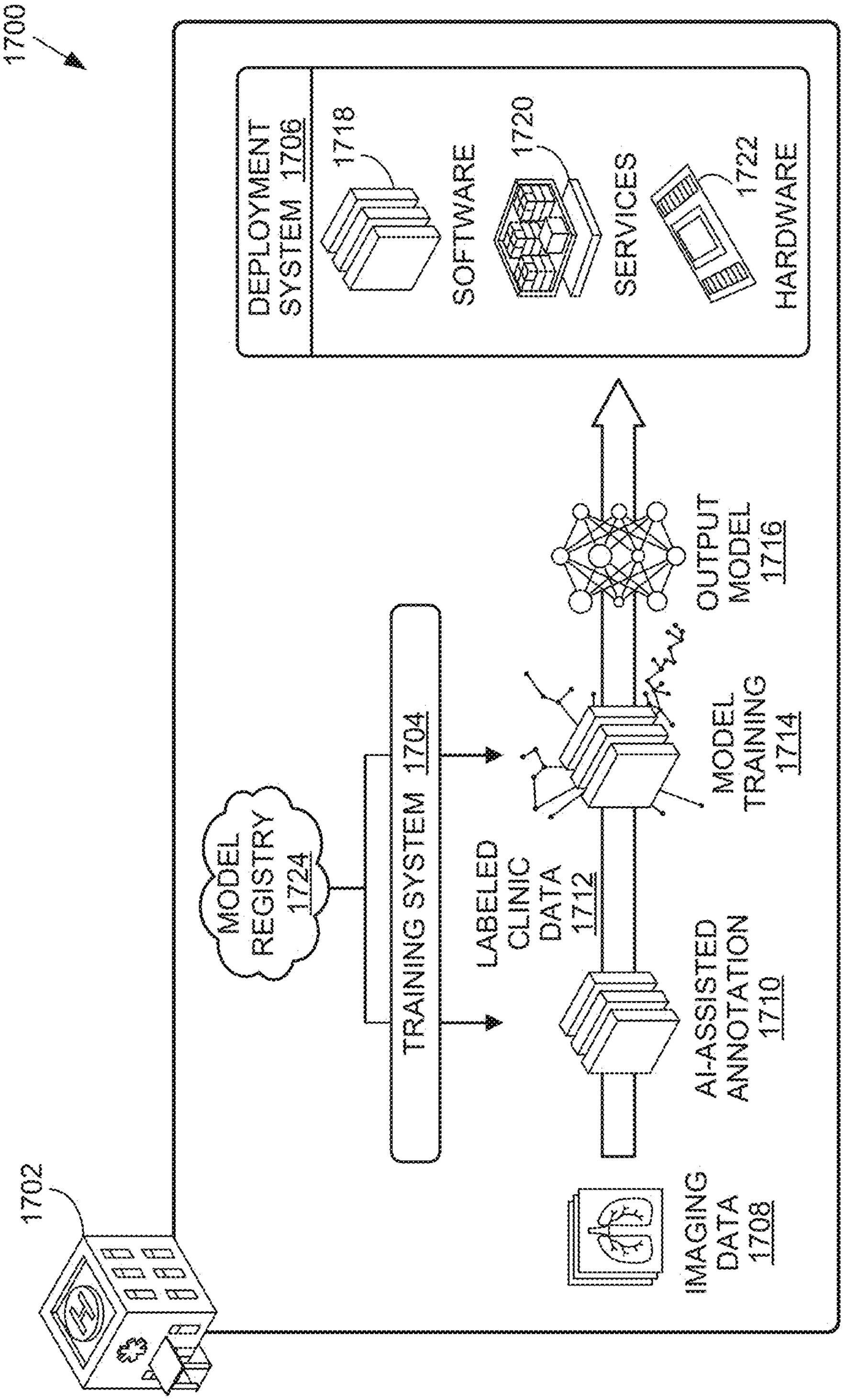
FIG. 29 illustrates an example data flow diagram for an advanced computing pipeline, in accordance with at least one embodiment.

With reference to FIG. 29, FIG. 29 is an example data flow diagram for a process 2900 of generating and deploying an image processing and inferencing pipeline, in accordance with at least one embodiment. In at least one embodiment, process 2900 may be deployed for use with imaging devices, processing devices, genomics devices, gene sequencing devices, radiology devices, and/or other device types at one or more facilities 2902, such as medical facilities, hospitals, healthcare institutes, clinics, research or diagnostic labs, etc. In at least one embodiment, process 2900 may be deployed to perform genomics analysis and inferencing on sequencing data. Examples of genomic analyses that may be performed using systems and processes described herein include, without limitation, variant calling, mutation detection, and gene expression quantification.

In at least one embodiment, process 2900 may be executed within a training system 2904 and/or a deployment system 2906. In at least one embodiment, training system 2904 may be used to perform training, deployment, and implementation of machine learning models (e.g., neural networks, object detection algorithms, computer vision algorithms, etc.) for use in deployment system 2906. In at least one embodiment, deployment system 2906 may be configured to offload processing and compute resources among a distributed computing environment to reduce infrastructure requirements at facility 2902. In at least one embodiment, deployment system 2906 may provide a streamlined platform for selecting, customizing, and implementing virtual instruments for use with imaging devices (e.g., MRI, CT Scan, X-Ray, Ultrasound, etc.) or sequencing devices at facility 2902. In at least one embodiment, virtual instruments may include software-defined applications for performing one or more processing operations with respect to imaging data generated by imaging devices, sequencing devices, radiology devices, and/or other device types. In at least one embodiment, one or more applications in a pipeline may use or call upon services (e.g., inference, visualization, compute, AI, etc.) of deployment system 2906 during execution of applications.

In at least one embodiment, some of applications used in advanced processing and inferencing pipelines may use machine learning models or other AI to perform one or more processing steps. In at least one embodiment, machine learning models may be trained at facility 2902 using data 2908 (such as imaging data) generated at facility 2902 (and stored on one or more picture archiving and communication system (PACS) servers at facility 2902), may be trained using imaging or sequencing data 2908 from another facility or facilities (e.g., a different hospital, lab, clinic, etc.), or a combination thereof. In at least one embodiment, training system 2904 may be used to provide applications, services, and/or other resources for generating working, deployable machine learning models for deployment system 2906.

In at least one embodiment, a model registry 2924 may be backed by object storage that may support versioning and object metadata. In at least one embodiment, object storage may be accessible through, for example, a cloud storage (e.g., a cloud 3026 of FIG. 30) compatible application programming interface (API) from within a cloud platform. In at least one embodiment, machine learning models within model registry 2924 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, a training pipeline 3004 (FIG. 30) may include a scenario where facility 2902 is training their own machine learning model, or has an existing machine learning model that needs to be optimized or updated. In at least one embodiment, imaging data 2908 generated by imaging device(s), sequencing devices, and/or other device types may be received. In at least one embodiment, once imaging data 2908 is received, AI-assisted annotation 2910 may be used to aid in generating annotations corresponding to imaging data 2908 to be used as ground truth data for a machine learning model. In at least one embodiment, AI-assisted annotation 2910 may include one or more machine learning models (e.g., convolutional neural networks (CNNs)) that may be trained to generate annotations corresponding to certain types of imaging data 2908 (e.g., from certain devices) and/or certain types of anomalies in imaging data 2908. In at least one embodiment, AI-assisted annotations 2910 may then be used directly, or may be adjusted or fine-tuned using an annotation tool (e.g., by a researcher, a clinician, a doctor, a scientist, etc.), to generate ground truth data. In at least one embodiment, in some examples, labeled clinic data 2912 (e.g., annotations provided by a clinician, doctor, scientist, technician, etc.) may be used as ground truth data for training a machine learning model. In at least one embodiment, AI-assisted annotations 2910, labeled clinic data 2912, or a combination thereof may be used as ground truth data for training a machine learning model. In at least one embodiment, a trained machine learning model may be referred to as an output model 2916, and may be used by deployment system 2906, as described herein.

In at least one embodiment, training pipeline 3004 (FIG. 30) may include a scenario where facility 2902 needs a machine learning model for use in performing one or more processing tasks for one or more applications in deployment system 2906, but facility 2902 may not currently have such a machine learning model (or may not have a model that is optimized, efficient, or effective for such purposes). In at least one embodiment, an existing machine learning model may be selected from model registry 2924. In at least one embodiment, model registry 2924 may include machine learning models trained to perform a variety of different inference tasks on imaging data. In at least one embodiment, machine learning models in model registry 2924 may have been trained on imaging data from different facilities than facility 2902 (e.g., facilities remotely located). In at least one embodiment, machine learning models may have been trained on imaging data from one location, two locations, or any number of locations.

In at least one embodiment, when being trained on imaging data from a specific location, training may take place at that location, or at least in a manner that protects confidentiality of imaging data or restricts imaging data from being transferred off-premises (e.g., to comply with HIPAA regulations, privacy regulations, etc.). In at least one embodiment, once a model is trained—or partially trained—at one location, a machine learning model may be added to model registry 2924. In at least one embodiment, a machine learning model may then be retrained, or updated, at any number of other facilities, and a retrained or updated model may be made available in model registry 2924. In at least one embodiment, a machine learning model may then be selected from model registry 2924—and referred to as output model 2916—and may be used in deployment system 2906 to perform one or more processing tasks for one or more applications of a deployment system.

In at least one embodiment, training pipeline 3004 (FIG. 30) may be used in a scenario that includes facility 2902 requiring a machine learning model for use in performing one or more processing tasks for one or more applications in deployment system 2906, but facility 2902 may not currently have such a machine learning model (or may not have a model that is optimized, efficient, or effective for such purposes). In at least one embodiment, a machine learning model selected from model registry 2924 might not be fine-tuned or optimized for imaging data 2908 generated at facility 2902 because of differences in populations, genetic variations, robustness of training data used to train a machine learning model, diversity in anomalies of training data, and/or other issues with training data. In at least one embodiment, AI-assisted annotation 2910 may be used to aid in generating annotations corresponding to imaging data 2908 to be used as ground truth data for retraining or updating a machine learning model. In at least one embodiment, labeled clinic data 2912 (e.g., annotations provided by a clinician, doctor, scientist, etc.) may be used as ground truth data for training a machine learning model. In at least one embodiment, retraining or updating a machine learning model may be referred to as model training 2914. In at least one embodiment, model training 2914—e.g., AI-assisted annotations 2910, labeled clinic data 2912, or a combination thereof—may be used as ground truth data for retraining or updating a machine learning model.

In at least one embodiment, deployment system 2906 may include software 2918, services 2920, hardware 2922, and/or other components, features, and functionality. In at least one embodiment, deployment system 2906 may include a software "stack," such that software 2918 may be built on top of services 2920 and may use services 2920 to perform some or all of processing tasks, and services 2920 and software 2918 may be built on top of hardware 2922 and use hardware 2922 to execute processing, storage, and/or other compute tasks of deployment system 2906.

In at least one embodiment, software 2918 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, for each type of imaging device (e.g., CT, MRI, X-Ray, ultrasound, sonography, echocardiography, etc.), sequencing device, radiology device, genomics device, etc., there may be any number of containers that may perform a data processing task with respect to imaging data 2908 (or other data types, such as those described herein) generated by a device. In at least one embodiment, an advanced processing and inferencing pipeline may be defined based on selections of different containers that are desired or required for processing imaging data 2908, in addition to containers that receive and configure imaging data for use by each container and/or for use by facility 2902 after processing through a pipeline (e.g., to convert outputs back to a usable data type, such as digital imaging and communications in medicine (DICOM) data, radiology information system (RIS) data, clinical information system (CIS) data, remote procedure call (RPC) data, data substantially compliant with a representation state transfer (REST) interface, data substantially compliant with a file-based interface, and/or raw data, for storage and display at facility 2902). In at least one embodiment, a combination of containers within software 2918 (e.g., that make up a pipeline) may be referred to as a virtual instrument (as described in more detail herein), and a virtual instrument may leverage services 2920 and hardware 2922 to execute some or all processing tasks of applications instantiated in containers.

In at least one embodiment, a data processing pipeline may receive input data (e.g., imaging data 2908) in a DICOM, RIS, CIS, REST compliant, RPC, raw, and/or other format in response to an inference request (e.g., a request from a user of deployment system 2906, such as a clinician, a doctor, a radiologist, etc.). In at least one embodiment, input data may be representative of one or more images, video, and/or other data representations generated by one or more imaging devices, sequencing devices, radiology devices, genomics devices, and/or other device types. In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 2916 of training system 2904.

In at least one embodiment, tasks of data processing pipeline may be encapsulated in a container(s) that each represent a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 2924 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers (e.g., software developers, clinicians, doctors, etc.) may develop, publish, and store applications (e.g., as containers) for performing image processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 2920 as a system (e.g., system 3000 of FIG. 30). In at least one embodiment, because DICOM objects may contain anywhere from one to hundreds of images or other data types, and due to a variation in data, a developer may be responsible for managing (e.g., setting constructs for, building pre-processing into an application, etc.) extraction and preparation of incoming DICOM data. In at least one embodiment, once validated by system 3000 (e.g., for accuracy, safety, patient privacy, etc.), an application may be available in a container registry for selection and/or implementation by a user (e.g., a hospital, clinic, lab, healthcare provider, etc.) to perform one or more processing tasks with respect to data at a facility (e.g., a second facility) of a user.

Figure 30:
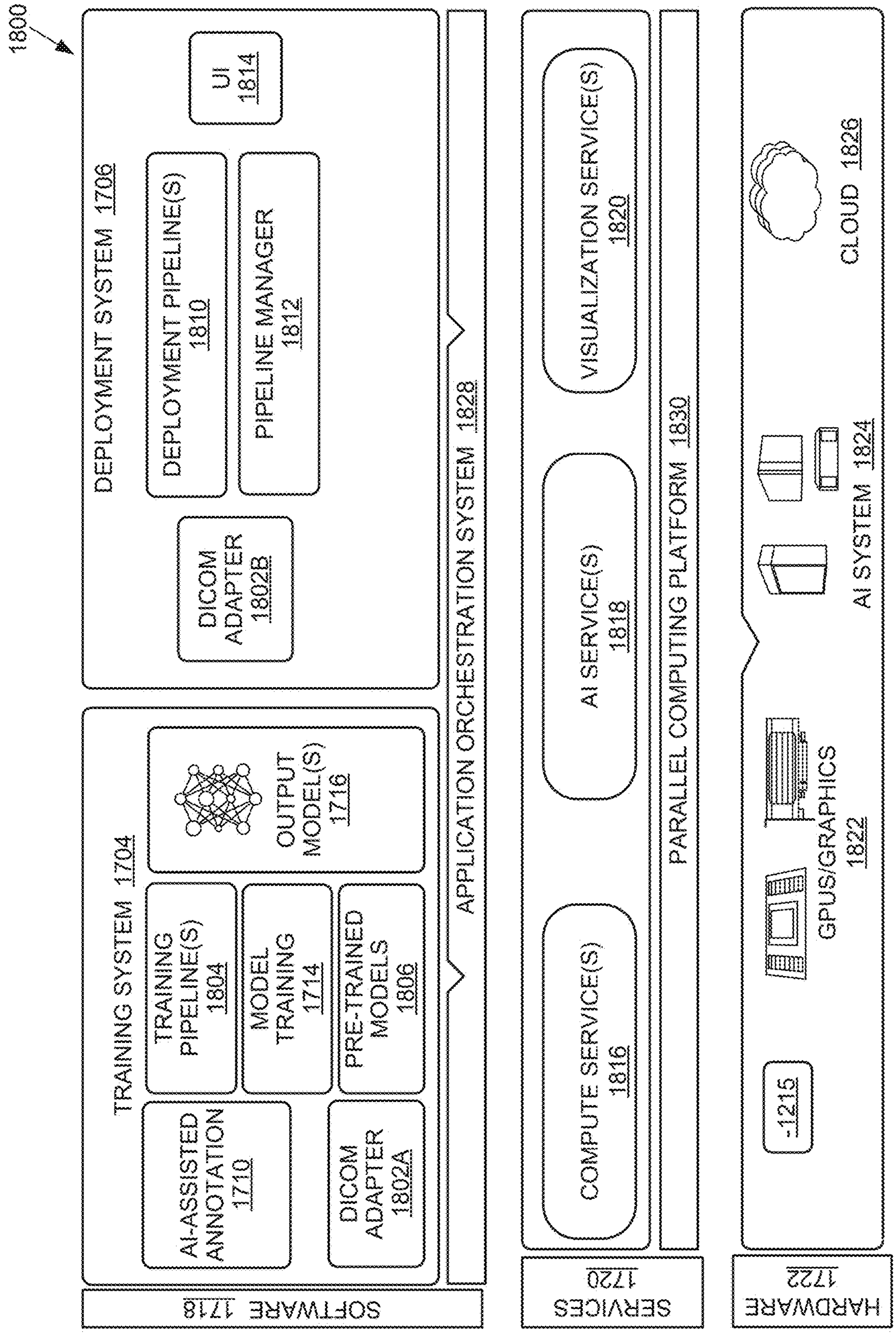
FIG. 30 illustrates a system diagram for an example system for training, adapting, instantiating and deploying machine learning models in an advanced computing pipeline, in accordance with at least one embodiment.

In at least one embodiment, developers may then share applications or containers through a network for access and use by users of a system (e.g., system 3000 of FIG. 30). In at least one embodiment, completed and validated applications or containers may be stored in a container registry and associated machine learning models may be stored in model registry 2924. In at least one embodiment, a requesting entity (e.g., a user at a medical facility)—who provides an inference or image processing request—may browse a container registry and/or model registry 2924 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 2906 (e.g., a cloud) to perform processing of data processing pipeline. In at least one embodiment, processing by deployment system 2906 may include referencing selected elements (e.g., applications, containers, models, etc.) from a container registry and/or model registry 2924. In at least one embodiment, once results are generated by a pipeline, results may be returned to a user for reference (e.g., for viewing in a viewing application suite executing on a local, on-premises workstation or terminal). In at least one embodiment, a radiologist may receive results from an data processing pipeline including any number of application and/or containers, where results may include anomaly detection in X-rays, CT scans, MRIs, etc.

In at least one embodiment, to aid in processing or execution of applications or containers in pipelines, services 2920 may be leveraged. In at least one embodiment, services 2920 may include compute services, artificial intelligence (AI) services, visualization services, and/or other service types. In at least one embodiment, services 2920 may provide functionality that is common to one or more applications in software 2918, so functionality may be abstracted to a service that may be called upon or leveraged by applications. In at least one embodiment, functionality provided by services 2920 may run dynamically and more efficiently, while also scaling well by allowing applications to process data in parallel (e.g., using a parallel computing platform 3030 (FIG. 30)). In at least one embodiment, rather than each application that shares a same functionality offered by a service 2920 being required to have a respective instance of service 2920, service 2920 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (e.g., DICOM, RIS, CIS, REST compliant, RPC, raw, etc.) extraction, resizing, scaling, and/or other augmentation. In at least one embodiment, a visualization service may be used that may add image rendering effects-such as ray-tracing, rasterization, denoising, sharpening, etc.—to add realism to two-dimensional (2D) and/or three-dimensional (3D) models. In at least one embodiment, virtual instrument services may be included that provide for beam-forming, segmentation, inferencing, imaging, and/or support for other applications within pipelines of virtual instruments.

In at least one embodiment, where a service 2920 includes an AI service (e.g., an inference service), one or more machine learning models associated with an application for anomaly detection (e.g., tumors, growth abnormalities, scarring, etc.) may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 2918 implementing advanced processing and inferencing pipeline that includes segmentation application and anomaly detection application may be streamlined because each application may call upon a same inference service to perform one or more inferencing tasks.

In at least one embodiment, hardware 2922 may include GPUs, CPUs, graphics cards, an AI/deep learning system (e.g., an AI supercomputer, such as NVIDIA's DGX supercomputer system), a cloud platform, or a combination thereof. In at least one embodiment, different types of hardware 2922 may be used to provide efficient, purpose-built support for software 2918 and services 2920 in deployment system 2906. In at least one embodiment, use of GPU processing may be implemented for processing locally (e.g., at facility 2902), within an AI/deep learning system, in a cloud system, and/or in other processing components of deployment system 2906 to improve efficiency, accuracy, and efficacy of image processing, image reconstruction, segmentation, MRI exams, stroke or heart attack detection (e.g., in real-time), image quality in rendering, etc. In at least one embodiment, a facility may include imaging devices, genomics devices, sequencing devices, and/or other device types on-premises that may leverage GPUs to generate imaging data representative of a subject's anatomy.

In at least one embodiment, software 2918 and/or services 2920 may be optimized for GPU processing with respect to deep learning, machine learning, and/or high-performance computing, as non-limiting examples. In at least one embodiment, at least some of computing environment of deployment system 2906 and/or training system 2904 may be executed in a datacenter one or more supercomputers or high performance computing systems, with GPU optimized software (e.g., hardware and software combination of NVIDIA's DGX system). In at least one embodiment, datacenters may be compliant with provisions of HIPAA, such that receipt, processing, and transmission of imaging data and/or other patient data is securely handled with respect to privacy of patient data. In at least one embodiment, hardware 2922 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC) may be executed using an AI/deep learning supercomputer(s) and/or GPU-optimized software (e.g., as provided on NVIDIA's DGX systems) as a hardware abstraction and scaling platform. In at least one embodiment, cloud platform may integrate an application container clustering system or orchestration system (e.g., KUBERNETES) on multiple GPUs to enable seamless scaling and load balancing.

In at least one embodiment, training system 2904 and/or deployment system 2906 includes one or more processors that are at least a portion of, or include at least a portion of, one or more of processors described herein at least in conjunction with FIGS. 1-8 and FIGS. 10-22. In at least one embodiment, training system 2904 and/or deployment system 2906 includes one or more processors that are at least a portion of, or includes at least a portion of, processor(s) 104 of FIG. 1. In at least one embodiment, training system 2904 and/or deployment system 2906 includes one or more processors that comprise one or more circuits to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein. In at least one embodiment, one or more circuits of one or more processors of training system 2904 and/or deployment system 2906 is configured by software 2918 to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein.

FIG. 30 is a system diagram for an example system 3000 for generating and deploying an imaging deployment pipeline, in accordance with at least one embodiment. In at least one embodiment, system 3000 may be used to implement process 2900 of FIG. 29 and/or other processes including advanced processing and inferencing pipelines. In at least one embodiment, system 3000 may include training system 2904 and deployment system 2906. In at least one embodiment, training system 2904 and deployment system 2906 may be implemented using software 2918, services 2920, and/or hardware 2922, as described herein.

In at least one embodiment, system 3000 (e.g., training system 2904 and/or deployment system 2906) may be implemented in a cloud computing environment (e.g., using cloud 3026). In at least one embodiment, system 3000 may be implemented locally with respect to a healthcare services facility, or as a combination of both cloud and local computing resources. In at least one embodiment, in embodiments where cloud computing is implemented, patient data may be separated from, or unprocessed by, by one or more components of system 3000 that would render processing non-compliant with HIPAA and/or other data handling and privacy regulations or laws. In at least one embodiment, access to APIs in cloud 3026 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 3000, may be restricted to a set of public IPs that have been vetted or authorized for interaction.

In at least one embodiment, various components of system 3000 may communicate between and among one another using any of a variety of different network types, including but not limited to local area networks (LANs) and/or wide area networks (WANs) via wired and/or wireless communication protocols. In at least one embodiment, communication between facilities and components of system 3000 (e.g., for transmitting inference requests, for receiving results of inference requests, etc.) may be communicated over a data bus or data busses, wireless data protocols (Wi-Fi), wired data protocols (e.g., Ethernet), etc.

In at least one embodiment, training system 2904 may execute training pipelines 3004, similar to those described herein with respect to FIG. 29. In at least one embodiment, where one or more machine learning models are to be used in deployment pipelines 3010 by deployment system 2906, training pipelines 3004 may be used to train or retrain one or more (e.g., pre-trained) models, and/or implement one or more of pre-trained models 3006 (e.g., without a need for retraining or updating). In at least one embodiment, as a result of training pipelines 3004, output model(s) 2916 may be generated. In at least one embodiment, training pipelines 3004 may include any number of processing steps, such as but not limited to imaging data (or other input data) conversion or adaption (e.g., using DICOM adapter 3002A to convert DICOM images to another format suitable for processing by respective machine learning models, such as Neuroimaging Informatics Technology Initiative (NIfTI) format), AI-assisted annotation 2910, labeling or annotating of imaging data 2908 to generate labeled clinic data 2912, model selection from a model registry, model training 2914, training, retraining, or updating models, and/or other processing steps. In at least one embodiment, for different machine learning models used by deployment system 2906, different training pipelines 3004 may be used. In at least one embodiment, training pipeline 3004 similar to a first example described with respect to FIG. 29 may be used for a first machine learning model, training pipeline 3004 similar to a second example described with respect to FIG. 29 may be used for a second machine learning model, and training pipeline 3004 similar to a third example described with respect to FIG. 29 may be used for a third machine learning model. In at least one embodiment, any combination of tasks within training system 2904 may be used depending on what is required for each respective machine learning model. In at least one embodiment, one or more of machine learning models may already be trained and ready for deployment so machine learning models may not undergo any processing by training system 2904, and may be implemented by deployment system 2906.

In at least one embodiment, output model(s) 2916 and/or pre-trained model(s) 3006 may include any types of machine learning models depending on implementation or embodiment. In at least one embodiment, and without limitation, machine learning models used by system 3000 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

Figure 33A:
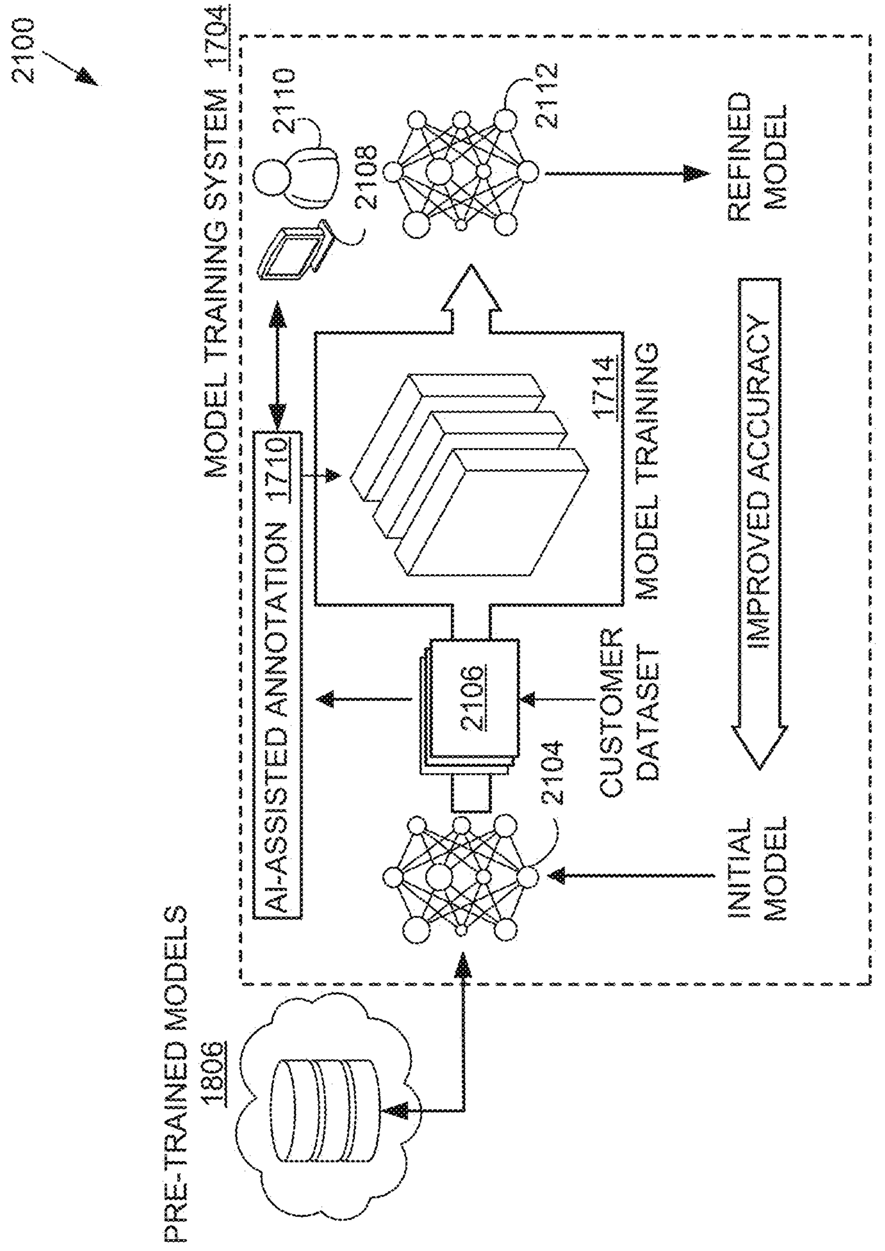
FIG. 33A illustrates a data flow diagram for a process to train a machine learning model, in accordance with at least one embodiment.
Figure 33B:
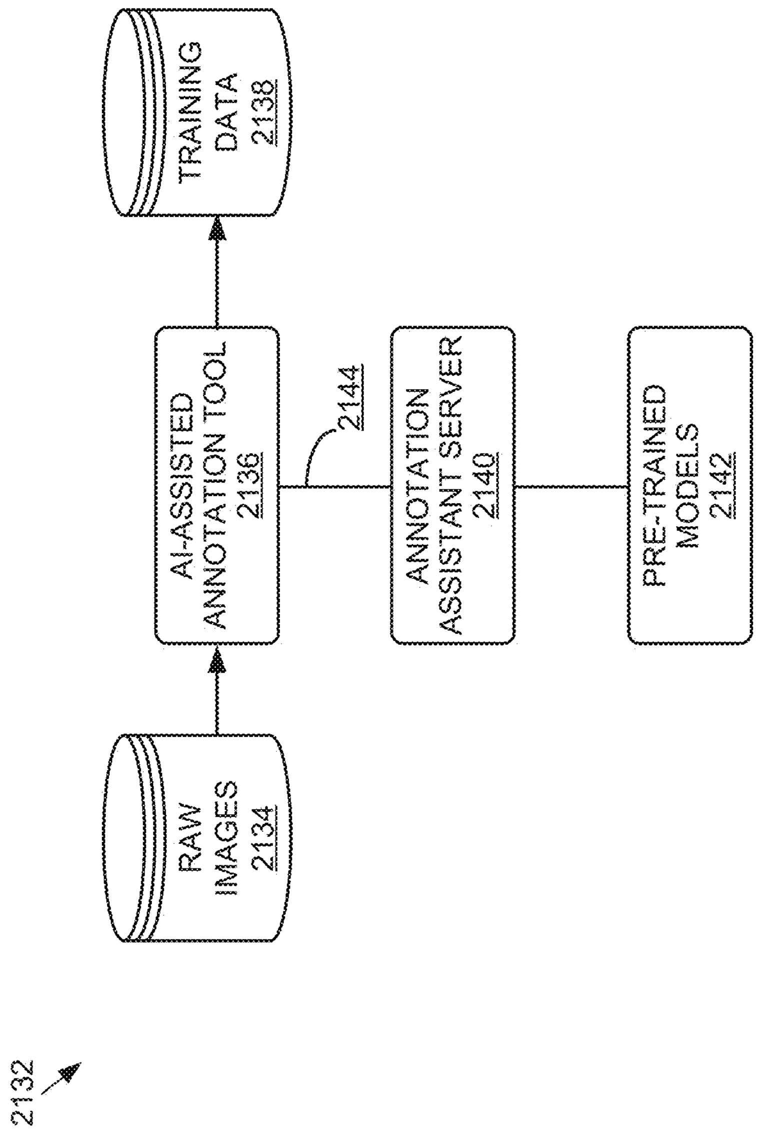
FIG. 33B is an example illustration of a client-server architecture to enhance annotation tools with pre-trained annotation models, in accordance with at least one embodiment.

In at least one embodiment, training pipelines 3004 may include AI-assisted annotation, as described in more detail herein with respect to at least FIG. 33B. In at least one embodiment, labeled clinic data 2912 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of imaging data 2908 (or other data type used by machine learning models), there may be corresponding ground truth data generated by training system 2904. In at least one embodiment, AI-assisted annotation may be performed as part of deployment pipelines 3010; either in addition to, or in lieu of AI-assisted annotation included in training pipelines 3004. In at least one embodiment, system 3000 may include a multi-layer platform that may include a software layer (e.g., software 2918) of diagnostic applications (or other application types) that may perform one or more medical imaging and diagnostic functions. In at least one embodiment, system 3000 may be communicatively coupled to (e.g., via encrypted links) PACS server networks of one or more facilities. In at least one embodiment, system 3000 may be configured to access and referenced data (e.g., DICOM data, RIS data, raw data, CIS data, REST compliant data, RPC data, raw data, etc.) from PACS servers (e.g., via a DICOM adapter 3002, or another data type adapter such as RIS, CIS, REST compliant, RPC, raw, etc.) to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (e.g., called) from an external environment(s) (e.g., facility 2902). In at least one embodiment, applications may then call or execute one or more services 2920 for performing compute, AI, or visualization tasks associated with respective applications, and software 2918 and/or services 2920 may leverage hardware 2922 to perform processing tasks in an effective and efficient manner.

In at least one embodiment, deployment system 2906 may execute deployment pipelines 3010. In at least one embodiment, deployment pipelines 3010 may include any number of applications that may be sequentially, non-sequentially, or otherwise applied to imaging data (and/or other data types) generated by imaging devices, sequencing devices, genomics devices, etc.—including AI-assisted annotation, as described above. In at least one embodiment, as described herein, a deployment pipeline 3010 for an individual device may be referred to as a virtual instrument for a device (e.g., a virtual ultrasound instrument, a virtual CT scan instrument, a virtual sequencing instrument, etc.). In at least one embodiment, for a single device, there may be more than one deployment pipeline 3010 depending on information desired from data generated by a device. In at least one embodiment, where detections of anomalies are desired from an MRI machine, there may be a first deployment pipeline 3010, and where image enhancement is desired from output of an MRI machine, there may be a second deployment pipeline 3010.

In at least one embodiment, applications available for deployment pipelines 3010 may include any application that may be used for performing processing tasks on imaging data or other data from devices. In at least one embodiment, different applications may be responsible for image enhancement, segmentation, reconstruction, anomaly detection, object detection, feature detection, treatment planning, dosimetry, beam planning (or other radiation treatment procedures), and/or other analysis, image processing, or inferencing tasks. In at least one embodiment, deployment system 2906 may define constructs for each of applications, such that users of deployment system 2906 (e.g., medical facilities, labs, clinics, etc.) may understand constructs and adapt applications for implementation within their respective facility. In at least one embodiment, an application for image reconstruction may be selected for inclusion in deployment pipeline 3010, but data type generated by an imaging device may be different from a data type used within an application. In at least one embodiment, DICOM adapter 3002B (and/or a DICOM reader) or another data type adapter or reader (e.g., RIS, CIS, REST compliant, RPC, raw, etc.) may be used within deployment pipeline 3010 to convert data to a form useable by an application within deployment system 2906. In at least one embodiment, access to DICOM, RIS, CIS, REST compliant, RPC, raw, and/or other data type libraries may be accumulated and pre-processed, including decoding, extracting, and/or performing any convolutions, color corrections, sharpness, gamma, and/or other augmentations to data. In at least one embodiment, DICOM, RIS, CIS, REST compliant, RPC, and/or raw data may be unordered and a pre-pass may be executed to organize or sort collected data. In at least one embodiment, because various applications may share common image operations, in some embodiments, a data augmentation library (e.g., as one of services 2920) may be used to accelerate these operations. In at least one embodiment, to avoid bottlenecks of conventional processing approaches that rely on CPU processing, parallel computing platform 3030 may be used for GPU acceleration of these processing tasks.

In at least one embodiment, an image reconstruction application may include a processing task that includes use of a machine learning model. In at least one embodiment, a user may desire to use their own machine learning model, or to select a machine learning model from model registry 2924. In at least one embodiment, a user may implement their own machine learning model or select a machine learning model for inclusion in an application for performing a processing task. In at least one embodiment, applications may be selectable and customizable, and by defining constructs of applications, deployment and implementation of applications for a particular user are presented as a more seamless user experience. In at least one embodiment, by leveraging other features of system 3000—such as services 2920 and hardware 2922—deployment pipelines 3010 may be even more user friendly, provide for easier integration, and produce more accurate, efficient, and timely results.

In at least one embodiment, deployment system 2906 may include a user interface 3014 (e.g., a graphical user interface, a web interface, etc.) that may be used to select applications for inclusion in deployment pipeline(s) 3010, arrange applications, modify or change applications or parameters or constructs thereof, use and interact with deployment pipeline(s) 3010 during set-up and/or deployment, and/or to otherwise interact with deployment system 2906. In at least one embodiment, although not illustrated with respect to training system 2904, user interface 3014 (or a different user interface) may be used for selecting models for use in deployment system 2906, for selecting models for training, or retraining, in training system 2904, and/or for otherwise interacting with training system 2904.

Figure 31:
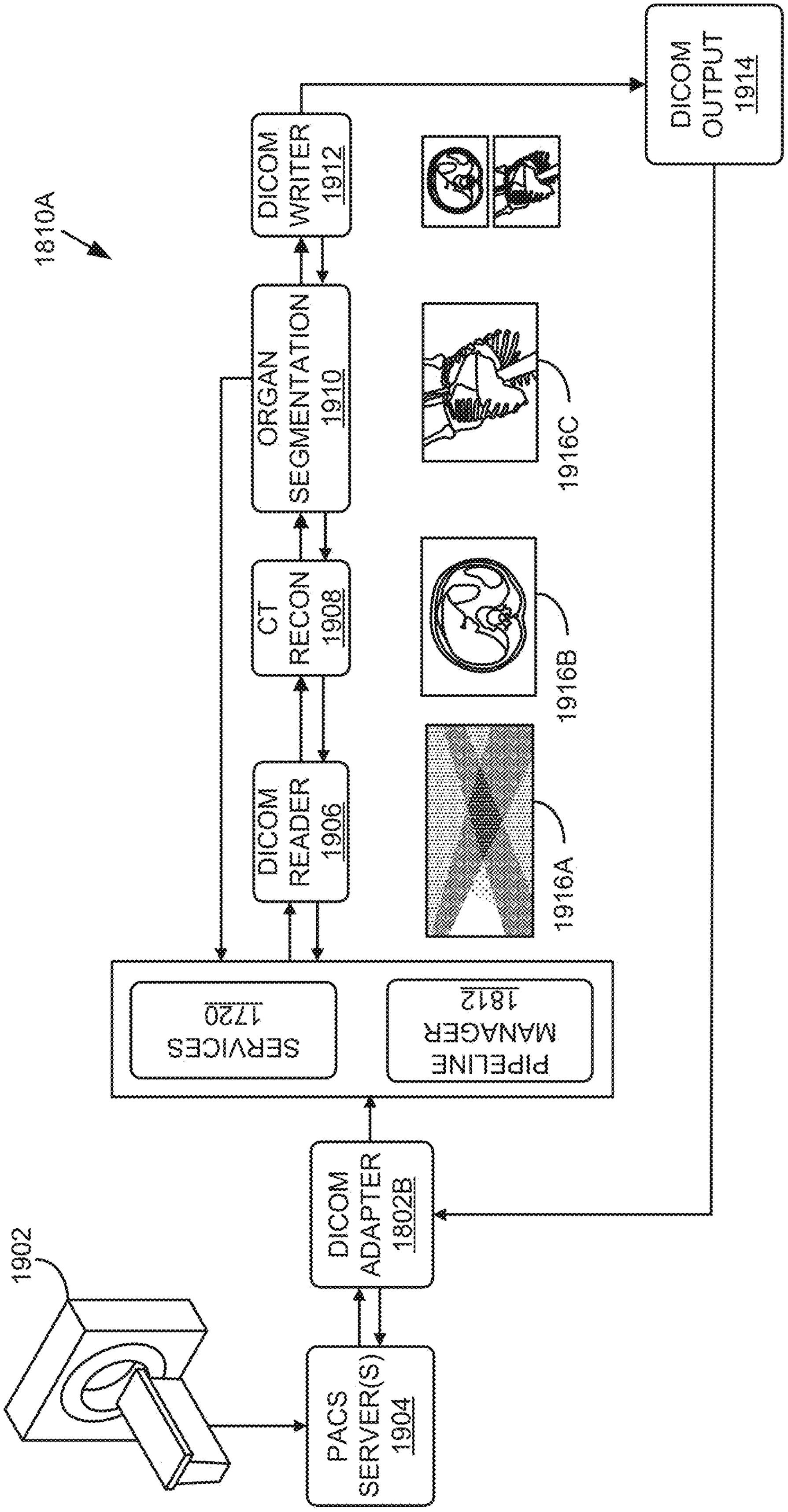
FIG. 31 includes an example illustration of an advanced computing pipeline 3910A for processing imaging data, in accordance with at least one embodiment.

In at least one embodiment, pipeline manager 3012 may be used, in addition to an application orchestration system 3028, to manage interaction between applications or containers of deployment pipeline(s) 3010 and services 2920 and/or hardware 2922. In at least one embodiment, pipeline manager 3012 may be configured to facilitate interactions from application to application, from application to service 2920, and/or from application or service to hardware 2922. In at least one embodiment, although illustrated as included in software 2918, this is not intended to be limiting, and in some examples (e.g., as illustrated in FIG. 31) pipeline manager 3012 may be included in services 2920. In at least one embodiment, application orchestration system 3028 (e.g., Kubernetes, DOCKER, etc.) may include a container orchestration system that may group applications into containers as logical units for coordination, management, scaling, and deployment. In at least one embodiment, by associating applications from deployment pipeline(s) 3010 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 3012 and application orchestration system 3028. In at least one embodiment, so long as an expected input and/or output of each container or application is known by a system (e.g., based on constructs of applications or containers), application orchestration system 3028 and/or pipeline manager 3012 may facilitate communication among and between, and sharing of resources among and between, each of applications or containers. In at least one embodiment, because one or more of applications or containers in deployment pipeline(s) 3010 may share same services and resources, application orchestration system 3028 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 3028 such as a sequencer and/or asynchronous compute engine) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 2920 leveraged by and shared by applications or containers in deployment system 2906 may include compute services 3016, AI services 3018, visualization services 3020, and/or other service types. In at least one embodiment, applications may call (e.g., execute) one or more of services 2920 to perform processing operations for an application. In at least one embodiment, compute services 3016 may be leveraged by applications to perform super-computing or other high-performance computing (HPC) tasks. In at least one embodiment, compute service(s) 3016 may be leveraged to perform parallel processing (e.g., using a parallel computing platform 3030) for processing data through one or more of applications and/or one or more tasks of a single application, substantially simultaneously. In at least one embodiment, parallel computing platform 3030 (e.g., NVIDIA's CUDA) may enable general purpose computing on GPUs (GPGPU) (e.g., GPUs 3022). In at least one embodiment, a software layer of parallel computing platform 3030 may provide access to virtual instruction sets and parallel computational elements of GPUs, for execution of compute kernels. In at least one embodiment, parallel computing platform 3030 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 3030 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 3018 may be leveraged to perform inferencing services for executing machine learning model(s) associated with applications (e.g., tasked with performing one or more processing tasks of an application). In at least one embodiment, AI services 3018 may leverage AI system 3024 to execute machine learning model(s) (e.g., neural networks, such as CNNs) for segmentation, reconstruction, object detection, feature detection, classification, and/or other inferencing tasks. In at least one embodiment, applications of deployment pipeline(s) 3010 may use one or more of output models 2916 from training system 2904 and/or other models of applications to perform inferencing on imaging data (e.g., DICOM data, RIS data, CIS data, REST compliant data, RPC data, raw data, etc.). In at least one embodiment, two or more examples of inferencing using application orchestration system 3028 (e.g., a scheduler, sequencer, and/or asynchronous compute engine) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 3028 may distribute resources (e.g., services 2920 and/or hardware 2922) based on priority paths for different inferencing tasks of AI services 3018.

In at least one embodiment, shared storage may be mounted to AI services 3018 within system 3000. In at least one embodiment, shared storage may operate as a cache (or other storage device type) and may be used to process inference requests from applications. In at least one embodiment, when an inference request is submitted, a request may be received by a set of API instances of deployment system 2906, and one or more instances may be selected (e.g., for best fit, for load balancing, etc.) to process a request. In at least one embodiment, to process a request, a request may be entered into a database, a machine learning model may be located from model registry 2924 if not already in a cache, a validation step may ensure appropriate machine learning model is loaded into a cache (e.g., shared storage), and/or a copy of a model may be saved to a cache. In at least one embodiment, a scheduler (e.g., of pipeline manager 3012) may be used to launch an application that is referenced in a request if an application is not already running or if there are not enough instances of an application. In at least one embodiment, if an inference server is not already launched to execute a model, an inference server may be launched. In at least one embodiment, any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inferencing on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inferencing as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT less than one minute) priority while others may have lower priority (e.g., TAT less than 10 minutes). In at least one embodiment, model execution times may be measured from requesting institution or entity and may include partner network traversal time, as well as execution on an inference service.

In at least one embodiment, transfer of requests between services 2920 and inference applications may be hidden behind a software development kit (SDK), and robust transport may be provided through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. In at least one embodiment, results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 3026, and an inference service may perform inferencing on a GPU.

In at least one embodiment, visualization services 3020 may be leveraged to generate visualizations for viewing outputs of applications and/or deployment pipeline(s) 3010. In at least one embodiment, GPUs 3022 may be leveraged by visualization services 3020 to generate visualizations. In at least one embodiment, rendering effects, such as ray-tracing, may be implemented by visualization services 3020 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 3020 may include an internal visualizer, cinematics, and/or other rendering or image processing capabilities or functionality (e.g., ray tracing, rasterization, internal optics, etc.).

In at least one embodiment, hardware 2922 may include GPUs 3022, AI system 3024, cloud 3026, and/or any other hardware used for executing training system 2904 and/or deployment system 2906. In at least one embodiment, GPUs 3022 (e.g., NVIDIA's TESLA and/or QUADRO GPUs) may include any number of GPUs that may be used for executing processing tasks of compute services 3016, AI services 3018, visualization services 3020, other services, and/or any of features or functionality of software 2918. For example, with respect to AI services 3018, GPUs 3022 may be used to perform pre-processing on imaging data (or other data types used by machine learning models), post-processing on outputs of machine learning models, and/or to perform inferencing (e.g., to execute machine learning models). In at least one embodiment, cloud 3026, AI system 3024, and/or other components of system 3000 may use GPUs 3022. In at least one embodiment, cloud 3026 may include a GPU-optimized platform for deep learning tasks. In at least one embodiment, AI system 3024 may use GPUs, and cloud 3026—or at least a portion tasked with deep learning or inferencing—may be executed using one or more AI systems 3024. As such, although hardware 2922 is illustrated as discrete components, this is not intended to be limiting, and any components of hardware 2922 may be combined with, or leveraged by, any other components of hardware 2922.

In at least one embodiment, AI system 3024 may include a purpose-built computing system (e.g., a super-computer or an HPC) configured for inferencing, deep learning, machine learning, and/or other artificial intelligence tasks. In at least one embodiment, AI system 3024 (e.g., NVIDIA's DGX) may include GPU-optimized software (e.g., a software stack) that may be executed using a plurality of GPUs 3022, in addition to CPUs, RAM, storage, and/or other components, features, or functionality. In at least one embodiment, one or more AI systems 3024 may be implemented in cloud 3026 (e.g., in a data center) for performing some or all of AI-based processing tasks of system 3000.

In at least one embodiment, cloud 3026 may include a GPU-accelerated infrastructure (e.g., NVIDIA's NGC) that may provide a GPU-optimized platform for executing processing tasks of system 3000. In at least one embodiment, cloud 3026 may include an AI system(s) 3024 for performing one or more of AI-based tasks of system 3000 (e.g., as a hardware abstraction and scaling platform). In at least one embodiment, cloud 3026 may integrate with application orchestration system 3028 leveraging multiple GPUs to enable seamless scaling and load balancing between and among applications and services 2920. In at least one embodiment, cloud 3026 may tasked with executing at least some of services 2920 of system 3000, including compute services 3016, AI services 3018, and/or visualization services 3020, as described herein. In at least one embodiment, cloud 3026 may perform small and large batch inference (e.g., executing NVIDIA's TENSOR RT), provide an accelerated parallel computing API and platform 3030 (e.g., NVIDIA's CUDA), execute application orchestration system 3028 (e.g., KUBERNETES), provide a graphics rendering API and platform (e.g., for ray-tracing, 2D graphics, 3D graphics, and/or other rendering techniques to produce higher quality cinematics), and/or may provide other functionality for system 3000.

In at least one embodiment, in an effort to preserve patient confidentiality (e.g., where patient data or records are to be used off-premises), cloud 3026 may include a registry-such as a deep learning container registry. In at least one embodiment, a registry may store containers for instantiations of applications that may perform pre-processing, post-processing, or other processing tasks on patient data. In at least one embodiment, cloud 3026 may receive data that includes patient data as well as sensor data in containers, perform requested processing for just sensor data in those containers, and then forward a resultant output and/or visualizations to appropriate parties and/or devices (e.g., on-premises medical devices used for visualization or diagnoses), all without having to extract, store, or otherwise access patient data. In at least one embodiment, confidentiality of patient data is preserved in compliance with HIPAA and/or other data regulations.

In at least one embodiment, system 3000 includes one or more processors that are at least a portion of, or include at least a portion of, one or more of processors described herein at least in conjunction with FIGS. 1-8 and FIGS. 10-22. In at least one embodiment, system 3000 includes one or more processors that are at least a portion of, or includes at least a portion of, processor(s) 104 of FIG. 1. In at least one embodiment, system 3000 includes one or more processors that comprise one or more circuits to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein. In at least one embodiment, system 3000 includes one or more circuits of one or more processors configured by software to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein.

FIG. 31 includes an example illustration of a deployment pipeline 3010A for processing imaging data, in accordance with at least one embodiment. In at least one embodiment, system 3000—and specifically deployment system 2906—may be used to customize, update, and/or integrate deployment pipeline(s) 3010A into one or more production environments. In at least one embodiment, deployment pipeline 3010A of FIG. 31 includes a non-limiting example of a deployment pipeline 3010A that may be custom defined by a particular user (or team of users) at a facility (e.g., at a hospital, clinic, lab, research environment, etc.). In at least one embodiment, to define deployment pipelines 3010A for a CT scanner 3102, a user may select—from a container registry, for example—one or more applications that perform specific functions or tasks with respect to imaging data generated by CT scanner 3102. In at least one embodiment, applications may be applied to deployment pipeline 3010A as containers that may leverage services 2920 and/or hardware 2922 of system 3000. In addition, deployment pipeline 3010A may include additional processing tasks or applications that may be implemented to prepare data for use by applications (e.g., DICOM adapter 3002B and DICOM reader 3106 may be used in deployment pipeline 3010A to prepare data for use by CT reconstruction 3108, organ segmentation 3110, etc.). In at least one embodiment, deployment pipeline 3010A may be customized or selected for consistent deployment, one time use, or for another frequency or interval. In at least one embodiment, a user may desire to have CT reconstruction 3108 and organ segmentation 3110 for several subjects over a specific interval, and thus may deploy pipeline 3010A for that period of time. In at least one embodiment, a user may select, for each request from system 3000, applications that a user wants to perform processing on that data for that request. In at least one embodiment, deployment pipeline 3010A may be adjusted at any interval and, because of adaptability and scalability of a container structure within system 3000, this may be a seamless process.

In at least one embodiment, deployment pipeline 3010A of FIG. 31 may include CT scanner 3102 generating imaging data of a patient or subject. In at least one embodiment, imaging data from CT scanner 3102 may be stored on a PACS server(s) 3104 associated with a facility housing CT scanner 3102. In at least one embodiment, PACS server(s) 3104 may include software and/or hardware components that may directly interface with imaging modalities (e.g., CT scanner 3102) at a facility. In at least one embodiment, DICOM adapter 3002B may enable sending and receipt of DICOM objects using DICOM protocols. In at least one embodiment, DICOM adapter 3002B may aid in preparation or configuration of DICOM data from PACS server(s) 3104 for use by deployment pipeline 3010A. In at least one embodiment, once DICOM data is processed through DICOM adapter 3002B, pipeline manager 3012 may route data through to deployment pipeline 3010A. In at least one embodiment, DICOM reader 3106 may extract image files and any associated metadata from DICOM data (e.g., raw sinogram data, as illustrated in visualization 3116A). In at least one embodiment, working files that are extracted may be stored in a cache for faster processing by other applications in deployment pipeline 3010A. In at least one embodiment, once DICOM reader 3106 has finished extracting and/or storing data, a signal of completion may be communicated to pipeline manager 3012. In at least one embodiment, pipeline manager 3012 may then initiate or call upon one or more other applications or containers in deployment pipeline 3010A.

In at least one embodiment, CT reconstruction 3108 application and/or container may be executed once data (e.g., raw sinogram data) is available for processing by CT reconstruction 3108 application. In at least one embodiment, CT reconstruction 3108 may read raw sinogram data from a cache, reconstruct an image file out of raw sinogram data (e.g., as illustrated in visualization 3116B), and store resulting image file in a cache. In at least one embodiment, at completion of reconstruction, pipeline manager 3012 may be signaled that reconstruction task is complete. In at least one embodiment, once reconstruction is complete, and a reconstructed image file may be stored in a cache (or other storage device), organ segmentation 3110 application and/or container may be triggered by pipeline manager 3012. In at least one embodiment, organ segmentation 3110 application and/or container may read an image file from a cache, normalize or convert an image file to format suitable for inference (e.g., convert an image file to an input resolution of a machine learning model), and run inference against a normalized image. In at least one embodiment, to run inference on a normalized image, organ segmentation 3110 application and/or container may rely on services 2920, and pipeline manager 3012 and/or application orchestration system 3028 may facilitate use of services 2920 by organ segmentation 3110 application and/or container. In at least one embodiment, for example, organ segmentation 3110 application and/or container may leverage AI services 3018 to perform inferencing on a normalized image, and AI services 3018 may leverage hardware 2922 (e.g., AI system 3024) to execute AI services 3018. In at least one embodiment, a result of an inference may be a mask file (e.g., as illustrated in visualization 3116C) that may be stored in a cache (or other storage device).

In at least one embodiment, once applications that process DICOM data and/or data extracted from DICOM data have completed processing, a signal may be generated for pipeline manager 3012. In at least one embodiment, pipeline manager 3012 may then execute DICOM writer 3112 to read results from a cache (or other storage device), package results into a DICOM format (e.g., as DICOM output 3114) for use by users at a facility who generated a request. In at least one embodiment, DICOM output 3114 may then be transmitted to DICOM adapter 3002B to prepare DICOM output 3114 for storage on PACS server(s) 3104 (e.g., for viewing by a DICOM viewer at a facility). In at least one embodiment, in response to a request for reconstruction and segmentation, visualizations 3116B and 3116C may be generated and available to a user for diagnoses, research, and/or for other purposes.

Although illustrated as consecutive application in deployment pipeline 3010A, CT reconstruction 3108 and organ segmentation 3110 applications may be processed in parallel in at least one embodiment. In at least one embodiment, where applications do not have dependencies on one another, and data is available for each application (e.g., after DICOM reader 3106 extracts data), applications may be executed at a same time, substantially at a same time, or with some overlap. In at least one embodiment, where two or more applications require similar services 2920, a scheduler of system 3000 may be used to load balance and distribute compute or processing resources between and among various applications. In at least one embodiment, in some embodiments, parallel computing platform 3030 may be used to perform parallel processing for applications to decrease run-time of deployment pipeline 3010A to provide real-time results.

Figure 32A:
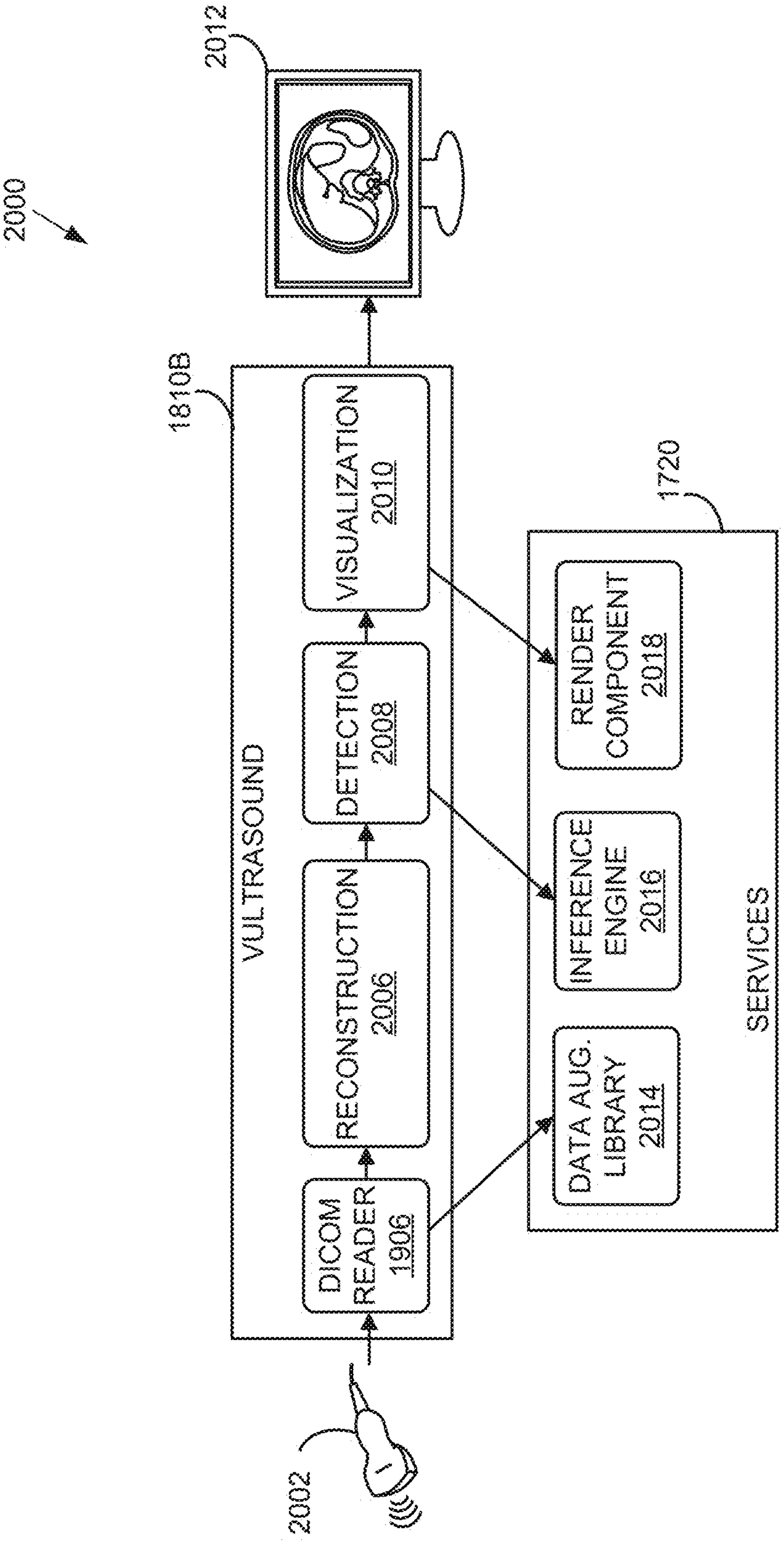
FIG. 32A includes an example data flow diagram of a virtual instrument supporting an ultrasound device, in accordance with at least one embodiment.
Figure 32B:
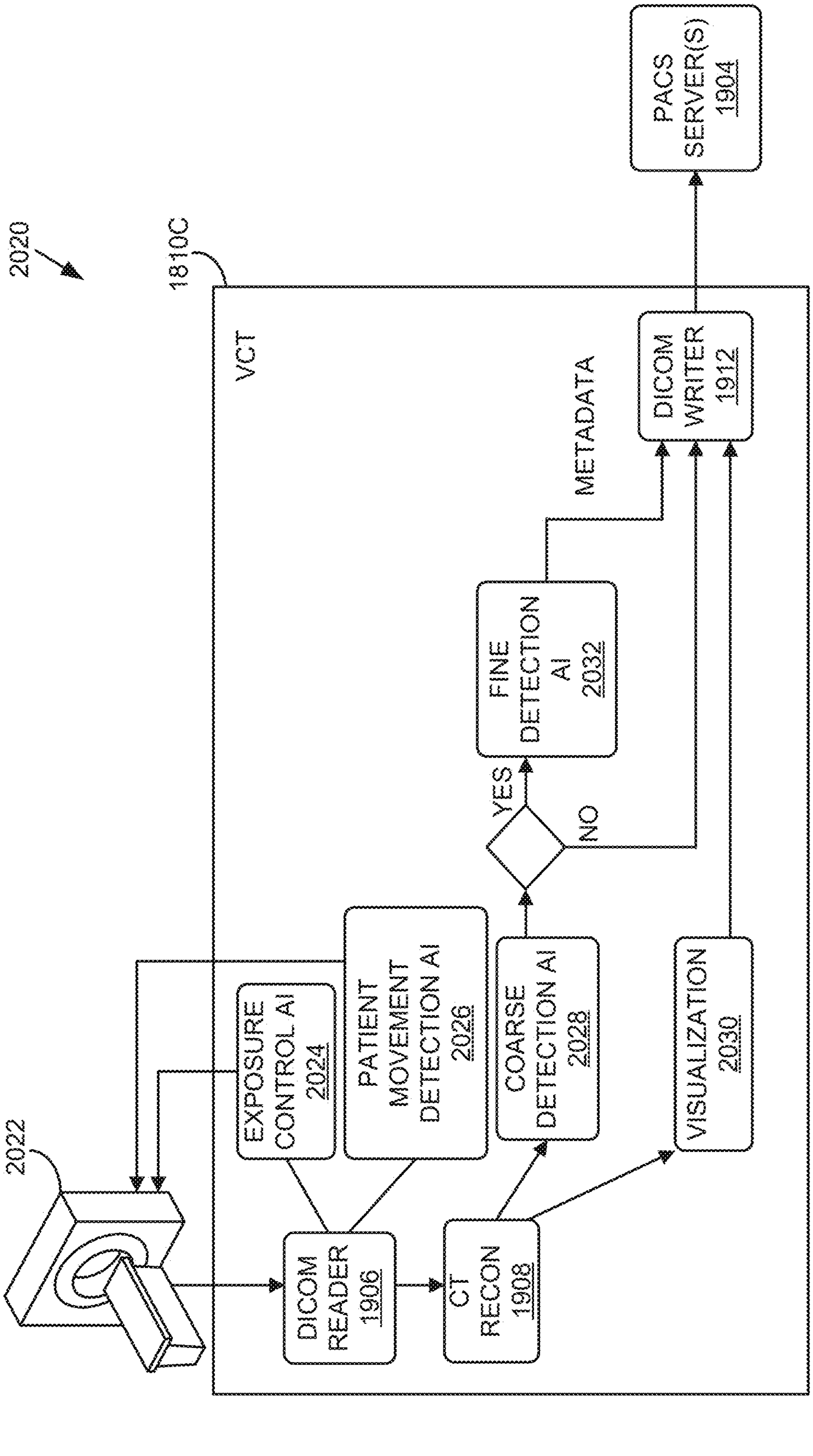
FIG. 32B includes an example data flow diagram of a virtual instrument supporting an CT scanner, in accordance with at least one embodiment.

In at least one embodiment, and with reference to FIGS. 32A-32B, deployment system 2906 may be implemented as one or more virtual instruments to perform different functionalities—such as image processing, segmentation, enhancement, AI, visualization, and inferencing—with imaging devices (e.g., CT scanners, X-ray machines, MRI machines, etc.), sequencing devices, genomics devices, and/or other device types. In at least one embodiment, system 3000 may allow for creation and provision of virtual instruments that may include a software-defined deployment pipeline 3010 that may receive raw/unprocessed input data generated by a device(s) and output processed/reconstructed data. In at least one embodiment, deployment pipelines 3010 (e.g., 3010A and 3010B) that represent virtual instruments may implement intelligence into a pipeline, such as by leveraging machine learning models, to provide containerized inference support to a system. In at least one embodiment, virtual instruments may execute any number of containers each including instantiations of applications. In at least one embodiment, such as where real-time processing is desired, deployment pipelines 3010 representing virtual instruments may be static (e.g., containers and/or applications may be set), while in other examples, container and/or applications for virtual instruments may be selected (e.g., on a per-request basis) from a pool of applications or resources (e.g., within a container registry).

In at least one embodiment, system 3000 may be instantiated or executed as one or more virtual instruments on-premise at a facility in, for example, a computing system deployed next to or otherwise in communication with a radiology machine, an imaging device, and/or another device type at a facility. In at least one embodiment, however, an on-premise installation may be instantiated or executed within a computing system of a device itself (e.g., a computing system integral to an imaging device), in a local datacenter (e.g., a datacenter on-premise), and/or in a cloud-environment (e.g., in cloud 3026). In at least one embodiment, deployment system 2906, operating as a virtual instrument, may be instantiated by a supercomputer or other HPC system in some examples. In at least one embodiment, on-premise installation may allow for high-bandwidth uses (via, for example, higher throughput local communication interfaces, such as RF over Ethernet) for real-time processing. In at least one embodiment, real-time or near real-time processing may be particularly useful where a virtual instrument supports an ultrasound device or other imaging modality where immediate visualizations are expected or required for accurate diagnoses and analyses. In at least one embodiment, a cloud-computing architecture may be capable of dynamic bursting to a cloud computing service provider, or other compute cluster, when local demand exceeds on-premise capacity or capability. In at least one embodiment, a cloud architecture, when implemented, may be tuned for training neural networks or other machine learning models, as described herein with respect to training system 2904. In at least one embodiment, with training pipelines in place, machine learning models may continuously learn and improve as they process additional data from devices they support. In at least one embodiment, virtual instruments may be continually improved using additional data, new data, existing machine learning models, and/or new or updated machine learning models.

In at least one embodiment, a computing system may include some or all of hardware 2922 described herein, and hardware 2922 may be distributed in any of a number of ways including within a device, as part of a computing device coupled to and located proximate a device, in a local datacenter at a facility, and/or in cloud 3026. In at least one embodiment, because deployment system 2906 and associated applications or containers are created in software (e.g., as discrete containerized instantiations of applications), behavior, operation, and configuration of virtual instruments, as well as outputs generated by virtual instruments, may be modified or customized as desired, without having to change or alter raw output of a device that a virtual instrument supports.

In at least one embodiment, deployment pipeline 3010A includes one or more processors that are at least a portion of, or include at least a portion of, one or more of processors described herein at least in conjunction with FIGS. 1-8 and FIGS. 10-22. In at least one embodiment, deployment pipeline 3010A includes one or more processors that are at least a portion of, or includes at least a portion of, processor(s) 104 of FIG. 1. In at least one embodiment, deployment pipeline 3010A includes one or more processors that comprise one or more circuits to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein. In at least one embodiment, one or more circuits of one or more processors of deployment pipeline 3010A is configured by software to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein.

In at least one embodiment, CT scanner 3102 includes one or more processors that are at least a portion of, or include at least a portion of, one or more of processors described herein at least in conjunction with FIGS. 1-8 and FIGS. 10-22. In at least one embodiment, CT scanner 3102 includes one or more processors that are at least a portion of, or includes at least a portion of, processor(s) 104 of FIG. 1. In at least one embodiment, CT scanner 3102 includes one or more processors that comprise one or more circuits to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein. In at least one embodiment, one or more circuits of one or more processors of CT scanner 3102 is configured by software to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein.

FIG. 32A includes an example data flow diagram of a virtual instrument supporting an ultrasound device, in accordance with at least one embodiment. In at least one embodiment, deployment pipeline 3010B may leverage one or more of services 2920 of system 3000. In at least one embodiment, deployment pipeline 3010B and services 2920 may leverage hardware 2922 of a system either locally or in cloud 3026. In at least one embodiment, although not illustrated, process 3200 may be facilitated by pipeline manager 3012, application orchestration system 3028, and/or parallel computing platform 3030.

In at least one embodiment, process 3200 may include receipt of imaging data from an ultrasound device 3202. In at least one embodiment, imaging data may be stored on PACS server(s) in a DICOM format (or other format, such as RIS, CIS, REST compliant, RPC, raw, etc.), and may be received by system 3000 for processing through deployment pipeline 3010 selected or customized as a virtual instrument (e.g., a virtual ultrasound) for ultrasound device 3202. In at least one embodiment, imaging data may be received directly from an imaging device (e.g., ultrasound device 3202) and processed by a virtual instrument. In at least one embodiment, a transducer or other signal converter communicatively coupled between an imaging device and a virtual instrument may convert signal data generated by an imaging device to image data that may be processed by a virtual instrument. In at least one embodiment, raw data and/or image data may be applied to DICOM reader 3106 to extract data for use by applications or containers of deployment pipeline 3010B. In at least one embodiment, DICOM reader 3106 may leverage data augmentation library 3214 (e.g., NVIDIA's DALI) as a service 2920 (e.g., as one of compute service(s) 3016) for extracting, resizing, rescaling, and/or otherwise preparing data for use by applications or containers.

In at least one embodiment, once data is prepared, a reconstruction 3206 application and/or container may be executed to reconstruct data from ultrasound device 3202 into an image file. In at least one embodiment, after reconstruction 3206, or at a same time as reconstruction 3206, a detection 3208 application and/or container may be executed for anomaly detection, object detection, feature detection, and/or other detection tasks related to data. In at least one embodiment, an image file generated during reconstruction 3206 may be used during detection 3208 to identify anomalies, objects, features, etc. In at least one embodiment, detection 3208 application may leverage an inference engine 3216 (e.g., as one of AI service(s) 3018) to perform inferencing on data to generate detections. In at least one embodiment, one or more machine learning models (e.g., from training system 2904) may be executed or called by detection 3208 application.

In at least one embodiment, once reconstruction 3206 and/or detection 3208 is/are complete, data output from these application and/or containers may be used to generate visualizations 3210, such as visualization 3212 (e.g., a grayscale output) displayed on a workstation or display terminal. In at least one embodiment, visualization may allow a technician or other user to visualize results of deployment pipeline 3010B with respect to ultrasound device 3202. In at least one embodiment, visualization 3210 may be executed by leveraging a render component 3218 of system 3000 (e.g., one of visualization service(s) 3020). In at least one embodiment, render component 3218 may execute a 2D, OpenGL, or ray-tracing service to generate visualization 3212.

In at least one embodiment, ultrasound device 3202 includes one or more processors that are at least a portion of, or include at least a portion of, one or more of processors described herein at least in conjunction with FIGS. 1-8 and FIGS. 10-22. In at least one embodiment, ultrasound device 3202 includes one or more processors that are at least a portion of, or includes at least a portion of, processor(s) 104 of FIG. 1. In at least one embodiment, ultrasound device 3202 includes one or more processors that comprise one or more circuits to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein. In at least one embodiment, one or more processors of ultrasound device 3202 is configured by software to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein.

FIG. 32B includes an example data flow diagram of a virtual instrument supporting a CT scanner, in accordance with at least one embodiment. In at least one embodiment, deployment pipeline 3010C may leverage one or more of services 2920 of system 3000. In at least one embodiment, deployment pipeline 3010C and services 2920 may leverage hardware 2922 of a system either locally or in cloud 3026. In at least one embodiment, although not illustrated, process 3220 may be facilitated by pipeline manager 3012, application orchestration system 3028, and/or parallel computing platform 3030.

In at least one embodiment, process 3220 may include CT scanner 3222 generating raw data that may be received by DICOM reader 3106 (e.g., directly, via a PACS server 3104, after processing, etc.). In at least one embodiment, a Virtual CT (instantiated by deployment pipeline 3010C) may include a first, real-time pipeline for monitoring a patient (e.g., patient movement detection AI 3226) and/or for adjusting or optimizing exposure of CT scanner 3222 (e.g., using exposure control AI 3224). In at least one embodiment, one or more of applications (e.g., 3224 and 3226) may leverage a service 2920, such as AI service(s) 3018. In at least one embodiment, outputs of exposure control AI 3224 application (or container) and/or patient movement detection AI 3226 application (or container) may be used as feedback to CT scanner 3222 and/or a technician for adjusting exposure (or other settings of CT scanner 3222) and/or informing a patient to move less.

In at least one embodiment, deployment pipeline 3010C may include a non-real-time pipeline for analyzing data generated by CT scanner 3222. In at least one embodiment, a second pipeline may include CT reconstruction 3108 application and/or container, a coarse detection AI 3228 application and/or container, a fine detection AI 3232 application and/or container (e.g., where certain results are detected by coarse detection AI 3228), a visualization 3230 application and/or container, and a DICOM writer 3112 (and/or other data type writer, such as RIS, CIS, REST compliant, RPC, raw, etc.) application and/or container. In at least one embodiment, raw data generated by CT scanner 3222 may be passed through pipelines of deployment pipeline 3010C (instantiated as a virtual CT instrument) to generate results. In at least one embodiment, results from DICOM writer 3112 may be transmitted for display and/or may be stored on PACS server(s) 3104 for later retrieval, analysis, or display by a technician, practitioner, or other user.

In at least one embodiment, CT scanner 3222 includes one or more processors that are at least a portion of, or include at least a portion of, one or more of processors described herein at least in conjunction with FIGS. 1-8 and FIGS. 10-22. In at least one embodiment, CT scanner 3222 includes one or more processors that are at least a portion of, or includes at least a portion of, processor(s) 104 of FIG. 1. In at least one embodiment, CT scanner 3222 includes one or more processors that comprise one or more circuits to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein. In at least one embodiment, one or more circuits of one or more processors of CT scanner 3222 is configured by software to sone or more operands stored contiguously based, at least in part, on a precision of the one or more operands, or perform other operations, such as operations to format a contiguous block of memory to store values of mixed-precision, or otherwise perform any of the operations described above or elsewhere herein.

FIG. 33A illustrates a data flow diagram for a process 3300 to train, retrain, or update a machine learning model, in accordance with at least one embodiment. In at least one embodiment, process 3300 may be executed using, as a non-limiting example, system 3000 of FIG. 30. In at least one embodiment, process 3300 may leverage services 2920 and/or hardware 2922 of system 3000, as described herein. In at least one embodiment, refined models 3312 generated by process 3300 may be executed by deployment system 2906 for one or more containerized applications in deployment pipelines 3010.

In at least one embodiment, model training 2914 may include retraining or updating an initial model 3304 (e.g., a pre-trained model) using new training data (e.g., new input data, such as customer dataset 3306, and/or new ground truth data associated with input data). In at least one embodiment, to retrain, or update, initial model 3304, output or loss layer(s) of initial model 3304 may be reset, or deleted, and/or replaced with an updated or new output or loss layer(s). In at least one embodiment, initial model 3304 may have previously fine-tuned parameters (e.g., weights and/or biases) that remain from prior training, so training or retraining 2914 may not take as long or require as much processing as training a model from scratch. In at least one embodiment, during model training 2914, by having reset or replaced output or loss layer(s) of initial model 3304, parameters may be updated and re-tuned for a new data set based on loss calculations associated with accuracy of output or loss layer(s) at generating predictions on new, customer dataset 3306 (e.g., image data 2908 of FIG. 29).

In at least one embodiment, pre-trained models 3006 may be stored in a data store, or registry (e.g., model registry 2924 of FIG. 29). In at least one embodiment, pre-trained models 3006 may have been trained, at least in part, at one or more facilities other than a facility executing process 3300. In at least one embodiment, to protect privacy and rights of patients, subjects, or clients of different facilities, pre-trained models 3006 may have been trained, on-premise, using customer or patient data generated on-premise. In at least one embodiment, pre-trained models 3006 may be trained using cloud 3026 and/or other hardware 2922, but confidential, privacy protected patient data may not be transferred to, used by, or accessible to any components of cloud 3026 (or other off premise hardware). In at least one embodiment, where a pre-trained model 3006 is trained at using patient data from more than one facility, pre-trained model 3006 may have been individually trained for each facility prior to being trained on patient or customer data from another facility. In at least one embodiment, such as where a customer or patient data has been released of privacy concerns (e.g., by waiver, for experimental use, etc.), or where a customer or patient data is included in a public data set, a customer or patient data from any number of facilities may be used to train pre-trained model 3006 on-premise and/or off premise, such as in a datacenter or other cloud computing infrastructure.

In at least one embodiment, when selecting applications for use in deployment pipelines 3010, a user may also select machine learning models to be used for specific applications. In at least one embodiment, a user may not have a model for use, so a user may select a pre-trained model 3006 to use with an application. In at least one embodiment, pre-trained model 3006 may not be optimized for generating accurate results on customer dataset 3306 of a facility of a user (e.g., based on patient diversity, demographics, types of medical imaging devices used, etc.). In at least one embodiment, prior to deploying pre-trained model 3006 into deployment pipeline 3010 for use with an application(s), pre-trained model 3006 may be updated, retrained, and/or fine-tuned for use at a respective facility.

In at least one embodiment, a user may select pre-trained model 3006 that is to be updated, retrained, and/or fine-tuned, and pre-trained model 3006 may be referred to as initial model 3304 for training system 2904 within process 3300. In at least one embodiment, customer dataset 3306 (e.g., imaging data, genomics data, sequencing data, or other data types generated by devices at a facility) may be used to perform model training 2914 (which may include, without limitation, transfer learning) on initial model 3304 to generate refined model 3312. In at least one embodiment, ground truth data corresponding to customer dataset 3306 may be generated by training system 2904. In at least one embodiment, ground truth data may be generated, at least in part, by clinicians, scientists, doctors, practitioners, at a facility (e.g., as labeled clinic data 2912 of FIG. 29).

In at least one embodiment, AI-assisted annotation 2910 may be used in some examples to generate ground truth data. In at least one embodiment, AI-assisted annotation 2910 (e.g., implemented using an AI-assisted annotation SDK) may leverage machine learning models (e.g., neural networks) to generate suggested or predicted ground truth data for a customer dataset. In at least one embodiment, user 3310 may use annotation tools within a user interface (a graphical user interface (GUI)) on computing device 3308.

In at least one embodiment, user 3310 may interact with a GUI via computing device 3308 to edit or fine-tune annotations or auto-annotations. In at least one embodiment, a polygon editing feature may be used to move vertices of a polygon to more accurate or fine-tuned locations.

In at least one embodiment, once customer dataset 3306 has associated ground truth data, ground truth data (e.g., from AI-assisted annotation, manual labeling, etc.) may be used during model training 2914 to generate refined model 3312. In at least one embodiment, customer dataset 3306 may be applied to initial model 3304 any number of times, and ground truth data may be used to update parameters of initial model 3304 until an acceptable level of accuracy is attained for refined model 3312. In at least one embodiment, once refined model 3312 is generated, refined model 3312 may be deployed within one or more deployment pipelines 3010 at a facility for performing one or more processing tasks with respect to medical imaging data.

In at least one embodiment, refined model 3312 may be uploaded to pre-trained models 3006 in model registry 2924 to be selected by another facility. In at least one embodiment, his process may be completed at any number of facilities such that refined model 3312 may be further refined on new datasets any number of times to generate a more universal model.

Logic 915 are used to perform inferencing and/or training operations associated with one or more embodiments. Details regarding logic 915 are provided herein in conjunction with FIGS. 9A and/or 9B. In at least one embodiment, logic 915 may be used in computing device 3308 for inferencing or predicting operations based, at least in part, on weight parameters calculated using neural network training operations, neural network functions and/or architectures, or neural network use cases described herein.

In at least one embodiment, computing device 3308 In at least one embodiment, system 3000 includes one or more processors that are at least a portion of, or include at least a portion of, one or more of processors described herein at least in conjunction with FIGS. 1-8 and FIGS. 10-22. In at least one embodiment, computing device 3308 includes one or more processors that are at least a portion of, or includes at least a portion of, processor(s) 104 of FIG. 1. In at least one embodiment, computing device 3308 includes one or more processors that comprise one or more circuits to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein. In at least one embodiment, one or more circuits of one or more processors of computing device 3308 are configured by software to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein.

FIG. 33B is an example illustration of a client-server architecture 3332 to enhance annotation tools with pre-trained annotation models, in accordance with at least one embodiment. In at least one embodiment, AI-assisted annotation tools 3336 may be instantiated based on a client-server architecture 3332. In at least one embodiment, annotation tools 3336 in imaging applications may aid radiologists, for example, identify organs and abnormalities. In at least one embodiment, imaging applications may include software tools that help user 3310 to identify, as a non-limiting example, a few extreme points on a particular organ of interest in raw images 3334 (e.g., in a 3D MRI or CT scan) and receive auto-annotated results for all 2D slices of a particular organ. In at least one embodiment, results may be stored in a data store as training data 3338 and used as (for example and without limitation) ground truth data for training. In at least one embodiment, when computing device 3308 sends extreme points for AI-assisted annotation 2910, a deep learning model, for example, may receive this data as input and return inference results of a segmented organ or abnormality. In at least one embodiment, pre-instantiated annotation tools, such as AI-Assisted Annotation Tool 3336B in FIG. 33B, may be enhanced by making API calls (e.g., API Call 3344) to a server, such as an Annotation Assistant Server 3340 that may include a set of pre-trained models 3342 stored in an annotation model registry, for example. In at least one embodiment, an annotation model registry may store pre-trained models 3342 (e.g., machine learning models, such as deep learning models) that are pre-trained to perform AI-assisted annotation on a particular organ or abnormality. In at least one embodiment, these models may be further updated by using training pipelines 3004. In at least one embodiment, pre-installed annotation tools may be improved over time as new labeled clinic data 2912 is added.

In at least one embodiment, computing device 3308 In at least one embodiment, system 3000 includes one or more processors that are at least a portion of, or include at least a portion of, one or more of processors described herein at least in conjunction with FIGS. 1-8 and FIGS. 10-22. In at least one embodiment, computing device 3308 includes one or more processors that are at least a portion of, or includes at least a portion of, processor(s) 104 of FIG. 1. In at least one embodiment, computing device 3308 includes one or more processors that comprise one or more circuits to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein. In at least one embodiment, one or more circuits of one or more processors of computing device 3308 are configured by software to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein.

Figure 34:
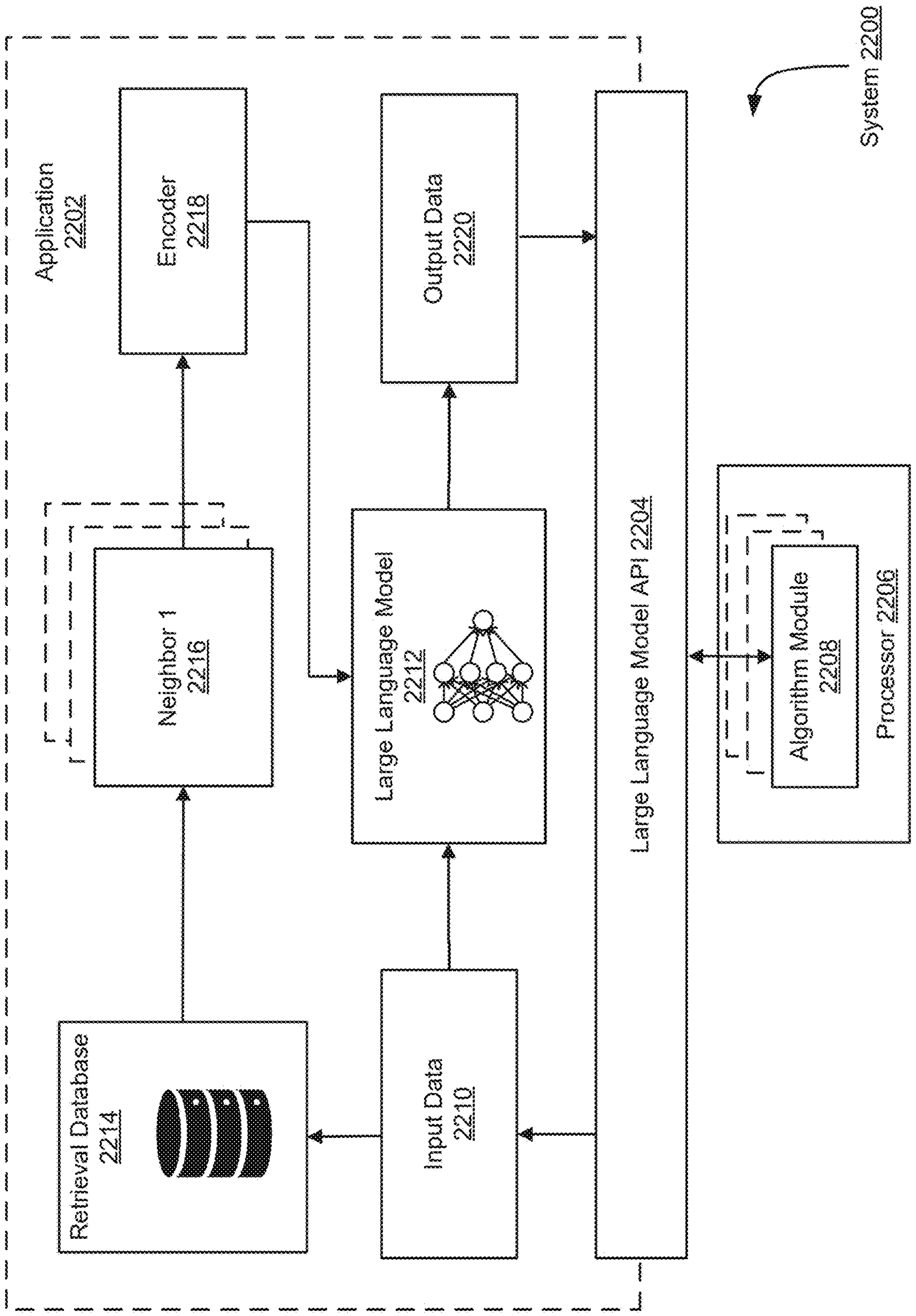
FIG. 34 illustrates components of a system to access a large language model, according to at least one embodiment.

FIG. 34 is a system diagram illustrating system 3400 for interfacing with an application 3402 to process data, according to at least one embodiment. In at least one embodiment, application 3402 uses large language model (LLM) 3412 to generate output data 3420 based, at least in part, on input data 3410. In at least one embodiment, input data 3410 is a text prompt. In at least one embodiment, input data 3410 includes unstructured text. In at least one embodiment, input data 3410 includes a sequence of tokens. In at least one embodiment, a token is a portion of input data. In at least one embodiment, a token is a word. In at least one embodiment, a token is a character. In at least one embodiment, a token is a subword. In at least one embodiment, input data 3410 is formatted in Chat Markup Language (ChatML). In at least one embodiment, input data 3410 is an image. In at least one embodiment, input data 3410 is one or more video frames. In at least one embodiment, input data 3410 is any other expressive medium.

In at least one embodiment, large language model 3412 comprises a deep neural network. In at least one embodiment, a deep neural network is a neural network with two or more layers. In at least one embodiment, large language model 3412 comprises a transformer model. In at least one embodiment, large language model 3412 comprises a neural network configured to perform natural language processing. In at least one embodiment, large language model 3412 is configured to process one or more sequences of data. In at least one embodiment, large language model 3412 is configured to process text. In at least one embodiment, weights and biases of a large language model 3412 are configured to process text. In at least one embodiment, large language model 3412 is configured to determine patterns in data to perform one or more natural language processing tasks. In at least one embodiment, a natural language processing task comprises text generation. In at least one embodiment, a natural language processing task comprises question answering. In at least one embodiment, performing a natural language processing task results in output data 3420.

In at least one embodiment, a processor uses input data 3410 to query retrieval database 3414. In at least one embodiment, retrieval database 3414 is a key-value store. In at least one embodiment, retrieval database 3414 is a corpus used to train large language model 3412. In at least one embodiment, a processor uses retrieval database 3414 to provide large language model 3412 with updated information. In at least one embodiment, retrieval database 3414 comprises data from an internet source. In at least one embodiment, large language model 3412 does not use retrieval database 3414 to perform inferencing.

In at least one embodiment, an encoder encodes input data 3410 into one or more feature vectors. In at least one embodiment, an encoder encodes input data 3410 into a sentence embedding vector. In at least one embodiment, a processor uses said sentencing embedding vector to perform a nearest neighbor search to generate one or more neighbors 3416. In at least one embodiment, one or more neighbors 3416 is value in retrieval database 3414 corresponding to a key comprising input data 3410. In at least one embodiment, one or more neighbors 3416 comprise text data. In at least one embodiment, encoder 3418 encodes one or more neighbors 3416. In at least one embodiment, encoder 3418 encodes one or more neighbors 3416 into a text embedding vector. In at least one embodiment, encoder 3418 encodes one or more neighbors 3416 into a sentence embedding vector. In at least one embodiment, large language model 3416 uses input data 3410 and data generated by encoder 3418 to generate output data 3420. In at least one embodiment, processor 3406 interfaces with application 3402 using large language model (LLM) application programming interface(s) (API(s)) 3404. In at least one embodiment, processor 3406 accesses large language model 3416 using large language model (LLM) application programming interface(s) (API(s)) 3404.

In at least one embodiment, output data 3420 comprise computer instructions. In at least one embodiment, output data 3420 comprise instructions written in CUDA programming language. In at least one embodiment, output data 3420 comprise instructions to be performed by processor 3406. In at least one embodiment, output data 3420 comprise instructions to control execution of one or more algorithm modules 3408. In at least one embodiment, one or more algorithm modules 3408 comprise, for example, one or more neural networks to perform pattern recognition. In at least one embodiment, one or more algorithm modules 3408 comprise, for example, one or more neural networks to perform frame generation. In at least one embodiment, one or more algorithm modules 3408 comprise, for example, one or more neural networks to generate a drive path. In at least one embodiment, one or more algorithm modules 3408 comprise, for example, one or more neural networks to generate a 5G signal. In at least one embodiment, processor 3406 interfaces with application 3402 using large language model (LLM) application programming interface(s) (API(s)) 3404. In at least one embodiment, processor 3406 may use one or more parallel computing platforms and/or programming models (e.g., NVIDIA's CUDA model).

In at least one embodiment, aspects of systems and techniques described herein in relation to FIG. 34 are incorporated into aspects of preceding figure(s). For example, in at least one embodiment, an apparatus depicted in preceding figure(s) includes processor 3406.

For example, in at least one embodiment, system 3400 uses ChatGPT to write CUDA code. For example, in at least one embodiment, system 3400 uses ChatGPT to train an object classification neural network. For example, in at least one embodiment, system 3400 uses ChatGPT and a neural network to identify a driving path. For example, in at least one embodiment, system 3400 uses ChatGPT and a neural network to generate a 5G signal.

Logic 915 are used to perform inferencing and/or training operations associated with one or more embodiments. Details regarding logic 915 are provided herein in conjunction with FIGS. 9A and/or 9B. In at least one embodiment, logic 915 may be used in system 3400 for inferencing or predicting operations based, at least in part, on weight parameters calculated using neural network training operations, neural network functions and/or architectures, or neural network use cases described herein.

In at least one embodiment, system 3400 In at least one embodiment, system 3400 includes one or more processors that are at least a portion of, or include at least a portion of, one or more of processors described herein at least in conjunction with FIGS. 1-8 and FIGS. 10-22. In at least one embodiment, system 3400 includes one or more processors that are at least a portion of, or includes at least a portion of, processor(s) 104 of FIG. 1. In at least one embodiment, system 3400 includes one or more processors that comprise one or more circuits to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein. In at least one embodiment, one or more circuits of one or more processors of system 3400 are configured by software to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein.

OpenVINO can include a toolkit for facilitating development of applications, specifically neural network applications, for various tasks and operations, such as, but not limited to, human vision emulation, speech recognition, natural language processing, recommendation systems, and/or variations thereof. OpenVINO can support neural networks such as, but not limited to, convolutional neural networks (CNNs), recurrent and/or attention-based neural networks, and/or various other neural network models. OpenVINO can support various software libraries such as, but not limited to, OpenCV, OpenCL, and/or variations thereof.

OpenVINO can support neural network models for various tasks and operations, such as, but not limited to, classification, segmentation, object detection, face recognition, speech recognition, pose estimation (e.g., humans and/or objects), monocular depth estimation, image inpainting, style transfer, action recognition, colorization, and/or variations thereof.

OpenVINO can include one or more software tools and/or modules for model optimization, also referred to as a model optimizer. A model optimizer can include a command line tool that facilitates transitions between training and deployment of neural network models. A model optimizer may optimize neural network models for execution on various devices and/or processing units, such as, but not limited to, a GPU, CPU, PPU, GPGPU, and/or variations thereof. A model optimizer can generate an internal representation of a model, and can optimize said model to generate an intermediate representation. A model optimizer may reduce a number of layers of a model. A model optimizer can remove layers of a model that may be utilized for training. A model optimizer may perform various neural network operations, such as, but not limited to, modifying inputs to a model (e.g., resizing inputs to a model), modifying a size of inputs of a model (e.g., modifying a batch size of a model), modifying a model structure (e.g., modifying layers of a model), normalization, standardization, quantization (e.g., converting weights of a model from a first representation, such as, but not limited to, floating point, to a second representation, such as, but not limited to, integer), and/or variations thereof.

OpenVINO can include one or more software libraries for inferencing, also referred to as an inference engine. An inference engine can include a C++ library, or any suitable programming language library. An inference engine can be utilized to infer input data. An inference engine may implement various classes to infer input data and generate one or more results. An inference engine can implement one or more API functions to process an intermediate representation, set input and/or output formats, and/or execute a model on one or more devices.

OpenVINO may provide various abilities for heterogeneous execution of one or more neural network models. Heterogeneous execution, or heterogeneous computing, can refer to one or more computing processes and/or systems that utilize one or more types of processors and/or cores. OpenVINO can provide various software functions to execute a program on one or more devices. OpenVINO may provide various software functions to execute a program and/or portions of a program on different devices. OpenVINO may provide various software functions to, for example, run a first portion of code on a CPU and a second portion of code on a GPU and/or FPGA. OpenVINO may provide various software functions to execute one or more layers of a neural network on one or more devices (e.g., a first set of layers on a first device, such as, but not limited to, a GPU, and a second set of layers on a second device, such as, but not limited to, a CPU).

OpenVINO can include various functionality similar to functionalities associated with a CUDA programming model, such as, but not limited to, various neural network model operations associated with frameworks such as, but not limited to, TensorFlow, PyTorch, and/or variations thereof. One or more CUDA programming model operations may be performed using OpenVINO. Various systems, methods, and/or techniques described herein may be implemented using Open VINO.

In at least one embodiment, one or more circuits can be used to cause one or more neural networks and training frameworks described elsewhere herein to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein. One or more neural networks and training frameworks can be configured by software to use one or more indices comprising a plurality of bits, each indicating one or more operands stored contiguously based, at least in part, on a precision of the one or more operands, or perform other operations, such as operations to format a contiguous block of memory to store values of mixed-precision, or otherwise perform any of the operations described above or elsewhere herein.

At least one embodiment of the disclosure can be described in view of the following clauses:

1. A processor comprising:

one or more circuits to use one or more indices comprising a plurality of bits, each indicating one or more operands stored contiguously based, at least in part, on a precision of the one or more operands.

2. The processor of clause 1, wherein the one or more circuits are to assign a plurality of contiguous storage locations to store two or more operands of different precisions.

3. The processor of any of clauses 1-2, wherein the one or more circuits are to use the one or more indices to store one or more operands of one or more tensors each comprising a plurality of operands of different precisions.

4. The processor of any of clauses 1-3, wherein the one or more indices indicate one or more storage locations of the one or more operands of a first precision based, at least in part, on one or more storage locations of the one or more operands of a second precision.

5. The processor of any of clauses 1-4, wherein the plurality of bits indicate one or more storage locations of the one or more operands.

6. The processor of any of clauses 1-5, wherein the one or more indices are based, at least in part, on data stored in a portion of storage storing the one or more operands.

7. The processor of any of clauses 1-6, wherein the one or more indices are to be used to store the one or more operands as part of a neural network.

8. A system, comprising:

one or more processors to use one or more indices comprising a plurality of bits, each indicating one or more operands stored contiguously based, at least in part, on a precision of the one or more operands.

9. The system of clause 8, wherein the one or more processors are to use the one or more indices to access a plurality of contiguous storage locations storing two or more operands of different precisions.

10. The system of any of clauses 8-9, wherein the one or more processors perform one or more tensor multiplication operations based, at least in part, on using the one or more indices to store one or more operands of one or more tensors each comprising a plurality of operands of different precisions.

11. The system of any of clauses 8-10, wherein the one or more processors are to store in each of a plurality of portions of storage a first same amount of the one or more operands of a first precision and a second same amount of the one or more operands of a second precision.

12. The system of any of clauses 8-11, wherein the plurality of bits indicate one or more memory addresses corresponding to one or more storage locations of the one or more operands.

13. The system of any of clauses 8-12, wherein the one or more indices are based, at least in part, on metadata stored in a portion of memory different from another portion of memory storing the one or more operands.

14. The system of any of clauses 8-13, wherein the one or more indices are to be used to store the one or more operands as part of a quantized neural network.

15. A method, comprising:

generating one or more indices comprising a plurality of bits, each indicating one or more operands stored contiguously based, at least in part, on a precision of the one or more operands.

16. The method of clause 15, further comprising using the one or more indices to concurrently obtain two or more operands of different precisions stored in a plurality of contiguous storage locations.

17. The method of any of clauses 15-16, further comprising performing one or more tensor multiplication operations using one or more tensors comprising a plurality of the one or more operands of different precisions based, at least in part, using the one or more indices to store the one or more operands.

18. The method of any of clauses 15-17, further comprising assigning each of a plurality of portions of storage to store a same proportion of an amount of the one or more operands of a first precision in relation to an amount of the one or more operands of a second precision.

19. The method of any of clauses 15-18, wherein the plurality of bits indicate one or more virtual memory addresses corresponding to one or more storage locations of the one or more operands.

20. The method of any of clauses 15-19, wherein the one or more operands of a given precision comprise one or more neural network values that exceed a threshold value based, at least in part, on accuracy of a neural network.

As will be apparent to one of ordinary skill in the art, other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Use of "may" and/or "can" is intended to indicate by way of example without limiting any particular embodiment or component or other function described above, below, or elsewhere herein. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as, but not limited to, phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). Number of items in a plurality can be at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. A process such as, but not limited to, those processes described herein (or variations and/or combinations thereof) can be performed under control of one or more computer systems configured with executable instructions and is implemented as code (e.g., executable instructions, one or more computer programs or one or more applications) executing collectively on one or more processors, by hardware or combinations thereof. Code can be stored on a computer-readable storage medium, for example, in form of a computer program comprising a plurality of instructions executable by one or more processors. A computer-readable storage medium can be a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. Code (e.g., executable code or source code) can be stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media can include multiple non-transitory computer-readable storage media and one or more of individual non-transitory storage media of multiple non-transitory computer-readable storage media lack all of code while multiple non-transitory computer-readable storage media collectively store all of code. Executable instructions can be executed such that different instructions are executed by different processors—for example, a non-transitory computer-readable storage medium store instructions and a main central processing unit ("CPU") executes some of instructions while a graphics processing unit ("GPU") executes other instructions. Different components of a computer system can have separate processors and different processors execute different subsets of instructions.

An arithmetic logic unit can include a set of combinational logic circuitry that takes one or more inputs to produce a result. An arithmetic logic unit can be used by a processor to implement mathematical operation such as, but not limited to, addition, subtraction, or multiplication. An arithmetic logic unit is used to implement logical operations such as, but not limited to, logical AND/OR or XOR. An arithmetic logic unit can be stateless, and made from physical switching components such as, but not limited to, semiconductor transistors arranged to form logical gates. An arithmetic logic unit may operate internally as a stateful logic circuit with an associated clock. An arithmetic logic unit may be constructed as an asynchronous logic circuit with an internal state not maintained in an associated register set. An arithmetic logic unit can be used by a processor to combine operands stored in one or more registers of the processor and produce an output that can be stored by the processor in another register or a memory location.

As a result of processing an instruction retrieved by the processor, the processor may present one or more inputs or operands to an arithmetic logic unit, causing the arithmetic logic unit to produce a result based at least in part on an instruction code provided to inputs of the arithmetic logic unit. The instruction codes provided by the processor to the ALU may be based at least in part on the instruction executed by the processor. Combinational logic in the ALU may process the inputs and produces an output which is placed on a bus within the processor. A processor can select a destination register, memory location, output device, or output storage location on the output bus so that clocking the processor causes the results produced by the ALU to be sent to the desired location.

In the scope of this application, the term arithmetic logic unit, or ALU, is used to refer to any computational logic circuit that processes operands to produce a result. For example, in the present document, the term ALU can refer to a floating point unit, a DSP, a tensor core, a shader core, a coprocessor, or a CPU.

One or more components of systems and/or processors disclosed above can communicate with one or more CPUs, ASICs, GPUs, FPGAs, or other hardware, circuitry, or integrated circuit components that include, e.g., an upscaler or upsampler to upscale an image, an image blender or image blender component to blend, mix, or add images together, a sampler to sample an image (e.g., as part of a DSP), a neural network circuit that is configured to perform an upscaler to upscale an image (e.g., from a low resolution image to a high resolution image), or other hardware to modify or generate an image, frame, or video to adjust its resolution, size, or pixels; one or more components of systems and/or processors disclosed above can use components described in this disclosure to perform methods, operations, or instructions that generate or modify an image.

Computer systems can be configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or example language (e.g., "such as, but not limited to,") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as, but not limited to, "processing," "computing," "calculating," "determining," or like, refer to action and/or processes of a computer or computing system, or similar electronic computing device, that manipulate and/or transform data represented as physical, such as, but not limited to, electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as, but not limited to, tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

References may be made to obtaining, acquiring, receiving, or inputting analog or digital data into a subsystem, computer system, or computer-implemented machine. Processes of obtaining, acquiring, receiving, or inputting analog and digital data can be accomplished in a variety of ways such as, but not limited to, by receiving data as a parameter of a function call or a call to an application programming interface. Processes of obtaining, acquiring, receiving, or inputting analog or digital data can be accomplished by transferring data via a serial or parallel interface. Processes of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as example forms of implementing the claims.

What is claimed is:

1. One or more processors, comprising:

circuitry to;

store one or more first precision numbers and one or more second precision numbers corresponding to one or more neural network parameters within a contiguous range of storage; and generate an index indicating locations, within the contiguous range of storage, of the one or more first precision numbers and the one or more second precision numbers.

2. The one or more processors of claim 1, wherein the circuitry is to assign two or more blocks of the contiguous range of storage to store a number of the one or more first precision numbers and a number of the one or more second precision numbers in each of the two or more blocks.

3. The one or more processors of claim 1, wherein the one or more first precision numbers and the one or more second precision numbers comprise two or more operands of one or more tensors.

4. The one or more processors of claim 1, wherein the index indicates one or more locations of the one or more first precision numbers based, at least in part, on one or more locations of the one or more second precision numbers.

5. The one or more processors of claim 1, wherein a plurality of bits indicate the locations.

6. The one or more processors of claim 1, wherein the index is generated by, at least in part, metadata used to format the contiguous range of storage to store the one or more first precision numbers and the one or more second precision numbers.

7. The one or more processors of claim 1, wherein the index is to be used to store the one or more first precision numbers and the one or more second precision numbers as part of a neural network.

8. The one or more processors of claim 1, wherein:

a block of memory comprises the contiguous range of storage;

the block of memory is divided into a plurality of sub-blocks;

at least one sub-block is to store the one or more first precision numbers; and at least one other sub-block is to store the one or more second precision numbers.

9. A system, comprising:

one or more processors to:

store one or more first precision numbers and one or more second precision numbers corresponding to one or more neural network parameters within a contiguous range of storage; and generate an index indicating locations, within the contiguous range of storage, of the one or more first precision numbers and the one or more second precision numbers.

10. The system of claim 9, wherein the one or more processors are to assign two or more fixed-length blocks of the contiguous range of storage to store a number of the one or more first precision numbers and a number of the one or more second precision numbers in each of the two or more fixed-length blocks.

11. The system of claim 9, wherein the one or more processors are to perform one or more tensor multiplication operations based, at least in part, on the index.

12. The system of claim 9, wherein the index indicates one or more locations of the one or more first precision numbers based, at least in part, on one or more locations of the one or more second precision numbers within a block of the contiguous range of storage.

13. The system of claim 9, wherein the index indicates one or more memory addresses corresponding to the locations.

14. The system of claim 9, wherein the index is generated by, at least in part, metadata stored in a portion of the contiguous range of storage.

15. The system of claim 9, wherein the index is to be used to store the one or more first precision numbers and the one or more second precision numbers as part of a quantized neural network.

16. A method, comprising:

storing one or more first precision numbers and one or more second precision numbers corresponding to one or more neural network parameters within a contiguous range of storage; and generating an index indicating locations, within the contiguous range of storage, of the one or more first precision numbers and the one or more second precision numbers.

17. The method of claim 16, further comprising using the index to concurrently obtain at least one of the one or more first precision numbers and at least one of the one or more second precision numbers stored within the contiguous range of storage.

18. The method of claim 16, further comprising performing one or more tensor multiplication operations using one or more tensors comprising the one or more first precision numbers and the one or more second precision numbers based, at least in part, on using the index.

19. The method of claim 16, further comprising assigning each of a plurality of portions of the contiguous range of storage to store a same proportion of an amount of the one or more first precision numbers in relation to an amount of the one or more second precision numbers.

20. The method of claim 16, wherein the index indicates one or more virtual memory addresses corresponding to the contiguous range of storage.

21. The method of claim 16, wherein at least one of the one or more first and second precision numbers comprise one or more neural network values that exceed a threshold value based, at least in part, on an accuracy of a neural network.

* * * * *